US008660876B2

(12) United States Patent
Woodings et al.

(10) Patent No.: US 8,660,876 B2
(45) Date of Patent: *Feb. 25, 2014

(54) DOCUMENT MANAGEMENT SYSTEM

(75) Inventors: Lewis E. Woodings, Chevy Chase, MD (US); James D. Bosse, Silver Spring, MD (US); Mathew P. Hodgson, Kensington, MD (US); Alexander Smorodintsev, Gaithersburg, MD (US); Alexei Klimantov, Gaithersburg, MD (US); Viatcheslav Karassik, Silver Spring, MD (US)

(73) Assignee: IDocuments, LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,063

(22) Filed: Sep. 23, 2011

(65) Prior Publication Data
US 2012/0078924 A1 Mar. 29, 2012

Related U.S. Application Data

(63) Continuation of application No. 12/561,807, filed on Sep. 17, 2009, now Pat. No. 8,060,394, which is a continuation of application No. 10/879,617, filed on Jun. 30, 2004, now abandoned.

(60) Provisional application No. 60/483,098, filed on Jun. 30, 2003.

(51) Int. Cl.
*G06Q 10/00* (2012.01)

(52) U.S. Cl.
USPC ........................................................ 705/7.13

(58) Field of Classification Search
USPC ........................................................ 705/7.13
See application file for complete search history.

(56) References Cited

U.S. PATENT DOCUMENTS

| | | |
|---|---|---|
| 5,111,391 A | 5/1992 | Fields et al. |
| 5,416,694 A | 5/1995 | Parrish et al. |
| 5,617,342 A | 4/1997 | Elazouni |
| 5,671,412 A | 9/1997 | Christiano |
| 5,748,907 A | 5/1998 | Crane |
| 5,819,295 A | 10/1998 | Nakagawa et al. |
| 5,911,134 A | 6/1999 | Castonguay et al. |
| 5,913,201 A | 6/1999 | Kocur |
| 5,963,911 A | 10/1999 | Walker et al. |
| 6,009,442 A | 12/1999 | Chen et al. |

(Continued)

OTHER PUBLICATIONS

MDIS: Is it possible to implement and manage human resources via Internet technology? M2 Presswire. Coventry: Jan. 31, 2000. p. 1 (proquest).

(Continued)

*Primary Examiner* — Johnna Loftis
(74) *Attorney, Agent, or Firm* — Sughrue Mion, PLLC

(57) ABSTRACT

The method, system and a computer program and a computer product for managing workers and documents is provided. The method includes storing industry representations and a list of workers with data related to the workers, linking the industry representations to the workers and selecting at least one worker from based on the industry representations for that worker. The method also includes scheduling workers to a job based on whether they have all of the required industry representations. In addition, the method includes uploading industry representations and bar code scanning industry representations into the database. The method further includes dispatching said industry representations to other users and automatically mapping fields of the dispatched data in the destination database. In addition, the method includes selectively encrypting only sensitive fields in data transmission between two entities.

23 Claims, 132 Drawing Sheets

(56) References Cited

U.S. PATENT DOCUMENTS

| | | | |
|---|---|---|---|
| 6,044,355 | A | 3/2000 | Crockett et al. |
| 6,049,776 | A | 4/2000 | Donnelly et al. |
| 6,154,753 | A | 11/2000 | McFarland |
| 6,157,808 | A | 12/2000 | Hollingsworth |
| 6,192,165 | B1 | 2/2001 | Irons |
| 6,192,381 | B1 | 2/2001 | Stiegemeier et al. |
| 6,266,659 | B1 | 7/2001 | Nadkarni |
| 6,275,812 | B1 | 8/2001 | Hag et al. |
| 6,292,783 | B1 | 9/2001 | Rohler et al. |
| 6,466,914 | B2 | 10/2002 | Mitsuoka et al. |
| 6,584,466 | B1 | 6/2003 | Serbinis et al. |
| 6,589,055 | B2 | 7/2003 | Osborne et al. |
| 6,636,968 | B1 | 10/2003 | Rosner et al. |
| 6,658,400 | B2 | 12/2003 | Perrell et al. |
| 6,674,924 | B2 | 1/2004 | Wright et al. |
| 6,810,383 | B1 | 10/2004 | Loveland |
| 6,810,404 | B1 | 10/2004 | Ferguson et al. |
| 6,915,278 | B1 | 7/2005 | Ferrante et al. |
| 7,003,669 | B2 | 2/2006 | Monk |
| 7,007,231 | B2 | 2/2006 | Dang |
| 7,330,817 | B1 | 2/2008 | Exall et al. |
| 7,403,942 | B1 | 7/2008 | Bayliss |
| 7,469,214 | B2 | 12/2008 | Martin et al. |
| 7,747,542 | B2 | 6/2010 | Morley et al. |
| 2001/0047347 | A1 | 11/2001 | Perell et al. |
| 2002/0019977 | A1 | 2/2002 | Matsuzuki |
| 2002/0055870 | A1 | 5/2002 | Thomas |
| 2002/0072946 | A1 | 6/2002 | Richardson |
| 2002/0087345 | A1 | 7/2002 | Bly et al. |
| 2002/0174098 | A1 | 11/2002 | Wu et al. |
| 2003/0115119 | A1 | 6/2003 | Schleicher |
| 2003/0159140 | A1 | 8/2003 | Candelore |
| 2003/0195765 | A1 | 10/2003 | Sehgal et al. |
| 2003/0220920 | A1 | 11/2003 | Lake et al. |

OTHER PUBLICATIONS

King, Julia, Getting the right person at the right time. Computerworld. Framingham, Feb. 3, 2004. vol. 37, Iss. 5; p. 40, 1 pg. (proquest).

Data General: Data General launches web-enabled imaging solution AV/Document Manager. M2 Presswire. Coventry: Apr. 14, 1999. p. 1 (proquest).

Mackey, Heather. Sloat-Kettering keeps its HR documents from spreading. InfoWorld. San Mateo: Jun. 17, 1996. vol. 18, Iss. 25; p. 64, 1 page (proquest).

MacInnes, Patricia, DND database cuts paperwork: department plans to move eight million records to one computer, ease data access for managers. Computing Canada. Willowdale: Jul. 2, 1999. vol. 25, Iss. 26; p. 19. (proquest).

Medtronic Deploys Saba Learning to Ensure Regulatory Compliance at Manufacturing and Customer Sites; Saba Solution Empowers Medtronic to Demonstrate FDA Compliance Through Learning Management, Digital Signatures and Certifications. PR Newswire, p SFM02710122001 Dec. 10, 2001.

Fig. 7

| Main Menu | Print-to-Go | Documents | Employees | Customers | Jobs | Contacts | Time Sheet | Company | WMS Solutions | Admin | Sign-Out | 11 Message(s). 0 New. Document Count 457 Wednesday – June 09, 2004 | Downloads |

Workforce Management | Add A New Employee | Workforce List | On-Site Employees | Search Workforce Report A Bug

Workforce List

Enter Employee Name [          ] GO

Filter Employees By Status: ● Current | ○ All

[ Add New Employee ]

[ View Detailed List ]

| Employee | Status | Edit |
|---|---|---|
| Alonzo, Luis Alberto | Current | |
| Alonzo Gamarron, Amilcar Vinicio | Current | |
| Alvarado, Jairon | Current | |
| Alvarado, Jose Carlos | Current | |
| Anaya, Jenny | Current | |
| Argueta, Otoniel | Current | |
| Baldermar Hernandez, Alex | Current | |
| Bergenza, Encarnacion | Current | |
| Bolanos, Manuel A | Current | |
| Castaneda, Armando | Current | |
| Castillo, Anthony | Current | |
| Cervak, Jiri | Current | |
| Cifuentes, Merlos | Current | |
| Cruz, Estevan | Current | |
| Delgado, Felix | Current | |
| Diaz, Miguel A | Current | |
| Gamarra, Darvin | Current | |
| Gamarro Martinez, Osman E | Current | |
| Godoy Rivera, Felix Ronaldo | Current | |
| Gomez, Julio | Current | |

Fig. 8A

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce List | Employee Details | Edit Employee | Add New Employee | Search Workforce |

Edit Worker: Jenny Anaya

| Save Changes | Apply Changes | Reset | Cancel |

| Employee Details | Document & Skills | Form Fields | Information | Employee History | Tool Box | Miscellaneous Documents |

First Name*

Middle Name

Last Name*

Status
Current

Employee Number

SSN*    111-55-1111

DOB*    11/11/1999   ###-##-####

Birthplace    mm/dd/yyyy

Emergency Contact

Address

City        State    Zip

Phone            Fax

Email

Languages:

Primary:   ○ Not Specified
           ○ English
           ○ Spanish

Other:     ☐ English
           ☐ Spanish

Employment Info

First Name*  Employee  ▼

Wage: ($/Hour)
Fringe: ($/Hour)

Worker Status:  ○ None Selected
                ○ US Citizen
                ○ Resident Alien
                ○ Work Permit
                ○ Other Temporary Worker: ☐
Has a Car:        ☐

| Save Changes | Apply Changes | Reset | Cancel |

File History

Fig. 8B

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

Edit Worker: Jenny Anaya

Jenny Anaya

| Workforce List | Employee Details |
|---|---|

| Save Changes | Apply Changes | Edit Employee | Add New Employee | Search Workforce |
|---|---|---|---|---|

| Employee Details | Document & Skills | Reset | Cancel |
|---|---|---|---|

| Trade Documents | Skills | Form Fields | Information | Employee History | Tool Box | Miscellaneous Documents |
|---|---|---|---|---|---|---|

Select a Document:

Add New Document Type

All Documents

- Fit Test
- Physical
- Asbestos Certificate
- Lead Certificate
- MD Asbestos
- MD Lead
- DC Asbestos
- DC Lead
- VA Asbestos
- VA Lead
- SSN
- I-94
- I-9
- Application
- Verification of SS number

Fit Test: Up-To-Date                                    Override

Image

Expiration Date: 07/1/2004
Issue Date:
Reference
Created:
Modified:
Document Size: 52kb
Scanned From: Copy
Initial Document: No Add Document                Edit Information Document History (Empty)

File History

Upload New Document

| Save Changes | Apply Changes | Reset | Cancel |
|---|---|---|---|

Fig. 8C

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce List | Employee Details | Edit Employee | Add New Employee | Search Workforce |

Edit Worker: Jenny Anaya

| Save Changes | Apply Changes | Reset | Cancel |

| Employee Details | Document & Skills | Form Fields | Information | Employee History | Tool Box | Miscellaneous Documents |

Jenny Anaya

Image

Upload New Document

| Trade Documents | Skills |

Add New Document Type

☐ All

☐ Demolition — Unspecified Level
☐ Mold Removal — Unspecified Level
☐ Security Clearance — Unspecified Level ☐ Company
☐ Trade
☐ VA Asbestos

| Apply Changes | Reset | Cancel |

File History

| Save Changes |

Main Menu  Print-to-Go  Documents  Employees  Customers  Jobs  Add New Employee  Contacts  Time Sheet  Company  WMS Solutions  Admin  Sign-Out 11 Message(s), 0 New, Document Count 457
Wednesday – June 09, 2004 | Downloads
Report A Bug Search Workforce Workforce List | Employee Details | Edit Employee

Edit Worker: Jenny Anaya

Save Changes | Apply Changes | Reset | Cancel

Employee Details | Document & Skills | Form Fields | Information | Employee History | Tool Box | Miscellaneous Documents Notes

- Notes
- Unemployment Claims
- Workers Compensation Claims
- Schedule History
- Payroll Job History
- Wage History Save Changes | Apply Changes | Reset | Cancel Jenny Anaya Image File History Upload New Document

Fig. 8G

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Workforce List | Employee Details | Edit Employee | Add New Employee | Search Workforce |

Edit Worker: Jenny Anaya

[ Save Changes ]  [ Apply Changes ]  [ Reset ]  [ Cancel ]

| Employee Detail | Document & Skills | Form Fields | Information | Employee History | Tool Box | Miscellaneous Documents |

Select a Binder

Documents

Info
- Total Documents: 3
- Total Pages: 16
- Total Fields: 4

☐ Include Document Properties
  ✓ Created Info
  ✓ Updated Info
  ✓ File Size Summary
  ✓ Custom Fields ☐ Include Page Summaries
  ✓ Titles as Download Links
  ✓ File Name
  ✓ File Size ☐ Display Actual Images

| | Class | Document | Type | Page Count | View | Info |
|---|---|---|---|---|---|---|
| ☑ | Equipment | | | | | |
| ☑ | Vacuum Systems and Respirators | ☑ Vacuum Systems and Respirators | | | | |
| ☑ | MSDS | ☑ MSDS | | | | |
| ☑ | Conventional Loan | | | | | |
| ☑ | Loan Documents | ☑ Loan Documents | | | | |

File History

[ Save Changes ]  [ Apply Changes ]  [ Reset ]  [ Cancel ]

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce Management | Add A New Employee | Workforce List | Search Workforce | On-Site Employees |

Perform Employee Search

| Details | Documents | Skills | Information Fields |

Employee Num  [    ]    First Name  [    ]    Last Name  [    ]    SSN  [    ] (000-00-0000)

Work Status
○ Any
○ US Citizen
○ Resident Alien
○ Work Permit
○ Other  [    ]

Employment Status
[ All ▶ ]

Labor Source
○ Either
○ Yes
○ No

Employment Title
[ All ▶ ]

Has a Car
○ Either
○ Yes
○ No

DOB  [    ]  (mm/dd/yyyy)

Birth Place  [    ]

City  [    ]

State  [ Select a State ▶ ]

Zip Code  [    ]

Primary Language
○ Any
○ Not Specified
○ English
○ Spanish

Languages
☐ English
☐ Spanish

Perform Employee Search

Fig. 11B

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce Management | Add A New Employee | Workforce List | Search Workforce | On-Site Employees |
|---|---|---|---|---|

Perform Employee Search

| Details | Documents | Skills | Information Fields |
|---|---|---|---|

☐ All

| ☐ Fit Test | Up-To-Date | > |
| ☐ Physical | Up-To-Date | > |
| ☐ Asbestos Certificate | Up-To-Date | > |
| ☐ Lead Certificate | Up-To-Date | > |
| ☐ MD Asbestos | Up-To-Date | > |
| ☐ MD Lead | Up-To-Date | > |
| ☐ DC Asbestos | Up-To-Date | > |
| ☐ DC Lead | Up-To-Date | > |
| ☐ VA Asbestos | Up-To-Date | > |
| ☐ VA Lead | Up-To-Date | > |
| ☐ SSN | Up-To-Date | > |
| ☐ I-94 | Up-To-Date | > |
| ☐ I-9 | Up-To-Date | > |
| ☐ Application | Up-To-Date | > |
| ☐ Verification of SS Number | Up-To-Date | > |

| ☐ Company | » |
| ☐ Trade | » |
| ☐ VA Asbestos | » |

Perform Employee Search

Fig. 11D

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce Management | Add A New Employee | Workforce List | Search Workforce | On-Site Employees |

Perform Employee Search

| Details | Documents | Skills | Information Fields |

| Use | Name | Value |
|---|---|---|
| ☐ | Drivers License Number (Plain Text): | |
| ☐ | Drug Test (Yes/No): | ☐ (Yes/No) |
| ☐ | Eye Color (Plain Text): | |
| ☐ | Hair Color (Plain Text): | |
| ☐ | Height (Plain Text): | |

Perform Employee Search

Fig. 12

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Workforce Management | Add A New Employee | Workforce List | Search Workforce | On-Site Employees |

Perform Employee Search

| Details | Documents | Skills | Information Fields |

Employee Num  First Name  Last Name  SSN
(000-00-0000)

Work Status
○ Any
○ US Citizen
○ Resident Alien
○ Work Permit
○ Other

Employment Status
[All ▼]

Employment Title
[All ▼]

Labor Source
○ Either
○ Yes
○ No

Has a Car
○ Either
○ Yes
○ No

DOB
(mm/dd/yyyy)

Birth Place

City  State  Zip Code
[Select a State ▼]

Primary Language
○ Any
○ Not Specified
○ English
○ Spanish

Languages
☐ English
☐ Spanish

Perform Employee Search

Search Results

☐ Abou-Said, Neina Leslile
☐ Alonzo, Luis Alberto
☐ Alonzo, Gamarro, Amilcar Vinicio
☐ Alvarado, Jairon
☐ Alvarado, Jose Carlos
☐ Anaya, Jenny
☐ Argueta, Luis
☐ Argueta, Otoniel
☐ Argueta G., Milton Leonel
☐ Baldemar Hernandez, Alex
☐ Berganza, Encarnacion
☐ Bolanos, Manual A
☐ Cano, Esdras William

[All] [None] [Show Status]
[Print-To-Go]

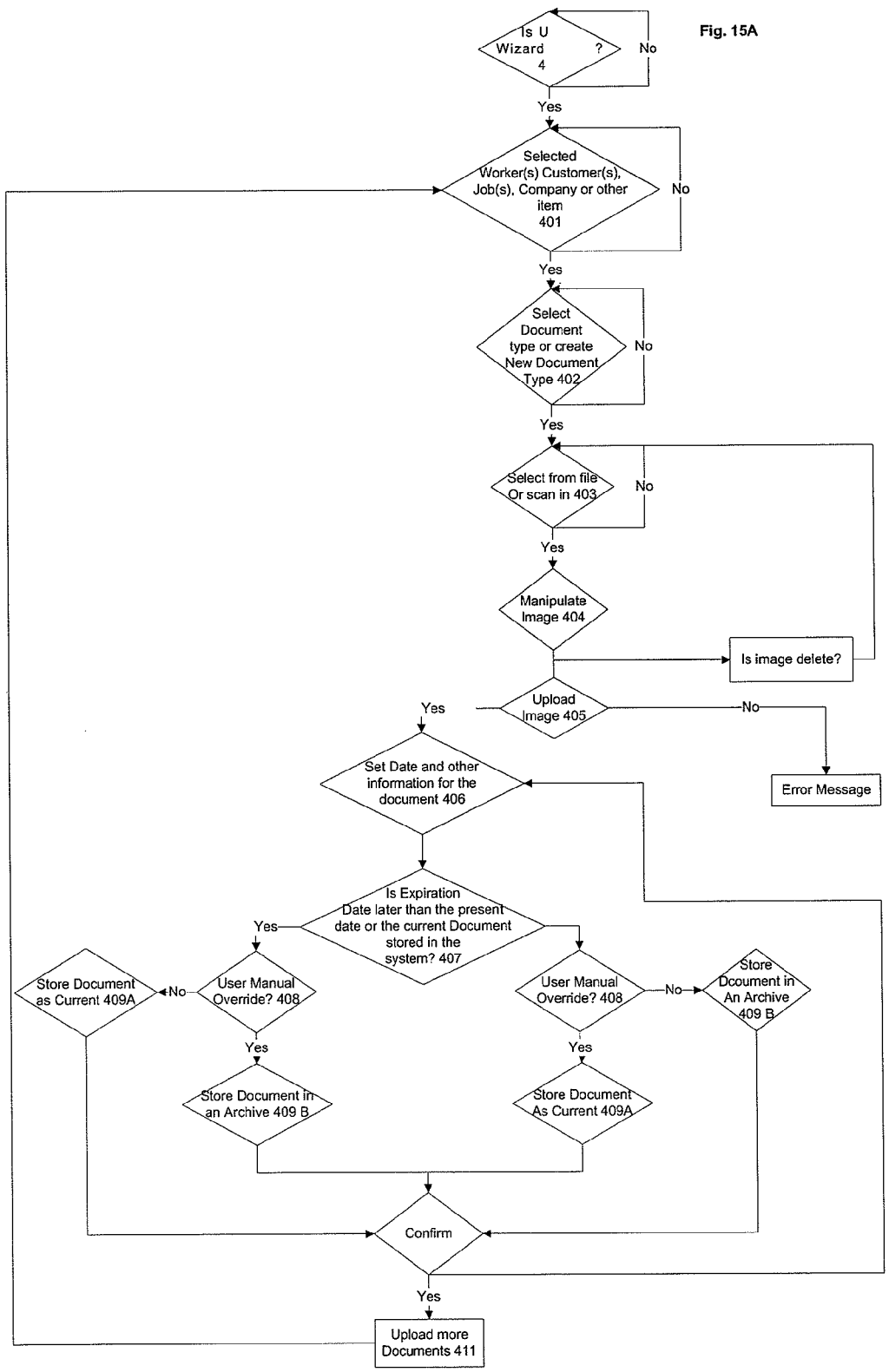

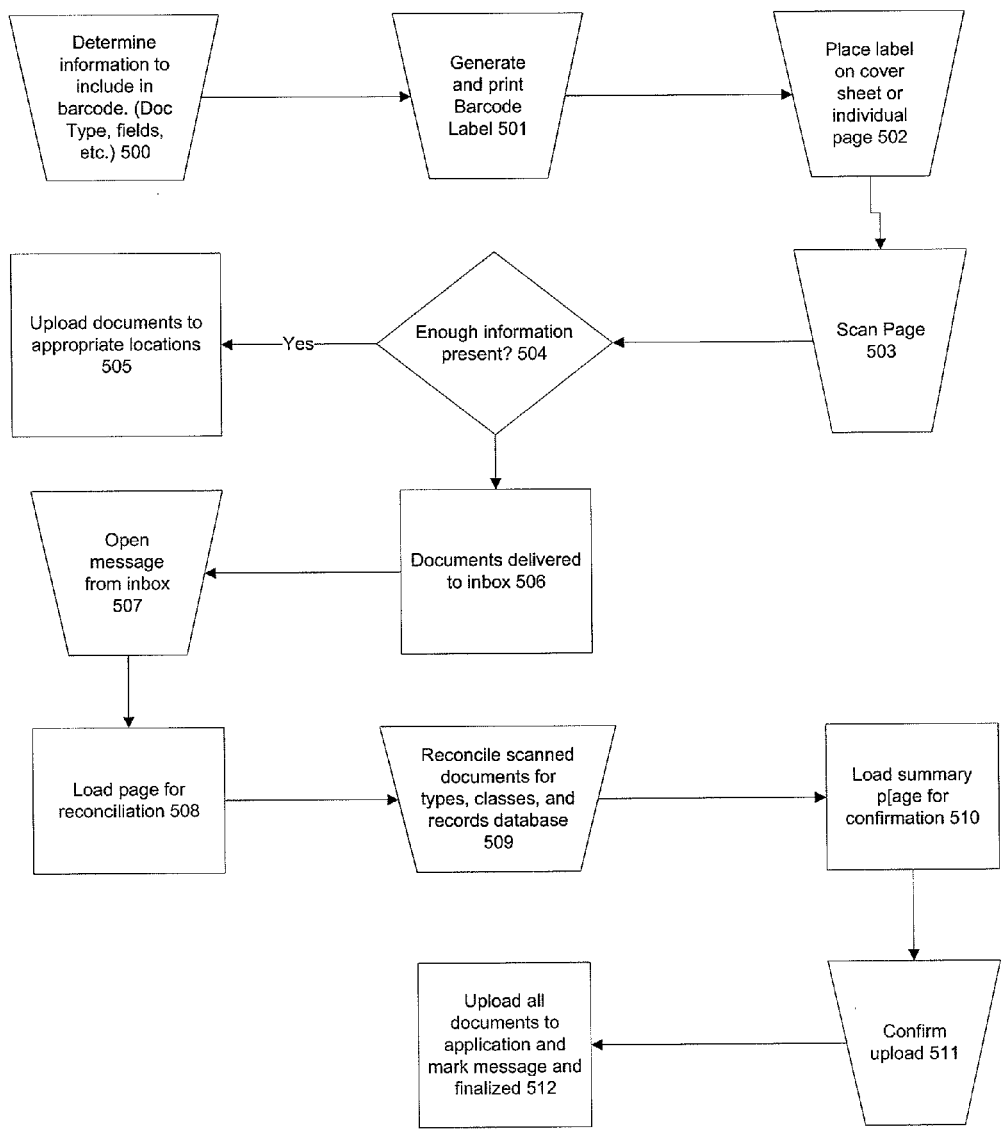

Fig. 16B

Step 2 of 6 : Select A Employee Document Type

Select a Worker Document Type for Jenny Anaya.

The second step for uploading a document is to select a document type. Please select a document type from the list below by clicking on a radio button.

- ○ Fit Test
- ○ Physical
- ○ Asbestos Certificate
- ○ Lead Certificate
- ○ MD Asbestos
- ○ MD Lead
- ○ DC Asbestos
- ○ DC Lead
- ⦿ VA Asbestos
- ○ VA Lead
- ○ SSN Note: You can only choose one document type at a time. When you have finished uploading this type of document, you will be able to upload another until all documents have been uploaded.

[Add New Document Type]

[<< Go Back To Step 1]    [Select Document Type & Go To Step 3 >>]

| Name (Number) | Fit Test | Physical | Asbestos Certificate | Lead certificate | MD Asbestos | MD Lead | DC Asbestos | DC Lead |
|---|---|---|---|---|---|---|---|---|
| Alonzo, Luis Alberto | Missing | 4/8/2005 | Expired 3/27/2004 | 3/29/2006 | Expired 3/27/2004 | 3/29/2006 | 7/31/2005 | NA |
| Alonzo Gamarron, Amilcar Vinicio | 11/25/2004 | 11/24/2004 | 11/22/2004 | 9/17/2006 | Expired 11/15/2003 | 11/25/2006 | 7/31/2005 | 9/23/2005 |
| Alvarado, Jairon | Expired 5/26/2004 | Expired 12/24/2003 | Expired 6/7/2004 | 3/5/2005 | Expired 6/7/2003 | NA | 7/31/2005 | NA |
| Alvarado, Jose Carlos | 4/5/2005 | Expired 6/2/2004 | Expired 4/26/2004 | Expired 5/12/2004 | Expired 4/26/2004 | NA | 7/31/2005 | NA |
| Anaya, Jenny | 7/18/2004 | 7/18/2004 | 7/19/2004 | 3/29/2006 | 7/19/2004 | 3/29/2006 | NA | NA |
| Argueta, Luis | 10/12/2004 | 10/10/2004 | 10/9/2004 | NA | 10/9/2004 | NA | NA | NA |
| Argueta, Otoniel | 7/26/2004 | 7/25/2004 | 7/24/2004 | NA | 7/24/2004 | NA | 7/31/2005 | NA |
| Argueta G. Milton Leonel | Expired 3/29/2004 | Expired 3/28/2004 | Expired 3/24/2004 | 3/29/2006 | Expired 3/27/2004 | 3/29/2006 | 7/31/2005 | 9/23/2005 |
| Baldermar Hernandez, Alex | 1/20/2005 | 1/17/2005 | 1/15/2005 | NA | 1/15/2005 | NA | NA | NA |
| Bergenza, Encarnacion | 7/23/2004 | 7/21/2004 | 7/12/2004 | 9/17/2006 | 7/12/2004 | 10/26/2005 | 7/31/2005 | NA |
| Bolanos, Manuel. A | Pending 6/28/2004 | Pending 6/26/2004 | Pending 6/14/2004 | 10/11/2005 | Pending 6/14/2004 | 10/11/2005 | 7/31/2005 | NA |
| Castaneda, Armando | Expired 3/23/2004 | Expired 3/22/2004 | 1/10/2005 | 11/23/2005 | 1/10/2005 | 11/23/2005 | 7/31/2005 | Expired 6/18/2003 |
| Castillo, Anthony | Expired 5/18/2004 | Expired 5/17/2004 | Expired 5/10/2004 | 10/11/2005 | Expired 5/10/2004 | 10/11/2005 | 7/31/2005 | NA |
| Cervak, Jiri | Missing | 9/12/2004 | NA | NA | NA | NA | NA | NA |
| Cifuentes, Merlos | Expired 3/19/2004 | Expired 3/17/2004 | 8/9/2004 | 8/17/2004 | 8/9/2004 | 8/17/2004 | NA | NA |
| Cruz, Estevan | Pending 6/27/2004 | Pending 6/26/2004 | Expired 6/7/2004 | 8/11/2005 | Expired 6/7/2004 | 8/11/2005 | 7/31/2005 | NA |
| Delgado, Felix | 8/23/2004 | 8/21/2004 | Pending 6/28/2004 | 8/14/2004 | Pending 6/28/2004 | 8/17/2004 | 7/31/2005 | NA |
| Diaz, Miguel A | Expired 4/18/2004 | Expired 4/17/2004 | Expired 4/19/2004 | 11/23/2005 | Expired 4/19/2004 | 11/23/2005 | 7/31/2005 | NA |
| Gamarra, Darvin | Expired 4/27/2004 | Expired 4/26/2004 | Expired 4/19/2004 | 5/6/2005 | Expired 4/19/2004 | 5/5/2005 | 7/31/2005 | NA |
| Gamarro Martinez, Osman E | 1/18/2005 | 1/17/2005 | 7/12/2004 | 10/5/2005 | 7/12/2004 | 10/5/2005 | 7/31/2005 | NA |

Fig. 18

WMS: Verification- Microsoft Internet Explorer

Fit Test for Amilcar Vinicio Alonzo Gamarro: Up-To-Date

Expiration Date: 11/25/2004
Issue Date: 11/25/2003
Reference:
Created:
Modified:
Document Size: 62Kb
Scanned From: Copy
Initial Document: NO

[Edit]

Document Verification Summary:

| Level | User Name | Expiration | Image | Validation | Last Modified |
|---|---|---|---|---|---|
| 1- Management | | | | | |
| 2- Operations | | | | | |

Verification Detail History

| Edit | Date | Level | User | Type | Text | E | I | V | C | D | File |
|---|---|---|---|---|---|---|---|---|---|---|---|
| ☐ | | | | | No History Info was found for the selected document | | | | | | |

[Add New]

Fig. 20

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Document Management | All Documents | Job Documents | Work Type Documents | Custom Documents | Saved Reports | Scheduled Update | Upload Wizard |
|---|---|---|---|---|---|---|---|

Hide Filters

Select A Customer
BG&E ▽

Select A Job
BG&E ▽

☐ Filter by Work Type
☑ MD Asbestos Worker ◁▷
☑ General

Select A Employee Source
● Assigned to Job
○ From Payroll

☐ Filter By Employee Status ◁▷
☑ Current
☐ Inactive
☐ Maternity Leave
☐ Part Time ☐ Filter By Document Status
☑ Up To Date
☑ Pending
☑ Expired
☑ Incomplete
☑ Missing
☑ NA Refresh Report
Save Report
Refresh Report

| Name (Number) | Fit Test | Physical | Asbestos Certificate | MD Asbestos |
|---|---|---|---|---|
| Alonzo Gamarro, Amilcar Viniclo | 11/25/2004 | 11/25/2004 | 11/25/2004 | 11/25/2004 |
| Alvarado, Jairon | | 11/25/2004 | 11/25/2004 | 11/25/2004 |
| Avlarado, Jose Carlos | 11/25/2004 | 11/25/2004 | 11/25/2004 | 11/25/2004 |
| Anaya, Jenny | 11/25/2004 | 11/25/2004 | 11/25/2004 | |

Fig. 21

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

| Document Management | All Documents | Job Documents | Work Type Documents | Custom Documents | Saved Reports | Scheduled Update | Upload Wizard |
|---|---|---|---|---|---|---|---|

Show Filters

| Name (Number) | Fit Test | Physical | Asbestos Certificate | MD Asbestos |
|---|---|---|---|---|
| Alonzo, Luis Alberto | Missing | 4/8/2005 | Expired 3/27/2004 | Expired 3/27/2004 |
| Alonzo Gamarro, Amilcar Vinicio | 11/25/2004 | 11/24/2004 | 11/22/2004 | Expired 11/15/2003 |
| Alvarado, Jairon | Expired 5/26/2004 | Expired 12/24/2003 | Expired 6/7/2004 | Expired 6/7/2003 |
| Alvarado, Jose Carlos | 4/5/2005 | 6/2/2004 | 4/26/2004 | 4/26/2004 |
| Anaya, Jenny | 7/18/2004 | 7/18/2004 | 7/19/2004 | 7/19/2004 |
| Arqueta, Luis | 10/12/2004 | 10/10/2005 | 10/9/2004 | 10/9/2004 |
| Arqueta, Otonel | 7/26/2004 | 7/25/2004 | 7/24/2004 | 7/24/2004 |
| Arqueta G, Milton Leonel | Expired 3/29/2004 | Expired 3/28/2004 | Expired 3/27/2004 | Expired 3/27/2004 |
| Baldemar, Hernandez Alex | 1/20/2005 | 1/17/2005 | 1/15/2005 | 1/15/2005 |
| Berganza, Encarnancion | 7/24/2004 | 7/21/2004 | 7/12/2004 | 7/12/2004 |
| Bolanos, Manuel A | Pending 6/28/2004 | Pending 6/25/2004 | Pending 6/14/2004 | Pending 6/14/2004 |
| Castaneda, Armando | Expired 3/23/2004 | Expired 3/22/2004 | 1/10/2005 | 1/10/2005 |
| Castillo, Antony | Expired 5/18/2004 | Expired 5/17/2004 | Expired 5/10/2004 | Expired 5/10/2004 |
| Cervak, Jiri | Missing | 9/12/2004 | Missing | Missing |
| Cifuentes, Merios | Expired 3/19/2004 | Expired 3/17/2004 | 8/9/2004 | 8/9/2004 |
| Cruz, Estevan | Pending 6/27/2004 | Pending 6/26/2004 | Expired 5/7/2004 | Expired 5/7/2004 |
| Deloado, Felix | 8/24/2004 | 8/21/2004 | Pending 6/28/2004 | Pending 6/28/2004 |
| Diaz, Miguel A | Expired 4/18/2004 | Expired 4/17/2004 | Expired 4/19/2004 | Expired 4/19/2004 |
| Gamarro, Darvin | Expired 4/27/2004 | Expired 4/26/2004 | Expired 4/19/2004 | Expired 4/19/2004 |
| Gamarro, Martinez Osman E | 1/18/2004 | 1/11/2004 | 7/12/2004 | 7/12/2004 |
| Godoy Rivera, Felix Ronaldo | 9/1/2004 | 9/2/2004 | 8/28/2004 | 8/28/2004 |

Fig. 24A

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

| Job List | Job Detail | Edit Job | Assign Employees |

Job: BG&E

| Details | Contacts | Requirements | Additional Skills/Qualifications | Accounting | Information | History | Job Cost | Tool Box | Job Documents |

Customer
BG&E ▽

Name
BG&E

Address
PO BOX 1431

City
Baltimore

State
Maryland ▽

Zip
21230

Directions
Take the road to BG&E ◁ ▷

Go to Mapquest

Status of Job
● Active
○ Credit Pending
○ Inactive
○ Pending

Start Time
08:00 AM

End Time
06:00 PM

Break / Lunch
01:00

Total Shift Hours:
09:00

Employees Requested
15

Start Date
3/3/2004

End Date
3/19/2004

Estimated End Date

Working Days
☑ Mon ☑ Tue ☑ Wed ☑ Thu ☑ Fri ☑ Sat ☑ Sun

Save Changes   Cancel

Fig. 24C

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Job List | Job Detail | Edit Job | Assign Employees |
|---|---|---|---|

Job: BG&E

| Details | Contacts | Requirements | Additional Skills/Qualifications | Accounting | Information | History | Job Cost | Tool Box | Job Documents |
|---|---|---|---|---|---|---|---|---|---|

Workforce Requirements by Trade

| ☐ | Trades | Source | Type | Shift | Requested | Assigned | Start Date | End Date | Details |
|---|---|---|---|---|---|---|---|---|---|
| ☐ | Conventional Loan | Company | Regular | 1 | 0 | 0 | Not Set | Not Set | ☐ |
| ☐ | FHA Loan | Company | Regular | 1 | 0 | 0 | Not Set | Not Set | ☐ |
| ☑ | General | Company | Regular | 1 | 0 | 4 | 3/4/2004 | 4/20/2004 | ☐ |
| ☑ | MD Asbestos Worker | Company | Regular | 1 | 0 | 0 | 3/11/2004 | 4/20/2004 | ☐ |

Add a New Work Type

Type of Work

☐ Lawyer

Add a New Work Type

Description of Work

| Save Changes | Cancel |
|---|---|

Fig. 24D

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Job List | Job Detail | Edit Job | Assign Employees |

Job: BG&E

| Details | Contacts | Requirements | Additional Skills/Qualifications | Accounting | Information | History | Job Cost | Tool Box | Job Documents |

Required Documents

☐ All                                   «

☐ Fit Test
☐ Physical
☐ Asbestos Certificate
☐ Lead Certificate
☐ MD Asbestos
☐ MD Lead
☐ DC Asbestos
☐ DC Lead
☐ VA Asbestos
☐ VA Led
☐ SSN
☐ I-94
☐ Application
☐ Verification of SS Number
☐ Fork Drivers License Company                                 »
Trade                                   »
VA Asbestos                             »

Add New Document Type

Required Skills

☐ All                                   «

☐ Demolition          Unspecified Level ▽
☐ Mold Removal       Unspecified Level ▽
☐ Security Clearance  Unspecified Level ▽

Company                                 »
Trade                                   »
VA Asbestos                             »

Add New Document Type

Currently Selected Work Type Skills

☐ All                                   «

<No Matching Skills Found>

Company                                 »
Trade                                   »
VA Asbestos                             »

Currently Selected Work Type Documents

☐ All                                   «

<No Matching Documents Found>

Company                                 »
Trade                                   »
VA Asbestos                             »

Save Changes        Cancel

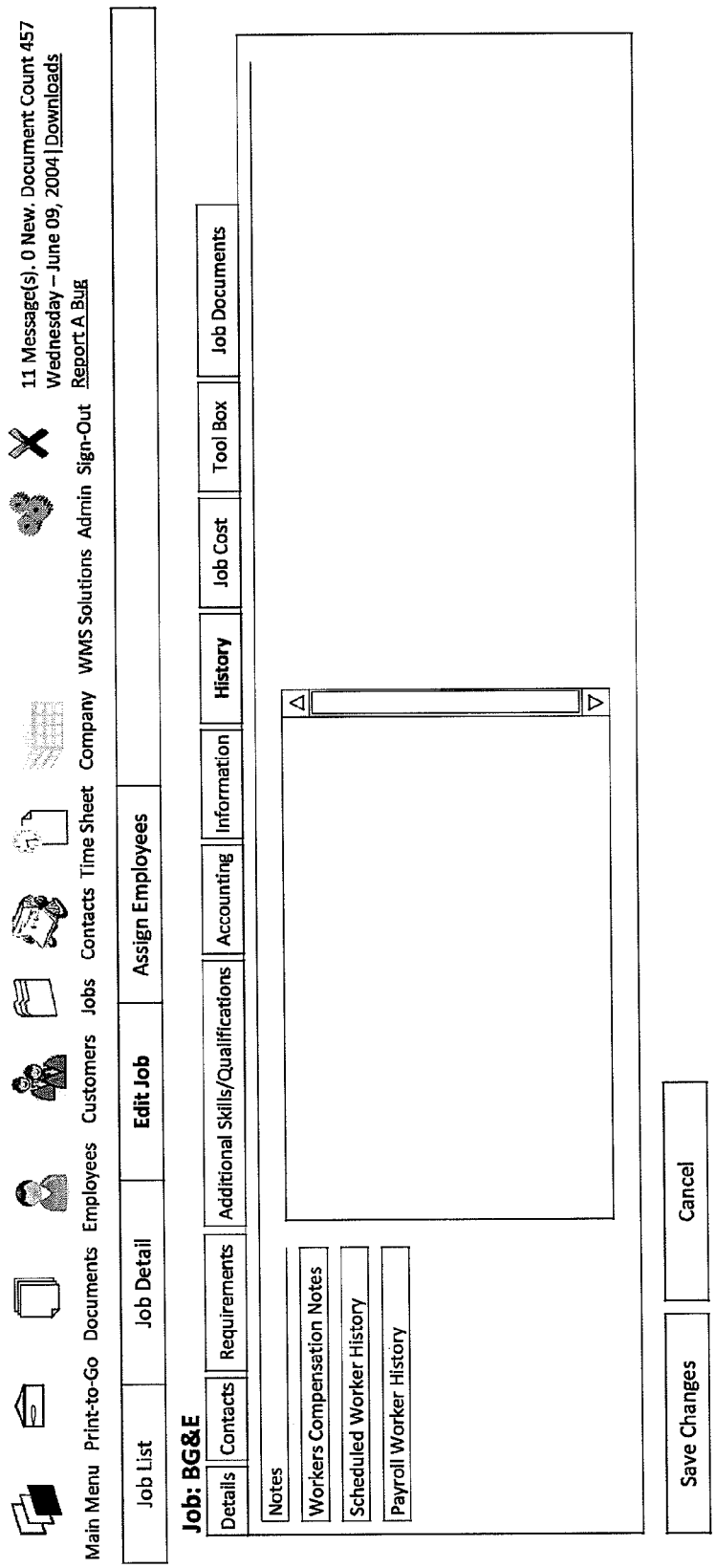

Fig. 24I

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Job List | Job Detail | Edit Job | Assign Employees |
|---|---|---|---|

Job: BG&E

| Details | Contacts | Requirements | Additional Skills/Qualifications | Accounting | Information | History | Job Cost | Tool Box | Job Documents |
|---|---|---|---|---|---|---|---|---|---|

Select a Binder

BG&E Job Submittal

Info:
- Total Documents: 26
- Total Pages: 302
- Total Fields: 54

Options:
- ☐ Include Document Properties
  - ☐ Created Info
  - ☐ Updated Info
  - ☐ File Size Summary
  - ☐ Custom Fields
- ☐ Include Page Summaries
  - ☐ Titles as Download Links
  - ☐ File Name
  - ☐ File Size
- ☐ Display Actual Images

| ☑ | Class | Document | Type | Count | View | Info |
|---|---|---|---|---|---|---|
| ☑ | Asbestos Abatement Program | | | | | |
| ☑ | Medical Surveillance | ☑ Medical Surveillance | C | 4 | ☐ | ☐ |
| ☑ | Personal Hygiene | ☑ Personal Hygiene | C | 1 | ☐ | ☐ |
| ☑ | Protective Equipment | ☑ Protective Equipment | C | 3 | ☐ | ☐ |
| ☑ | Abatement Procedures | ☑ Abatement Procedures | C | 31 | ☐ | ☐ |
| ☑ | Procedures for Disposal | ☑ Procedures for Disposal | C | 2 | ☐ | ☐ |
| ☑ | Air Monitoring Procedures | ☑ Air Monitoring Procedures | C | 5 | ☐ | ☐ |
| ☑ | Training Requirements | ☑ Training Requirements | C | 2 | ☐ | ☐ |
| ☑ | Company Overview Documents | | | | | |
| ☑ | General Safety | ☑ General Safety | C | 22 | ☐ | ☐ |
| ☑ | Hazard Communication Program | ☑ Hazard Communication Program | C | 36 | ☐ | ☐ |
| ☑ | Equipment | | | | | |
| ☑ | Air Filtration | ☑ Air Filtration | C | 4 | ☐ | ☐ |
| ☑ | Vacuum Systems and Respirators | ☑ Vacuum Systems and Respirators | C | 13 | ☐ | ☐ |
| ☑ | Water Filtration | ☑ Water Filtration | C | 2 | ☐ | ☐ |

Save Changes     Cancel

Fig. 25

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Job Management | Add a New Job | Job List | Schedule by Employee | Job Assignment | Assignment Report |

Job List

| Enter Job Name | | GO | Filter by Job Status | Active ▽ |

Add New Job

| Job Listing | Status | Edit |
|---|---|---|
| Customer: BG&E | | |
| BG&E | Active | ☐ |
| Project X | Active | ☐ |
| Prospects | Active | ☐ |
| Customer: Clark Construction | | |
| Aquarium Lead Abatement | Active | ☐ |
| Science Center | Active | ☐ |
| Customer: Whiting-Turner | | |
| Baltimore Arena Asbestos Abatement | Active | ☐ |

View Detailed List

Fig. 28

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 |Downloads
Report A Bug

| Job Management | Add a New Job | Job List | Schedule by Employee | Job Assignment | Assignment Report |

Assignment Report for 6/9/2004.
Employees Assigned - 19

| BG&E |
|---|
| BG&E |
| General Required: 0. Assigned: 4 |
| Alonzo, Gamarro Amiclar Vinicio () |
| Alvarado, Jairon () |
| Alvarado, Jose Carlos () |
| Anaya Jenny () |

| Clark Construction |
|---|
| Science Center |
| General Required: 0. Assigned: 5 |
| Alonzo, Louis Alberto () |
| Alonzo, Gamarro Amiclar Vinicio () |
| Alvarado, Jairon () |
| Alvarado, Jose Carlos () |
| Abou-Said, Zeina (56) |

| Whiting-Turner |
|---|
| Baltimore Arena Asbestos Abatement |
| MD Asbestos Worker Required: 10. Assigned: 10 |
| Cruz, Estevan () |
| Berganza, Encarnacion () |
| Baldemar, Hernandez Alex () |
| Argueta, Otoniel () |
| Bolanos, Manuel A () |
| Delgado, Felix () |
| Argueta, Louis () |
| Alvarado, Jose Carlos () |
| Anaya, Jenny () |
| Castillo, Anthony () |

Print

| | | | | Monday, June 07, 2004 – Sunday, June 13, 2004 | | | | | | | |
|---|---|---|---|---|---|---|---|---|---|---|---|
| Job: BG&E | | | | | | | | | | | |
| General | Average Wage 0.00 | Requested 0 | Assigned 4 | Assigned 4 | Assigned 4 | Assigned 4 | Assigned 4 | Assigned 0 | Assigned 0 | | |
| Employee Number | Last Name | First Name | Monday 6/7 | Tuesday 6/8 | Wednesd 6/9 | Thursday 6/10 | Friday 6/11 | Saturday 6/12 | Sunday 6/13 | Total |
| ☐ | Alonzo | Vinicio | 9:00 | 9:00 | 9:00 | 9:00 | 9:00 | 0:00 | 0:00 | 45:00 |
| ☐ | Alvarado | Jairon | 9:00 | 9:00 | 9:00 | 9:00 | 9:00 | 0:00 | 0:00 | 45:00 |
| ☐ | Alvarado | Jose Carlos | 9:00 | 9:00 | 9:00 | 9:00 | 9:00 | 0:00 | 0:00 | 45:00 |
| | Anaya | Jenny | 9:00 | 9:00 | 9:00 | 9:00 | 9:00 | | | |
| General | Average Wage 0.00 | Requested 0 | Assigned 4 | Assigned 4 | Assigned 4 | Assigned 4 | Assigned 4 | Assigned 0 | Assigned 0 | |
| Employee Number | Last Name | First Name | Monday 6/7 | Tuesday 6/8 | Wednesd 6/9 | Thursday 6/10 | Friday 6/11 | Saturday 6/12 | Sunday 6/13 | Total |

Fig. 32

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Customer Management | Add New Customer | Customer List |

Add New Customer

Customer Group

Name*

Address

City                State    Zip

Phone                    Fax

Accounting Ref. Name/Number

Pay Group Details

Regular

Customer Notes

Create Customer      Reset       Cancel

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Customer List | Customer Details | Edit Customer | Add New Customer |

Customer: BG&E

| Details | Contacts | Notes | Information | History | Customer Documents |

Total Hours       180.00
Wage              $0.00
Travel/Fringe     $0.00
Total Labor Cost  $0.00
Billing           $0.00
Margin            $0.00

Save Changes to Customer    Reset    Cancel

Main Menu  Print-to-Go  Documents  Employees  Customers  Jobs  Contacts  Time Sheet  Company  WMS Solutions  Admin  Sign-Out 11 Message(s), 0 New; Document Count 457
Wednesday – June 09, 2004 | Downloads
Report A Bug

| User Account Management | User Account Types | User Accounts | Verification Levels |
| --- | --- | --- | --- |

| View/Edit | Account | Type | Email | Active | Password |
| --- | --- | --- | --- | --- | --- |
| | (owner) | Owner | | Yes | Change Password |
| | Admin Admin (admin) | Owner | | Yes | Change Password |
| | Benny Hung (Benny) | Owner | | Yes | Change Password |
| | Corey Eck (Corey) | Owner | | Yes | Change Password |
| | Karen Brown (karen) | Admin | jcasseriee@aol.com | Yes | Change Password |
| | Sam Chairs (Sam) | Owner | | Yes | Change Password |
| | Tania Raslivkina (Tania) | Owner | rtania@wmssolutions.com | Yes | Change Password |
| | Ted Woodings (Ted) | Owner | ted@woodingscorp.com | Yes | Change Password |
| | Terry Faust (terry) | Admin | tef81260@aol.com | Yes | Change Password |
| | Test Test (Test) | Owner | | Yes | Change Password |
| | Tim Zecha (tzecha) | Owner | | Yes | Change Password |
| | Travis Idol (travis) | Owner | | Yes | Change Password |
| | Zeina Abou-said (Zeina) | Owner | | Yes | Change Password |

Add Another Account

Fig. 40B

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Doc/Skill Management | Doc/Skill Groups | Skill Types | Document Types | Custom Document Types | Custom Type Groups | Custom Document Binder Template |

Hide Filters

Status
● Active
○ Inactive
○ All

«

| All | « |
| Demolition | Active View Edit |
| Mold Removal | Active View Edit |
| Security Clearance | Active View Edit |
| Company | » |
| Trade | » |
| VA Asbestos | » |

Add Skill Type

Fig. 40C

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Doc/Skill Management | Doc/Skill Groups | Skill Types | Document Types | Custom Document Types | Custom Type Groups | Custom Document Binder Template |

Status «
- ● Active
- ○ Inactive
- ○ All

Hide Filters

| All | » |
|---|---|
| Fit Test | Active View Edit |
| Physical | Active View Edit |
| Asbestos Certificate | Active View Edit |
| Lead Certificate | Active View Edit |
| MD Asbestos | Active View Edit |
| MD Lead | Active View Edit |
| DC Asbestos | Active View Edit |
| DC Lead | Active View Edit |
| VA Asbestos | Active View Edit |
| VA Lead | Active View Edit |
| SSN | Active View Edit |
| I-94 | Active View Edit |
| I-9 | Active View Edit |
| Application | Active View Edit |
| Verification of SS Number | Active View Edit |
| Fork Driver License | Active View Edit |
| Blood Level Finish | Active View Edit |
| TOEFL | Active View Edit |
| Company | » |
| Trade | » |
| VA Asbestos | |

Add Document Type

Fig. 40D

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Doc/Skill Management | Doc/Skill Groups | Skill Types | Document Types | Custom Document Types | Custom Type Groups | Custom Document Binder Template |

All Custom Document Types
- Customers
  - ↑ Contracts
  - Equipment
  - Notes
  - Sales Notes
- Job
- Employee
- Contact
- Company
- Type of Work
- Wage
- Vendor
- Account Create New Custom Doc Group Show Filters Name: _____
Description: _____

Issue/Expiration Settings:
- ☐ Use Expiration    Term: [ 0 ]  Year(s)
- ☐ Use Issue Date Custom Fields to Include:

| Custom Field Name | Edit | Req |

Permissions:

| Account Group | Level |
| Admin | None |
| General | None |
| Owner | Full |

Created: 4/7/2004 11:44PM by Tania Rasilvkina
Updated: 6/9/2004 2:07PM by Tania Rasilvkina Status
○ Active  ○ Inactive Member of ☐ Group
☐ Customer
☐ Job
☐ Employee
☐ Contact
☐ Company
☐ Type of Work
☐ Wage
☐ Vendor
☐ Account Group Membership:

| ☐ Custom Field Name | Req |

Save

Fig. 40E

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Doc/Skill Management | Doc/Skill Groups | Skill Types | Document Types | Custom Document Types | Custom Type Groups | Custom Document Binder Template |
|---|---|---|---|---|---|---|

Hide Filters

Status
- ● Active
- ○ Customer
- ○ Job
- ○ Worker
- ○ Contact
- ○ Company
- ○ Type of Work
- ○ Wage
- ○ Vendor
- ○ Account

Custom Documents Groups List

| Name | Type Count | Customer | Job | Worker | Contact | Company | Type of Work | Wage | Vendor | Account |
|---|---|---|---|---|---|---|---|---|---|---|
| Job Documents | 0 | | x | x | | | | x | | |

Fig. 40F

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Doc/Skill Management | Doc/Skill Groups | Skill Types | Document Types | Custom Document Types | Custom Type Groups | Custom Document Binder Template |

All Custom Document Types
- ↑ Worker Document Binder
- Customer
- Worker
- Worker Document Binder
- Contact
- Company
- Type of Work
- Wage
- Vendor
- Account
- Create New Custom Doc Group Show Filters ↑

Name

Description

Status
○ Active  ○ Inactive

Custom Document Types to Include

| | Custom Document Type |
|---|---|
| ☐ | Asbestos Abatement Program |
| ☐ | Company Overview Documents |
| ☐ | Equipment |
| ☐ | Scope of Work |
| ☐ | Plans and Programs |
| ☐ | MSDS Sheets |

Member of

| | Group |
|---|---|
| ☐ | Customer |
| ☐ | Job |
| ☐ | Employee |
| ☐ | Contact |
| ☐ | Company |
| ☐ | Type of Work |
| ☐ | Wage |
| ☐ | Vendor |
| ☐ | Account |

Created: 4/7/2004 11:44PM by
Updated: 6/9/2004 2:07PM by

Save

Fig. 44

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Administrative Setup | Job Status | Types of Work | Employee Status | Employee Title | Employee Languages | Information Fields | Contact Group | Form Management | Vendor Type |
|---|---|---|---|---|---|---|---|---|---|

Status
« 
- ● Active
- ○ Inactive
- ○ All

Hide Filters

| Name (Click To Modify) | Status |
|---|---|
| Asbestos Removal | Active |
| Bricklaying | Active |
| General Demolition | Active |
| Lead Removal | Active |

Add New Type of Work

Fig. 47

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug Administrative Setup | Job Status | Types of Work | Employee Status | Employee Title | Employee Languages | Information Fields | Contact Group | Form Management | Vendor Type Hide Filters

Status
● Active
○ Inactive
○ All

Requirement
○ Required
○ Non Required
● All

| Field Type Name | Data Type | Worker | Job | Customer | Active | |
|---|---|---|---|---|---|---|
| Drivers License Number | Plain Text | ☑ | ☐ | ☐ | Yes | ✎ |
| Drug Test | Yes or No | ☑ | ☐ | ☐ | Yes | ✎ |
| Eye Color | Plain Text | ☑ | ☐ | ☐ | Yes | ✎ |
| Hair Color | Plain Text | ☑ | ☐ | ☐ | Yes | ✎ |
| Height | Plain Text | ☑ | ☐ | ☐ | Yes | ✎ |

[ Add Information Field ]

Fig. 49A

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

| Form Management | Forms | Form Fields |
| --- | --- | --- |

Name (Click to Modify)

| Description | Status | Action |
| --- | --- | --- |
| Access to SSA Headquarters Facilities | Enabled | |
| Connecticut Asbestos Application | Enabled | |
| DC Asbestos Application | Enabled | |
| DC Lead Application | Enabled | |
| Delaware Lead Application | Enabled | |
| I-9 | Enabled | |
| Maine Asbestos Application | Enabled | |
| MW 507 Form | Enabled | |
| Questionnaire for National Security Positions | Enabled | |
| North Carolina Asbestos Application | Enabled | |
| New York Asbestos Application | Enabled | |
| Ohio Asbestos Application | Enabled | |
| Questionnaire for Public Trust Positions | Enabled | |
| Request for Building Pass Identification Card | Enabled | |
| Statement of Personal History | Enabled | |
| Virginia Asbestos Application | Enabled | |
| Virginia Lead Application | Enabled | |
| VA W-4 | Enabled | |
| W-4 | Enabled | |

Access to SSA Headquarters Facilities
CT Asbestos
DC Asbestos
DC Lead
DE Asbestos
GA Lead
I-9
ME Asbestos
MW 507 Form
National Security Positions
NC Asbestos Modify Form
Name: NC Asbestos
Description: North Carolina Asbestos Application
Status: Enabled
File Size: 45Kb
Orientation: ● Portrait   ○ Landscape
Created: 11/25/2003 by Sam sam (chairs)
Updates: 11/25/2003 by Sam Sam (Chairs)
Delete      Submit      Cancel

W-4

Add New Form

Fig. 49B

Main Menu  Print-to-Go  Documents  Employees  Customers  Jobs  Contacts  Time Sheet  Company  WMS Solutions  Admin  Sign-Out 11 Message(s), 0 New, Document Count 457
Wednesday – June 09, 2004 | Downloads
Report A Bug

| Form Management | Forms | Form Fields |
| --- | --- | --- |

☑ Select Field Type
☑ Worker's Table
☐ Worker's Form
☐ Company Table

☐ Additional Columns
☐ Source
☑ Description
☑ Reference Name
☐ Applies To

Reload

Hide Filters

| Name (Click to Modify) | Description | Reference Name |
| --- | --- | --- |
| Zip Code Extension (Home) | Zip Code Extension (Home) | F55 |
| Zip Code (Home) | Zip Code (Home) | F54 |
| Street Address Line 2 (Home) | Street Address Line 2 | F51 |
| Modify Field Form | Street Address Line 1 | F50 |
| Name: Street Address Line 2 (Home) | State (Home) | F53 |
| Description: Street Address Line 2 (Home) | Social Security Number second 2 digits | F252 |
| | Social Security Number last 4 digits | F253 |
| Reference ID: f51 | Social Security Number first 3 digits | F219 |
| Source: Employees Table | Social Security Number | F300 |
| Source Field Name: Address Line 2 | Worker's Place of Birth | F13 |
| Sour Position: Start: Length: | Phone Number Last Four Digits (Home) | F58 |
| Input Fields Size: | Phone Number First Three Digits (Home) | F57 |
| Field Type: Text | Phone Area Code (Home) | F56 |
| Created: 11/7/2003 by | Middle Name | F216 |
| Updated: 11/7/2003 by | Worker's Middle Initial | F6 |
| Delete    Submit   Cancel | Worker's Last Name | F7 |
| Full Name | First, MI, Last | F301 |
| First Name | Last, First, MI | F302 |
| DOB Year | Worker's First Name | F5 |
| DOB Month | Worker's Year of Birth | F12 |
| DOB Day | Worker's Month of Birth | F10 |
| DOB | Worker's Day of Birth | F11 |
| City (Home) | MD/DD/YYYY | F303 |
| Beeper/Mobile Number Last 4 digits | City (Home) | F52 |
| Beeper/Mobile Number First 3 digits | Beeper/Mobile Number Last 4 digits | F234 |
| Beeper/Mobile Area Code | Beeper/Mobile Number First 3 digits | F233 |
| | Beeper/Mobile Area Code | F232 |

Add New Field

Fig. 50A

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

| Administrative Setup | Job Status | Types of Work | Employee Status | Employee Title | Level of Use | Tool Cost | Est Life Span | Contact Group | Form Management | Vendor Type |
|---|---|---|---|---|---|---|---|---|---|---|
| Contact Group type | | | | | Level of Use | Tool Cost | Est Life Span | | Hourly reimbursement | |
| Customers | | | | | Heavy Use | $10.00 | 24 | | $0.42 | |
| HEPA Vaccuum Cleaner | | | | | Light Use | $200.00 | 24 | | $8.33 | |

Add New Tool

Hide Filters

Status
● Active
○ Inactive
○ All

Fig. 50B

Edit Tool:

Name: HEPA Vacuum Cleaner

Tool Cost ($): 200.00

Est. Life Span: (hours) 24

Hourly Reimbursement:($) 8.33

Active: ☑

Levels: Light Use ▶

Add New Level

Created Date: 3/11/2004 by
Updated Date: 3/11/2004 by Tania Razlivkina

Delete    Submit    Cancel

Fig. 51

Fig. 56A 11 message(s), 0 new, Document count: 457
Monday - June 28, 2004 | Downloads
Welcome Tania Rashivini | Report A Bug Main Menu | Print-To-Go | Documents | Employees | Customers | Jobs | Contacts | Time Sheet | Company | Admin | Sign-Out Wage Management | Wage Object | Wage Determination Library | Wages/Fringes

| State | WDC | Wage Determination | Total Wage | Wage OT | Total Fringe | Fring OT | Reg Overhead | OT Overhead | Total Reg | Total OT | % Markup | $ Markup | Gross Profit % | Gross Profit $ | Regular Bill Rate | OT Bill Rate |
|---|---|---|---|---|---|---|---|---|---|---|---|---|---|---|---|---|
| Alabama | | | | | | | | | | | | | | | | |
| | Asbestos Removal | Company Default | $10.00 | $15.00 | $4.00 | $6.00 | $0.00 | $0.00 | $14.00 | $21.00 | %5.00 | $0.70 | %4.76 | $0.70 | $14.70 | $21.70 |
| | General | Company Default | $5.00 | $7.50 | $3.00 | $4.50 | $0.00 | $0.00 | $8.00 | $12.00 | %5.00 | $0.40 | %4.76 | $0.40 | $8.40 | $12.40 |
| | Lead Removal | Company Default | $10.00 | $15.00 | $2.00 | $3.00 | $0.00 | $0.00 | $12.00 | $18.00 | %15.00 | $1.80 | %13.04 | $1.80 | $13.80 | $19.80 |
| Alaska | | | | | | | | | | | | | | | | |
| | Demolition | Company Default | $5.00 | $7.50 | $3.00 | $4.50 | $0.00 | $0.00 | $8.00 | $12.00 | %5.00 | $0.40 | %4.76 | $0.40 | $8.40 | $12.40 |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| Arizona | | | | | | | | | | | | | | | | |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| Arkansas | | | | | | | | | | | | | | | | |
| | Demolition | Company Default | $5.00 | $7.50 | $3.00 | $4.50 | $0.00 | $0.00 | $8.00 | $12.00 | %5.00 | $0.40 | %4.76 | $0.40 | $8.40 | $12.40 |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| California | | | | | | | | | | | | | | | | |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| Colorado | | | | | | | | | | | | | | | | |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| Connecticut | | | | | | | | | | | | | | | | |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| Delaware | | | | | | | | | | | | | | | | |
| | General | Wage Not Set | $0.00 | $0.00 | $0.00 | $0.00 | $0.00 | $0.00 | $0.00 | $0.00 | %0.00 | $0.00 | %0.00 | $0.00 | $0.00 | $0.00 |
| District of Columbia | | | | | | | | | | | | | | | | |
| | DC Asbestos Worker | Company Default | $10.00 | $15.00 | $4.00 | $6.00 | $0.00 | $0.00 | $14.00 | $21.00 | %10.00 | $1.40 | %9.09 | $1.40 | $15.40 | $22.40 |
| | DC Lead Work | Company Default | $10.00 | $15.00 | $2.00 | $3.00 | $0.00 | $0.00 | $12.00 | $18.00 | %15.00 | $1.80 | %13.04 | $1.80 | $13.80 | $19.80 |
| | General | Company Default | $5.00 | $7.50 | $3.00 | $4.50 | $0.00 | $0.00 | $8.00 | $12.00 | %15.00 | $1.20 | %13.04 | $1.20 | $9.20 | $13.20 |
| Florida | | | | | | | | | | | | | | | | |

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 |Downloads
Report A Bug

| Wage Management | Wage Object | Wage Determination Library | Wage/Fringes |

| Schedule | Wage Documents |

Wage Name
[          ]

State
[Company Specific ▼]

County
[          ]

Type of Wage
[Regular ▼]

Wage Code
[          ]

☐ Active
Apply to Trade Defaults

Pay Group
[Company Specific ▼]
Add New Pay Group

Pay Group Details

Regular Pay
| Name | Amount | Workers Comp | Misc Comp | Payroll Taxes |

OverTime Pay
| Name | Amount | Workers Comp | Misc Comp | Payroll Taxes |

Total Regular: $0
Total OT: $0

Memo
[                                    ]

[Save Changes]   [Cancel]

Fig. 56D

11 Message(s). 0 New. Document Count 457
Wednesday – June 09, 2004 | Downloads
Report A Bug Main Menu  Print-to-Go  Documents  Employees  Customers  Jobs  Contacts  Time Sheet  Company  WMS Solutions  Admin  Sign-Out

| Wage Management | Wage Object | Wage Determination Library | Wages/Fringes |

| Name (Click to Modify) | Created By | Created Date | Modified By | Modified Date | Status |
|---|---|---|---|---|---|
| General Asbestos | | 6/9/2004 | | 6/9/2004 | Active |
| General Demolition | | 6/9/2004 | | 6/9/2004 | Active |

[Add New Wage Determination]

[Show Filters]

Fig. 56E

Modify Wage:

Group Name: Demolition

Regular Wages:

| Name | Rate ($) | OT | Rate | OT (%) |
|---|---|---|---|---|
| Wage | 5.00 | ☑ | 7.5 | 150.00 |
| Fringe | 3.00 | ☑ | 4.5 | 150.00 |

$8    $12

Status: Active
Created: 6/9/2004 by
Updated: 6/9/2004 by

Delete    Submit    Cancel

Fig. 58

Main Menu  Print-to-Go  Documents  Employees  Customers  Jobs  Contacts  Time Sheet  Company  WMS Solutions  Admin  Sign-Out 11 Message(s), 0 New. Document Count: 457
Wednesday – June 09, 2004 | Downloads
Report A Bug

| Work Type List | Work Type Detail | Edit Work Type | Add Work Type |

Save  Cancel

*Indicates a Required Field

Work Type Name*
MD Asbestos Worker

State*
Louisiana

Active
☐

Work Type Description

Work Type Required Tools:*

| | Name (Click to Modify) | Level of Use | Tool Cost | Est. Life Span | Hourly Reimbursement |
|---|---|---|---|---|---|
| ☐ | Hammer | Heavy Use | $10.00 | 24 | $0.42 |
| ☐ | HEPA Vacuum Cleaner | Light Use | $200.00 | 24 | $8.33 |

Add New Tool

Job Cost  >>

Work Type Required Tools:*
☐ All  >>
☐ Company  >>
☐ Natasha Document  >>
☐ Trade  >>
☐ VA Asbestos  >>

New Required Document

Fig. 61

Main Menu  Print-to-Go  Documents  Employees  Customers  Jobs  Contacts  Time Sheet  Company  WMS Solutions  Admin  Sign-Out 11 Message(s), 0 New. Document Count 457
Wednesday – June 09, 2004 | Downloads
Report A Bug

| Payroll Management | Weekly Time Report |
|---|---|

| Payroll Experts |
|---|

Select a Customer
BGE

Select a Job
BGE

Hours
☐ Use Default Hours

Populate from
○ Assignments
○ Schedule

Select Date
6/6/2004 [Update]

| May | June 2004 | Jul |
|---|---|---|
| Mon Tue Wed Thur Fri Sat Sun | | |
| | 1 2 3 4 5 6 | |
| 7 8 9 10 11 12 13 | | |
| 14 15 16 17 18 19 20 | | |
| 21 22 23 24 25 26 27 | | |
| 28 29 30 | | |

[Refresh Report]

Hide Filters

Week Ending: 6/6/2004

| Work Type | Name | Emp Num | Mon 31 | Tue 1 | Wed 2 | Thu 3 | Fri 4 | Sat 5 | Sun 6 | Reg Hrs | OT Hrs | Tot Hrs | Trav Reg | Trav OT | Wage Reg |
|---|---|---|---|---|---|---|---|---|---|---|---|---|---|---|---|
| General | Alonso, Gamarro | | 9.00 | 9.00 | 9.00 | 9.00 | 9.00 | 0 | 0 | 40.00 | 5.00 | 45.00 | 0 | 0 | 0 |
| General | Alvarado, Jairon | | 9.00 | 9.00 | 9.00 | 9.00 | 9.00 | 0 | 0 | 40.00 | 5.00 | 45.00 | 0 | 0 | 0 |
| General | Alvarado, Jose Carlos | | 9.00 | 9.00 | 9.00 | 9.00 | 9.00 | 0 | 0 | 40.00 | 5.00 | 45.00 | 0 | 0 | 0 |
| General | Anaya, Jenny | | 9.00 | 9.00 | 9.00 | 9.00 | 9.00 | 0 | 0 | 40.00 | 5.00 | 45.00 | 0 | 0 | 0 |
| | Totals | Update | | | | | | | | | | | | | |

[Add Worker/Job to Time Report] [Reassign Selected Workers] [Assign Worker to Additional Job]

[Save Changes] [Select All] [Deselect All] [Delete Selected Records]

Fig. 62

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Payroll Management | Weekly Time Report | Payroll Experts |

Download PDF

Customer
BGE

Job
BGE

Week Ending: 6/6/2004

| Work Type | Name | Emp Num | Mon 31 | Tue 1 | Wed 2 | Thu 3 | Fri 4 | Sat 5 | Sun 6 | Reg Hrs | OT Hrs | Tot Hrs | Trav Reg | Trav OT | Wage Reg | Wage OT | Bill Reg | Bill OT |
|---|---|---|---|---|---|---|---|---|---|---|---|---|---|---|---|---|---|---|
| General | Alonso, Gamarro | | 9.00 | 9.00 | 9.00 | 9.00 | 9.00 | 0 | 0 | 40.00 | 5.00 | 45.00 | .00 | .00 | .00 | .00 | .00 | .00 |
| General | Alvarado, Jairon | | 9.00 | 9.00 | 9.00 | 9.00 | 9.00 | 0 | 0 | 40.00 | 5.00 | 45.00 | .00 | .00 | .00 | .00 | .00 | .00 |
| General | Alvarado, Jose Carlos | | 9.00 | 9.00 | 9.00 | 9.00 | 9.00 | 0 | 0 | 40.00 | 5.00 | 45.00 | .00 | .00 | .00 | .00 | .00 | .00 |
| General | Anaya, Jenny | | 9.00 | 9.00 | 9.00 | 9.00 | 9.00 | 0 | 0 | 40.00 | 5.00 | 45.00 | .00 | .00 | .00 | .00 | .00 | .00 |
| | Totals | Update | | | | | | | | | | | | | .00 | .00 | .00 | .00 |

<< Prev | Time View | Bill View | Sign View | Next >>

| 6/6/2004 | Update |

| May | June 2004 | Jul |
| Mon | Tue | Wed | Thur | Fri | Sat | Sun |
|---|---|---|---|---|---|---|
| | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | | | | |

Refresh Report

Main Menu  Print-to-Go  Documents  Employees  Customers  Jobs  Contacts  Time Sheet  Company  WMS Solutions  Admin  Sign-Out 11 Message(s). 0 New. Document Count 457
Wednesday – June 09, 2004 | Downloads
Report A Bug

| Print-To-Go | Employee-To-Go | Job-To-Go | Form-To-Go |

1. Select Form Group:
- Employees
- Company
- Customers
- Jobs

☐ 2. Select Workers:
- ☐ Alonzo, Luis Alberto
- ☐ Alonzo Gamarro, Amilcar Vinicio
- ☐ Alvarado, Jairon
- ☐ Alvarado, Jose Carlos
- ☐ Anaya, Jenny
- ☐ Argueta, Luis
- ☐ Argueta, Otonel
- ☐ Argueta G., Milton Leonel
- ☐ Baldemar Hernandez, Alex
- ☐ Berganza, Encarnancion
- ☐ Bolanos, Manuel A
- ☐ Castaneda, Armando
- ☐ Castillo, Antony
- ☐ Cervak, Jiri Show Status

☐ 3. Select Forms:
- ☐ Access to SSA Headquarters Facilities
- ☐ CT Asbestos
- ☐ DC Asbestos
- ☐ DC Lead
- ☐ DE Asbestos
- ☐ GA Lead
- ☐ I-9
- ☐ ME Asbestos
- ☐ MW 207 Form
- ☐ National Security Positions
- ☐ NC Asbestos
- ☐ NC Lead
- ☐ NY Asbestos Download Test    Download PDF Do Not Select any Employees if you wish to print EMPTY forms

DOCUMENT MANAGEMENT SYSTEM

CROSS-REFERENCE TO RELATED APPLICATIONS

This is a continuation of application Ser. No. 12/561,807 filed Sep. 17, 2009, which is a continuation of application Ser. No. 10/879,617 filed Jun. 30, 2004, which claims benefit of Provisional Application No. 60/483,098 filed Jun. 30, 2003. The entire disclosures of the prior applications are hereby incorporated by reference.

BACKGROUND OF THE INVENTION

1. Field of the Invention

A method and a system consistent with the present invention broadly relates to tracking business documents including employee documents and other business related information. More particularly, the present invention is consistent with providing an integrated, comprehensive method for managing employees, customers, jobs, vendors, contacts and equipment information, and the related documents.

2. Description of the Related Art

Business owners, especially those who manage large temporary or permanent work forces or a myriad of projects, face an avalanche of documents and expend a tremendous amount of time and resources to properly manage employee documents, improve payroll speed and reliability, manage job and task assignments, match employee skills and qualifications with job requirements, and transfer the required documents to their business partners.

Out-dated, erroneous or lost information, delays, reduced productivity, and low morale are just a few of the problems associated with conventional efforts to exchange documents with business partners and manage workers, documents and associated tasks or jobs. More importantly, in regulated industries, business owners must comply with a host of state and federal requirements and worker certifications, all of which must be tracked, kept current and provided to various business partners including government agencies. In addition, there are numerous issues associated with the proper allocation, tracking, and distribution of funds associated with the projects.

In the environmental industry, for example, an environmental contractor must handle and track multiple workers, multiple projects, multiple state and federal regulations, and thousands of documents almost each and everyday, or face substantial penalties and fines. The contractor must therefore devote significant internal resources for tracking and compliance with industry regulations.

Attempts in the industry have been made to solve these problems. For example, U.S. Pat. No. 6,049,776 to Donnelly discloses a human resource management system for staffing projects with various workers. For example, Donnelly's system schedules workers based on skills and evaluation of the performance manually entered by the user. Donnelly's system is a very limiting management system, which does not manage documents for the worker and which addresses only a few of the general problems described above. Donnelly does not even begin to address the problems of the environmental industry.

In the healthcare industry, a document information system was designed for addressing specific needs of this specialized industry as taught by U.S. Pat. No. 6,292,783 to Rohler et al. Rohler et al. is also a limiting solution designed for this very specialized industry, which has a data storage means, phone interface means for inputting and retrieving data and a verification means using one or more calendars to verify medical tasks performed to the scheduled ones.

Attempts in the industry are also made to facilitate the transfer of documents from one database to another. For example, in Publication No. 20020174098 to Hsing Kong Wu et al., a database management system integrates the original data sources operating under different Application Program Interface (e.g., ORACLE, SYBASE, MS SQL, IBM DB2, etc.) and transforms these data sources into text files (e.g., EXCEL, XML, WML format) for utilization by different application systems (e.g., IE Browser, Netscape, EXCEL, WAP phone, EOS, or POS in enterprises) via different transmission interfaces (Internet, Intranet, Mobile network) so as to meet the requirements of electronic commerce. In particular, one database is transferred to another database mapping the data fields via multiple operation means. This system, however, is for automatically transferring entire files. The user does not have the flexibility to just transfer the necessary fields. Also, no verification of data is present.

Business owners, managers and other personnel need a real-time system that can accurately track and manage multiple workers, multiple projects, and the associated documentation requirements, without spending an inordinate amount of time entering data, re-keying data, developing reports, and interfacing with conventional payroll and accounting systems. In addition, business owners need a system capable of quickly exchanging information between various business associates.

SUMMARY OF THE INVENTION

Illustrative, non-limiting embodiment of the present invention overcomes the above disadvantages and other disadvantages not described above. Also, the present invention is not necessarily required to overcome any of the disadvantages described above, and an illustrative, non-limiting embodiment of the present invention may not overcome any of the problems described above. The appended claims should be consulted to ascertain the true scope of the invention.

It is an aspect of the present invention to provide a system and method managing personnel staffing for designated projects, especially those requiring time-sensitive certifications. It is further an aspect of the present invention to provide a system and a method managing the costs of the designated projects including payroll management, project estimations, and the like.

It is further an aspect of the present invention to provide a system and a method for managing industry representations related to personnel, customers, projects, equipment and to other subjects and other entities present in various industries. It is further an aspect of the present invention, to provide a system and a method for comprehensive management of documents of various kinds.

It is further an aspect of the present invention to provide a system and a method to facilitate secure sharing of documents between various entities within a community. It is further an aspect of the present invention to provide a system and a method for verification of various documents. Other aspects will become apparent from reading the description herein.

According to an exemplary non-limiting embodiment of the present invention, a computer-assisted system and a method is provided for managing workers and documents. A storage stores industry representations and a list of workers with data related to the workers. A processor relationally links the industry representations with one or more workers from the list of workers. The processor further analyzes the workers on the list based on the industry representations linked to the workers and based on data related to the workers. Based on this analysis, the processor then selects a worker from the list. The processor may select the worker for various viewings and manipulations.

According to another illustrative, non-limiting embodiment of the present invention, a computer program product and a computer system adapted to manage workers and documents has a processor, a memory with software instruction adapted to enable the computer system to perform the following steps: storing industry representations and a list of workers with data related to the workers, relationally linking the industry representations with one or more worker from the list of workers, analyzing each worker based on industry representations linked to this worker and based on data related to this worker, and selecting one or more workers based on this analysis.

According to another exemplary, non-limiting embodiment of the present invention, a method for managing documents is provided. In the method, a plurality of documents and a list of entities are stored and some of the documents are linked to one or more entities. The method further analyzes an entity based on the documents relationally linked to the entity.

According to another illustrative, non-limiting embodiment of the present invention a system, a computer program product and a method for uploading documents is provided. In this embodiment, an entity and an industry representation type, and the type of uploading to perform is selected. The industry representation is uploaded and the user inputs information for the uploaded industry representation. The information and the industry representation is saved to a data store. The industry representation is linked to the entity and the industry representation type and the entity is a worker, a customer, a job, a vendor, a contact, a user or a company.

According to another illustrative, non-limiting embodiment of the present invention a system, a computer program product and a method for transmitting information is provided. The industry representation is scanned in with a bar code and the bar code information from the bar code related to an industry representation is read. The bar code information is linked to the industry representation. When the bar code information has an industry representation type and an entity, the bar code information is complete. In this case, the industry representation with the linked bar code information is stored in the data store. When the bar code information is incomplete, the industry representation is manually linked to the entity and/or the industry representation type, before the industry representation is stored in the data store with the linked bar code information.

According to another illustrative, non-limiting embodiment of the present invention a system, a computer program product and a method for uploading industry representations is provided. A coversheet with a bar code is scanned in and the bar code information is read from the bar code that is attached to a cover sheet. Next a number of industry representations are scanned in and the bar code information is automatically linked to each of the scanned in industry representations. The industry representations are stored with the linked bar code information.

According to another illustrative, non-limiting embodiment of the present invention a system, a computer program product and a method for managing workers and documents is provided. A list of workers and industry representations with data related to the industry representations are stored. The industry representations are linked with one or more worker from the list. Filters are set for displaying information and one or more worker with one or more corresponding industry representation is displayed.

According to another illustrative, non-limiting embodiment of the present invention a system, a computer program product and a method for managing workers and documents is provided. Data related to a worker, one or more industry required representations and a job with or without a work type is stored. User input is then received and analysis of the stored data is performed based on the received user input. The results are then displayed. The analysis performed is at scheduling one or more worker to a job when one or more industry required representations for the worker matches industry requirements for the work type. Alternatively, the analysis performed is informing the user of a status of an industry required representation for the worker or displaying a list of jobs filtered by a job status.

According to another illustrative, non-limiting embodiment of the present invention a system, a computer program product and a method for managing worker information and documents is provided. Data related to a number of workers including an industry required representation for one or more workers is stored. Data related to a job and workers associated to a work type is also stored. Next, an analysis of the stored data is performed and the results of the analysis are produced. The results may be a list of one or more workers qualified for the work type based on the industry required representation for the one or more workers. Alternatively, the results may be an empty list when no workers meet the industry requirement for the work type or a list of the workers to allow the user to manually allocate one or more workers for the job but alerting the user when the worker being scheduled does not have the industry required representation for the work type.

According to another illustrative, non-limiting embodiment of the present invention a system, a computer program product and a method for managing worker information and documents is provided. Data for a number of workers and various forms are stored in a data store. Then, one or more workers are selected and one or more forms are selected and the system populates the selected forms with data for the selected workers.

According to another illustrative, non-limiting embodiment of the present invention a system, a computer program product and a method for dynamically exchanging information between a community of users is provided. The user selects data having a number of fields and at least one record from a source database for transfer to a destination database. The selected data is dispatched to the destination database. When the dispatched data is received, upon a user request, the received data is stored in the destination database by mapping fields of the received data with fields in the destination database.

According to another illustrative, non-limiting embodiment of the present invention a system, a computer program product and a method for transmitting information between entities, the entities being a server and a client. First, a key pair for asymmetric cipher is generated by a first entity, and the public key is transmitted to the second entity. The second entity generates a session key for a symmetric cipher and encrypts the session key with a public key. The encrypted session key is transmitted to the first entity, and the first entity uses the session key to encrypt selected data. The data with some fields being encrypted is transmitted to the second entity where it is decrypted.

BRIEF DESCRIPTION OF THE DRAWINGS

The above objects and other advantages of the present invention will become more apparent by describing in detail the illustrative, non-limiting embodiments thereof with reference to the accompanying drawings, in which:

FIG. 7 is a GUI of the workforce list in accordance with this embodiment of the present invention.

FIG. 8A-H is a GUI of the worker information split up into tabs in accordance with this embodiment of the present invention.

FIG. 11A-D is a GUI of the worker searches split up into tabs in accordance with this embodiment of the present invention.

FIG. 12 is a GUI of the search results in accordance with this embodiment of the present invention.

FIG. 15A is a flow chart diagram for uploading a document into the system in accordance with this embodiment of the present invention.

FIG. 15B is a flow chart diagram for creating a barcode and scanning items into a database.

FIGS. 16A-F is a GUI of the uploading wizard in accordance with this embodiment of the present invention.

FIG. 17 is a GUI of the document review sub-module in accordance with this embodiment of the present invention.

FIG. 18 is a GUI for verifying a document in accordance with this embodiment of the present invention.

FIG. 20 is GUI for setting filters for the job review sub-module in accordance with this embodiment of the present invention.

FIG. 21 is GUI for work type document review sub-module in accordance with this embodiment of the present invention.

FIGS. 24A-J are GUIs for adding/editing or viewing information about a job in accordance with this embodiment of the present invention.

FIG. 25 is a GUI of a job list in accordance with this embodiment of the present invention.

FIG. 28 is a GUI of the job assignment report in accordance with this embodiment of the present invention.

FIG. 29A is a GUI of scheduling by job, job assignments, in accordance with this embodiment of the present invention.

FIG. 30A is a GUI of the scheduling by worker in accordance with this embodiment of the present invention.

FIG. 32 is a GUI for adding a new customer into the worker management system in accordance with this embodiment of the present invention.

FIGS. 39A-C are GUIs for user account management sub-module in accordance with this embodiment of the present invention.

FIGS. 40A-F are GUIs for document and skills set up sub-module in accordance with this embodiment of the present invention.

FIG. 44 is a GUI for setting up types of work in accordance with this embodiment of the present invention.

FIG. 47 is a GUI for creating, editing and viewing field types in accordance with this embodiment of the present invention.

FIGS. 49A-B are GUIs for setting up form types and fields for the forms in accordance with this embodiment of the present invention.

FIGS. 50A-B are GUIs for setting up tools and detailed information for the tools in accordance with this embodiment of the present invention.

FIG. 51 is a GUI for setting up payroll taxes types in accordance with this embodiment of the present invention.

FIGS. 56A-E are GUIs for wage management sub-module including setting up company pricings, customer pricings, work type pricings, vendor pricings, wage determination library, and wage setup, in accordance with this embodiment of the present invention.

FIG. 58 is a GUI for adding, editing and viewing work types in accordance with this embodiment of the present invention.

FIG. 61 is a GUI for weekly time report for a payroll management in accordance with this embodiment of the present invention.

FIG. 62 is a GUI for printable time report for a billing management in accordance with this embodiment of the present invention.

FIG. 65 is a GUI for creating a job file to go in accordance with this embodiment of the present invention.

FIG. 66 is a GUI for populating filled out forms in accordance with this embodiment of the present invention.

FIGS. 68A-E are GUIs for creating a new message to be transmitted and reading a received message in accordance with this embodiment of the present invention.

DETAILED DESCRIPTION OF THE ILLUSTRATIVE, NON-LIMITING EMBODIMENTS

Figure 1:
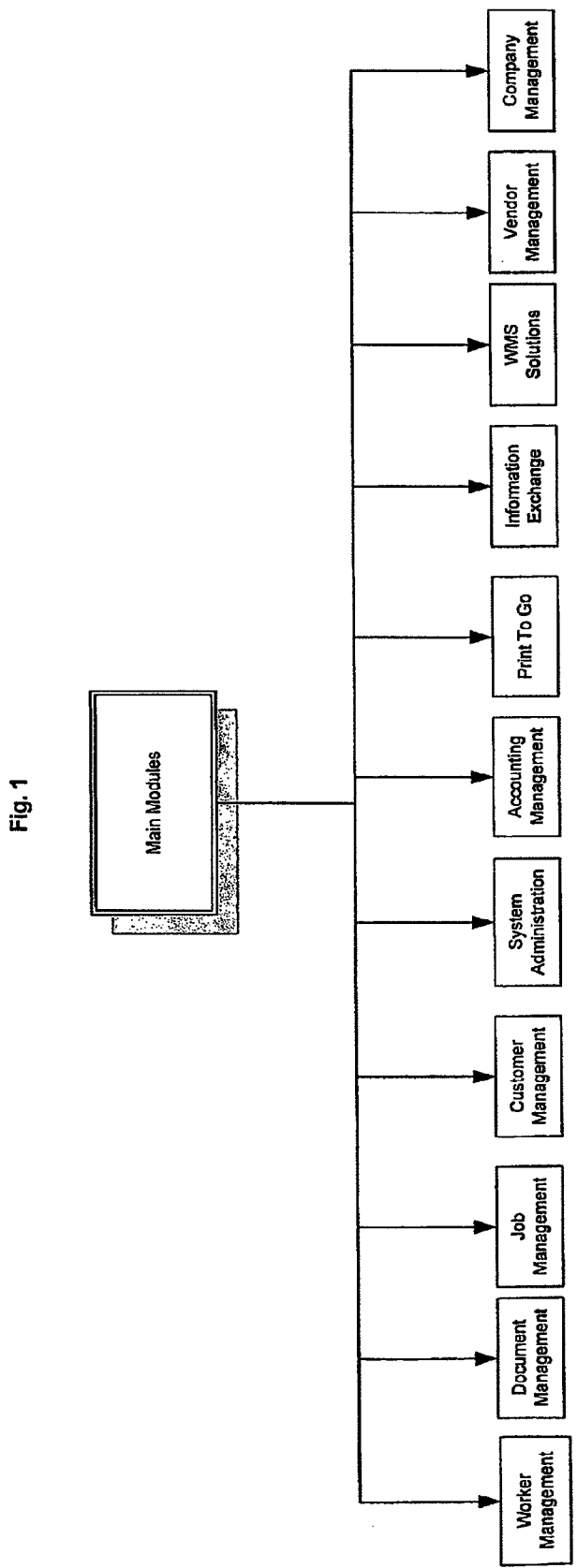
FIG. 1 is a block diagram of the main modules in a worker management system in accordance with an illustrative, non-limiting embodiment of the present invention.

The present invention will now be described in detail by describing illustrative, non-limiting embodiments thereof with reference to the accompanying drawings. In the drawings, the same reference marks denote the same elements. The invention may, however, be embodied in many different forms and should not be construed as being limited to the illustrative embodiments set forth herein. Rather, the embodiments are provided so that this disclosure will be thorough and complete, and will fully convey the concept of the invention to those skilled in the art. The terms "end user", "customer" or "contractor" are used interchangeably, and refer to the actual user of the illustrative, non-limiting embodiment of the Worker Management System ("WMS") to coordinate workers and projects.

I. Introduction

In an illustrative, non-limiting embodiment of the present invention, the Worker Management System is a software application that manages aspects of the relationship of a worker and a company, with regards to skills, qualification, certification, job requirements, scheduling needs and document management. The software application can be delivered to the user via a web-based graphical user interface. The software application can also be deployed over a dedicated computer network (e.g., LAN or WAN), or via a stand-alone computer system for a particular company, such as an intranet installation or by other means. For simplicity and ease of discussion, the illustrative, non-limiting embodiments of the present invention will be described with reference to a web-based system.

The illustrative, non-limiting, embodiment digitally captures worker, customer, job and equipment information and documentation in one system. The captured information is used across a wide variety of modules and makes the captured information available in a variety of reports further ensuring that the captured data is easily ported to conventional software applications such as payroll and accounting systems that interface with the variety of modules.

For example, the illustrative, non-limiting, embodiment of the Worker Management System can work in conjunction with the end user's current accounting software (with a custom link) or be configured to work with a proprietary accounting system by changing the data export functions as described in greater detail later. The software can also be enabled for web-based delivery, allowing multiple end users (customers) to gain access to worker information and job specifications from anywhere via an Internet connection.

The illustrative, non-limiting embodiment of the present invention uses dynamic fields to describe data, so that the system can be adapted to any industry that requires document capture and/or the tracking and dissemination of those documents, for example, regulated certificates or required documents. The system tracks features related to the documents such as expiration dates, renewals and updates. Although an illustrative embodiment of the present invention is particularly suited for a regulated industry worker and documentation management, one of ordinary skill in the art would understand that, by modifying the dynamic fields, the illustrative embodiment of the present invention is applicable to any industry requiring worker management and documentation. For example, an illustrative, non-limiting embodiment of the WMS is applicable to the construction industry, chemical industry, healthcare industry, real estate and many other industries. New fields can be added at any level to accommodate the specific requirements of a particular industry.

The illustrative, non-limiting embodiment of the present invention has an intuitive user interface to make it user friendly and easy to use. The system also allows rapid management and review of workers qualifications and expiration dates. In the environmental industry, for example, an environmental contractor using the illustrative embodiment of the WMS can handle and track thousands of documents that are required within the industry each and everyday. The illustrative, non-limiting embodiment of the WMS allows the environmental contractor to manage their company work force with incredible ease, reliability and efficiency, thereby drastically cutting support and overhead costs. The use of the WMS by a contractor costs pennies in comparison with the costs a contractor currently incurs to perform the same functions.

In addition to the environmental contractor, the Industrial Hygienist (IH), the customers (i.e., sub-contractors) of the environmental contractor and state/federal regulators can access the same data set, or selected portions of the same data set, as determined for each job. Thus, there is a single location where information is current, and parties involved in the process may view the same real-time data. With a password, for example, the documentation is only an Internet connection or a phone call away. By relieving the administrative burden, the workers and the contractor can focus on the tasks at hand.

In the illustrative, non-limiting embodiment of the present invention, the main modules are: a) worker management, b) document management, c) job management, d) customer management, e) system administration, f) accounting management, g) print-to-go, h) information exchange, i) vendors and j) miscellaneous. They are shown in FIG. 1 and can be accessed by the user via, for example, the main menu.

Figure 2:
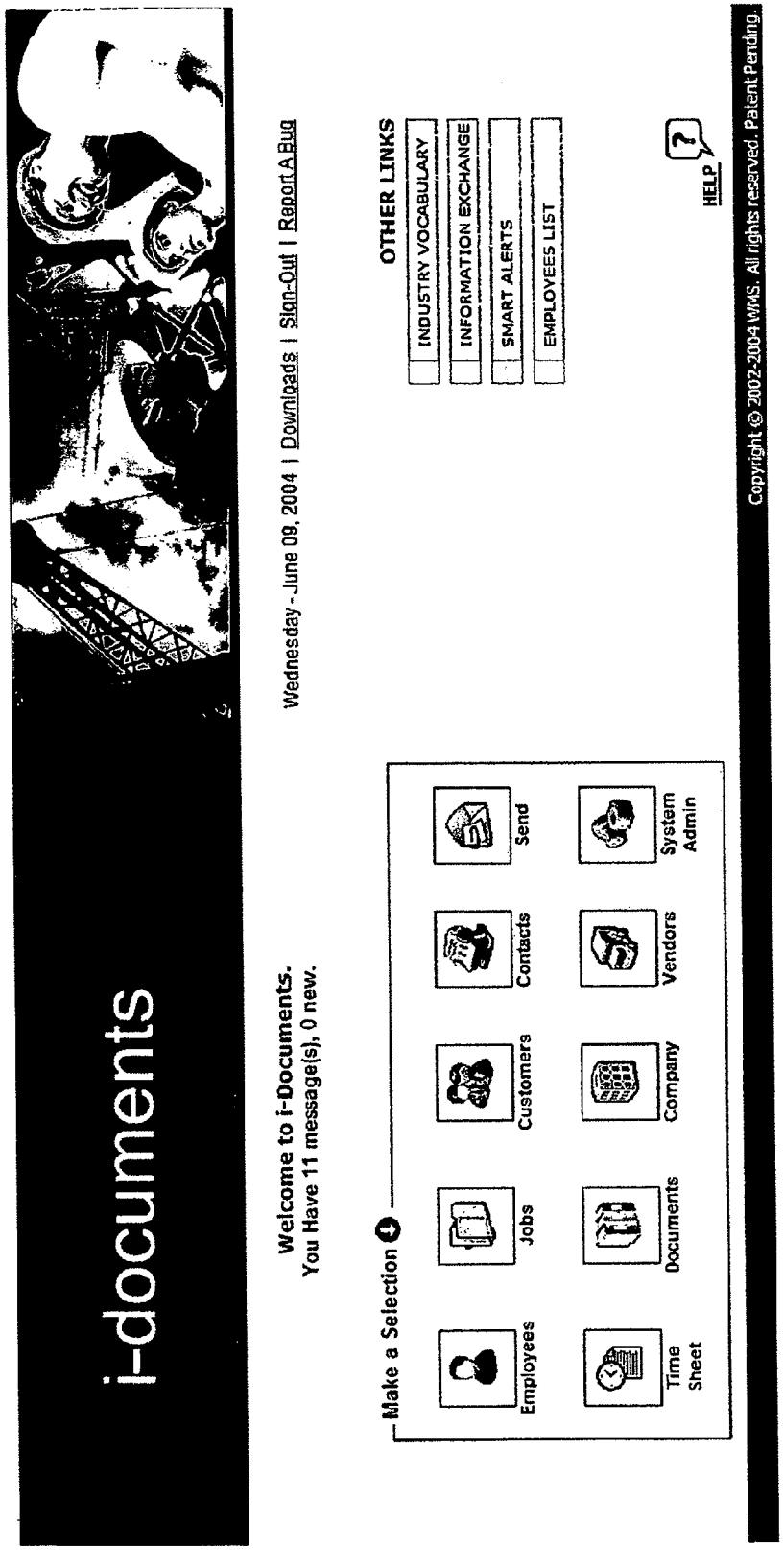
FIG. 2 is a GUI of the main menu of the worker management system in accordance with this embodiment of the present invention.

The exemplary main menu illustrated in FIG. 2 provides the user with access to worker management module by selecting "employees." Similarly, the exemplary main menu illustrated in FIG. 2 provides the user with access to document management module by selecting "documents", to job management module by selecting "jobs," to customer management module by selecting "customers," to the system administration module by selecting "system admin", to the accounting management by selecting "time sheet," to print-to-go module by selecting "send," to the information exchange by selecting "information exchange" from other links appearing on the right side of the exemplary screen, to the vendors module by selecting "vendors." Access to additional information may be provided. For example, the main menu may provide access to contacts which is similar to an address book, company information, industry vocabulary, help, number of messages in the mail box, downloads and so on may be provided.

The terms "module" and "sub-module" and "logical part" are not intended to mean that the functions described herein be grouped as described, as any alternate grouping of functions may be substituted to practice the present invention. What follows is a general overview of the broad functionality of the illustrative non-limiting embodiments of the present invention and then, a more specific and detailed description of the main modules is presented in the context of the environmental services industry.

II. Overview of the Exemplary WMS Functionality

The illustrative WMS has numerous features, and the following presents a broad framework of its capabilities. Many of the features have functionality that interact across several of the main modules, and therefore are not easily categorized under a single heading. As a result, the features below may contain some overlap in the description, and the features described under one major category of functionalities may also be applicable to other categories of functionalities. Some of the exemplary functionalities of the WMS are described below under the following broad category headings: a) document and worker management, b) information exchange and web security, c) job and worksite management, d) scheduling, e) searching, f) labor/cost management analysis, g) payroll, h) billing, i) alerts, j) worker compensation audit information management, and k) color coding.

A. Document and Worker Management

For example, document management services allow for a comprehensive input and data capture, comprehensive distribution of materials as requested, pre-job submittals (explained later in further detail in the site management section), print, email and fax of documents and materials directly to the job site or to the designated management personnel, secure access (e.g., using a secure PIN number) for designated third parties, including, for example, Industrial Hygienist (IH), the customers' sub-contractors, and local, state and federal regulators.

To facilitate the management of documents, a 24-hour Document Center may be included, which allows the contractor, IH and sub-contractors to upload, verify or request documents or worker searches 24 hours a day. Worker updates or requirements can be forwarded to the WMS at anytime. If a contractor needs to have submittals printed, a job completion set printed, or just a group of documents printed, with a simple phone call, email or fax they can request the WMS document center to take care of it.

Anytime a worker has an updated requirement, the user may have the information forwarded to the WMS, directly from that location and by the time they return to their office, the information is updated in the WMS and is ready for use. For example, when a worker gets an updated physical, the doctor's office faxes the cover sheet to the WMS 24-hour document center and the file is automatically uploaded before the worker even returns to the job site.

The end user has complete access to the workers files via the web, in a secure environment. The end user could review the document for verification, review the status of the document, and print, email or fax it anywhere, anytime. If the user is unable to access the web, he or she can call an 800 number, provide a password and direct the 24-hour Document Center to fax or email anywhere any documents.

The exemplary, non-limiting WMS can identify, accumulate, store, track, disseminate and update documents. The WMS tracks what paperwork has been printed. When the end user adds workers to a job and go to disburse the required documents for the workers, WMS knows what has been previously sent. The end-user can select to distribute only documents that have not been sent or the user can select to redistribute the entire file.

For example, this exemplary functionality may be accomplished by simple check boxes such as print entire job file, print only new documents, or view selected workers. If the user already printed the documentation and the job required five additional workers, the system will show which documents have been printed, and the user can simply request to print the unprinted documentation or the user can print the entire job again. All of these options apply to faxing and emailing as well. The WMS includes a capability to print from a cell phone by, for example, dialing in the job number, employee number and the fax number to receive the document(s) needed.

WMS job file has an "update list" that allows the end user to define who should be updated throughout the job. It can be turned on or off for each recipient and it controls how the information will be distributed. When a worker has been added to a job or their documentation has been updated, the user selects "update" and the WMS checks the records and forwards the new documents. By setting the update to automatic, the WMS will send document updates every time a document is updated for that job without the end user having to do anything. If the end user would rather do this manually, the end user can turn off the automatic setting and then when needed select "update" for all or only specific recipients on the list. Then files that have not been sent will be transmitted by fax, email or to a printer based on the recipient's predefined parameters.

The document distribution and review process allows for any or all documents that are stored to be printed, emailed, faxed and reviewed using any criteria. For example, anywhere there is a "document" icon, the end user can double click the icon and the workers documents are displayed on the screen in a separate window for review, without losing the current place in the application the user was working in. In addition, the user can drill-down into any worker's document or file to review and research the information.

In this illustrative, non-limiting embodiment, the information is presented to the user in a hierarchical approach, where the user is provided with a general overview, and the user may select the desired item and view details for that item, next the user may select sub-item and view details for this sub-item and so on.

When the user selects a worker via a navigation action such as rolling the mouse pointer over the worker's icon or clicking on the icon, the user is presented with items that are expired or incomplete within the worker file, thus eliminating the need to change screens to find out what documents are showing incomplete or expired. The WMS system either shows the information as being fully cleared, where the issuing body had been contacted and the document confirmed for authentication, or semi-cleared in those cases where only the date was verified. The documents may employ a color border, or some other visual means, to distinguish the various levels of certification, verification, non-certification, or expiration. When WMS uploads the files, the WMS will enter and lock the dates so they cannot be changed without a security access code. This allows for a safe, secure and reliable storage of documents.

Moreover, there are a number of ways to monitor documents within the WMS to verify or even allow documents to leave the WMS system. These controls can be put in place with or without the knowledge of the lower level staff. For example, while email distribution is one of the best methods to send files, there could be security issues. Therefore, the WMS has secure methods of monitoring emails. These exemplary methods are explained herein below.

For example, only an authorized administrator will have access to email distribution. For further security, the WMS can prevent any emailed documents from leaving the system prior to an entry of a password. Then, upon an authorized individual's approval, the document would be forwarded to the recipient. When the administrator emailed a job file of workers documents, it would send an email request for release to a predefined management person. The manager would then enter an access code releasing the documents. This procedure has been set up to ensure no documents leave the site without the proper authorization or knowledge of the management. If the end user is unable to release an important email because they are away from the web, the WMS 24 hour Document Center can assist. With a simple phone call to the Document Center and a series of verifications, the end user can have the documents released from anywhere.

If security is not a big concern and the end user wants everyone to have total access, but also wants to know when certain documents are transferred to others, the following functionality can be implemented. WMS can send an email alert to the management every time a document has been printed, emailed or faxed. The WMS may also send a notification anytime a certain size file was printed, faxed or emailed. The WMS may have a log page that allows the end user to access the dispatched records. This log will monitor printing, emails, and faxes, and tell the user who and what was dispatched.

As a result, an exemplary, non-limiting embodiment of the present invention, allows for a number of functionalities to facilitate document management including input, distribution, updates and access. These exemplary functionalities allows for managing workers such as analyzing and reviewing of document expiration dates. In addition, the end user can track, monitor and schedule updates for the documents of certain workers. These functionalities for document and worker management are always available via the web. The documents are stored in a storage such as a database, thereby allowing a number of various searches based on numerous customized criteria.

In addition, in order to facilitate upload of documents into the system, barcodes specifying the document's location in the system's storage and metadata can be used. Scanning with barcodes facilitates uploading a large amount of documents into the system. In addition, the validity of the document can be verified by users with different clearance levels. Some of these exemplary functionalities are also applicable to the other categories described below.

B. Information Exchange and Web Security

With the use of passwords and certificates, documents are secure. Each subscribing company is set up on its own database to ensure that no matter what kind of situation occurs, a subscribing organization could not find its way into another company's files. A user and a community of users in a one to one or one to many relationship can exchange information with each other seamlessly while enabling each user to choose the information they want to distribute, just as if they where submitting the information by paper, email attachments, web page portal or any other means. Moreover, to ensure the security of the sensitive content, selective encryption is used during the data exchange. In particular, the user specifies which fields (e.g., the social security number) should be encrypted during the transfer. By not encrypting the information that is unnecessary to secure, the system limits the size and complexity of the data that is being transmitted, allowing information to be transmitted faster while maintaining the security of the transmitted data.

The Information Exchange (IE) functionality eliminates the need for the recipient to manually extract data from the sources in order to enter the data into a database, IE automatically enters the data into the recipient's database. With the development of IE, the user may dispatch information and supporting documentation (ISD) to one or more users electronically, enabling the recipients to receive, view and accept all or parts of the information. The accepted ISD may be saved directly into the receiving database. Each user has control over the ISD in their individual database. When information is received they can choose to accept or reject the data and can even create new fields to accept new types of information. The user has control over what information is sent to other users and what information is accepted into their own database. IE empowers the world to exchange any information and supporting documentation by any user and community of users quickly and easily.

IE also enables the user to review ISD before accepting it. IE displays information in full before loading it into the user's database. The user has the opportunity to confirm the mapping of information and to accept or reject specific fields or supporting documentation. In addition, IE's Smart Management, a standard component of the IE process, allows the user to manage the information and supporting documents through color codes and smart alert rules that have been established by each user to manage common information between users in the industry.

C. Job and Worksite Management

Moreover, the exemplary, non-limiting embodiment of the present invention allows for management of the documents required for a certain job (some of these functionalities were explained herein above in the document and worker management section). The job and worksite management allows for management of the job and skill requirements, costs and scheduling. Job Management is an easy to use tool that allows the end user to track budget information, comparing scheduled information to actual information, through one data entry screen.

Job Management allows for records to be tracked by each job a worker has been assigned to. The Job Management module allows for real-time tracking of scheduled events and the worker cost associated with the project. In addition, it allows scheduled information to be compared to actual information when the payroll module is utilized. The cost reporting shows actual labor cost as they are assigned while also showing the budgeted cost. This functionality provides with information regarding costs of the job in relation to the budget.

In addition, budgeted and actual information can be entered into the Job Management fields to give the end user a complete Job Cost system. One of the many advantages of the exemplary WMS is that as workers are scheduled a cost is calculated in real-time covering predefined burdens. This allows the end user to identify over-scheduling and projects that are behind or ahead of their budget before the work is done.

The WMS shows the end user workers' schedules including but not limited to how many hours the worker has been assigned for a particular day or week and which workers were not assigned for that or another particular day or week. The end user can view the schedule for the upcoming week, and which worker has been assigned to which job, how many hours the workers have been assigned for, and view worker availability in the list until they have been assigned to 40 hours (or any defined number of hours) and for which job(s). Once the worker has reached a set number of hours, the name of this worker is no longer on the list of available workers.

The worker name or the table cell in which the worker's name appears can be color coded based on their availability. For example, worker name, or cell in which the name appears, will turn one color once they have been assigned for forty hours (or another predefined number set by the end user) and another color if they have been assigned overtime. In addition the end user will be able to view the totals including hours assigned for the week, regular hours, overtime hours, the cost (based on worker's wage or job certification wage) and percentage of staff assigned. As a result, staffing a job is easy and efficient. One of ordinary skill in the art would understand that other variations are possible including color coding various user interface representations such as the text or the actual field value, the cell of a table, a symbol, an icon and so on.

Moreover, with all the different paperwork requirements on a job site, it is hard for the user to remember all the details. This exemplary WMS checks the job requirements and dispatches the necessary documents. The illustrative system allows the end user to pull up a job and select via a navigation action, print, email or fax to dispatch the required documents for that particular job. The documentation for that job is delivered because the system knows what is required based on the job parameters and specifications previously entered by the end user.

Job and worksite management allows the end-user to gain complete control over the worksite. Real-time information is loaded into the system as workers enter and leave the system using WAP technology, swipe cards, barcode cards, smartcards or biometrics. Workers can be logged in via any WAP enabled device, by swiping a card with a magnetic stripe, by scanning barcode card or smartcard, or by scanning their fingerprints. This allows real-time costs to be calculated in the WMS, thereby providing real-time costs to the end-user. In addition, in real-time, the worker is either cleared or not cleared to work on the job site. This is determined upon entry to the site. If a worker is not authorized to work on the site, the worker is denied the ability to sign in unless a supervisor overrides the system. Some of these exemplary functionalities are also applicable to the other categories.

D. Scheduling

Some of the exemplary functionality to facilitate scheduling includes easy to use reports for posting to job boards, monitoring upcoming expirations, real-time schedule updating, scheduling based on work type, reminders for individuals who should have gone to an update class, scheduling a worker for an update from anywhere in the system. Thus, when a worker's certification is expiring, the worker can immediately be scheduled by a drop down menu showing course information and date.

Scheduling based on work type allows for easy monitoring of the budget and prevents the scheduling of higher wage qualified workers to a low wage job that can be fulfilled by other, less qualified workers. For example, the environmental industry is labor intensive and requires multiple worker qualifications, just like the construction, medical staffing and other industries. Accordingly, a large portion of the budget for each project is for labor and insurance to cover the labor. Therefore, when a worker is assigned/scheduled to the job, the following information may be displayed for the job: work type (which generates an accurate workers compensation expense), the cost of an individual, the average cost of the group assigned by "work type", the total daily cost scheduled, total man-days scheduled to that date, and total man-days estimated for a quick comparison.

This allows the end user to know at a glance if they are within the budget before the work actually takes places, allowing the end user to be proactive rather than reactive. A color-coded system can be used to show when a job is over budget or approaching a predefined benchmark percentage of labor cost allowed. Some of these exemplary functionalities are also applicable to the other categories.

E. Searching

Numerous integrated searches may be performed. For example, the end-user may search for the information associated with a particular worker, document, job, customer, etc. The searching may include a one parameter (e.g. worker name, a job number, etc.) or multiple parameters (e.g., workers whose asbestos certificates are about to expire, workers who worked overtime for a particular job, etc.).

For example, the end user can run searches based on any parameter and locate specific workers for a specific work type. As explained above, each worker's skills and qualifications are maintained and kept current. Once set, the system will analyze the available work force and return a list of workers meeting the skill and qualification requirements. In addition, the list can be expanded to show workers who did not qualify and why, so the issues can be resolved. The end user can then choose from the list of the selected workers and assign them to that job. By a navigation action such as clicking a check box the worker is assigned, providing real-time cost assessment compared to pre-entered budget information. The worker's documents are captured for that job site requirements and are made ready for distribution. Once the workers are assigned for the job, the documents for the job are just a click away to fax, email or print as submittals or initial paper work preparation for the site. The system shows how many hours the worker has been assigned for that day and shows who has not been assigned for that day. Some of these exemplary functionalities are also applicable to the other categories.

F. Actual Labor Cost Management Analysis

WMS has the ability to assess ahead of time when a project is over budget. WMS has scheduling capabilities whereby you can track not only the job qualifications, but also the cost associated with the labor as well. By inputting key job cost information the customer (contractor) is able to view accurate job labor costs before the work has occurred.

By using WMS, the total cost of labor appears according to the scheduled workflow. Therefore, when a project is over scheduled the customer would know ahead of time. In addition, WMS allows for predefined thresholds that will alert supervisors via email, voice message or screen pop up that the threshold has been triggered. This helps management to control, or eliminate, cost overruns before they happen. By utilizing the payroll module, the WMS delivers side-by-side comparison data. This allows the customer to analyze actual cost of the project to scheduled cost of the project. The actual costs are the final numbers delivered from a payroll. Some of these exemplary functionalities are also applicable to the other categories.

G. Payroll Worksheet

Whether the payroll module is used or not, the exemplary Job Assignments module of the present invention generates a Payroll Worksheet that lets management know who was scheduled to the job and who to collect time from. This saves hundreds of lost hours a year correcting checks and failing to capture billable hours. The payroll module has a spreadsheet function that has been designed to overlay any existing accounting system, providing a dramatic reduction in the payroll processing time. For example, the difference between a conventional Paychex data entry for one certified wage worker and WMS is about two hundred fifteen keystrokes. With the exemplary payroll module, it takes only about five keystrokes compared to the conventional Paychex method of about two hundred twenty keystrokes. On a large job of seventy five people, the difference can be as great as about 16,125 keystrokes. What used to take several hours or more, may take just minutes with the exemplary payroll module.

The exemplary WMS payroll input system utilizes job assignments to dynamically create spreadsheets for time entry, and allows for manipulation of the spreadsheet on the fly. The process has been designed to be user friendly with one-time entries as often as possible. Individual data screens reside in the background while a spreadsheet allows for rapid and precise data entry. Default screens allow for a single payroll entry week after week, while allowing the end user to overwrite and edit the spreadsheet on the fly, editing or adding information. The exemplary WMS then exports the data into Paychex, and can accommodate any other payroll package by modifying the data export file. Some or all of these exemplary functionalities are also applicable to the other categories.

H. Billing

The Job Management captures billing information for the workers by "work type" and prints detailed reports. This makes generating invoices for the user's clients quickly and easily, eliminating headaches and allowing the user to easily sort and arrange information. This exemplary functionality is also applicable to other categories.

I. Alerts

Smart alerts are designed to prevent typical errors that occur at the actual job sites. The exemplary system utilizes email, voicemail or pop up alerts to the end user's designated management team anytime certain criteria have been breached. This enables the end user's management to react immediately. The exemplary system allows for predefined thresholds (e.g., cost thresholds, worker document expirations, schedule compliance, etc.) that will send an email, pop up or voicemail to the assigned management that the threshold has been triggered. The alerts can be turned on/off during the initial set-up process. In addition, customized threshold events for an end user can be developed and implemented into the exemplary WMS. These alerts may be automatically sent to the management team without further review or work from the end-user.

For example, the WMS sends email alerts, voicemails or pop ups to managers as the date of expiration for a certain certification document approaches. The illustrative email alert may be sent seven days (or whatever number is set by the end-user or administrator) prior to expiration, and then a reminder is sent two days (or whatever number is set by the end-user or administrator) prior to expiration. A daily email could be sent to the job site for workers that are on the site but out of compliance. An email can also be sent to the appropriate manager when a worker fails to attend a required training class to preserve a certification or qualification.

In another example, when labor cost thresholds are breached, an email is sent to specified managers alerting them that the project has been over-scheduled based on the estimate. At the same time, on the job schedule screen in the WMS, the scheduler can view the job labor cost as the workers are scheduled, thereby allowing for real-time cost labor analysis, including the ability to override the threshold if needed.

The illustrative worker management system also has numerous internal controls for worker allocation compliance. For example, anytime an unqualified worker is placed on the job, a smart alert can be sent to the appropriate manager notifying them of the problem. When the administrator or the end-user attempts to place the worker on the job, a pop up window will request a reason for the override. A short override authorization statement may be required to place the worker. The administrator or the end-user will then be reminded at periodic intervals with a smart alert that a worker has been placed without the proper qualifications, prompting them to update and/or to correct the situation. Of course, these fields can be modified, so that the worker cannot be assigned at all, or it can allow the administrator/the end-user to assign the worker with an appropriate explanation. Some or all of these exemplary functionalities are also applicable to the other categories.

J. Worker Compensation Audit Information Management

By using the payroll module, the end-user not only can speed up the payroll processing but also enable the actual job cost functions to show as exact labor costs. A detailed worker compensation reporting functionality allows the end user to provide the insurance auditor with a detailed report of the workers' exact activities, allowing the end user to capitalize on huge savings.

The end user is no longer at the mercy of the compensation carrier defaulting the workers to the highest code. The report gives the exact and calculated cost of the work type performed allowing for quick and precise audits with the documentation necessary to make the end user compliant with the most detailed audit request. The exemplary WMS enables the end user to also see a worker's job history. The worker's history will display any workers compensation claims, unemployment claims, job history, and payroll history. Some or all of these exemplary functionalities are also applicable to the other categories.

K. Color-Coding

The illustrative, non-limiting embodiment of the present invention has also utilized an intuitive and rapid way to identify groups or items using a color-coding system. With a quick glance, the exemplary system enables the end user to review worker document and job budget status with incredible speed. The color-code system has been designed to highlight documents or criteria outside a specific range. For example:

One Color Worker expired

Second Color Worker within 30 days of expiring

Third Color Worker info within 30 days of expiring but has been scheduled for renewal Forth Color Job approaching budget based on predefined criteria Fifth Color Job over budget One of ordinary skill in the art would understand that the invention is not limited to any specific colors, and various colors or other identifiers can be used within the scope of the invention. Moreover, one of ordinary skill in the art would understand that the invention is not limited to color-coding only these particular fields, color-coding a number of other fields is within the scope of the invention. One of ordinary skill in the art would understand that other color coding schemas of various user interface representations are possible. For example, the exemplary system may color code cells in a table, icons, links, symbols, field value and so on. One of ordinary skill in the art would also understand that the present invention is not limited to color coding workers, a number of other fields may be color coded. For example, jobs may be color coded depending on their status and/or calendar may be color coded based on scheduled hours on projects indicating the ratio of originally projected or estimated current costs versus the scheduled costs. The scheduled costs may include such items as payroll, tools (equipment being used), workers compensation and miscellaneous burdens. These items are explained in further detail below. Some or all of these exemplary functionalities are also applicable to the other categories.

III. An Exemplary Architectural Design of the Worker Management System

Next, an exemplary design of the WMS system is described. Each area described below contains a set of dynamic data fields to be populated for each function. It is understood that the number of data fields can be increased, decreased, or modified, depending on the specific requirements of a particular user or customer. Since each customer is stored in a separate storage area or in a separate portion of the storage area, the adding, subtracting or modifying of data fields for one customer does not affect the data fields for the other customers.

The application architecture may be separated into the following ten illustrative, non-limiting logical modules, shown in FIG. 1: a) worker management, b) document management, c) job management, d) customer management, e) system administration, f) accounting management, g) print-to-go, h) information exchange, i) vendors, and j) miscellaneous. WMS is an integrated system with functionality overlapping across these ten logical parts or modules. The entire application may be password protected and the unauthorized users may automatically be redirected to a login screen. The user can easily navigate between these modules and their sub-modules by selecting various icons, tabs, and other user interface representations. A detailed description of these logical parts is provided herein below.

A. Worker Management

The exemplary Worker Management module provides a simple, intuitive, all-inclusive form containing user interface representations such as tabs, icons, hyperlinks and so on for access to sub-modules and other modules and their sub-modules. The screens have been designed for ease of use to allow the customer to proceed through the fields of the WMS system tracking and monitoring workers. The exemplary fields include many ranges to sort the worker's essential requirements.

The Worker Management modules provides the user with the ability to monitor documents related to workers and their expiration dates, the ability to quickly display these documents, the ability to quickly access a document's status using the color-coded system, the ability to activate and deactivate documents in reference to a specific worker, the ability to easily upload documents by using user interface representation such as a browse button, the ability to easily scan documents via a scan button, the ability to easily manipulate documents, the ability to track the skills of the worker and add new skills on the fly without having to predefine any skills, e.g., via pop up screens.

All of these exemplary items such as the workers and the related documents are color-coded and are monitored throughout the WMS system to show the status of each worker in relation to a number of principles. For example, the items may be monitored in relation to a predefined company requirements and requirements directly associated to a predefined work type. These requirements may be pre-entered into the system by the end-user.

The work type may be dynamically generated as well as its requirements, giving the end user the unique ability to have a limitless range of work types. The end-user can designate a certain set of skill(s) and qualification(s) to any "work type" they want to create. This exemplary feature allows the end-user to apply skill or qualification requirements or combinations of skills and qualifications to a work type. Once this type is assigned to the worker, WMS monitors and tracks the worker throughout the system for their validation and status of that specific work type description. This is done through a color and symbol system, allowing the end user easy visible monitoring of their work force.

For example, a company policy may require a copy of the worker's driver's license to be kept on file. The end user can simply select "add a new document type" and call it "driver's license", and the requirement is set. It makes no difference if the jobs are Federal, State or local. This criteria is easily defined or redefined by the end user for any work type and the skills of the work type as they pertain to the worker and then, as they pertain to the job. This allows the user to match a qualified and skilled worker to the job requirement for example by using work type or document type as explained in detail below. In addition, this information allows the end user to monitor these industry representations for expiration and renewal. These industry representations are archived so that the user always has these industry representations for record purposes.

A more detailed discussion of the various forms with the Worker Management module will now be described. In particular, this exemplary Worker Management module comprises of the following sub-modules shown in FIG. 3: 1) add a new worker, 2) worker list, and 3) worker search. The user may easily select any one of these sub-modules by, for example, selecting Worker Management and then selecting a tab corresponding to the desired sub-module. By using tabs the screen does not have to reload, and it keeps the screen simple and easy to navigate and view.

Figure 4:
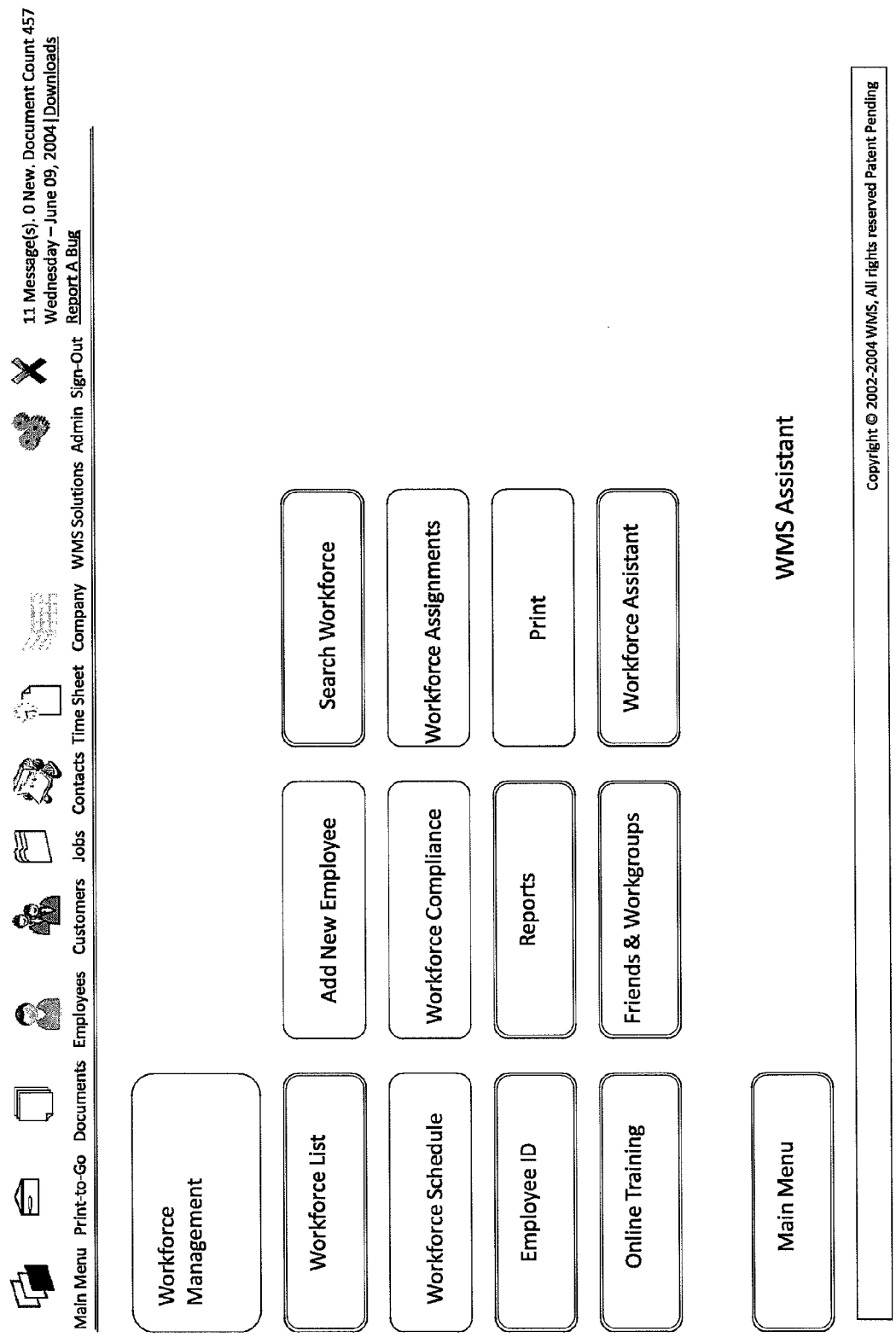
FIG. 4 is a GUI of the worker management module in accordance with this embodiment of the present invention.

The menu for the worker management module may provide the following options as illustrated in FIG. 4. In FIG. 4, the bar on top of the screen provides the user access to the main modules explained above. Mainly, this menu screen shown in FIG. 4 provides the user access to three sub-modules: the user may access the new worker sub-module by accessing "add new employee," the worker list sub-module by selecting "workforce list," and the worker search sub-module is accessed by selecting "search workforce." In addition, the menu for the worker management module provides the user with access to "workforce schedule," which allows the user to schedule workers, "workforce compliance," which allows the user to verify that workers have the required documents, "workforce assignments" also allows scheduling. These features are explained in further detail below.

1) Add a New Worker

Figure 5:
FIG. 5 is a GUI of the add a new worker sub-module in accordance with this embodiment of the present invention.

The end user can add a new worker without navigating through numerous screens and having to wait for the screen to reload upon each selection, as explained above. This exemplary sub-module captures the worker information so the user is not delayed with numerous forms and continuous reloading and no additional time is lost on data entry. An illustrative user interface for this sub-module is shown in FIG. 5. The user is simply presented with a display worker entry form, as shown in the flow chart of FIG. 6. Then, the user simply enters the needed fields for the worker information.

For example, as illustrated in FIG. 5, the bar on top of the screen provides the user access to the main modules explained above. The next bar on top of the screen provides the user access with access to the main menu for this main module by selecting "worker management" and with access to the sub-modules "add new employee," "workforce list," and "search workforce." In addition, the user is provided with access to "on-site employees" to view the workers assigned to various jobs, this is explained in further detail below.

As illustrated in FIG. 5, to add a new worker, the user may enter some or all of the following fields: employee Number (this can be any type of number to synchronize with other accounting packages, etc.), First Name, Middle Name, Last Name, Address, Phone Number, Mobile Number, City, State, Zip code, Other Contact (this can be a memo field), Worker Status (e.g., US Citizen, Resident Alien, Work Permit, Other), Available (this can be a Yes or No), Employment Status (Active, Terminated, Inactive and any other dynamic statuses created by the user), Social Security Number (this field may be formatted to only accept correct entry), Date of Birth, Employment Title, Birth Place, Primary Language, Other Secondary Languages, Wage, Fringe, Photo and etc. In addition, the user can upload documents for that worker by simply clicking one of the upload icons, shown in FIG. 5. The uploading of documents is described in greater details below.

Next, the user selects submit via navigation action and the data is stored in the database. In addition, as illustrated in FIG. 5, options such as reset, cancel, and apply changes (when the worker information is being edited) are provided.

When the social security number or the employee number matches a worker already in the database, an error message is displayed. The user, however, may force the entry of the information into the database by selecting to save the data anyways. Once a worker is saved in the database, the list of the current or the entire workforce is displayed. The user may simply click the corresponding icon to add another new worker.

Figure 6:
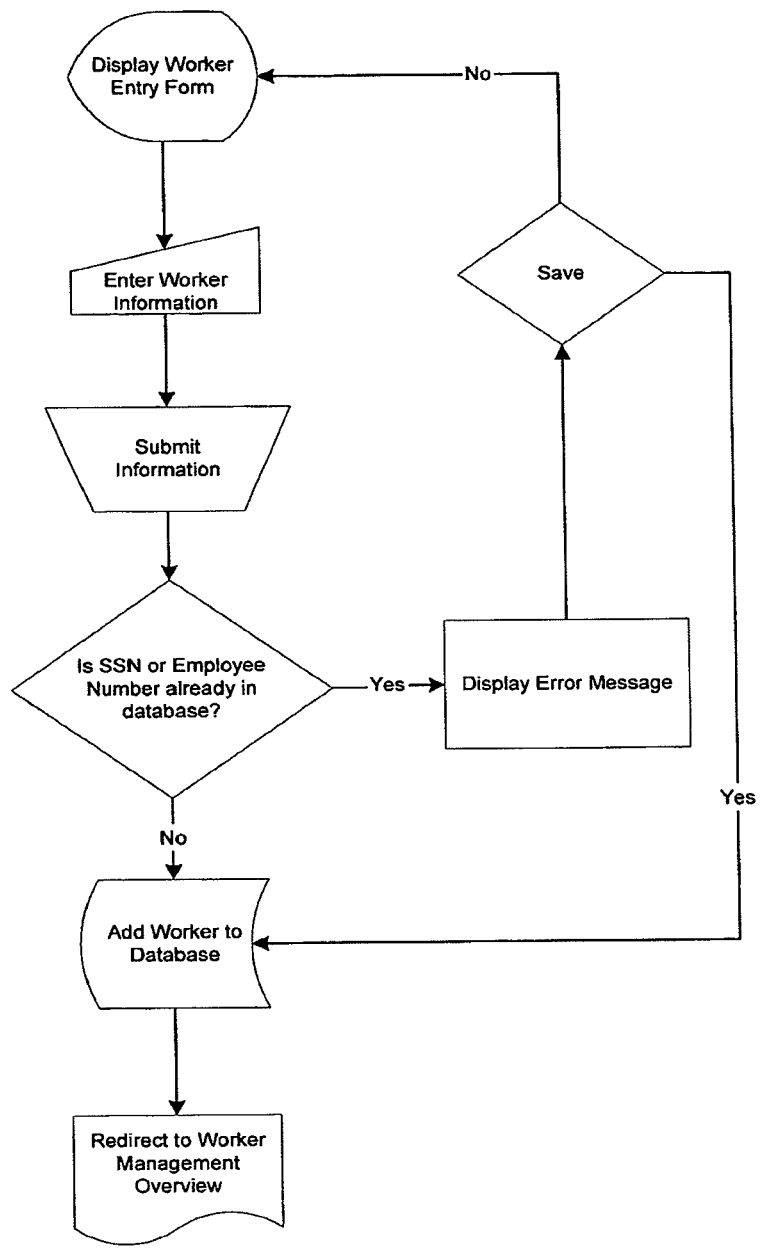
FIG. 6 is a flow chart diagram of adding a new worker to the worker management system's database in accordance with this embodiment of the present invention.

FIG. 6 illustrates the flow for adding a worker. In particular a user selects to add a worker and worker entry form is displayed. The user then enters worker information and submits the information. The system then checks the existing social security numbers or employee numbers and compares them to the social security number or the employee number presently entered. When the entered social security or worker number does not match any of the social security numbers or the worker numbers stored in the database, then the new worker information is saved. If, however, the system finds the social security or employee number in the database that matches the entered social security or employee number, then an error message is displayed, and the user is asked whether he or she wants to save the entered information. If the user may still want to save the information, the information will be stored in the database. If the user does not want to save the information, then the user starts over. The user is then redirected to the entry form and the whole process of adding information for the worker starts over. The information previously entered by the user will, however, be displayed on the entry form.

One of ordinary skill in the art would understand that the invention is not limited to any or all of these fields, and a number of other fields may be provided within the scope of the invention. These fields are provided by way of an example only and are not intended to limit the scope of the invention in any way. In addition, these fields may be restricted to only accept a certain type of data (e.g., only numerical values for the phone numbers or only set numbers of variables for the social security number, etc) as is well known by one of ordinary skill in the art.

2) Worker List

The exemplary Workers List sub-module allows the user to add a new worker, as described above, or to view and edit a worker's profile in one simple form. The Worker storage such as a database collects a series of information regarding a plurality of workers and enables the end user to monitor, track and evaluate a worker or a group of workers from anywhere in the system.

The view worker screen is available from anywhere in the exemplary embodiment of the system with pop up menus. This allows the end user the unique ability to enter data in another location in the WMS, click on the worker's name, have a pop-up display of the worker's information, edit the information and return directly to the screen they were working in with new updated information stored in the storage.

Figure 3:
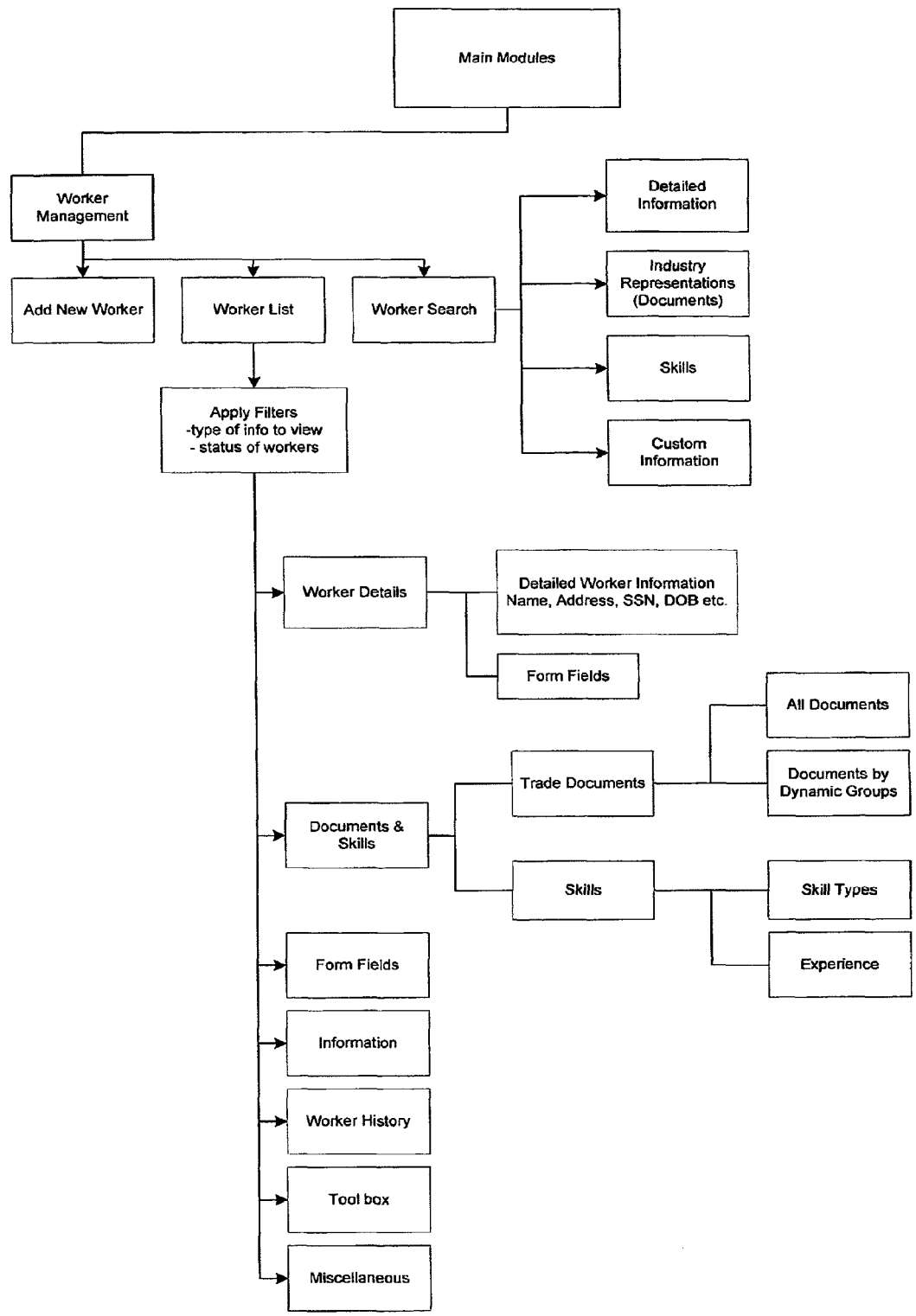
FIG. 3 is a block diagram of the sub-modules for a worker management module in accordance with this embodiment of the present invention.

Within the illustrative Worker List sub-module, the user has the option of filtering workers to view all workers or workers of any predefined or dynamic statuses such as active, terminated or inactive workers, as shown in FIG. 3. Moreover, the user can set up his or her screen so as to have certain information shown for each worker on the list, shown in FIG. 3. One of ordinary skill in the art would understand that numerous other variations are possible and these selections and how to view the selections are provided by way of an example only and is not intended to limit the scope of the invention. The selection may then be viewed and edited as required by the end-user.

For example, the user may want to view the workers on the list along with fields such as worker's address, city, state, birth place, date of birth, employee number, phone number, languages, worker status, and so on. The worker list can also be color coded on a certain field or on any number of certain fields. For example, hard hats or some other icon or symbol next to each worker name may be provided informing the user of the worker's status as it relates to the business requirements set in that instance of the application. FIG. 7, for example, shows a list of workers. Each worker on the worker list is color coded to show the status of the documents associated with the worker. As illustrate in FIG. 7, two filters are provided to show a list of all workers or only workers of the default worker statuses, such as current. In this exemplary case, the workers are provided with color coded icons. The icon of each worker changes color based on the type of documents present for the worker and the status of these documents. The user may add a new worker or view the detailed list for the workers. In addition, the user may search for the worker as illustrated in FIG. 7.

From the Worker List, which can be displayed in a number of ways (a few examples were provided above), the user can then drill down into information about an individual worker by simply clicking on that worker or entering that worker's number. The user may be provided with an ability to easily navigate through worker's data with a variety of tabs. The detailed individual worker information may be split up into a number of logical parts, as shown in FIG. 3. These parts may be displayed as tabs, allowing the user to click on the tab to access a particular logical part. For example, the Worker List may be split into the following logical parts: i) worker details, ii) skills and qualifications, iii) form fields iv) employment information, v) worker history, vi) tool box and vii) miscellaneous. Each one of these logical parts is explained in greater detail herein below.

Each of these tabs gives the user the information they need to review and evaluate the worker to determine their ability to work on any job or project without having to move around the system to check on these items, or to scroll though a long document page. The user saves time that may otherwise be lost on extra keystrokes and pages continually reloading as they navigate the system.

i) Worker Details

The worker detail logical part, which can be accessed by simply clicking on a corresponding tab, see FIG. 8A, provides access to general information such as worker name, social security number, date of birth, employee numbers, addresses, phone numbers and other contact information, which can be provided in a form of a memo field. In addition, information such as worker's wage, fringe rate, employee title and other general information can be provided. As illustrated in FIG. 8A, in addition to the employee details that can be added and edited, the user is provided with a worker picture as well as tools for uploading and/or changing the photo for the worker. Moreover, as illustrated in FIG. 8A by a button title "File History," a user may be provided access to the history of the file to view information related to the file creation, edits and so on.

ii) Skills and Qualifications

This exemplary logical part, which can be presented to the user in a form of a screen shown in FIG. 8B, allows the user to access, view and/or edit skills and qualifications of the worker. In the figures, "skills and qualifications" are represented as "skills and documents." The skills and qualifications logical part provides the user with the ability to add skills and qualifications of a particular worker. Not only can skills and qualifications for a particular worker be added by selecting from a set of pre-defined skills or from a set of pre-defined qualifications but also a new skill can be added to a predefined list of skills or a new qualification to a predefined list while entering skills or qualifications for a particular worker. The exemplary WMS provides the user the ability to capture skills and qualifications that are specific to their industry. The skills and qualifications can be added dynamically, on the fly, e.g., by using pop up screens.

The skills and qualifications logical part may be represented by two tabs as illustrated in FIG. 8B. One tab is for qualifications, illustrated in FIG. 8B as "trade documents", which allows the user to add, override or edit information related to industry representations such as industry required documents or to simply view the industry representation. FIG. 8B illustrates a view for a document type "Fit Test," which is shown in the middle of the screen and may be enlarged by simply clicking on the document. Next, the exemplary FIG. 8B also shows document information such as expiration date and information related to its size, source, creation, modification and so on. Next to the document type, FIG. 8B shows the status of the document to be "Up-To-Date." In addition, below the document and its information, the user may be provided with document history.

These qualifications or documents can be split into dynamic user groups (e.g., documents for asbestos work type, documents for general construction license, and so on). For example, as illustrated in FIG. 8S, the industry representations "VA Lead," "SSN," "I-94" (visa), "I-9," "Application," and "Verification of SS number" are all grouped under the "VA Asbestos" document type.

The user is able to determine the order of documents in these groups via simple pop up list that allows the user to drag and drop the document types into the desired location. When no groups are created, the documents are simply listed. When a group exists, it will follow the "All Documents" group. The created groups can be collapsed or expanded by simply clicking on two small arrows in the group heading, for example. In addition, the user can edit the actual document image already uploaded into a worker file. They can even choose to replace a certain industry representation with a new one. The user can also upload multiple pages for the document.

The skills tab may list the existing skills the worker has as well as the level of that skill. Similarly to qualifications, the skills may be broken into groups. The list of the skills appears first followed by user defined groups of skills. For example, FIG. 8C illustrates skills grouped in various categories. FIG. 8C illustrates skills being grouped under the category "all skills," "company skills," which may be skills relates to the customer (the company that is using the exemplary WMS or the client of the company). That is, various customers may require additional qualifications or skills that are not required by the government or the work type. The exemplary WMS provides the user with an ability to track these additional documents only required by a particular customer.

In addition, in FIG. 8C some skills may be placed under category "Trade" and others under the category "VA Asbestos." These dynamically created categories may be overlapping where certain skills are listed under one or more categories. Moreover, FIG. 8C illustrates that for each skill (the exemplary skills in FIG. 8C are "demolition," "mold removal," and "security clearance,"), a level may be specified or left unspecified.

New skills or skill groups and qualification types may be added on the fly via user interface such as a pop up box. Conventional methods and procedures often require the user to setup skills in the application and define the skill prior to use. This process requires the user to interrupt their current data entry, and go to a setup screen, which requires thorough knowledge of the system and path of the software. Delays in setting up a field may cause a busy administrator to neglect the task of adding new skills, skill categories or qualification types, the process may take too long and they may not have the time for it.

However, this illustrative, non-limiting embodiment enables the user to dynamically enter a new skills and/or qualifications on the fly without having to close the current working screen. The user may take a simple navigation action to add a new skill or qualification for the worker or to add a new type of skill or qualification. For example, FIG. 8B illustrates that the user may add a qualification by clicking on "add new document" button to access a pop up screen. Also, FIG. 8B illustrates that by simply clicking "add new document type", anew qualification type is added. FIG. 8C illustrates that a new skill type may be added by a simple navigation action such as clicking a button. In addition various skill types may be linked to a worker by checking the skill types to be linked to the worker.

The new skill is added to the dynamic list of skills or a new industry required representation is uploaded into the list of qualifications. This enables the user to quickly and easily add a new skill without any delay. By being able to easily add skills the end user is able to track as much information about a worker as they wish, which enables the end user to search and associate the worker with jobs that they are skilled for. By utilizing Skills and Qualification fully the user is enabled to locate and track workers to perform specific work as the work is available or to work for a particular customer by meeting customer specific requirements, for a particular job by meeting job specific requirements and so on.

For example, if a user is adding skills and qualifications for a worker and the user discovers that the worker has a Class C license and can drive an 18 wheeler. The user could easily click add a skill, the window would appear, they would type Class C license, and close the window, dynamically, the list would now include "Class C license" as a skill. The user could then click a check box, for example, and add the skill to the worker's skills. Then the user could switch to a new job file (described later), enter a new job and find that a Class C license driver is needed to make a special delivery. The user could then, set the job up and additional skills and qualifications Class C license would appear. They could simply check the box for a Type C license and a list of the Class C license drivers would appear in the qualified to work box.

This exemplary feature has given the end user the unique ability to easily enter a skill without predefining it in a skill setup screen requiring links to a worker file and job file. This traditional set up delay in the conventional applications requires thorough knowledge of the system and several setup screens. In addition to adding a skill in the worker file, the skill could also be added in the job file, the company file, or the customer file (when the customer only wants workers with class C licenses where class C licenses may not necessarily be required for the job). This same list would then appear in the worker list.

In addition, to entering skills for workers, where a new skill may be dynamically created on the fly, this logical part allows for entry of worker's qualifications by linking industry representations such as various documents (e.g., the actual scanned in Class C license) to a particular worker (details with respect to industry representation management are described below). An industry representation such as a certificate or a license may be scanned or uploaded. The user may select to link this scanned representation to the worker or to unlink (deactivate) a particular industry representation from the worker. Additional fields may be provided such as an expiration date of the document, creation date, modification date, history of the industry representation and so on. These fields are provided by way of an example only and are not intended to limit the scope of the invention. One of ordinary skill in the art would understand that various other different fields are possible. Moreover, one of ordinary skill in the art would understand that certain fields may be predefined as mandatory and that only upon completion of all the mandatory fields can data be saved.

Worker documents, industry representation for workers, are predefined in the administrative module to control required documents but this can be edited and new types of documents can be added on the fly.

By selecting one of the documents types, the name of the document appears on the screen as illustrated in FIG. 8B. The system automatically stamps key tracking information such as the creation date and modification date, and the user enters information such as document history, an expiration date of the document if any, whether the document applies to a particular work type and so on. If the user enters a check mark for "No", the document is not required for this worker and it will not appear under the worker qualifications when viewing worker skills and qualifications. On the other hand, when the check box is left blank the document will appear in its status for document review and will also appear as an expired and/or incomplete document, until the information is completed for each worker. This is explained in greater detail below.

Moreover, the user may view or zoom in on the document by for example highlighting or clicking on the document of interest. In addition, browse and scan buttons may be provided to allow the user to browse the disk drive in order to load the document or scan the document directly to the relevant record. Once the document is loaded it is recorded to the document type. This allows for future use, since documents expire but may need to be referenced many years later.

iii) Form Fields

Figure 8D:
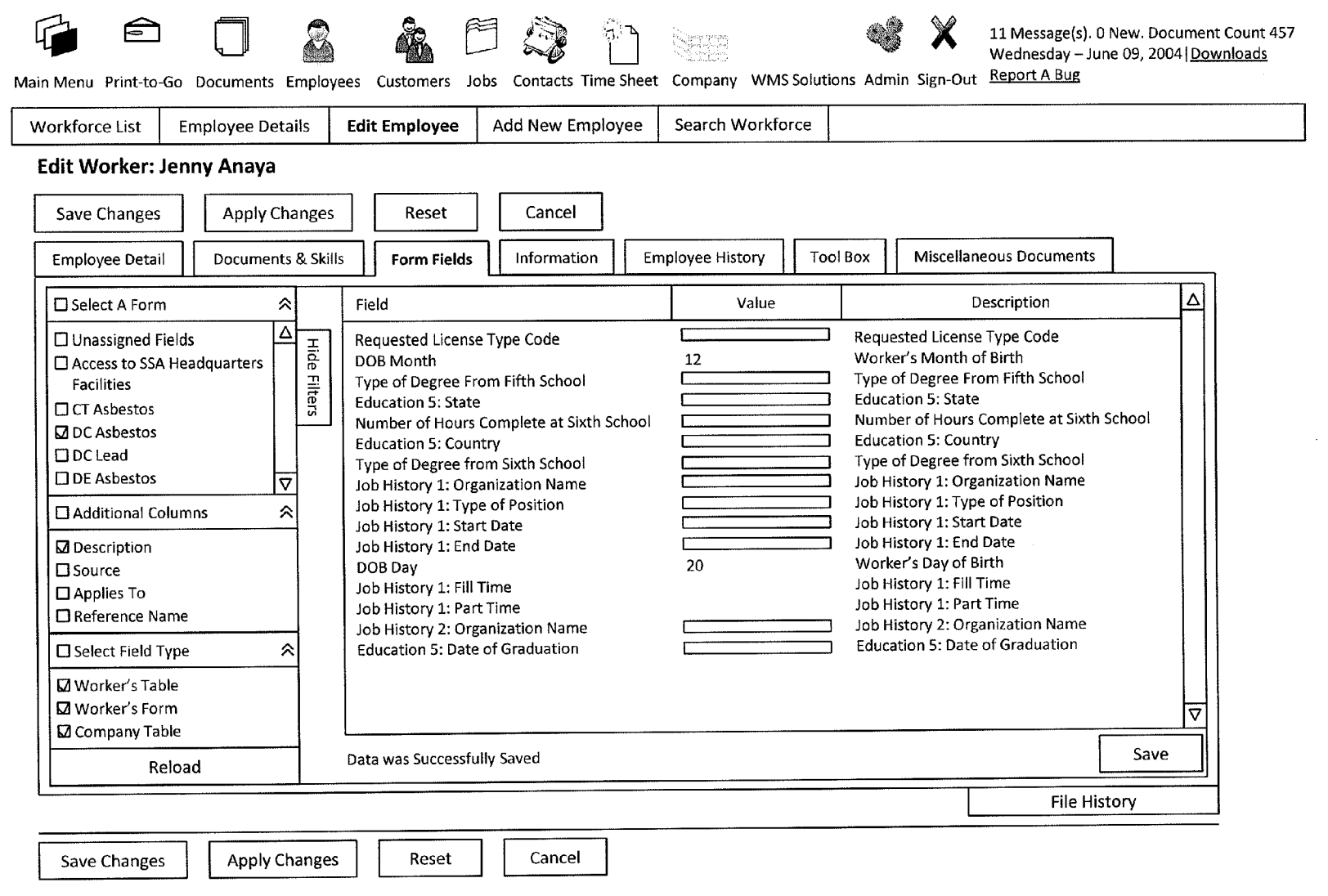

This exemplary logical part, which can also be accessed by simply clicking on a corresponding tab, see FIG. 8D, lists the forms that are in the customer's system and allows the forms to be filled out with the necessary information in the corresponding form fields as well as the information already captured in the details tab and other existing fields in the system.

The form fields screen has a list of forms to choose from on the left hand side of the screen, for example, as shown in FIG. 8D. A user simply checks the box next to the form, which needs to be completed. Further information is located below the form names that can also be displayed on the screen as illustrated in FIG. 8D. The user simply marks the check box next to description, source, applied to and/or reference name if they wish to view those additional columns of information, see e.g., FIG. 8D which illustrates that when the information selected under "additional column" is "description," then description for each field is displayed. The user also selects the types of fields they will need to complete including fields from the worker table, fields specifically for worker forms, and fields from the company table.

As illustrated in FIG. 8D, the user first checks the source of the field types that should be completed ("worker's tables," "worker's form," and/or "company's table"). Next, the center of the screen illustrated in FIG. 8D lists the field names followed by empty cells in which the user can type the field values. The user then can choose to save or cancel the forms by clicking on one of two buttons which appear at the bottom right hand corner of the screen illustrated in FIG. 8D. Moreover, information in the system that was previously entered under a different logical part, sub-module or module is provided as values to the fields. For example, FIG. 8D illustrated that the values for the fields DOB (date of birth) month are already present because they were previously entered in a different sub-module or module.

iv) Employment Information

This exemplary logical part, which can be accessed by the user by simply clicking on a tab provides a screen which shows employment related information such as worker status (US Citizen, Resident Alien, Work Permit, Other), availability of the worker (Yes or No), employment status (Active, Terminated, Inactive) and so on.

Figure 8E:
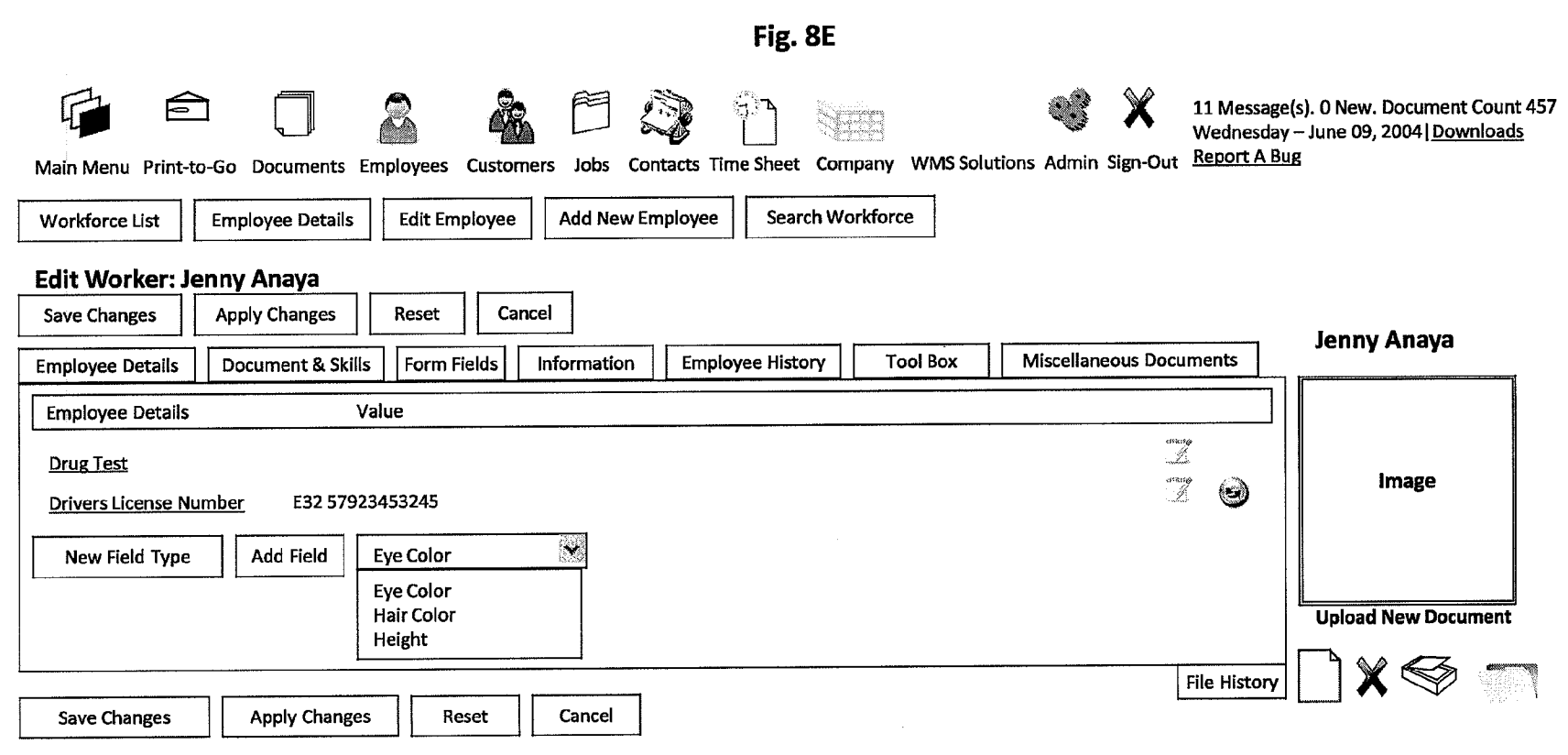

For example, in FIG. 8E, the employee information is "a drug test," "driving license" with the driving license number stored under value of the "driving license" type of information. As illustrated in FIG. 8E, additional fields such as eye color, hair color, height and so on may be added. Also, the fields may be broken by types (e.g., one type may be license information, another type maybe physical information, and so on). Moreover, FIG. 8E illustrates that the file history for the employee information may be view, (file history was explained in detail above).

v) Worker History

This exemplary logical part, which can be accessed by the user by simply clicking on a tab, provides a screen which shows information related to the worker's history such as general notes, worker compensation notes, schedule history, payroll history, unemployment notes, jobs worked on and so on, see FIG. 8F. These additional features are used to track wage history (e.g., when and by how much a worker's wage rate has been changed in their file), an unemployment history, worker's compensation history, a job scheduled history, and a payroll history.

This exemplary feature allows for tracking the scheduled time versus payroll time. As a result, the end user can view schedule information, associated costs as well as payroll information for that job, giving the end user the ability to compare and analyze schedule information versus payroll information. This unique ability to compare scheduled dates to actual payroll dates enables the end user to make better management decisions. For example, the user can compare the workers scheduled hours to the actual payroll hours paid to determine if the worker is working his scheduled shifts. This could help the user determine if the worker is reliable.

In the conventional systems, the end user uses budgeting software to determine job cost relationships and actual cost spent. The time spent breaking down payroll cost between types of work each pay period, requires countless hours of double entry work. Even the best accounting systems that post the payroll cost directly to the job and the work type on the job miss the relationship of what was actually scheduled. For example, when the user schedules the job with 10 men, the number of men he estimated could do the job, and only 8 men show up all week, that information is then displayed in the payroll numbers. The user then has the ability to see the schedule information and payroll information quickly and easily. This feature enables the user to better estimate the cost of the next job that is similar in scope.

The reverse situation could be tracked by these unique tools as well. If the end user scheduled 5 men to a job, and the job took 2 weeks to complete instead of the 1 week that was estimated, the user knows the cost overrun was due to underestimating the amount of work the job would take and the number of workers that need to be assigned to a similar job will be increased the next time around. By relational linking between scheduling and payroll, a variety of cost information can be presented to the user for better project management. The information is easy to read and can be drilled down for more detail.

Also, this logical part shows the information related to the worker's job performance and contributions. Managers are often forced to keep large amounts of data in their head as that it is often easier than buying and learning new management software applications. Additionally, much of the worker management software that exists today is difficult to use and time consuming to set up. This wasted time could otherwise be spent managing the user's core business.

This exemplary feature utilizes custom fields to allow the user to dynamically enter key words for tracking information about a worker. These key words allow the user to quickly and easily add and review notes regarding the worker. A user can view how the worker has been rated by his supervisors. This gives the end user more information to help them decide whether or not they would want to use that worker on their next available job and with which supervisor, the worker is most compatible.

vi) Tool Box

This exemplary logical part, which can be accessed by the user by simply clicking on a corresponding tab, provides the user with the ability to create binders or to group various documents into one group. For instance, certain documents are required for a particular customer, or a job, the user can simply create a binder with the needed documents. FIG. 8G illustrates creating a binder having a variety of information.

FIG. 8G illustrates an exemplary user interface for creating and managing binders of information. In FIG. 8G, a binder template ("documents") is selected on the left hand of the screen. The user may view various binders templates in the system, by for example clicking on the "select a binder" button. Next, FIG. 8G illustrates that the user selects the type of documents, e.g. "Equipment," "Conventional Loan." Next, the user selects various documents classes under the selected types, a C is displayed for current documents and an H is displayed for archived or historic documents, page numbers are also displayed as illustrated in FIG. 8G. The user may also specify the type of information to be included. As illustrated in FIG. 8G, the user specifies document properties to include such as created, updated information, file size summary and custom fields. Next, FIG. 8G illustrates that the user may select page summary and what information is to appear on page summary (titles as download links, file name, file size).

In FIG. 8G, information for the binder is provided including total number of documents, pages and fields. Total number of documents is a count of the number of document classes included in the binder, total pages is a count of the total number of pages included in the binder and total fields is the total number of custom fields included in the binder by summing the number of fields included in each document. For example, if the binder has only two documents where the first document has three fields (creation date, modification date and expiration date) and the second document has only two fields (creation and expiration date), the total field count for this binder would be five. Thereby, once the binder is created or whenever the user accesses the binder, the user can simply click on the binder and print, dispatch (email, fax, etc.) or review only the documents in this binder. In addition, the user may review the dispatch and print history of the binder. FIG. 8G illustrates an icon for review of the dispatch and/or print information appearing on the right hand side next to the options to print, fax or email.

vii) Miscellaneous Documents

This exemplary logical part, which can be accessed by the user by simply clicking on a corresponding tab, provides a screen which shows any other information the end user may deem important such as birth place, language skills and/or documents that do not fit the mold of worker documents, which can be any type of file, not just a jpg or gif, but a .doc, .xls or any other file type and can also have multiple image pages. The pages are listed next to the image of the first page. The user can number the pages or choose to rename them. In addition the user can drag and drop the pages into a different order if so desired. The files can be of any type from Microsoft Office files to pdfs, gifs, tiffs and CAD drawings. The drag and drop technology for the order of the document types and the order of the pages can be designed in HTML.

Figure 8H:
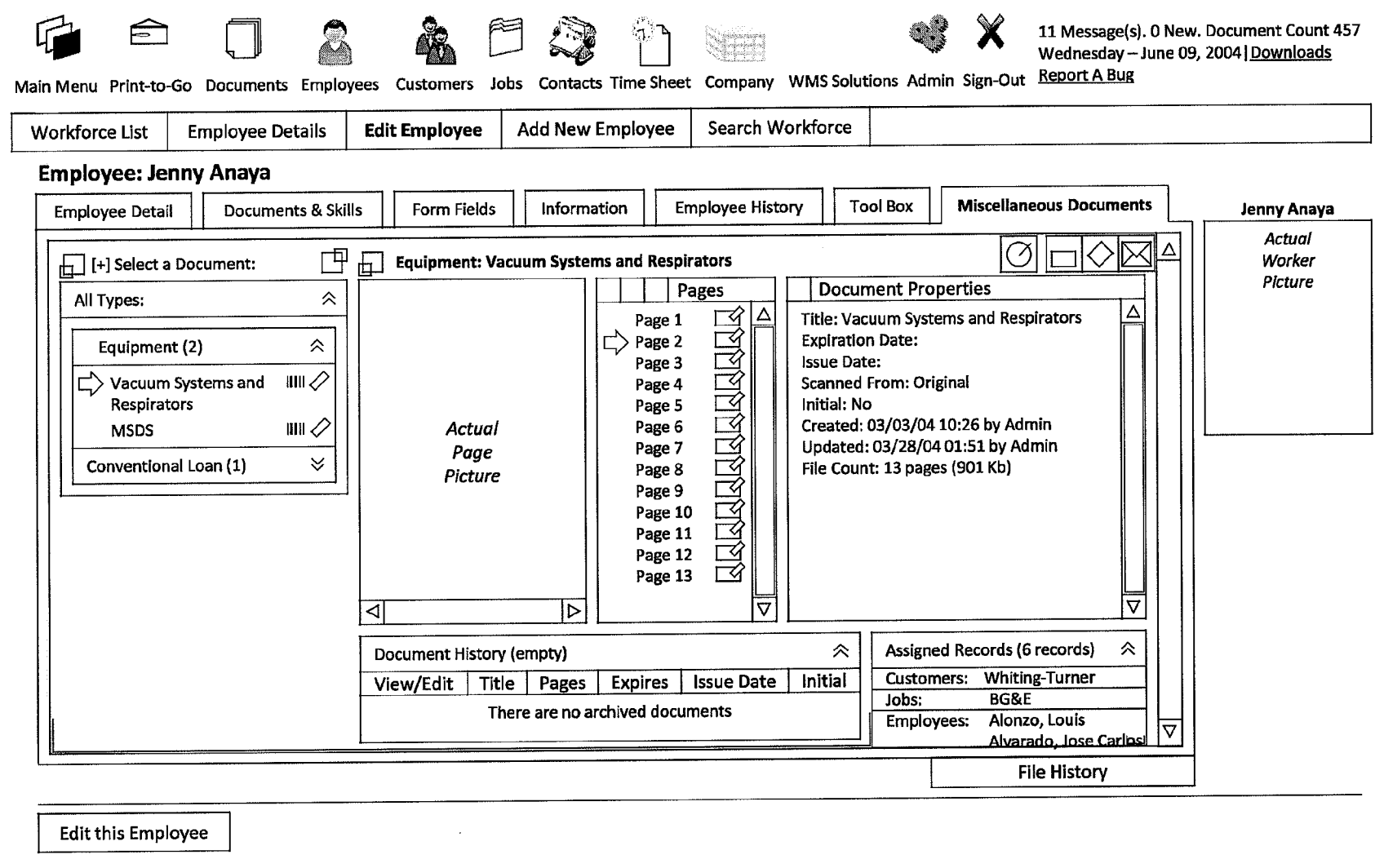

In addition, each image or file can be downloaded, printed, emailed or faxed from this screen. The user has the option to dispatch just one page or any selection of pages and document metadata such as the creation and modification dates and users or any custom fields associated with the document. In addition, when a single document is chosen from the list of documents on the page, the entire page does not refresh. Only the new thumbnails of the documents are loaded along with their associated metadata. The user can switch between document types and classes, or subtypes without having to reload their page. This additional document functionality may appear as a tab in the job, vendor, customer, company and user account modules as well, An exemplary miscellaneous or custom document is illustrated in FIG. 8H. The miscellaneous document appears on the left hand side of the screen under various categories such as "equipment" and "conventional loan". Once the user selects a document, initially the first page of the document is displayed on the screen, all other pages may be selected by a simple user navigation action, see FIG. 8H. Also, FIG. 8H illustrates that the user may view document history including archived versions of the document. In addition the user may view document properties including document title, expiration date, issue date, scanned from, initial or not, creation, update, file count and so. Moreover, the document may be linked with various information in the system. For example, as illustrated in FIG. 8H, the document may be linked with a customer "Whiting-Turner" and job "BG&E" and to the employees "Alonzo, Alvado, Anaya" and so on. These could be the employees, the customer and projects for which the equipment is used.

To sum up, the Worker storage such as a database collects a series of information regarding a plurality of workers and enables the end user to monitor, track and evaluate a worker or a group of workers from anywhere in the system. The view worker screen is available from anywhere in the exemplary embodiment of the system with pop up menus. This allows the end user the unique ability to enter data in another location in the system, click on the worker's name, have a pop-up display of the worker's information, edit the information and return directly to the screen they were working in with new updated information stored in the storage.

The exemplary Workers List sub-module allows the user to track any possible information about the worker without any duplicative data entry. In addition, the information is relationally linked by the system allowing for a number of analyses. For example, a worker can be scheduled to a job closer to his home by using the detailed information for the worker or with a supervisor that speaks his native language. Similarly, the system can prevent the scheduling of unqualified workers (the workers which lack industry required representations for this particular job type) and thereby avoid hefty governmental fines. Moreover, workers with advanced skills and higher wages can be scheduled to harder and better paid jobs by using worker qualifications and skills and accounting information, thereby saving costs. Worker's reliability, compatibility with various supervisors and even worker's clumsiness can be analyzed (by reviewing worker compensation information and causes and dates of the injuries).

Figure 9:
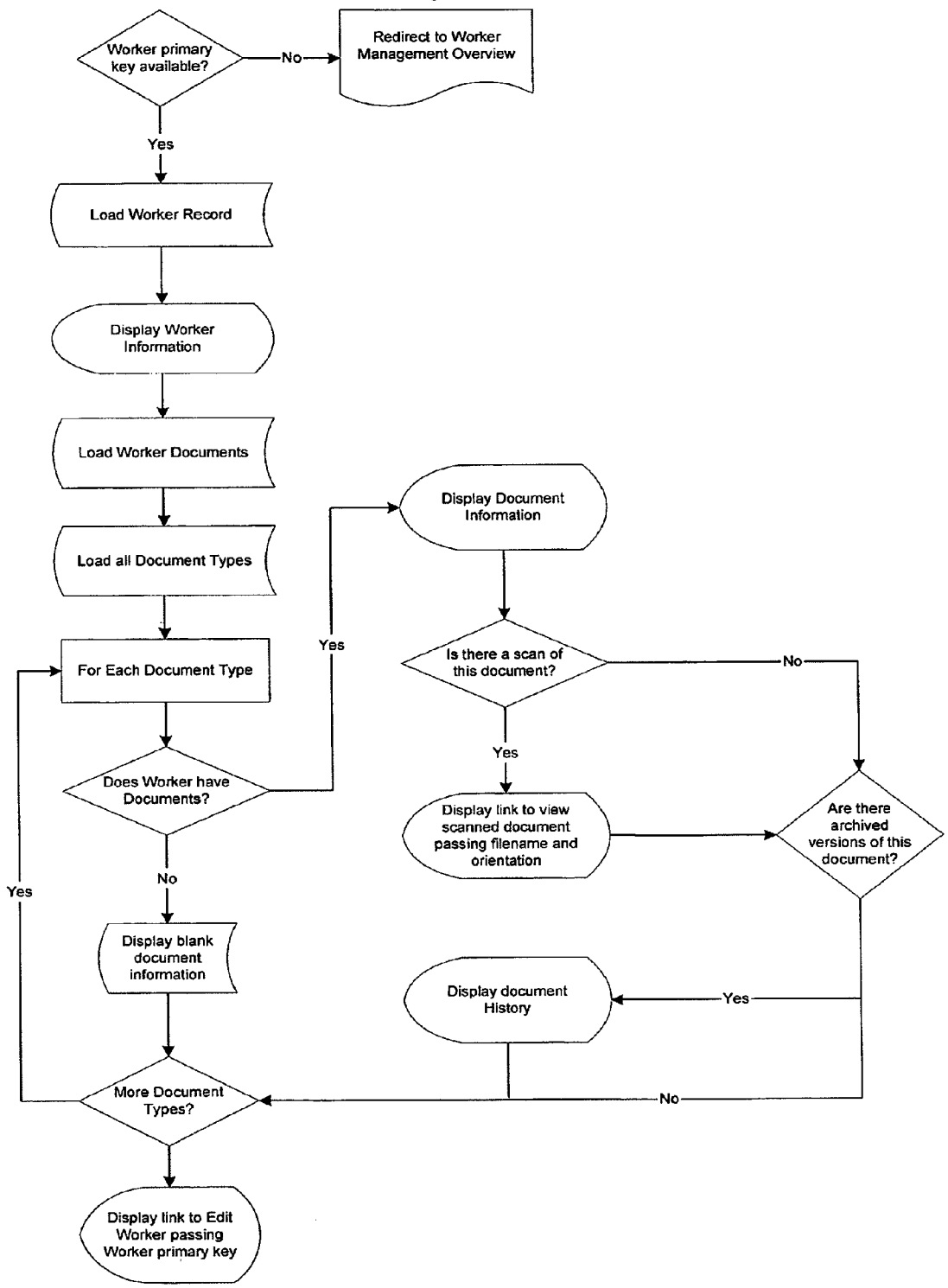
FIG. 9 is a flow chart diagram of viewing worker information in accordance with this embodiment of the present invention.

To sum up, the worker management system provides the user with an easy way to view the worker information and corresponding documents. The user can select a worker by simply clicking on the worker from the list or by entering worker number. In response as shown in FIG. 9, the system looks for that worker's information in the system's database, if worker record is not found, the user is redirected to the worker's list as illustrated in FIG. 9. When the worker's record is found, it is loaded into the system and is displayed for the user in easy to navigate tabs.

In addition worker documents are loaded for user review. If worker does not have a certain type of document, this document is displayed as a blank document. Moreover, for the existing documents, its history is displayed. That is, the system loads all document types and for each document type checks all workers within the list, see FIG. 9. In particular, if the worker is missing the document, it is displayed blank. Otherwise, document information is displayed and the system checks if there is a scan of the document or other file type in the system. If the document is found, then the user is provided with a link to view the document. Ndxt, the system checks for archived version, and provides the user with links to archived document that is to the file history as illustrated in FIG. 9. This process is repeated for each document type, as illustrated in FIG. 9.

Figure 10:
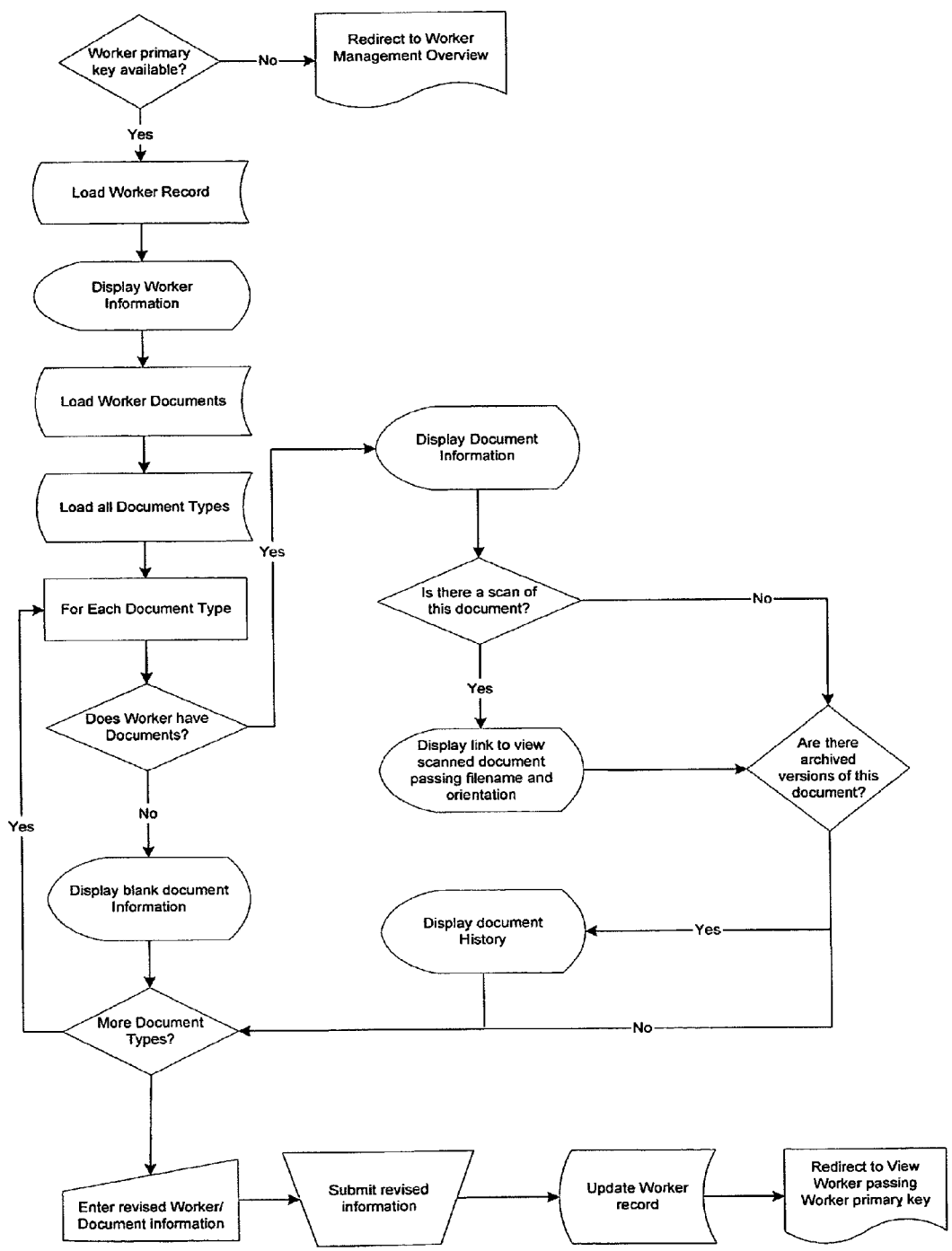
FIG. 10 is a flow chart diagram of editing worker information in accordance with this embodiment of the present invention.

Once the process finishes, the user is provided with a link to edit the worker information. For example, the user may edit the worker information and documents by simply clicking the edit button. Once, the edit button is clicked, the user simply modifies the desired information including worker documents, and clicks save. The modified information is uploaded into the system and saved for future reference, see FIG. 10.

3) Worker Searches

The exemplary Worker Searches sub-module is a search engine designed to search for a single piece of data within a very complex and large amount of data. The WMS allows the user to enter any possible scenario to locate a specific type of worker based on any criteria in the system and returns a list of workers who meet the criteria. Without leaving the screen, the user can adjust the parameters and start another search or save the search and then create a new search. The user has the option to search by various worker details, documents, and skills. One of ordinary skill in the art would understand that the additional search criteria can be added and organized on one form or separate tabs as currently shown.

The search engine searches through workers with statuses deemed as active by default. A filter in a drop down list allows the user to sort by All Workers, Workers that worked in the last 30 days, 6 months, one year and so on. This allows the end user to review very specific criteria for hard to staff jobs with workers that are no longer with the company. The search always reevaluates the criteria and applies the search as a new search based on the criteria.

The results appear, giving the end user the name in the unique color code system, so the user can immediately learn the worker's status. The end user can take a navigation action such as rolling their mouse pointer over the symbol or clicking on the symbol to see what issues exist with the workers skills and qualifications or the user can click on the worker and a pop up window will display the worker's file. The user can then close the pop up window and return directly to the search results without losing their place.

The user can click on a flag box next to the workers they want to schedule. There is an add button that will take the workers who have been marked with a check in the flag box and directly assign them to a selected job. When hitting the add button the Job Management window pops up to select a customer and a job. Once the job is selected, that list of workers is shown in the assignment screen for the job. The color coded system shows the workers status in relation to the job. The days of the week are selected, the work type is selected and the workers are posted to the job for those dates. In the event the workers are not qualified, a pop up window appears and the user must list why he is staffing the unqualified workers. The workers are posted to the job and an email is sent to the predefined management personal that wants to know when this occurs.

One of ordinary skill in the art would understand that in addition to the above defined format using predefined variables, a more customized search format could also be implemented and employed, using terms and connectors or natural language criteria for the search. The skill to build and deploy a custom search engine is within the capabilities of one of ordinary skill in the art.

The end user can set up search criteria within the quick search menu for any topic within the worker file. This search can be saved as a predefined search report for later use. In this illustrative, non-limiting embodiment search criteria is split into four logical parts: i) detailed information, ii) industry representations (e.g., documents) iii) skills and iv) custom information, see FIG. 3. These four logical parts can be accessed by simply clicking a corresponding tab.

In the detailed information logical parts, e.g., FIG. 11A, criteria such as employee number (search for similar), first name (search for similar), last name (search for similar), work status (US Citizen, Resident Alien, Work Permit, Other), worker availability, temporary worker (Yes or No), Has a Car? (Yes or No), languages and other general information can be specified in order to perform the search for workers meeting the user specified criteria.

Figure 11C:
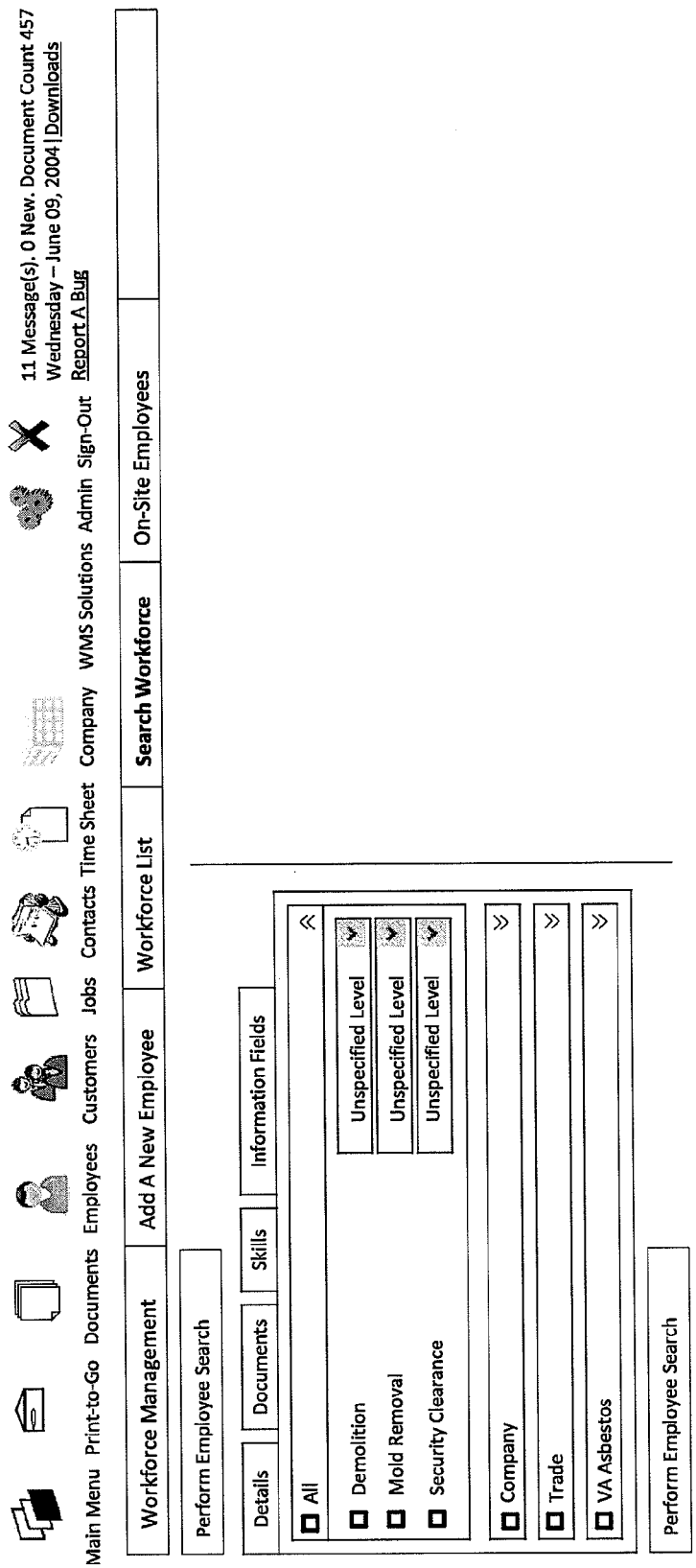

In the industry representations logical part, e.g., FIG. 11B, criteria for worker's qualifications can be specified. For example, document types, document status (up to date, expired, incomplete, pending or any combination of them) and so on can be specified. In the skills logical part, e.g., FIG. 11C, required or desired skills, skill level and so on can be specified. Custom information logical part, e.g., FIG. 11D, allows the user to specify as search criteria, user defined information (an example of which was explained previously) that the user may have created and associated to a worker or workers.

The results of the search are then returned to the user in a form of a table to the right of the screen, for example as illustrated in FIG. 12, with worker names and color coded icons of a person (some other symbol may be used) determining the status of the worker as it applies to the business logic set in the system. The user then can drill into detailed information of the worker (all of the information described under worker list sub-module) by simply clicking the worker's name. In addition a pull down menu to sort results by All Workers, Workers From Last Month, 3 Months, 6 Months, 9 Months, One Year or other predefined filter can be provided.

The user can save any custom search they create to a predefined search report list for future use so the same search does not have to be recreated. The search report is then saved to a predefined search list. The predefined search feature allows the user to choose from a list of previously created predefined search reports, allowing the user to quickly review the name, search criteria, date the report was created and by whom, date it was last modified, search criteria of the report and so on. This information allows the user to easily evaluate the search criteria prior to use. It also tells the user who was the last person to modify the report.

Figure 13:
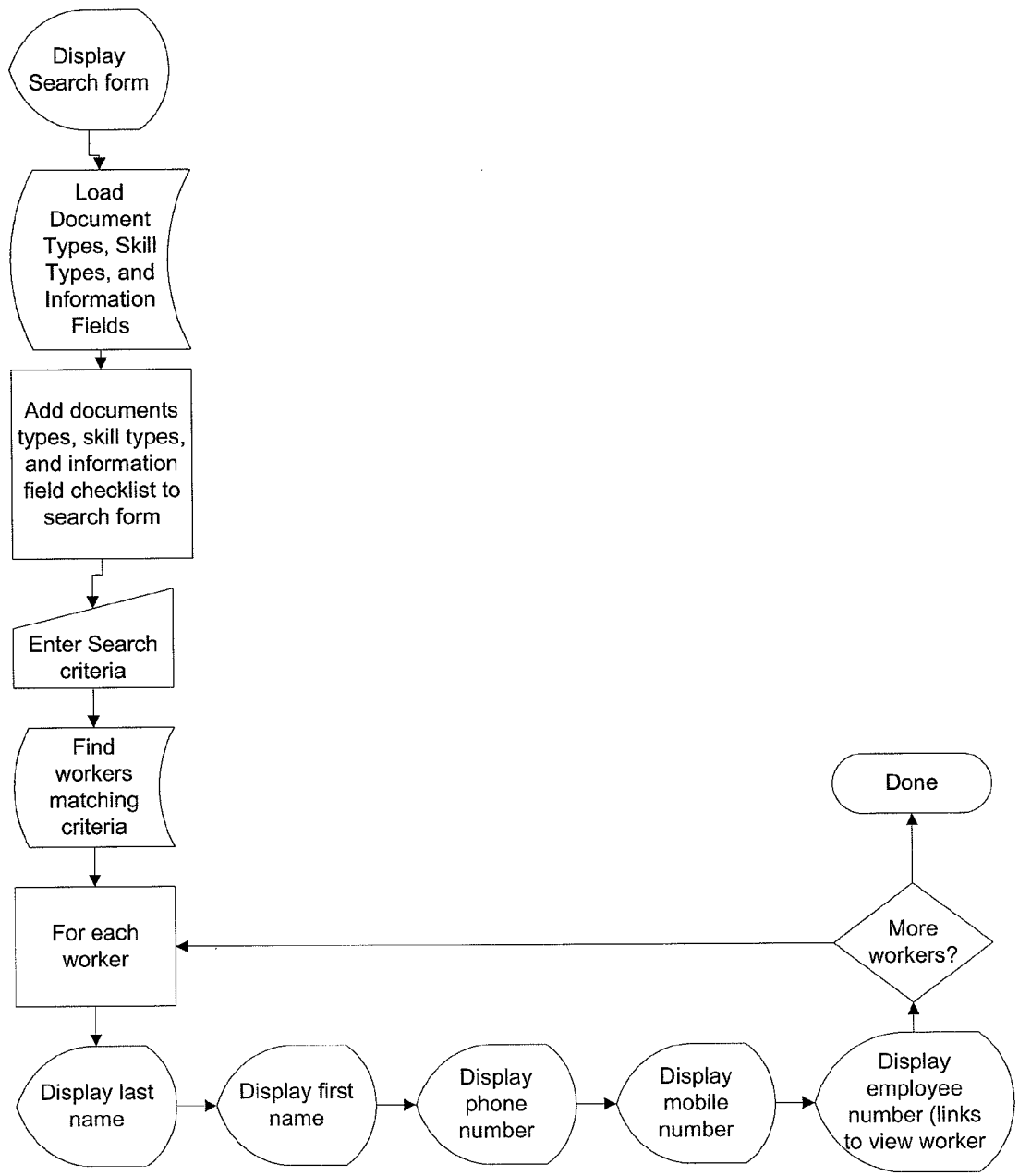
FIG. 13 is flow chart diagram of searching for workers using user inputted criteria in accordance with this embodiment of the present invention.

In sum, when the user selects to search for particular types of workers, a search form is displayed and document types and other criteria which can be specified by the user is loaded as illustrated in FIG. 13. As illustrated in FIG. 13, the user enters search criteria and the system searches the database to find a match between the entered criteria and workers in the database. For each worker found information such as name, phone number and employee number is displayed. In addition, a link is provided so that by clicking on the worker the user can view detailed information organized by tabs as explained above.

B. Document Management

Figure 14:
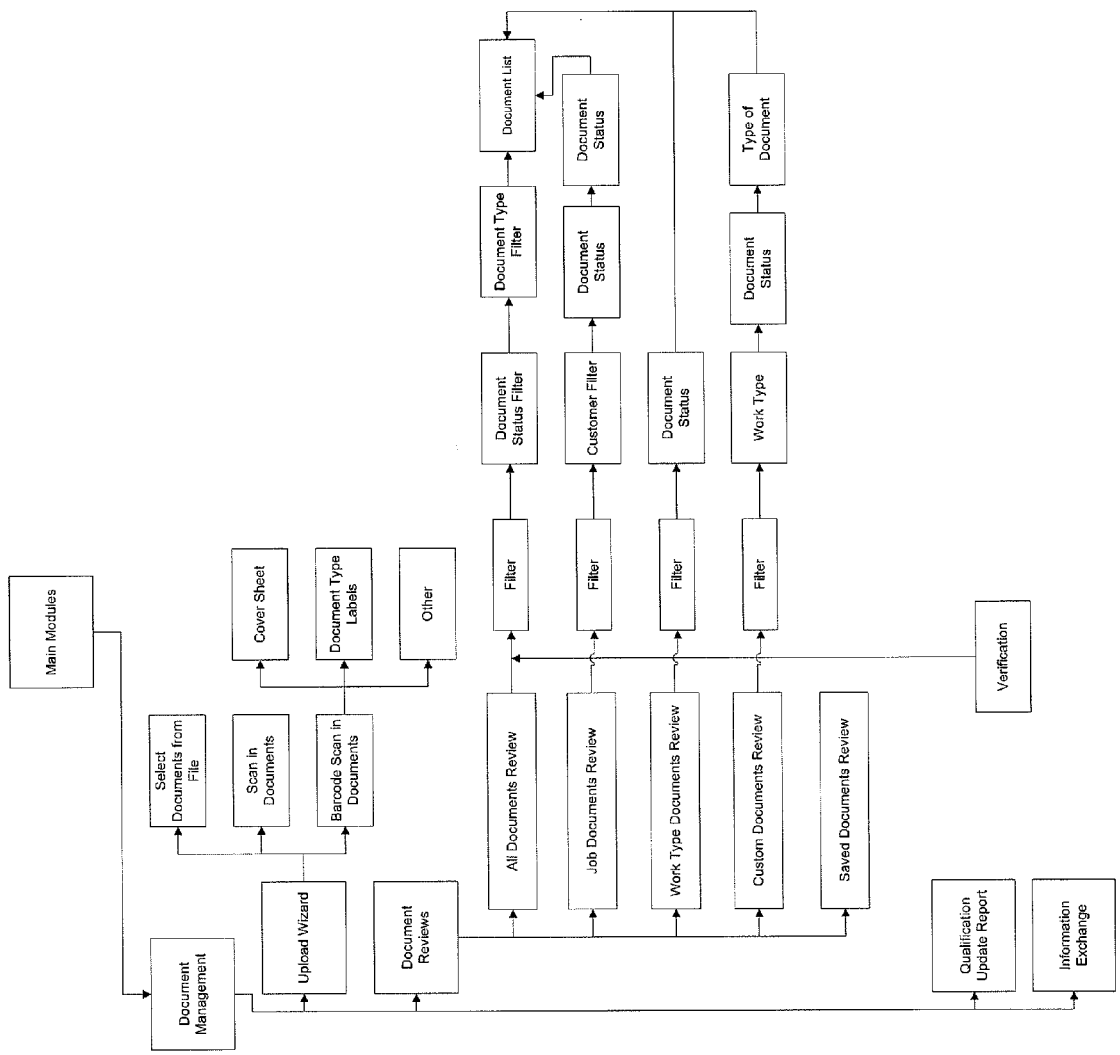
FIG. 14 is a block diagram of the sub-modules for a document management module in accordance with this embodiment of the present invention.

The document management portion of this exemplary, non-limiting embodiment of the WMS system allows the user to effectively manage the uploading and tracking of key documents as they relate to customers, jobs, workers, vendors, contacts, user accounts, company information, and other user-defined fields of importance. In this exemplary embodiment, the document management module is split into four sub-modules, as illustrated in FIG. 14: 1) upload wizard, 2) document review, 3) qualification update report and 4) information exchange. Information Exchange is an easy solution for transmitting information between users. In this exemplary embodiment, it is also available from the main module and is described in greater detail herein below in §H. The other sub-modules are described in greater detail herein below.

1) Upload Wizard

Documents can be uploaded throughout the system via browse and scan buttons available on most screens, via barcode scan technology, or via a simple intuitive web based wizard (upload system) or by forwarding documents to the 24 hours Document Center described above. By digitizing documents the user is able to have any documents available for each customer at anytime. Forms can be loaded with digital signatures for disbursement with invoices or other correspondence.

The Upload Wizard leads users through the entire process of single or multiple documents scanning and uploading with the use of dialog boxes and prompts. The wizard is available within the web application and/or as a stand alone application that is installed on the user's computer/server. This gives the user the ability to load documents on their own computer for faster upload or have the convenience and accessibility to load them from any web browser. The user can scan directly to a worker's file and alter that image before it is saved to the file.

In the conventional scanning systems, many people cringe at the thought of scanning file cabinets full of documents. They cringe because they believe it is difficult and typically requires a computer savvy person to scan and upload the documents. It is an aspect of the upload wizard to resolve this fear. The scanning is made easy to use, intuitive, fast and affordable. The documents can be scanned from a local scanner using a web based application. The scan application is currently available from within WMS's web based document management solution. This scanning tool utilizes a library that supports TWAIN, ISIS and WIA scanners. The scanning tool is downloaded to the client using Active X technology that allows the application to run on the client computer. From any record within the system where a document can be uploaded, a scan icon is present. Clicking on the scan icon allows the user to scan documents from the web directly to that location in the client database. With this exemplary non-limiting embodiment of the uploading wizard as explained below with reference to FIG. 15A, uploading documents is quick and easy. Moreover, for uploading a large amount of documents, bar code scanning as explained below with reference to FIG. 15B may be implemented.

Uploading one or more Documents

Figure 16A:
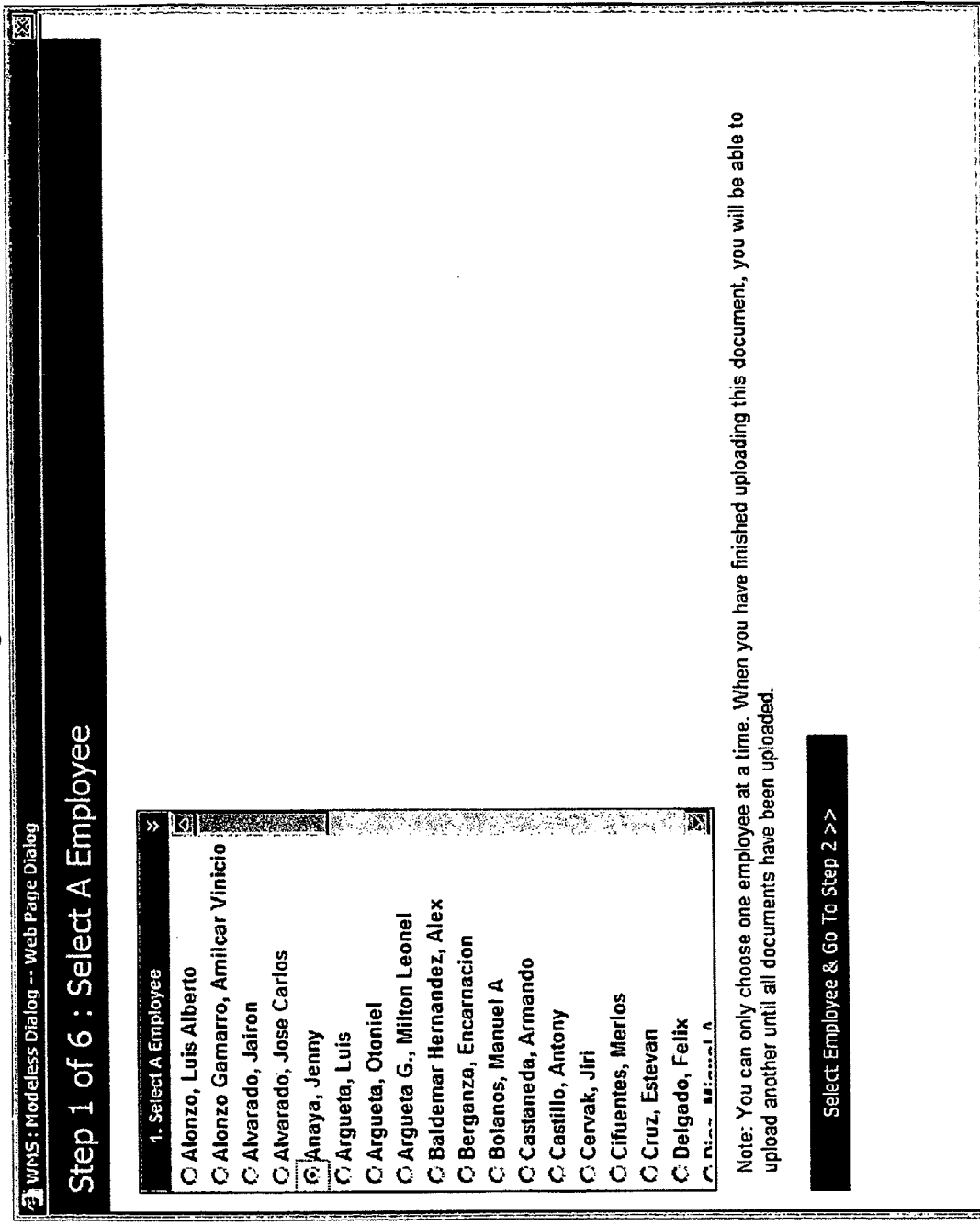

For example, uploading can be performed in the following easy steps, as shown in FIG. 15A. The user selects upload wizard sub-module at step 400. At step 401, the user selects a worker, a customer, a job, a company or other item with which this document should initially be identified with. For example, FIG. 16A illustrates a user interface for selecting an employee or a worker with which the document should be identified. Next, at step 402, the type of document is selected. For example, FIG. 16B illustrates a user interface for selecting a document type with which the document should be identified. This document type can be from a list of all document types or from a list of a particular group of document types (e.g., document types for client X) and so on. As illustrated in FIG. 16B, a new type of document can be created on the fly by using a pop up screen.

Figure 16C:
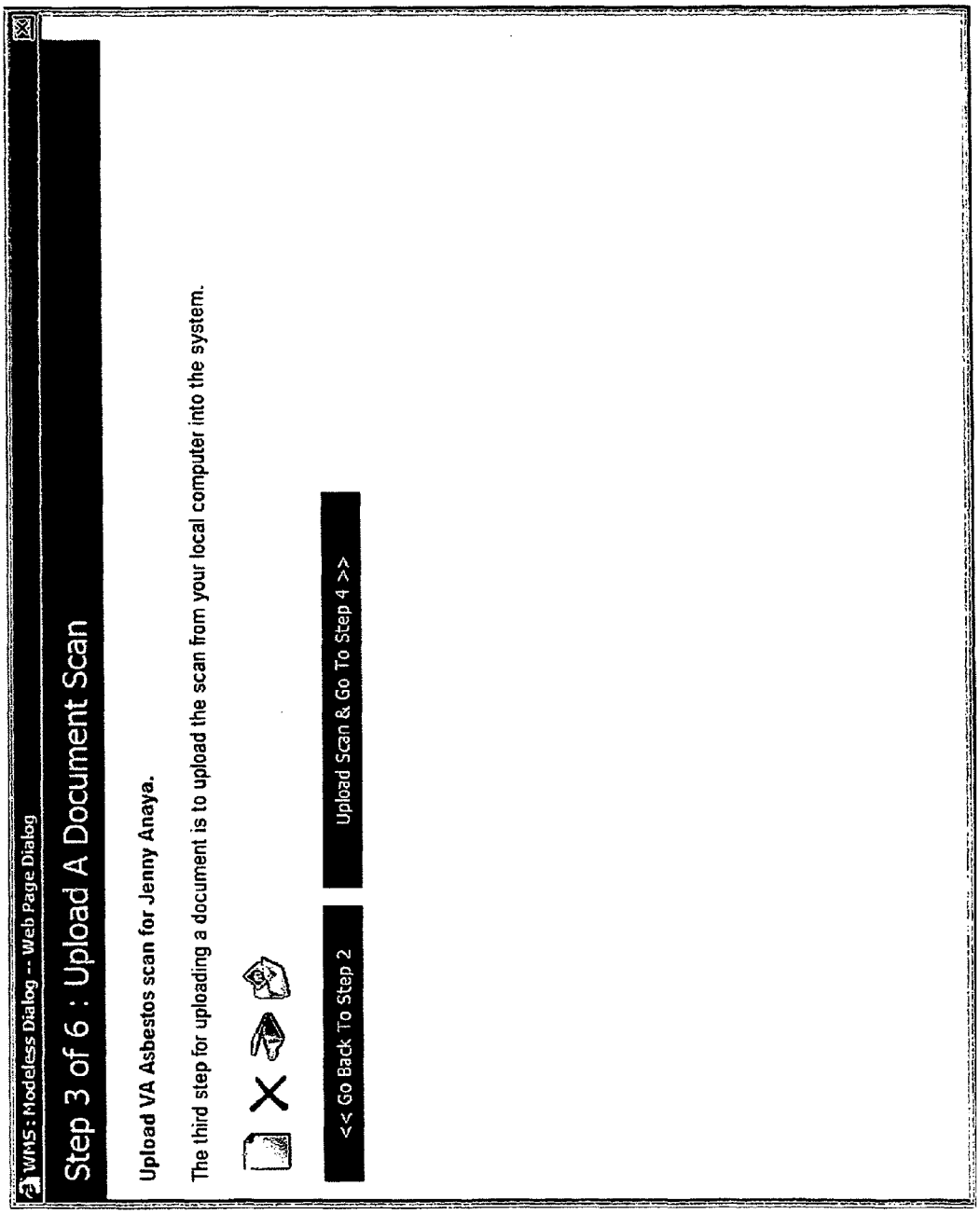

Then, at step 403, the user scans in the document or selects a document by browsing through various existing files. For example, FIG. 16C illustrates a user interface for selecting a type of uploading to perform. As illustrated in FIG. 16C, to scan a document, the user click on the scanner icon and a scanning dialogue using a library is opened. The system in which this technology is embedded can then communicate with any scanner attached to the client computer and acquire an image from that scanner and save it in memory of the client computer or alternatively, the user can view the scanned in image and delete it instead of uploading it into the system or saving it to a file. Similarly, a selected item can simply be deleted by clicking on the delete icon.

Once the document is selected or scanned in, at step 404, the user is provided with the ability to manipulate and edit the image by for example changing its size and/or resizing the image, color, rotating and/or flipping the image, creating a mirror image and so on. For example, once the image is uploaded, the user can click on the thumbnail of that image to manipulate it. Once the changes are made, the user uploads or imports the document into the system at step 405.

Figure 16D:
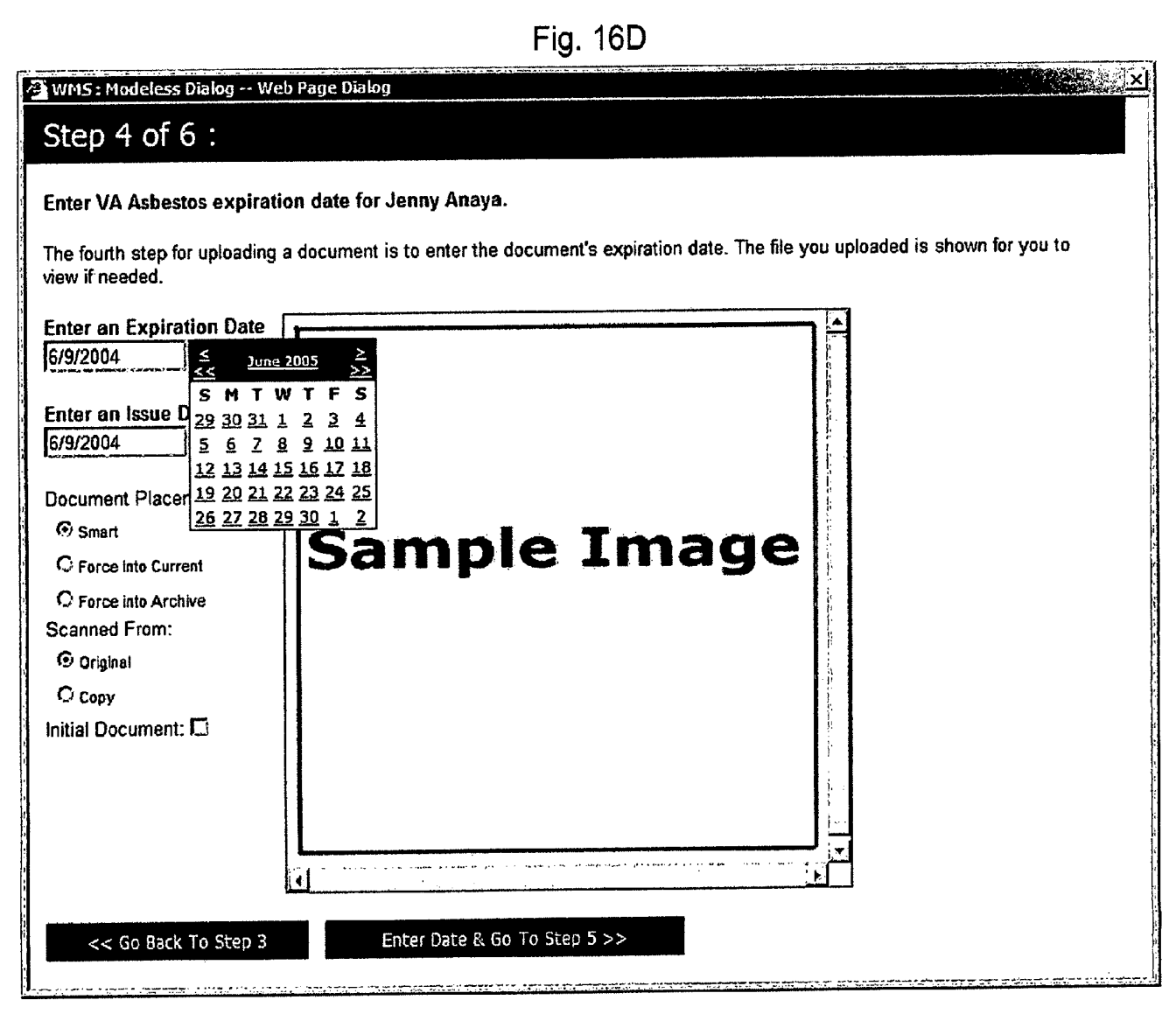
Figure 16E:
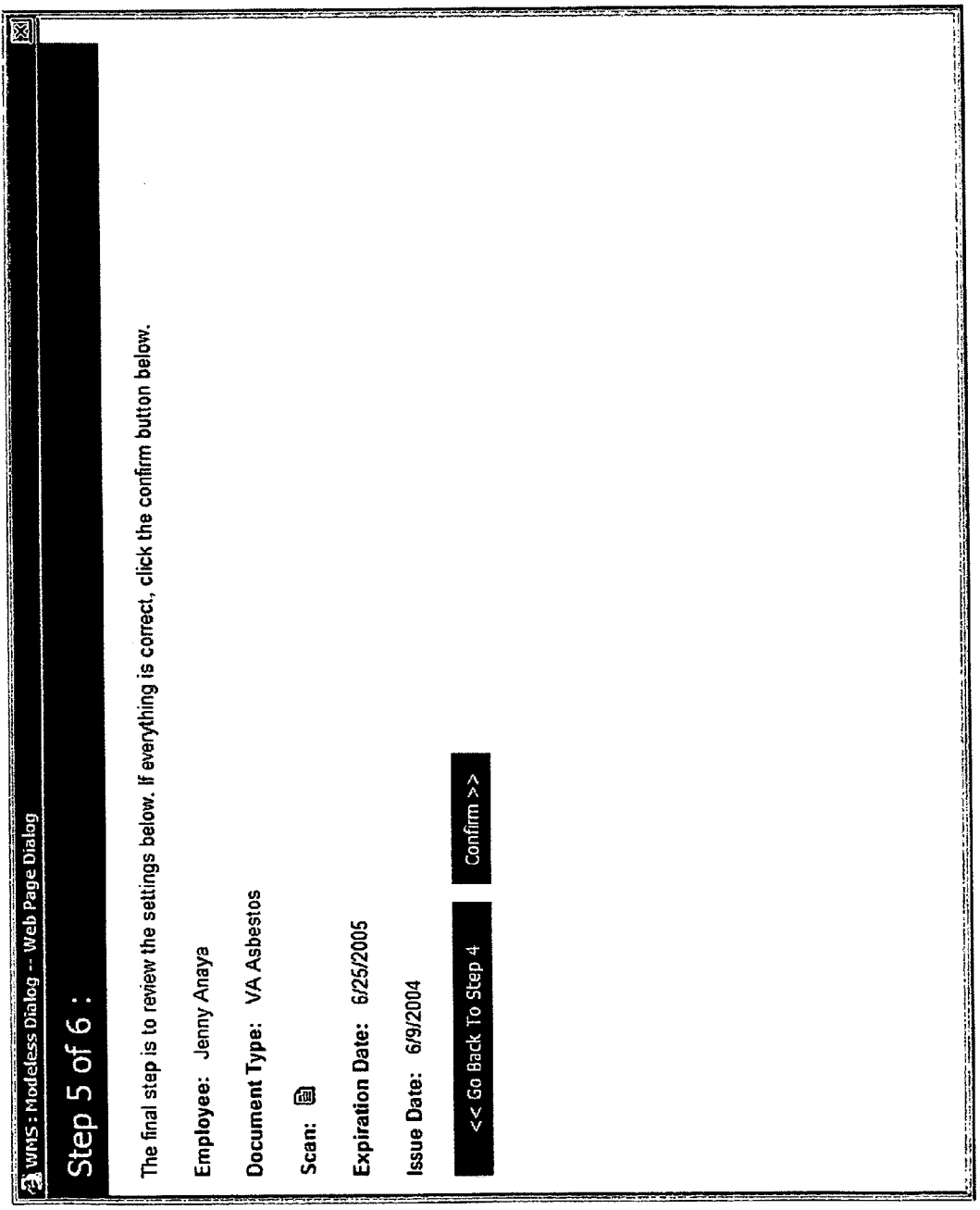
Figure 16F:
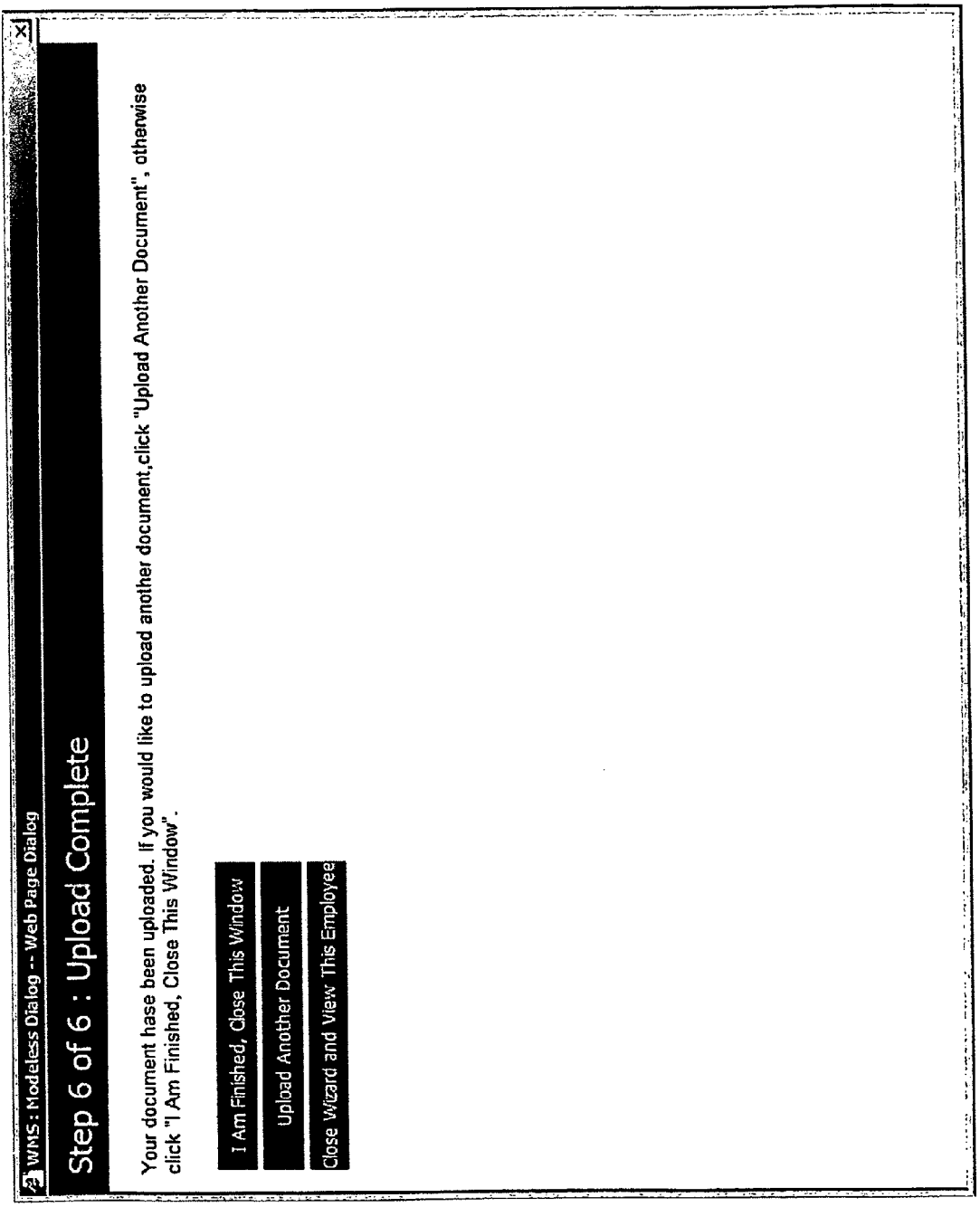

Next, at step 406, the user sets the necessary data for this uploaded document. By way of an example as illustrated in FIG. 16D, the user sets an expiration date for the document. Moreover, as illustrated in FIG. 16D, the user may also set an issue date using a pop up calendar. Depending on the expiration date, as shown at step 407, the uploaded document may replace an already existing document, as shown at step 409a. Then, the already existing document will be stored in the archive and the uploaded document will be displayed as current, step 409a. Alternatively, if the expiration date is before the expiration date of the corresponding, already existing document, then the uploaded document is stored in the archive, and the already existing document remains current, step 409b. Manual override is also possible, step 408 (e.g. the current document may be stored directly in the archive and the old document will remain current and so on). FIG. 16D illustrates a user interface allowing the user to select document placement, where if the "smart" option is selected, the system will automatically place the document based on the expiration date. On the other hand, a manual override is provided "force into current" or "force into an archive." At step 410, the user is presented with all the entered information and is asked to confirm, e.g., FIG. 16E and at step 411, the user is asked whether more documents are to be uploaded, e.g., FIG. 16F. If the user selects to upload more documents, then the user repeats the process from step 401. As a result, a document or any number of documents are quickly stored and relationally linked to a worker, customer, job and so on.

Barcode Scanning

The barcode scanning facilitates scanning and uploading of large amount of documents. 2D Datamatrix barcodes are generated from any module within the application. These robust barcodes can hold vast amounts of information specifying the exact document location and associated metadata. The barcodes are then attached to the documents and are scanned or faxed using the latest document capture technology.

From any record within the system where a document can be uploaded, a barcode icon or some other user interface representation for the barcode is present. Clicking on the barcode icon allows the user to fill out information regarding the document they wish to scan as illustrated in FIG. 15B step 500. The barcode is then generated and printed out as illustrated in step 501. At step 502, the user must then apply the generated barcode to the document in question. The user then scans the document as shown in step 503. Depending on the information stored in the barcode as shown in step 504, the document is either uploaded to the appropriate location in the database as shown at step 505, or the document proceeds to the inbox for reconciliation as shown at step 506. When documents are scanned using only a coversheet with a barcode to associate them to a file or document type, they will need reconciliation. The user receives a message in their inbox alerting them that documents have arrived that need to be reconciled. The user opens that message as shown in step 507. The page is loaded with the documents, document types and records where the document may be stored as shown in step 508. The user must then drag and drop those documents to their appropriate locations as shown in step 509. In step 510, a summary page is loaded for the user to confirm as shown in step 511. If everything looks ok the user allows the system to upload the documents to their mapped locations as shown in step 512.

Generating a Barcode

A barcode can be generated in various places throughout the main modules. For example, before scanning in a document or an image, the user can click on a barcode icon and a screen to create a bar code will pop up. The following information can be keyed into the bar code: the document is current or archived, whether it is an original document or a copy, whether it is an initial document, the expiration date, issue date, reference value, custom fields and so on.

Once the information is keyed in, a user can generate the barcode by simply clicking on "generate" button. A new bar code is generated and the pop up window for barcode generation is closed. Each type of document that can be scanned will have a barcode scan icon. By selecting this barcode scan icon a window comes up asking the user if they wish to print the bar code for that document. By selecting yes, a bar code is printed for that precise document for that job, worker, or other record in the database.

Scanning Documents using barcodes

The user simply attaches the above generated barcode labels to the documents and these barcodes are read from the label and are used during upload. The documents are then scanned using the latest document capture technology including the ability to fax documents with the attached barcodes directly to the desired record within the system. When faxing the documents, the file is converted to an image similar to using a scanner and can be routed to its appropriate record and database based on the number dialed and the barcode attached to the document. Once the documents have been scanned they are immediately uploaded into the system and are attached to the appropriate record with the appropriate custom fields. No reconciliation of scanned images is necessary.

Bulk Scanning using Covers Sheets

To ease the process of capturing large amounts of related documents, the user can generate cover sheets, each of which associates a group of documents to a record in the database. Barcode labels can also be created for each document specifying the user defined document type and whether the file is current or archived. The coversheet is simply placed over the stack of documents and scanned or faxed using the latest document capture technology. The user has the option of printing just the coversheet or they can attach document type barcodes to each document to ease the process of reconciliation.

In addition, using a screen similar to the direct barcode scan popup, barcodes that identify a group name, for example, a particular worker, job, contact, customer or company information, can be created. The bar code will be used as a cover page to assign the following scanned documents to the specified record. The document type is not specified on the cover sheet. Once a user clicks on the scan button, the document or documents will be loaded to the specified location. One or many different documents can be loaded at a time.

For example, the user likes to scan the documents associated with Joe Smith's worker file. The user then loads the necessary documents into a high speed scanner with cover sheets between each worker's documents. When more than one worker is loaded at a time, a list of worker's will be shown after the scan process with the total number of documents loaded for each. The user selects the worker and a screen displays Joe's name and picture as well as the documents loaded to his file. Icons on the right side of the page may be provided to represent each different document loaded. On the left side of the page, a list of the active document types may be provided.

The user clicks the first icon representing a document and the selected document pops up. The user selects the document type that represents the document and selects load. The document is then saved to the worker file as that document type. A new screen may appear showing the document on the left, large enough to read easily. On the right side of the screen are the necessary information fields that have been set up to be completed for that document type. The user enters the information and clicks save. The user is then returned to the main worker screen where the remaining documents to be loaded are listed. The user repeats this process until the documents have been loaded. When they return to the list of workers, Joes name is checked off as confirmed. The user proceeds to work their way through the list of workers and documents. If a document is loaded to the wrong file, a command within the system allows the user to move the document to another worker. This allows the user to make adjustments on the fly if they made a mistake with the cover page.

Bulk Scanning using Document Type Labels

For example, the user may want to load a document to a job called "NIH Ceiling Tile" for Marcor Environmental™. To print specific document types for a job, the user simply opens the job named "NIH Ceiling Tile removal" and selects the document type to scan. In this case, the user may select the document type contract. A screen pops up showing the contract files already present for this job. The bar code icon may reside on the lower left corner of the pop up. The user may click the icon and will be asked "do you want to print a bar code for NIH Ceiling Tile Removal Contract Document?"

The user clicks "Yes", and the bar code is printed. If a contract already exists, the system then asks whether the document is going to be the current document or archived. The user selects an appropriate document type, enabling the system to properly manage the document after scanning. The user can print one or many bar code labels and then simply attach them to the appropriate document, enabling the system to properly identify the documents during scanning.

The user then opens the upload screen and selects upload. The documents are then scanned and uploaded to the database, attaching directly to the record and document type as directed by the bar code. The user can then open the upload screen to view a list of documents that have been loaded but not yet confirmed. The list shows the documents in order of the general topic. For example, if many documents were loaded to one job, the list would display the documents by jobs. If workers and job were loaded, the list would then show the workers, then each worker, then each document. The user would then select each document and confirm them one by one loading information about them as described above. A screen with information that needed to be drawn from the document would be displayed allowing the user to enter the information. Tile user works their way through the list until the required information is entered. The user has the option to enter the information fields immediately or to postpone data entry to a later time. A document will not be removed from the list until it is confirmed. Once the document is confirmed it is removed from the list as complete.

Through a filter, the user can select to view the loaded documents, only active documents, deleted documents or confirmed documents. Other variations are within the scope of the invention. The user can delete documents when they are first viewed. The user can move the documents to other locations as they are loaded to allow the user to easily correct cover sheets or barcodes that may have been out of order. The user can attach email notifications to user accounts to inform them that documents have been loaded. This can be done by default for document types or done on a particular file. The document screen will display the number of pages scanned for each document cover.

After a bulk upload is completed, the system allows the user to reconcile the uploaded scanned documents to their specific locations within the client database. This scan management solution provides easy to use lists of the documents that have been captured and the locations where they can be stored. The user simply maps the documents to their locations and enters the necessary information fields. In the case of custom documents, a user will also be able to associate a group of documents to be the pages within one document class. The user can also specify the order of those pages and the associated information fields.

In sum, the exemplary upload wizard is consistent with providing an easy and quick way to upload documents, a single document or a large number of documents. To facilitate bulk uploads cover sheets with barcodes and individual document barcodes may be provided. The upload wizard is an efficient and cost effective solution for uploading documents into a database, which also attempts to eliminate duplicative entry at every step of the way.

2) Document Reviews

The WMS solution for monitoring documents is revolutionary to any industry that has to monitor numerous documents with expiration dates. WMS has invented a method through a color-coded system that allows the user to review thousands of documents and workers within minutes for validation of required documents.

WMS allows the user to see the date of expiration of the document on an icon that is located in a grid format. An exemplary screen for document review is illustrated in FIG. 17. FIG. 17 illustrates on the left side of the exemplary screen, the worker names are displayed, while the document names are displayed on the top part of the screen. Inside the grid, there are color-coded icons that display the necessary information about the document. For example, green color coding may represent that the document is current. Yellow color coding may represent that the document will expire within 30 days. The cell containing the document information may be displayed in red if the document has expired, or is missing or incomplete. If a user has scheduled the worker to update this particular document the cell color will turn to blue. Of course, one of ordinary skill in the art would understand that different color-coding schemes can be used to differentiate the various statuses of the documents.

At each intersection of document type and worker name, the following icons along with the expiration date may be displayed as illustrated in FIG. 17. FIG. 17 illustrates a document icon displayed within the cell between the lock icon and the calendar icon. If the user has no rights to view the document, the document icon is solid white, and the user cannot access or view the document. If the user does have rights to view the document, the document icon contains lines and links the user to the popup of that document. If no document is on file as illustrated in FIG. 17, instead of the document icon, the term "missing" is displayed. By selecting the icon, the user can pull up the actual document and review the information. By selecting 'close' the user is back in the review screen.

By selecting the calendar icon, which may be present in all documents as illustrated in FIG. 17 or only in the documents that need updating, the schedule update menu pops up and the user can schedule the worker to an update. By going to schedule an update report, the user can view the updates that have been scheduled for workers and mark them as complete or delete them as well as schedule new updates.

Documents can be reviewed in numerous formats. Predefined reports are set up that allow the user to review the documents, expired documents, incomplete documents, pending documents, particular work type documents and custom reports. This allows the user rapid review of documents and the ability to set WMS to particular company needs. One of ordinary skill in the art would easily recognize that variations in the reports such as those mentioned below and others are within the scope of the invention.

In this illustrative, non-limiting embodiment, the review screens allow the user to verify, monitor and schedule the necessary updates. When a Work Type or New Job Criteria is created, a document review screen is dynamically generated in the Document review list. The end user is provided with a simple and easy access to review documents associated with the job and work type, for example. When a new document type is added the new document is dynamically added to the All Document Screen for viewing. This allows the end user to view All Documents and see each document type that is in the WMS system. In the conventional systems, the end users have to run a query, set up custom reports, set up custom screens and in many instances enter information twice, whereas in this exemplary embodiment, the document type is entered one time only. Then it is dynamically generated into reviewable lists. The user can quickly get what they need without having to program a new report to retrieve the necessary information. The document reports can be saved for future reference and dispatched to other parties.

Moreover, the documents can be verified from any of the document review screens. Verification is a process by which a user can validate documents. The user can check document images, expirations and authenticity while recording information related to the validation process in an easy to use table. In addition, a clear concise grid will inform the system user whether or not a worker's documents have been accepted using clearly identifiable icons. Fields within the individual record can also be validated. For example, a worker's social security number, name, address or phone number could be validated right inside the worker file. FIG. 17 illustrates an icon in the form of a lock which represents the validation of this information. The lock may be color coded based on whether the document was verified, and which level of personnel verified it and so on.

In this illustrative, non-limiting embodiment, document reviews are split into the following logical parts, see FIG. 14: i) all documents review (also mentioned above), ii) job documents review iii) work type documents review iv) custom documents review and v) saved custom documents review. Each of these logical parts are described in greater detail herein below after the detailed description of the verification process, which can be implemented from any one of these exemplary logical parts.

Verification of Industry Representations

Regulatory authorities require copies of certain documentation for workers who are going to work on secure sites. These secure sites may include government facilities, state facilities, commercial facilities, educational faculties, and industrial facilities. The documents required range from a copy of a driver's license, a physical to work, a license to work in specific trade or industry, copy of work history and numerous other required certifications or regulations. In the conventional methods, the user arrives to the work site with copies of the required work documents or the user's customer makes copies of the documents on site. The user's customer documents are then tracked and monitored for authenticity and expiration by the customer. When documents expire, they have to be updated. The current tracking of these documents range from notes on a pad to databases that have been created to track the information.

The secure document solution makes it easier to monitor this delicate information. The exemplary WMS utilizes drill down component, allowing the user to click on an icon once, and view a document, a color code system facilitates the monitoring of the documents, and a notes capability allows the user's customer the ability to document the verification of the document. By utilizing these methods the user and the customer can share the database, enabling the information to be entered one time, it can be verified one time, and then monitored until its expiration. Upon expiration, the user and the customer are notified and an updated version of the document is required. The prior document is archived and both the user and the customer retain the history of the document. As explained in greater detail above.

In sum, in this illustrative, non-limiting embodiment, the uploading of documents may be performed in three different methods. The first method allows the user to load documents and enter the expiration dates into the system, and then confirm the dates with two sets of initials. The second method allows the user to load the documents and enter the dates, then request the system to verify the dates and upload the documents. The system may have each document reviewed by two or more people to confirm the dates of the documents. If a discrepancy is found, the user is contacted and the issue is resolved. Upon verification, the documents are uploaded. The third method enables the loading of the documents and entering the dates for the user, two individuals verify the information and then the user verifies the information. Upon verification by the three individuals, the document or documents are uploaded. The user can request review of these documents prior to uploading for date authenticity or they can confirm the dates themselves.

Different aspects of a document, record or industry representation in the database can be validated during the verification process. Namely, a user can verify that the scanned image, or other file type is correct and the image or file is accepted. FIG. 18 illustrates an exemplary interface for verifying the document. The user can check that the expiration and issue date on that document matches the expiration and issue date entered into the system. The user can then validate that the document is authentic by contacting the training provider, physician or other party who issued the document in question. The user may also insert comments regarding the document's authenticity. The user can also verify all custom information fields associated with the document.

In addition to manually calling or faxing an issuer to validate a document, the system has the ability to electronically validate the document through web services between the system and the issuing party's website or via fax. For example, a VA Asbestos license number could be sent to the Virginia department of Professional and Occupational Regulation website to be verified. A message would then be returned to the system notifying the user of the document's validity. In the case of social security numbers, one or many workers' numbers could be faxed directly from within the system to the Social Security Administration (SSA). The SSA responds with a faxed list of the numbers that are accepted as authentic or rejected as fraudulent.

The user may have the ability to accept, reject or mark pending any of the above mentioned fields. In addition, the user can associate the contact information of the appropriate document issuer to that document record in the verification table to be easily accessed for future reference. Any correspondences received regarding the document can be attached to the verification record for easy retrieval in the memo table.

In addition, a user may be allowed to enter notes associated with the documents and view previous entries made by other users. A memo can also be flagged as confidential for only permissible users to view. A memo created by the system or the user can also be marked for dispatch. If a memo is marked for dispatch, it will be dispatched along with the document during information exchange. In this exemplary embodiment, manual memos can be deleted, however automatic memos are permanent and cannot be deleted. In addition, the user has the ability to highlight portions of the document by a navigation action such as clicking and dragging their mouse. They can then insert those memos into the highlighted areas.

Once information is verified, a color coded icon (as explained above and illustrated in FIG. 17) of a lock or some other symbol appears next to the document, representing a number that represents the highest verification level as it corresponds to the status of that document. The following illustrative, non-limiting, color coded symbols could be employed to quickly alert the user whether the industry representation has been verified or not. An open lock may symbolize an Un-Validated Documents and a closed green lock may symbolize accepted industry representations and contain a number of the highest verification level who accepted the document. A closed yellow lock may symbolize a pending document and contain the number of the highest verification level who marked the document as pending verification process. A closed red lock may symbolize a document that is rejected and contain the number of the highest verification level who rejected the document. Of course, one of ordinary skill in the art will readily recognize that other variations are possible.

Moreover, a small legend may be provided explaining each verification level and its attributes and permissions. For example, some users may have rights to alter the previously mentioned items, while others may only have very selective privileges. For example, a level 3 clearance can complete clearance of image and expiration but not contact verification. Multiple levels are created to represent the hierarchy of user accounts as they validate and reject documents. Users can set up the accounts to correspond to actual positions within the company. For example, a user may wish to create Human Resources, Accountant, Project Manager and Owner levels of verification and associate them to each position within the company.

All parties in community can verify documents as long as they are granted a verification level greater than zero. They will also be able to share notes if so requested. The notes are stamped by user and company. Users can also send verification information emails. The verification levels control the rights to the various stages of verification. Each verification level is assigned a number that represents its hierarchy. For example, HR may be level 1, while Accounting is level 2 and the Owner is level 3. Each level may have increased rights to the verification process. The level with the highest number has the greatest access to the verification process.

To further explain, a user may wish for the HR personnel to only have the ability to verify document images and expiration dates without the ability to validate document authenticity or attach files associated to specific documents. The user may also give or take away the rights to view other entries to the verification table made by users of equal or higher levels. The verification levels also dictate the hierarchy of validation. For example, if an HR personnel accepted a document but upon validation by the owner the document comes back fraudulent, the owner could then reject the document. However, the HR person could not reject a document marked accepted by the owner. In addition, the HR person may or may not be given rights to upload a new document or edit the information pertaining to the existing image.

In this illustrative, non-limiting embodiment, the user may have right to verify the industry representation (e.g. a document image) and accept or reject this representation. In addition, the user may have the right to verify the expiration date by accepting or rejecting it. In addition, if the user is currently checking the validity of the industry representation or the date, the user may set it to "pending" to alert others that the industry representation or the date is under verification.

More specifically, the verification process occurs by clicking a verification icon, for example, and a verification screen illustrated in FIG. 18 pops up. This verification screen is a combination of a user worksheet, document details and a simple grid containing the history of the verification information associated with that document. The pop up screen may include the information pertaining to the document as it appears in the specified record.

For example, in the case of a worker's asbestos certificate, an image of the certificate appears along with the indexed information. In this example, the title of the pop up is the document type and worker's name along with the status of the document. In the table to the right of the document image, for example, are the custom information fields such as expiration date, issue date, reference number, creation date and user, last modification date and the user who modified it, file size, in what form it was originally scanned, and whether or not it is the initial document in a series of documents as illustrated in FIG. 18. Other similar information may be provided and such variations are clearly within the scope of the invention.

For example, below the document details, a document verification table may be provided as explained in greater detail below. The verification table is displayed when verification levels exist as illustrated in FIG. 18. The verification levels are listed along with the name of the last user of that level to verify the document. In order to more easily view the level of verification, a black arrow may highlight the level to which the user belongs. Clicking on his or her verification level provides a small pop up containing items to be verified and options for verifying. Only the fields the user has permission to clear will appear with radio buttons ora pull down menus to accept, reject or mark the fields as pending. For those users without specific permissions for verification, that functionality will be disabled in the worksheet. When a document image is accepted by someone of Level 1 verification, the users of level 1 would see that image as accepted. The accepted/rejected/pending statuses would apply to other users of the same level.

For example, the user can Accept, mark Pending, Reject or ignore (N/A) the document issue and expiration dates and its validity while also including comments on the process. The user could include notes about not being able to reach a document issuer, or waiting for a call back. Upon saving the actions, the verification table is stamped with the user's selections. For example, if the user accepted the expiration and issue dates, a green "Accepted" would appear in the Expiration column, illustrated in FIG. 18, on that user's verification level row. If the user marked the image as pending, a black "Pending" would appear in the Image column on that user's verification level row. If the user marked the validity of the document as rejected, a red "Rejected" would appear in the validity column on that user's verification level row. The row would also be stamped with the user's name and the date of the last modification. The user will enter and save their verification information and the verification detail history table will be populated. One of ordinary skill in the art would understand that this is provided by way of an example only and a number of other variations are possible.

An additional portion of the screen is designated as an area for associating a contact to that document's validation process. For example, from a drop down list the user can select the contact information for the doctor who issued a physical for a worker or the user could select the name and contact information of a training provider who issued a certificate. The bottom portion of the pop up includes the document verification actions in a memo details table.

The table of this illustrative, non-limiting embodiment, includes automatic memos generated every time an image, expiration date, or validation is accepted, rejected or marked pending. These automatic memos are shown for everyone in the system that has made a change to the verification of that document. Memos are also generated every time the document details are altered, such as expiration date, or a new image is uploaded. These messages would be hard-coded into the system and inserted as memos in the table when the specified change is made. The table also includes the manual memos that are entered to track the process of validating a document. For example, a user could enter a memo noting that they had called a training provider to verify a certificate but no one had answered so the user left a message. As many memos as needed could be entered. Based on a combo box filter the user can decide if they want to see messages belonging to all or individual verification levels.

Alternatively, the user has the ability to automatically fax or email a copy of document directly from the verification screen to the document's issuer for validation. A fax can be sent via a local printer/fax. A pop up will show the printer commands, while displaying contact information. In addition, the user can use a web service fax, such as e-Fax, and the information will be pre-loaded from the contact screen. A cover sheet will be sent, displaying confidentiality disclaimers, instructions and return fax information. A request for verification will be stored in the Validation table (explained in further detail below), time, date and user request. A response from the contact can then be attached to the attachment field.

Information stored on the web can also be auto-authenticated. For example, worker names, social security numbers or other industry representations may be entered and validated against a state issuing agency's database to verify that the worker in question actually attained the training specified by the certificate under scrutiny. In addition, links may be provided to the websites of physicians, training facilities and other third parties that may be able to validate documents. The user can validate a contact for approval of certain document types. When validating a document, the pre-approved contact is already authorized as a dependable authenticator. For example, in the case of training schools, each training school can be validated for specific training. Each training facility can be associated to a document type and in turn validated for the pre-cleared type of training. Validations can be done automatically if the state posts the school approvals on the web or the user can validate the information. The user can also post expiration dates of licenses as smart alerts for annual confirmation.

Each validation performed will be stored in the system in a memo field. Each memo field may be preceded by a flag box allowing the user to select one or many memos. These memos could then be faxed, emailed or printed. The attachments to a memo would be attached as separate documents to an email, or would need to be opened individually for fax or print. The verification detail history table includes a column with check boxes determining whether or not any user is allowed to dispatch that memo as illustrated in FIG. 18. The next column may include an edit button, which brings the user into a pop up allowing them to edit the memo. The fields can be edited on the manual memos. For automatically generated memos only the check boxed for marking a document as confidential or able to be dispatched can be edited.

The next column may include the date and time stamp when that memo was created or generated. The fourth column may reveal the verification level of the user who created that memo; it also may allow the user to sort by all, some or one verification level as illustrated in FIG. 18. The following column may include the initials of the user who created that memo or made the change that caused it to be auto generated. The sixth column may provide the user with the ability to filter by automatic or manual memos. The next column may contain text from the memos. The following three columns may include the results of the verification for the document expiration date, image, and validity, these columns are illustrated in FIG. 18.

The following column may include a check box for marking the memo as confidential. When a memo is marked confidential then it cannot be dispatched, and when a memo is marked dispatched it cannot be confidential. A memo is left unmarked for confidentiality and for dispatch by default for modification memos. The rights to read the confidential memos would be restricted according to user preferences. The second to last column may include a check box to mark the document as an item that can or cannot be dispatched. The very next column would allow the user to upload an attachment for each memo. The last column would only be visible to someone with system administrator rights. This column would include an icon for easily deleting the memo. In the event that the level assigned to a user changed, the user cannot access a record if his new level no longer has rights to the process in question.

At the bottom of the table, a button may be provided for adding a new record to the table as well as the buttons to Print, Fax or Email the selected records. A notify button would also be present allowing the user to edit the contacts that have been pre-specified to receive notification of changes to a document validation. From this screen the user may also access the document in the worker's file via a pop up screen, to make any necessary changes, such as deleting and rescanning the document or altering the expiration date. Entries in to the memo table, however, may only be deleted by the system administrator. Some users may want the preference to be able to make deletion a top down process, where users of a certain level could make changes to the levels below them. Of course, one of ordinary skill in the art would understand that other variations of the validation table and user rights may be provided.

The document verification detail history table can be exclusive to the company's internal history or may include information input by the rest of the community including third party evaluators. Whether or not document memos entered by the external community members are shown will be based on user and company preferences regarding the permissions each user is granted. Notes sent by the third party community members via document dispatch may be shown in the table alongside internal notes.

For example, a contractor may send documents to an IH with no notes. The IH validates the information and sends the confirmation back to the contractor. This confirmation would then populate the verification table as an IH Verification record. Clicking on the record will bring up the IH's worksheet which will include the verification notes as entered by the IH. The display of this information to a user would be set up in company preferences that determine which users can view community notes. Another example would be third party security notes. A contractor could outsource a specific document for validation. The document would be dispatched and upon receipt would be returned with notes of the validation made by the third party in their individual verification worksheet.

The table would also include a flag box next to each user for whether or not that information should be dispatched. For example, if the flag box next to the HR person's account is checked then their notes will be dispatched. When the user clicks on the HR person's name, the user will be taken into their worksheet, where they can further specify which of their individual notes will or will not be allowed to be dispatched. If the HR person's flag box is not selected no notes within their account will be dispatched. Of course, one of ordinary skill in the art will readily understand that this is provided by way of an example only and other variations are possible.

In addition, when the user adds a memo or clicks on one to view the details, the user will see a form that includes the details of the memo statement. In addition, the user will be able to add an attachment (e.g. by browsing through files). A text box is present, where the bulk of the information is entered. Also a mechanism for reporting on information drawn from the memo fields is provided. The user can choose one or many workers and one or many memos to dispatch or print.

The system will also store information regarding any changes that are made to a document record or verification status. A user can set up automatic transfer of information through web services, fax or email, as verification results are made. Specifically, user rights are required for displaying information both for company verification and community verification. If a document is rejected and rescanned or edited, history of the changes made is stored. A log of verification information and history of changes will be kept for review.

The verification process is performed internally and externally. A company can set up the verification table to include only internal entries and send smart alerts internally only. However, the system also allows the user to include third parties in this process. External community members such as an IH may be granted access via email, login, web services or information exchange whereby they can view some or all of the records associated with the document verification or they can actually participate in the verification process—verifying and rejecting documents. In addition, external community members can be included in email notification, smart alerts or links to inform them that the documents have been verified. Documents can be cleared individually or in batches for required work types. The system will keep track of the dispatched verifications.

A number of filters may be set up to review verification table for the document. For example, a filter by document type, worker status, verification status, accounts, verification level and so on. This exemplary verification process provides the user with a quick and easy way to authenticate industry representations. The results may be displayed on any one of the document review screens.

[01]i) All Documents Review

All Documents Review is a dynamically generated screen that displays the documents in the system at one time for the workers as illustrated in FIG. 17 and explained above. The screen can be filtered for viewing only a specified group of workers or documents. For example, if a new OSHA Fall Protection Program was added in Document Type, the OSHA Fall Protection Document would dynamically be added to the review screen for each worker. The document information is immediately available for viewing without another single setting or adjustment to the menu. Once a filter is set, the all documents review screen will display worker's last and first name and employee number for the workers consistent with the set filter. As way of an example, a filter for status of the workers or work type may be set. The end user may want to view the current workers, all workers, last 3 months, last 6 months or last year workers. In addition, documents filters may be set. By way of an example, the user may desire to view only the expired documents, incomplete documents, pending documents and so on. In addition, a filter for the document types may be set such as view fitness tests, physicals, asbestos certificates and so on. In this illustrative, non-limiting embodiment, these filters are implemented with simple checkboxes, thereby allowing the user to select any number of desired filters. Of course, one of ordinary skill in the art would understand that different filter schemes can be used to differentiate various documents and workers.

Figure 19:
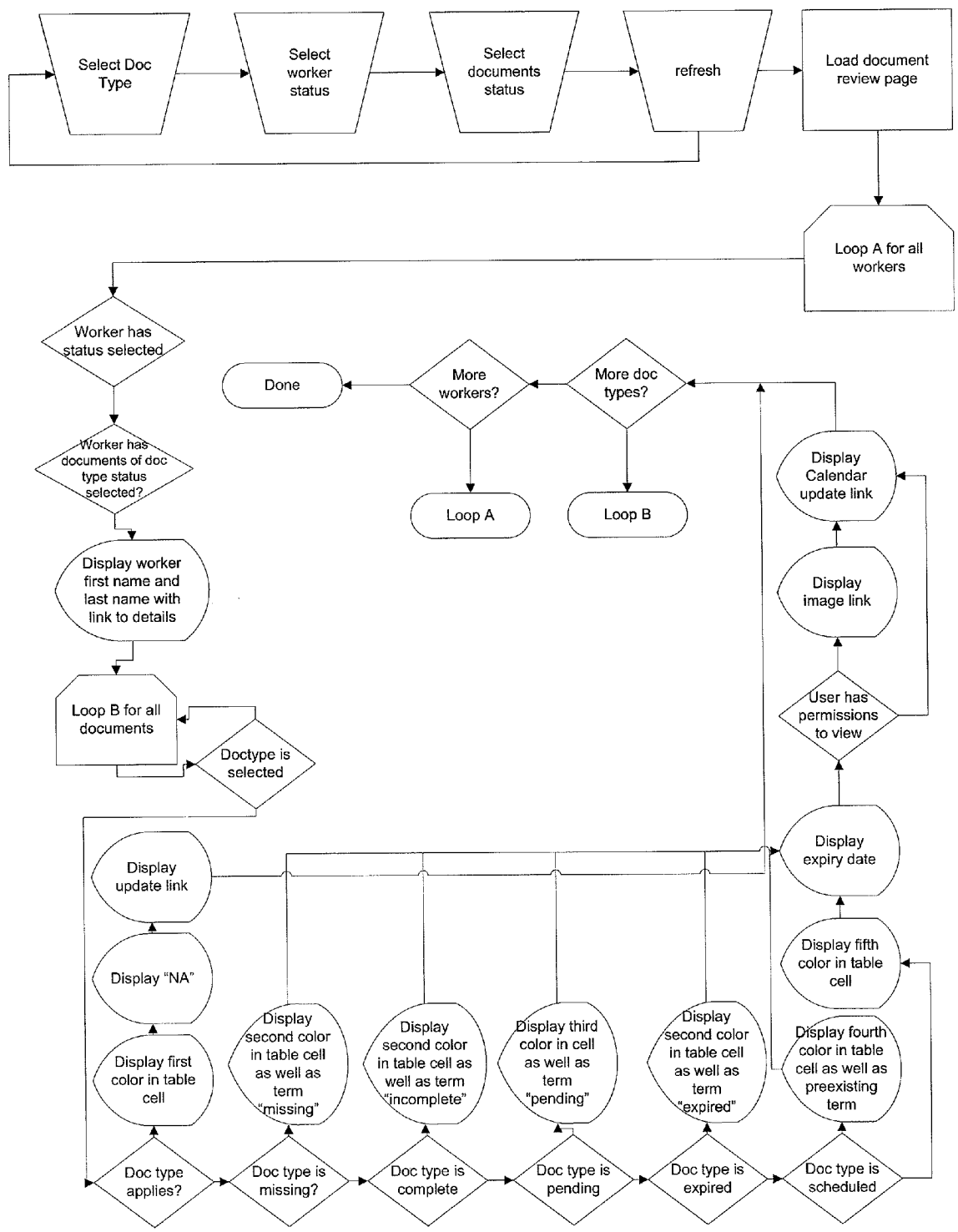
FIG. 19 is a flow chart diagram of the document review sub-module in accordance with this embodiment of the present invention.

The all documents review screen shows workers with the documents as illustrated in FIG. 17, in a color coded scheme. In addition, FIG. 17 illustrates for each document an icon for scheduling an update, for verification and for viewing the document is provided. In particular, the system loads the workers and document types that correspond to the set filter (if no filter is set, all the workers are loaded). As illustrated in FIG. 19, the user first selects from the filter which document types to display, the user then selects the statuses of the workers in question. The user may select the statuses of the document types previously chosen. For example, the user may wish to retrieve a report of only "Expired" or "Incomplete" "Physicals". After selecting the filtering criteria, the user then clicks on a button to refresh the report as illustrated in FIG. 19. For each worker, worker name and employee number may be displayed. Then each document for the worker is analyzed in accordance with the expiration date, whether or not the document is present in the record or missing, and whether the date information is incomplete to set the color of the box. In addition, if the user has rights to view the document type in question, an icon for viewing the document will be provided as explained above with respect to FIG. 19.

ii) Job Documents Review

Job Documents Review is a dynamically generated screen that produces a review screen with the documents and qualifications for a specific job. This enables the user to review the documents specifically regarding the job in question. Furthermore, it allows the administrator to view information about the job knowing that the job parameters had been set according to management and the necessary documents are automatically included on the list. This helps eliminate common key stroke errors that could otherwise result in double entry. Any document required on the job is displayed dynamically in the Job Document Review Screen.

For example, if a contractor had a new Asbestos Job in Maryland and it was set up in the job file under the name "NIH Building 6", with an Asbestos Work Type, the Job Documents Review screen would dynamically have a job called "NIH Building 6". By clicking on that drop down filter from the list, the user would immediately be able to view the worker documents assigned for that job or all the workers in the user's staff. The review screen would display the workers names and the documents associated with the Asbestos Work Type in the State of Maryland. In the conventional systems, this type of information takes hours to assemble and review. The information has to be updated and monitored, daily, whereas in this illustrative embodiment, not only are the documents immediately available for review with the ability to know every detail about the document, but everything is done without a single additional key stroke for setting up the information from the user. Everything is entered one time when the job is initially set up, for example.

As with the previous logical part, setting a variety of filters is possible, e.g., FIG. 20, the filters are illustrated on the left hand side. A filter can be set to view jobs of only particular customers, or to view only particular jobs as illustrated in FIG. 20. Moreover, a filter can be set to view only particular types of work, documents, and workers. For example, the user can select to only view Asbestos workers and/or only the current workers and/or workers assigned to the job or workers from the payroll. Similarly, by way of an example, the user can select to view only the expired or incomplete documents needed for the job. Of course, one of ordinary skill in the art would understand that different filter schemes can be used to differentiate various documents, workers, jobs and customers as may be necessary for efficient review of job related documents.

iii) Work Type Documents Review

Work Type Documents Review is a dynamically generated screen that displays the Work Type Documents. When a new Work Type is created, the Work Type Document Review screen is dynamically updated with the new Work Type name. The work types are displayed on a list and the user can simply click on the name of the Work Type and the documents associated with it will be displayed. FIG. 21 illustrates an exemplary display for filtering the workers by "work type documents". This may be especially helpful to see which workers have the necessary documents for a particular work type. For example, the end user can select a location (e.g., state) and work type and immediately view the status of the documents required for this work type in that particular state for the workers. The documents will be shown in a color coded scheme described above to alert the user to missing or expired documents. Again, as in the logical parts above, a number of filters can be set. For example, a filter for current workers, all workers, last 3 months, last 6 months, last year may be set. Similarly, by way of an example, a filter for the document status (expired, up to date, missing, soon due for renewal, etc) can be set. Of course, one of ordinary skill in the art would understand that different filter schemes can be used to differentiate various documents and workers.

iv) Custom Documents Review

Custom Documents Review is designed to give the user the ability to create their own document review screens and save any report format they create. In addition, it allows the user to save the information in the report for future use. This allows the user to save hours throughout the year that would otherwise be spent recreating the same review information over and over. Through this process, the end user is provided with an ability to save the report criteria information and the date for the report at that particular moment in time as well. This process gives the user the ability to save and dispatch or print the report to anyone who needs to receive it. The feature gives the user the ability to capture that moment in time for the documents. In the conventional systems, the user would have to use a report writer to print or dispatch this report. However, in this exemplary, non-limiting embodiment, the end user can do it right from any document review screen.

After selecting the custom documents review, which can be accessed by simply clicking a button, a screen is displayed that lists the documents in the system. There are check boxes next to each work type. The user can select whichever documents they wish to review and click on a button to name the report. The report is displayed on the screen under its name, showing only the documents the user requested. The user can edit the form at anytime by, for example, clicking edit. The user can modify the status by making the report inactive in the status menu. If the user wants to reactivate the report, the user selects document report history and the inactive reports.

Again, a number of filters can be set up in this logical part. For example, a filter for document types, status of documents and worker status can be set. These filters facilitate creation of a report or to review the custom documents. Of course, one of ordinary skill in the art would understand that different filter schemes can be used to differentiate various custom documents and workers.

v) Saved Documents Review

Once a user has created a report, the report can be saved and will be listed on this screen for future reference. The Saved Documents Review includes the Name of Document Report, the Workers Name and ID with an icon to pop up worker file, and the documents requested. These reports can be saved to run on new data or can be saved with the existing data only. The report can be dispatched as an email or printed at anytime from the report screen.

3) Qualification Update Reports

The qualification update report is a report that details which updates each worker has been assigned to. From any document review screen, a worker can be scheduled to take an update, this includes but is not limited to scheduling for training, physicals, update driver's license, an industry certificate, employment information, and any other industry representation or any other type of dated criteria the user needs to schedule with a specific work type.

WMS manages an update contact list that holds information for each contact. A drop down list appears in the schedule menu and the user selects the vendor (i.e., the vendor performing the report update) they want and assigns a date for the worker to obtain an update. Once the update is scheduled, the screen, which was one color turns to another color. The new color shows the user that the worker has been scheduled for training or an update. The user will no longer have to waste time checking whether or not they had scheduled the worker. This feature is consistent with saving time for the user. Visually, the user will be able to view the document review screen and recognize the status of the workers, without having to remember who was and was not scheduled.

After the date of the scheduled update or training, the cell turns back to its status color. For example if the document has already expired, the cell would turn back to red. In addition, an email is sent to the user reminding them to check on the scheduled update or training and update the document information in the system. When a new document is loaded for the update, the system automatically sets the update as complete and adjusts the color of this document.

The WMS can also have an "advertisement" that is linked to the email update feature. Since WMS knows what type of document is being updated, when the user clicks the calendar on the icon to schedule the update, an "advertisement" for the local "Update Vendor" is displayed. The advertisement is a direct link to the site and enables the user to immediately schedule the worker for the update. Advertisements will be sold for each type of update entity and will be controlled by zip code as determined by the worker or company's address. These are two variables that the user can predefine in the system set up menu. Of course, if this option is not desired, it can be turned off during the set up of the system by the administrator or during use by the end user. Alternatively, the end user can just click "no thanks" button and enter directly into the contact list.

For example, when a worker needs a new physical, the closest facility to the worker or the company, depending on how the system is set up, will pop up with a schedule and availability, with everything pre-filled out for the user. The user would pick a date and everything would bill and populate both databases automatically. The "update vendor" will have to follow specific guidelines in order to advertise and make it simple for the user. This method will benefit both parties.

Figure 22:
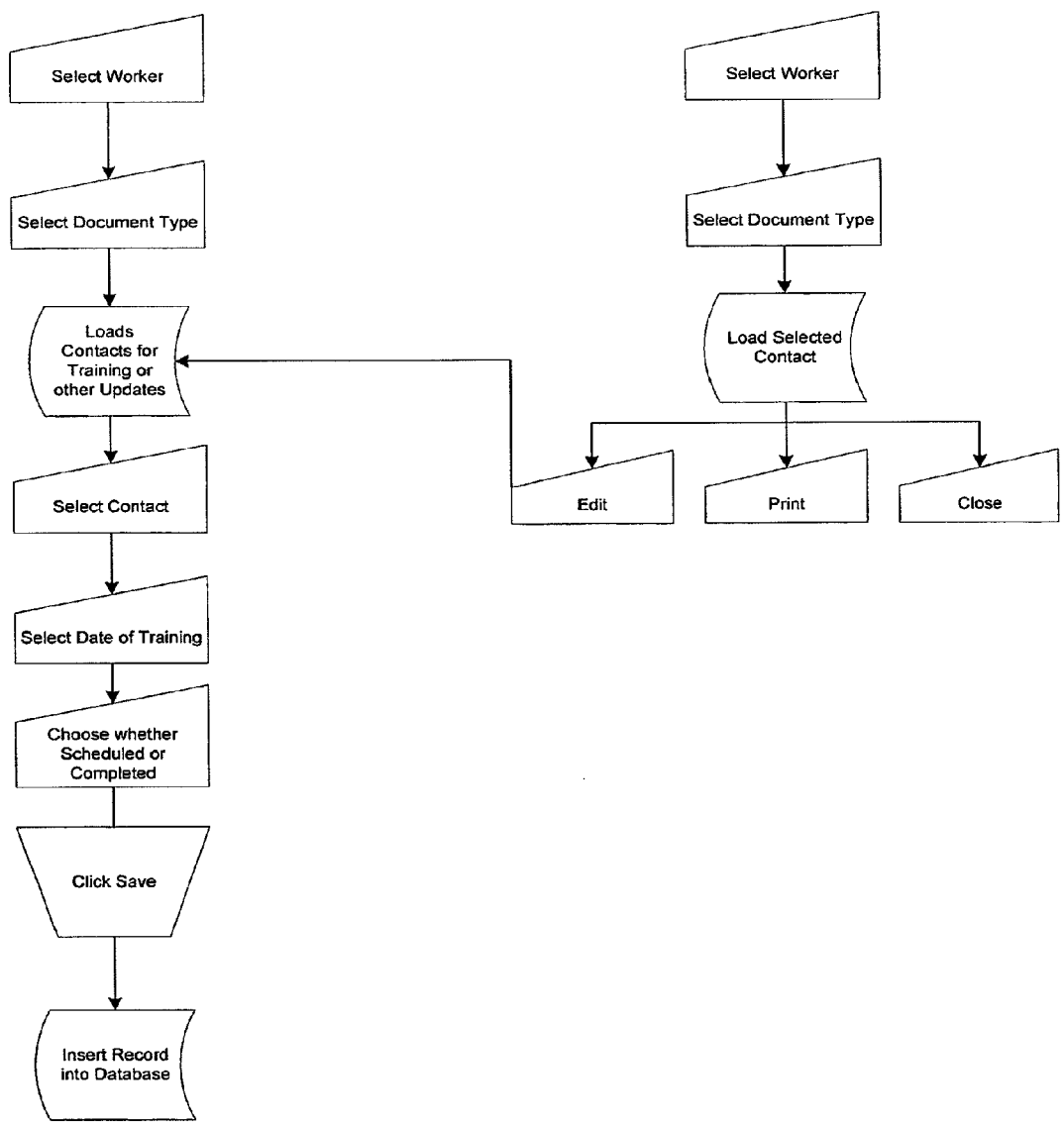
FIG. 22 is a flow chart diagram of scheduling an update for the document in accordance with this embodiment of the present invention.

In short, to schedule a worker for an update an example of which is illustrated in FIG. 22, the user selects the worker and the document type. Next, as illustrated in FIG. 22, a number of training locations including contact information for each location are loaded into the system and are displayed to the user. The user selects a location or contact and the date for the update or training. Then, the user chooses whether it is a scheduled training or performed training (that is, completed training) and saves the information into the database as illustrated in FIG. 22. Next, FIG. 22 illustrates that the user may also edit, print or view a selected training location and contact, by simply selecting a worker, document type and a training location or a contact. The user may then select the date of training, choose whether the date is a scheduled or completed date, and save the information into the system.

In sum, the document management module provides a complete solution for managing documents associated with workers. The documents can easily be uploaded from a file or scanned in using barcodes and barcode coversheets. In addition, the documents could easily be viewed, verified and scheduled for update, with this color coded worker management system. In addition, a number of complex searches can be performed by simple set up of the screen. The user can view, edit, delete or add documents quickly and easily with this worker management module.

C. Job Management

Job Management is a powerful module that enables the user to take complete control of the execution and monitoring of their jobs sites. This module allows the user to match skills and qualifications with predefined job requirements set by work types allowing precise cost association to be determined for a project. In addition, the use of the color coded system and symbols enable the user to visually monitor the worker requirements in conjunction with the job.

This module provides an efficient way to track the relationship between estimated, scheduled and actual work type cost. The user can monitor the job by scheduled workers and by actual payroll data. By using WMS, the end user can estimate the cost believed to be associated with a particular project. The user can then track the actual costs that were incurred on the job and see whether the job was over or under budget. If the project went over budget, the user can better determine needs for future work. If the project was under budget, the user can use the information to become more competitive on future work.

Similar to the way Worker History is tracked by payroll and schedule history, this module keeps scheduled cost and actual payroll cost separate under Job History as well. Many of the conventional accounting systems require laborious data sorting, queries and data research to obtain the necessary information to make project management decisions. By relationally linking between scheduling and payroll, the user can view this information easily for better project management. The information is easy to read and can be drilled down for more detail. The information used in schedule history is driven by the worker assignment sheets, while the payroll history information is driven by the Payroll sheets that are inputted for workers.

Moreover, in the job management module, custom fields in the job file can be dynamically created. This data is entered only once and is tracked and searched. Job files are very fluid; they have different parameters and specifics that may change daily with new regulations and requirements. The worker management module enables the user to dynamically create new custom field tabs on the fly without having to use complicated setup screens. This enables the user to capture and track any information they want from any job source they want without being limited to predefined fields.

This process provides the user with control over the data they chose to track and monitor. The ability to add this information dynamically provides the system with much needed flexibility. The user can capture information that they think is important to better make their business decisions without being restricted by a software application that has limited fields or missing key links to a formula a user has developed for managing their business. This enables the user to have one place to keep and track this information.

The job management module has detailed screens, color-coded information, email alerts and pop up alerts to inform the user of the different activities on the job sites. Throughout the cost reporting, scheduling screens, payroll screens, print screens and so on, the user is informed about the status of the job cost. The color code method illustrates the different levels of cost and cost comparisons to estimates. Email and pop up alerts inform the user immediately of cost levels that are reached in predefined fields. Users have complete control to edit and change these parameters at anytime to ensure even greater control of the job cost.

Figure 23:
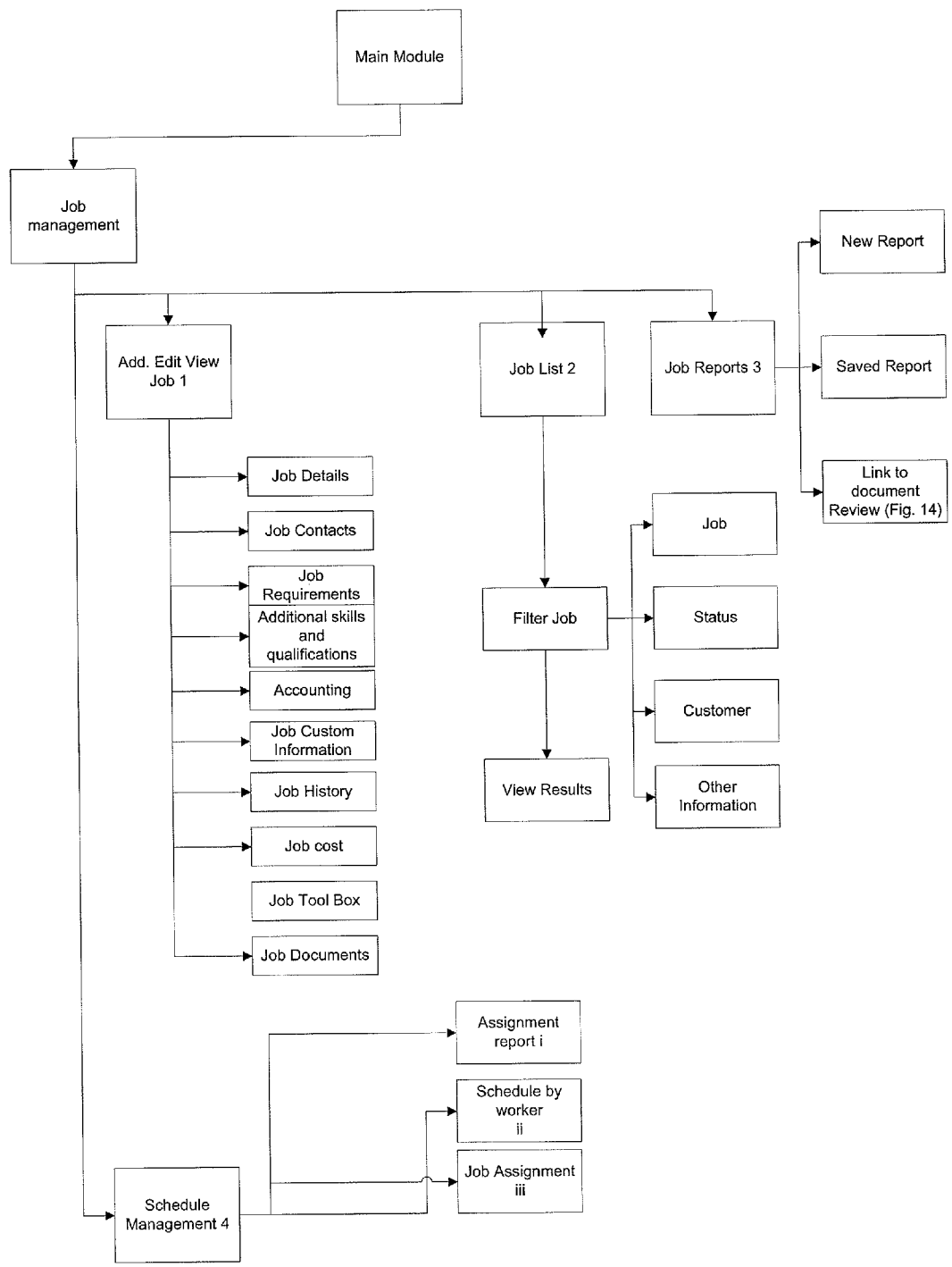
FIG. 23 is a block diagram of the sub-modules for a job management module in accordance with this embodiment of the present invention.

The job management module in this illustrative, non-limiting embodiment is broken into the following sub-modules, as shown in FIG. 23: 1) add, edit or view a job, 2) job list, 3)

job reports, and 4) schedule management. Each of these parts are described in further detail herein below.

1) Add New Job and Edit or View an Existing Job

Whether the user decides to add a new job, edit or just view an existing job, the information may be presented to the user in the following format: in one easy to use screen with a number of tabs, as shown in FIGS. 24A-J. This screen guides the user through the process so they will be reminded of the job site critical materials. The user can enter or view different job monitoring information, thereby taking full advantage of monitoring each job in relation to cost and progress.

To add a job, the system loads in customers stored in the database. The user then selects a customer and begins inputting information for the job. In particular, the information is organized in the following logical parts, as shown in FIG. 23: i) job details, ii) contacts iii) job requirements, iv) additional skills and qualifications, v) accounting, vi) job custom information, vii) job history, viii) job costs, ix) job tool box and x) job documents. The user may access each logical part by simply clicking on the corresponding tab, for example. Each one of these logical parts are described in further detail herein below.

i) Job Details

This logical part provides the general information about the job. The user can access this logical part, for example, by simply clicking on the corresponding tab and a new screen will be displayed showing the general information for this job, as shown in FIG. 24A. The user can simply view or edit the information or enter a new job. Job details may include the following general information about the job: a customer (which may be defaulted from prior screen selection), name of the job, address (address, city, zip code and state, the state field is especially critical since a number of work types are bound by state predefined regulatory requirements), directions and a link to Mapquest, site specific memo (specific site location for meetings), status of job (active, inactive, pending, or any other status type the user defines), number of workers requested, start date, end date, number of working days, timezone, start time and end time, lunch time, total standard shift hours and so on.

ii) Contacts

Figure 24B:
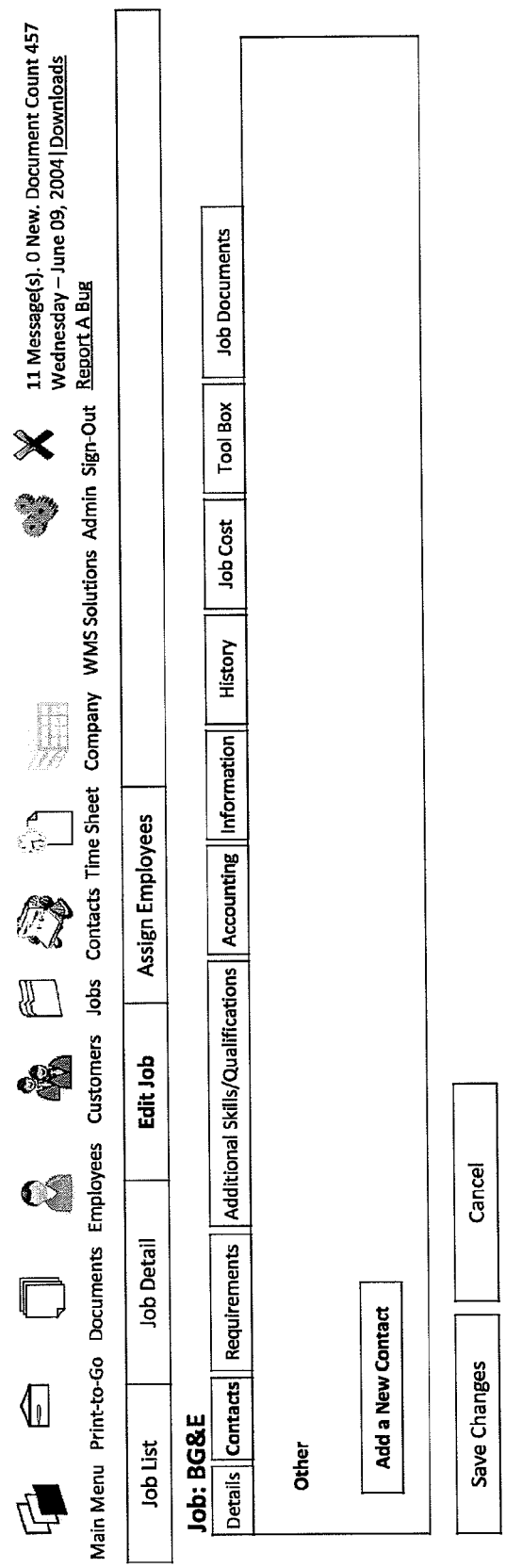

This logical part provides the contact information for the job. The user can access this logical part, for example, by simply clicking on the corresponding tab and a new screen will be displayed showing the contact information for this job, as shown in FIG. 24B. The user can simply view or edit the information or enter a new contact. Job contact may include the following information: contact type (manager, supervisor and so on, a new contact type can be added on the fly), name, phone numbers, fax, email and so on.

iii) Job Requirements

This logical part provides what work type is required for the job. The user can access this logical part, for example, by simply clicking on the corresponding tab and a new screen will be displayed showing the job requirements information, as shown in FIG. 24C. The user can simply view or edit the information or enter a new job requirement. Job requirements may include the following information: certified wage project ("Yes" or "No"), types of work grids (lists the predefined work types for that state), state initials, number of workers (unless it was already entered in the job details, then the number of workers will automatically be displayed on this screen), shift information, description of work, work type and so on. The work types chosen link directly to the predefined list of workers compensations, payroll tax and miscellaneous burden costs as well as the required documents and skills for each. In addition, the wages and billing rates predetermined for the customer, company or vendors with those work types can be applied here for reporting capabilities.

iv) Additional Skills and Qualifications

This logical part provides what required industry representations and skills are needed for the job. The user can access this logical part, for example, by simply clicking on the corresponding tab and a new screen will be displayed showing the required industry representations and skills for this job, as shown in FIG. 24D. The user can simply view or edit the information or enter a new skill or qualification. Additional skills and qualification may include the following information: required industry representations (required by the industry or the ones required by the company for this work), required skills (required by the industry (non-negotiable) and the ones required by the company (possibly negotiable)), level of the required skill (novice, expert, etc), and so on.

v) Accounting

Figure 24E:
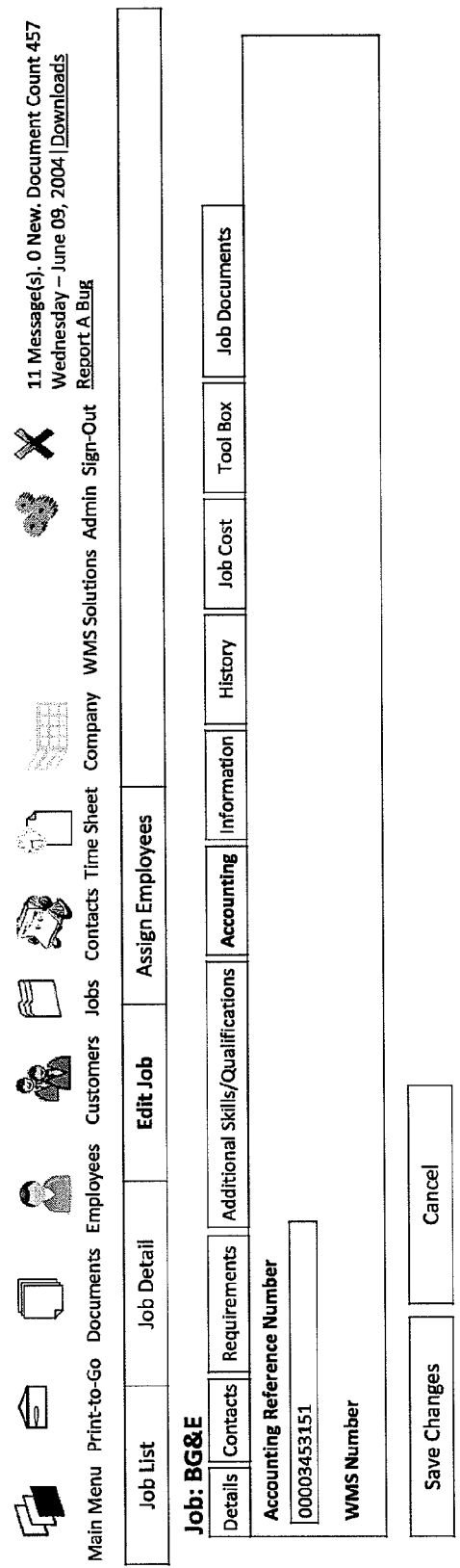

This logical part provides accounting information for the job. The user can access this logical part, for example, by simply clicking on the corresponding tab and a new screen will be displayed showing the accounting information for this job, as shown in FIG. 24E. The user can simply view or edit the information or enter a new accounting field. Accounting may include the following information: OT Bill Rate (enter by hour), number of workers requested (if this field is already entered in the previous screens then it is simply shown here, no duplicative data entry is needed), wage (budgeted pay rate for work type), fringe (budget fringe or travel for work type), accounting Reference Name/Number, purchase order information (memo field to handle multiple purchase order, total project hours (fixed number defined by user to manage job) and so on.

vi) Job Custom Information

Figure 24F:
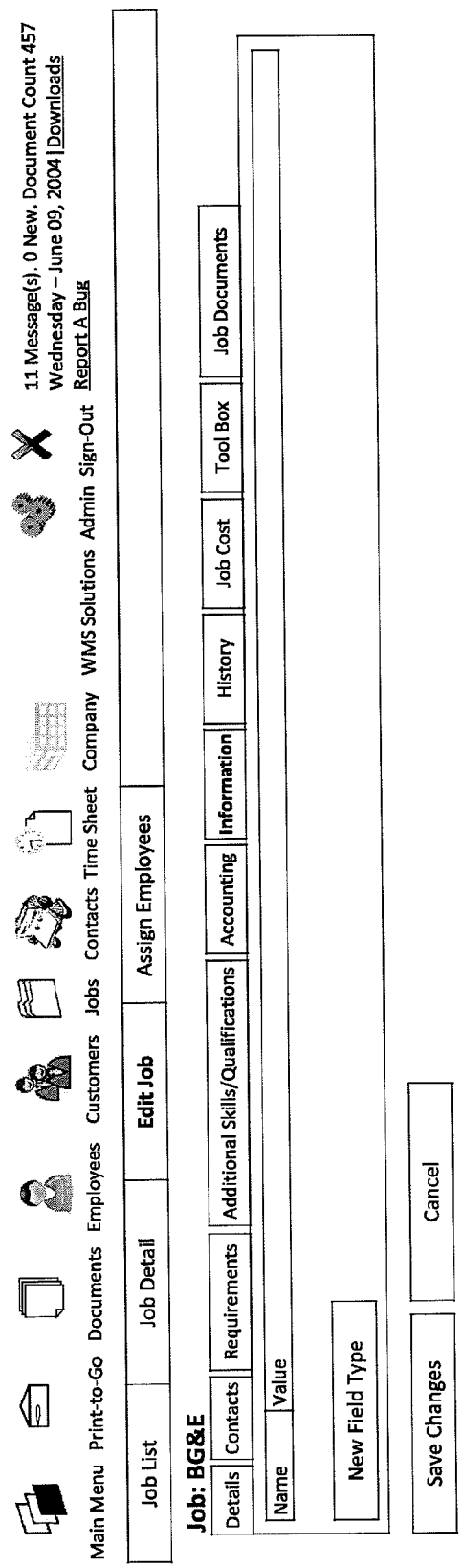

This logical part provides custom information for the job. The user can access this logical part, for example, by simply clicking on the corresponding tab and a new screen will be displayed showing the custom information for this job, as shown in FIG. 24F. The user can simply view or edit the information or enter a new custom field. Custom information includes user defined fields and values. These dynamic custom fields can be designed by the user to accept plain text, formatted text, numbers with no decimals, numbers with decimals, drop down lists, yes/no values and so on.

vii) Job History

This logical part provides history information for the job. The user can access this logical part, for example, by simply clicking on the corresponding tab and a new screen will be displayed showing the history of this job, as shown in FIG. 24G. The user can simply view or edit the information or enter a new job history information. Job history information includes: notes, worker compensation notes, scheduled worker history, payroll worker history and so on.

viii) Job Costs

Figure 24H:
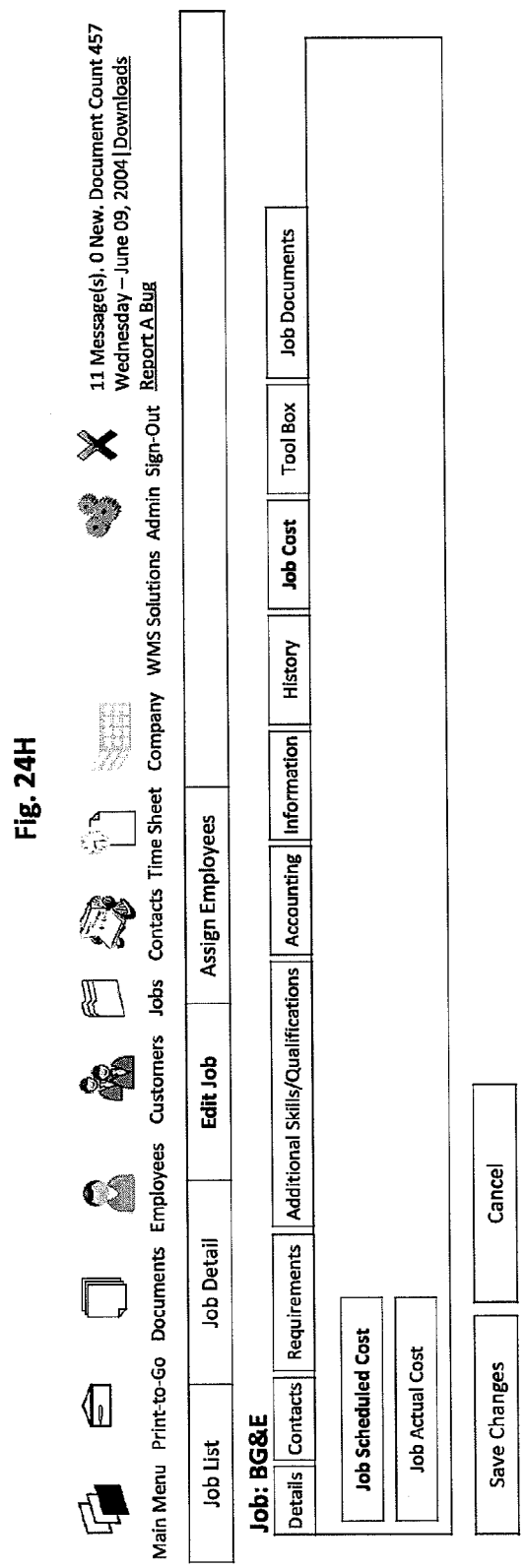

This logical part provides cost information for the job. The user can access this logical part, for example, by simply clicking on the corresponding tab and a new screen will be displayed showing the costs of this job, as shown in FIG. 24H. The user can simply view or edit the information or enter a new cost. Job cost information includes: job scheduled cost, job actual cost and so on. As a result, the actual cost of the job can accurately be analyzed and compared.

ix) Job Tool Box

This logical part provides the user with an ability to store job document groups for quick and easy printing, emailing, faxing, saving or information exchange, a document group may be called a binder. An example of a binder would be a job submittal in the construction industry. A job submittal is a group of documents that are required to be on file in order for a contractor to begin work. The templates for binders are set up in the Custom Document Group within the system administration. However, they can also be created via a pop up within this tab. In the job tool box, a user simply selects the binder template they wish to use. They then adjust it as necessary, including specific instances of documents and custom fields and removing others. They can then print, email, fax, save or information exchange that information.

The user can access this logical part, for example, by simply clicking on the corresponding tab and a new screen will be displayed showing the available binders for the job, as shown in FIG. 24I. If a binder has already been completed, it may appear with the following information: binder name, an information table (total document count, total page count, total field count), option table (with check boxes to include document history summary, page summaries, assigned record summaries, created info, updated info, file size), main table (with check boxes to include document class, document, type (history document or current), page count), view and information icon, buttons to show history of correspondences regarding the selected binder, to print, to fax, to email and so on. In addition, this exemplary logical part allows the user to store other forms of reports, e.g., Air Monitoring samples for the environmental contractors.

x) Job Documents

Figure 24J:
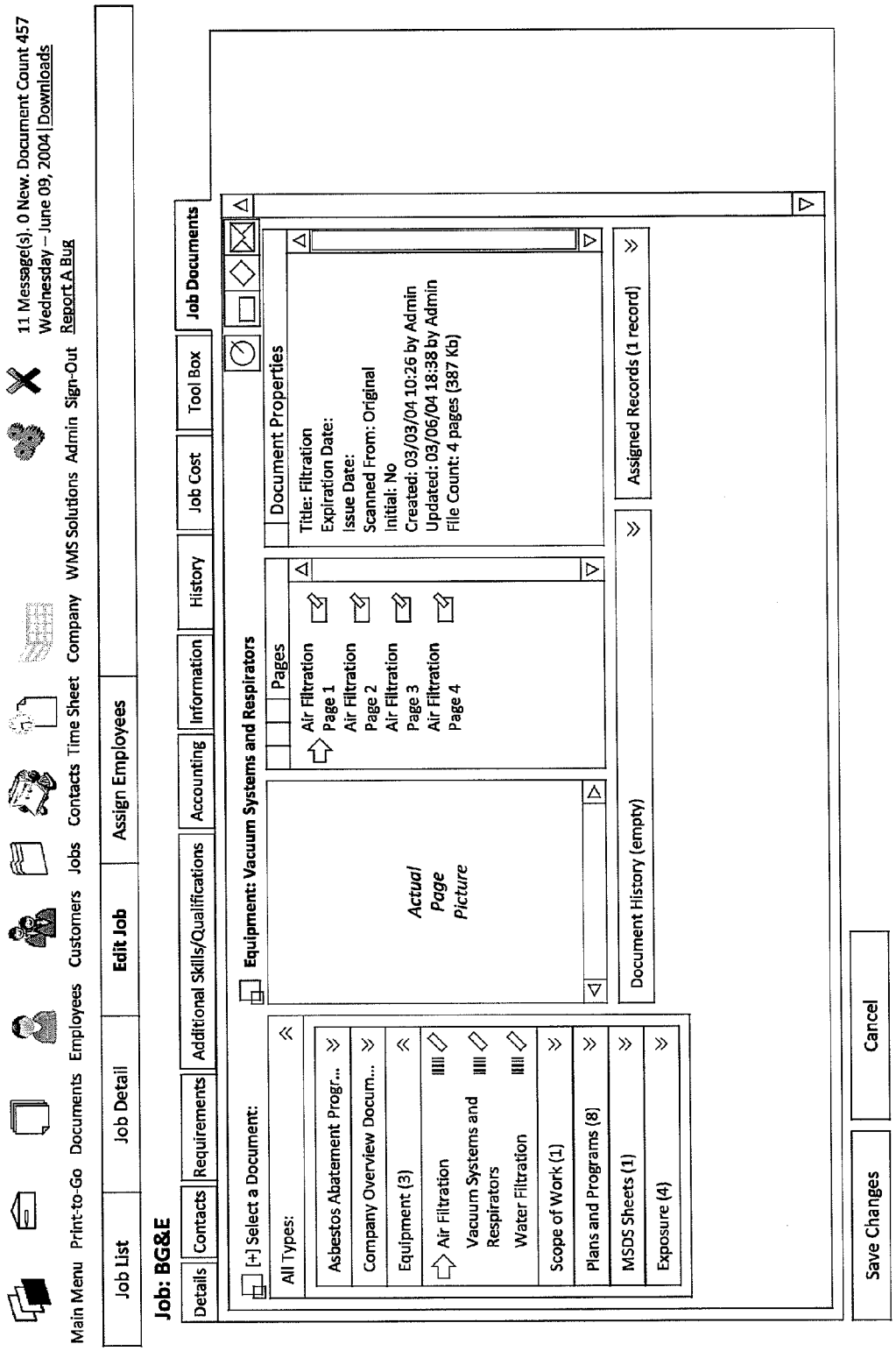

This logical part, which can be presented to the user in a screen, accessible via a corresponding tab, for example, allows users to add custom documents to their job file, as shown in FIG. 24J. A user can also associate existing documents to that job file, assign custom fields to documents and change the order in which those documents appear. Files of any kind can be uploaded in this logical part, not just images of documents, but MS Office files, PDFs and so on.

The screen for this logical part can appear as follows, e.g., see FIG. 24J. On the left hand column of each document type header, a small drop down menu can be presented. In this drop down menu, the user can select the following options: add new document, assign other documents, assign custom fields, resort documents, and so on. Below each document type header, a list of corresponding document classes can be presented.

The list can have several buttons, for example one to print a barcode for scanning and another to edit the document class. When a document class is selected, the following information may appear in the center of the screen: title of the document type, document class preceded by a button to add a new document, image of the first page of the document if it is an image file, otherwise an icon will appear representing the type of file, page table with information on each page and an icon to add new pages, document properties table (title, scanned from an original or a copy, initial document or a refresher), date and user who created the document, date and user who last updated the document, file count (page number and size), custom field names and values. The user has the ability to add additional pages on the fly and resort those pages by dragging and dropping them to the appropriate location. In addition, the user can upload different file types as the pages; one may be a .Tiff, a .gif, a .jpg, a .bmp, a .xls, .doc, .pdf or various other file types.

In addition to the document information, a table for document history may be shown with view/edit icon, title of the document, pages, whether it is the initial or the refresher and so on. Moreover, assigned records table including lists for the jobs, customers, workers or other items with which the document class is associated, may be presented. One of ordinary skill in the art will understand that other variations are possible.

2) Job List

This sub-module can be accessed by the user by simply clicking a corresponding button, for example see FIG. 25. The Job list provides a main menu containing the jobs list, as well as filters for customizing the job lists such as pending jobs or active jobs. From any one of these lists, a user can click on a particular job and drill down into that particular job's details.

The individual job list screens may be arranged as follows. The customer name is listed, with the ability to click on the customer and produce a pop up window of the customer for review, jobs are displayed for the user giving them access to view any job with a simple click, and several key facts are displayed about the job. Drilling down into any job enables the end user to easily view the status of the job, key labor cost of the job both scheduled and payroll, the number of men scheduled to each job and on what days, with a total man day count used to date.

The dynamic ability to capture work type, schedule information and calculate it against workers' wage rates enables the user to quickly and easily make business decisions. In the conventional systems, same information requires users to view several different screens and related numerous reports and several different methods of capturing data, such as information from a random excel sheet file and information from their accounting system and then being combined by the user to collect and understand the information. Users spend hundreds of hours a year creating and recreating these reports. In addition, these reports capture only the data for those instances, where up to date information can be displayed with this illustrative embodiment of the WMS.

By clicking on any job, a user will pull up separate tabs on the same screen for accessing the logical parts for this job described above (job details, contacts, job requirements, additional skills and qualifications, accounting, job custom information, job history, job costs, job tool box and job documents). Job list can be filtered by job status (all, active, inactive or other) or custom filters can be set.

Moreover, the list can display selected items based on user preferences. The user has the option to display the following job information on that screen: address, billing hours and type, break hours, budgeted rate, certified, contract number, daily start and end time, notes, site, state, zip code, total shift hours, wage, work description, number of workers requested and so on. One of ordinary skill in the art would readily recognize that other variations are possible.

In short, a job list is displayed to the user. The user may click on the job and will be provided with detailed information for the job organized in tabs discussed above. To edit the job, the user clicks on the edit button, and modifies and updates the information as necessary. Then, the user may simply click on a save button and the system stores changes made to the record and the job is displayed with the new updated information, e.g., see FIGS. 26 and 27.

Figure 26:
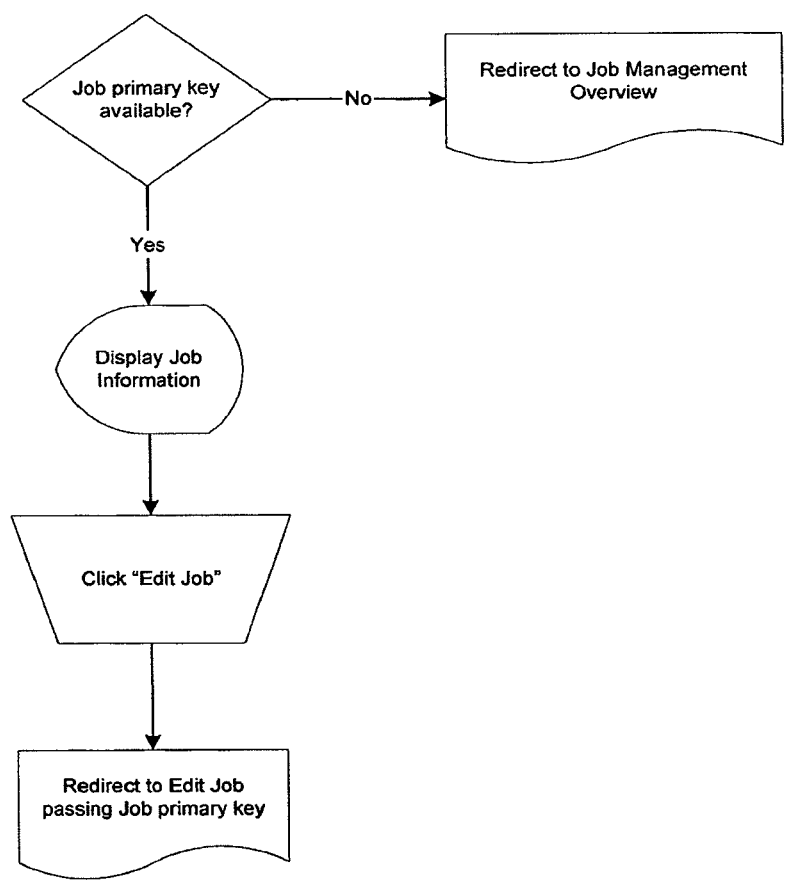
FIG. 26 is a flow chart diagram for viewing job information in accordance with this embodiment of the present invention.
Figure 27:
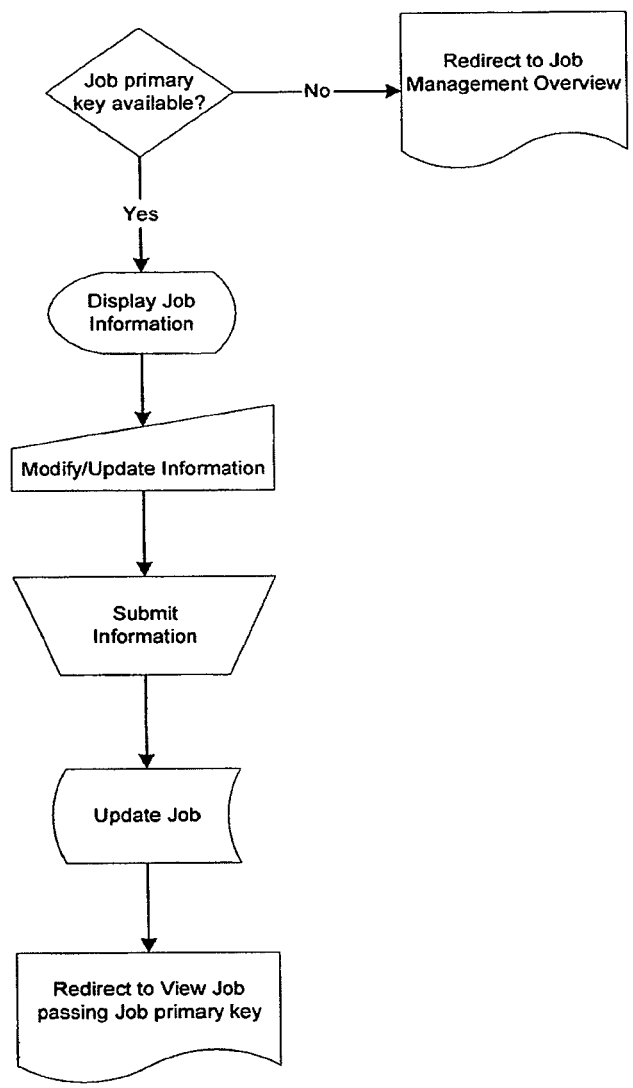
FIG. 27 is a flow chart diagram for editing job information in accordance with this embodiment of the present invention.

As illustrated in FIG. 26, the user enters a job key or job name and the system searches for the corresponding job in the database. If the key or name cannot be found, the list of the existing jobs is displayed. On the other hand, if job information is found it is displayed. The user may simply click on the "edit" button and they will be redirected to edit the information stored for a job. As illustrated in FIG. 27, the user modifies the stored job record, the information is updated by the system and then returned back to the system.

3) Job Reports

The Job Reports sub-module allows the user to create Custom Reports to better manage their business. The user can then save those reports as predefined reports to be viewed and edited at a later date. This added feature saves time for the user that can be better spent concentrating on their daily business. The job reports are somewhat similar to the worker reports except these reports are specifically generated for the job.

The user can dynamically generate reports from anywhere within the WMS system. By utilizing the report writer, the end user can identify fields within the database and build custom reports to meet their needs. The report wizard walks the end user through the process step by step insuring the integrity of the data and its relationships for distribution. In the event the user is unable to build a report, the end user has the ability to call the WMS document center for support or contract system partners to develop any type of report information they need. The report can then be saved. An example of a saved report could be a Worker History Report.

4) Schedule Management

This exemplary, non-limiting WMS Schedule Management sub-module allows the user to utilize one screen shot in a web based application to manage a worker in relation to his work schedule and the jobs on which he or she is qualified to work. This simple setup gives the user a one-screen view of their entire staff and resource allocation for the week. By selecting the worker, the user is given easy access to review the worker's file, edit the job assignment, and reassign a job. These methods and procedures for managing a worker's schedule save hundreds of keystrokes, eliminate time delays in jumping between job and worker screens, and give the user a snap shot of the entire resource allocation for a week at a time, for example. In addition, the user can view which users need to be scheduled for updates and which workers have been scheduled for updates. This exemplary, non-limiting embodiment of the schedule management includes the following logical parts, see FIG. 23: 1) assignment report, 2) schedule by worker, and 3) schedule by job (job assignment). Each of these exemplary, non-limiting logical parts are described in further detail herein below.

i) Assignment Report

Assignment Report logical part provides the user with one easy screen to view the jobs and the assigned workers to each of the jobs. The user can immediately view the number of workers required, number of workers scheduled and the name of the scheduled workers. For example, once the user selects assignment report, the system loads the customer, jobs and workers and displays a complete assignment report illustrated in FIG. 28. In particular, FIG. 28 shows assignment report weekly, the assignment report by client, sub-contractor or worker. Other variations are possible and are within the scope of the invention.

ii) Schedule by Job (Job Assignment)

The schedule by job (Job Assignment) logical part is a method to easily add workers to an active job. The Job Assignment enables the busiest user to easily and quickly add and remove workers from a job. The capabilities of having paper work association and job site cost are essential pieces of information for the user to better manage their time, productivity, and cost. By utilizing the Job Assignment, the user can view a list of customers and jobs, work types for that job, a complete list of workers in the system, along with a filter to narrow the list in one, easy to read screen. This allows the user to simply and easily select as many workers as they choose, assign them to a specific work type or default to general work, while viewing there eligibility to work on the job.

By utilizing Schedule by Job (Job Assignment), the details of assigning a worker to a job can be selected or the user can select the defaults, for example, by just clicking on the workers desired for the job and clicking assign. The list displays the workers' compliance for the job and work type on the job as well as overall company compliance via color coded icons that check for document expiration, missing documents, incomplete documents, missing skills and so on.

Figure 29A:
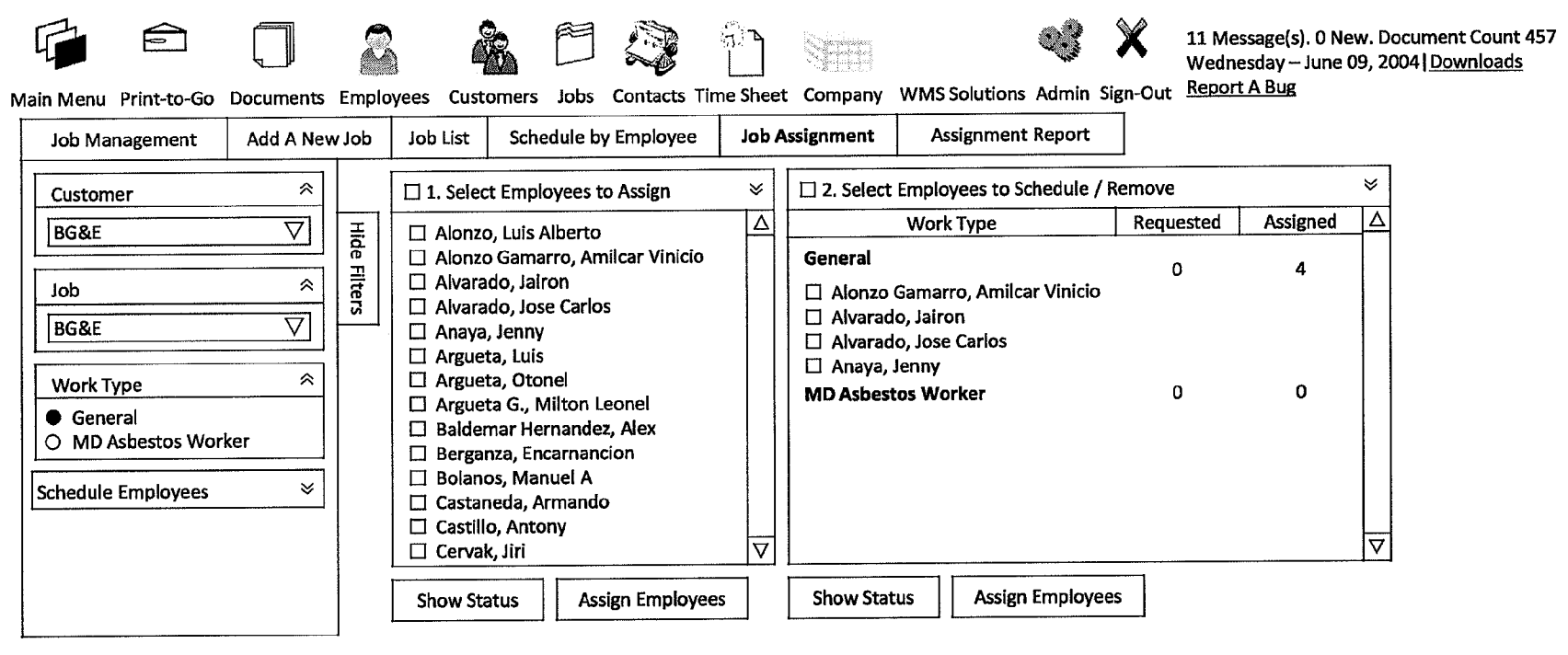

As illustrated in FIG. 29A, preceding each worker name are two icons. One icon represents the worker's compliance with regard to system wide requirements; the other symbolizes the workers compliance with regard to the job and work type requirements. To assign workers, the user simply selects the workers with a checkbox and clicks assign. The workers are now assigned to the job. As illustrated in FIG. 29A, to schedule the workers for specific dates, the user utilizes schedule to go or schedule by worker. After selecting to assign worker, the paper work required for the job is ready to print, email, fax or burn to CD/DVD. This logical piece is especially convenient for the busy end user who thinks they do not have the time to schedule workers to the job. The simple and quick process enables quick scheduling, and utilizes the abilities of Job-To-Go, which gives the user complete management over the documents required for meeting regulatory compliance. These exemplary features save time that would otherwise be spent performing a task twice in any other software system. The workers are assigned, the system knows who was assigned to the job and manages documents required for the jobs.

Schedule by Job (Job Assignment) allows job assignments to be made without the need to actually schedule a worker to a date range on a job. The job assignments can be filtered as follows. The user selects a customer from a drop down menu, then a job and work type, as illustrated in FIG. 29A.

Workers are listed in alphabetical order and preceded by a color coded icon, such as a hard hat or worker icon, representing their overall status and another color coded icon, such as a folder, representing their status as it applies to that job and whatever work type is selected. By clicking on the worker's icon or flagging multiple workers and clicking on the "show status button", details for the particular worker can be viewed. The details of the worker appear in a pop up window, informing the user immediately if any documents or skills are not in compliance for the job, work type and overall company compliance. The user selects one or more workers by, for example, checking the check boxes next to the workers and clicking on "assign" button. A list of assigned workers can appear on the right hand side of the screen by work type as illustrated in FIG. 29A. A filter is provided to show which workers have been made inactive on the job assignment. Workers can also be removed. In addition, the user can be alerted when he attempts to assign worker which lacks the required qualifications for a certain work type.

The Schedule By Job (Job Assignment) gives the end user the ability to easily assign workers to a Job File under the desired work type. This form allows the user to see the required work types, the number requested for each work type, the amount of workers filled for each work type and the cost associated with each work type. This information gives the user the ability to manage cost during scheduling. In the conventional systems, the users are required to run cost reports and analyze data after the fact, whereas in this illustrative, non-limiting embodiment, the user has real cost each time they schedule one or many workers.

For example, if a pool company has a pool cover to pull off a customer's pool and a high level technician is assigned to this job, the system, through smart alerts and the color coding, will notify the user that they are sending a $25.00 an hour worker to a job that requires a $10.00 an hour laborer. This allows the user to decide whether to move forward with their current decision or change the decision. The ability to use scheduling cost control provides the user instant information regarding the worker who has been assigned to a job.

The daily assignment form gives the user the ability to click on the work type to fill and have a list generated letting them know who is qualified to work on that job based on the requirements of that job. If the user needs more workers the user can simply select see the workers, this allows them to see the active workers, and the user can then select workers from their current staff. By creating this list, the user has the ability to view the status and any pending issues of a worker without leaving the screen. By rolling their mouse pointer over an icon the user can view what pending issues the worker has in relation to the job requirements, for example. The user can easily assign workers knowing workers status.

In addition, for the user to have security regarding the placement of unqualified workers, the user can enable the smart alerts for assignment. With the smart alerts activated, the user can have the ability to notify anyone within management that needs to be informed when a worker has been assigned to a job without the proper requirements. This notification can require an email with or without a written response from the user who assigned the worker. For example, if a worker has been assigned to drive a truck for a large delivery next week and the worker's driver's license is going to expire on the coming Monday prior to the delivery, the system would prompt the user letting them know they are assigning a worker to a job that requires a current driver's license, the user would be required to enter a message to his superior informing them of why they assigned the worker knowing this information. As soon as the worker is assigned, the supervisor who was scheduled to receive notification when this event occurs is immediately notified with a smart alert of their choosing.

Figure 29B:
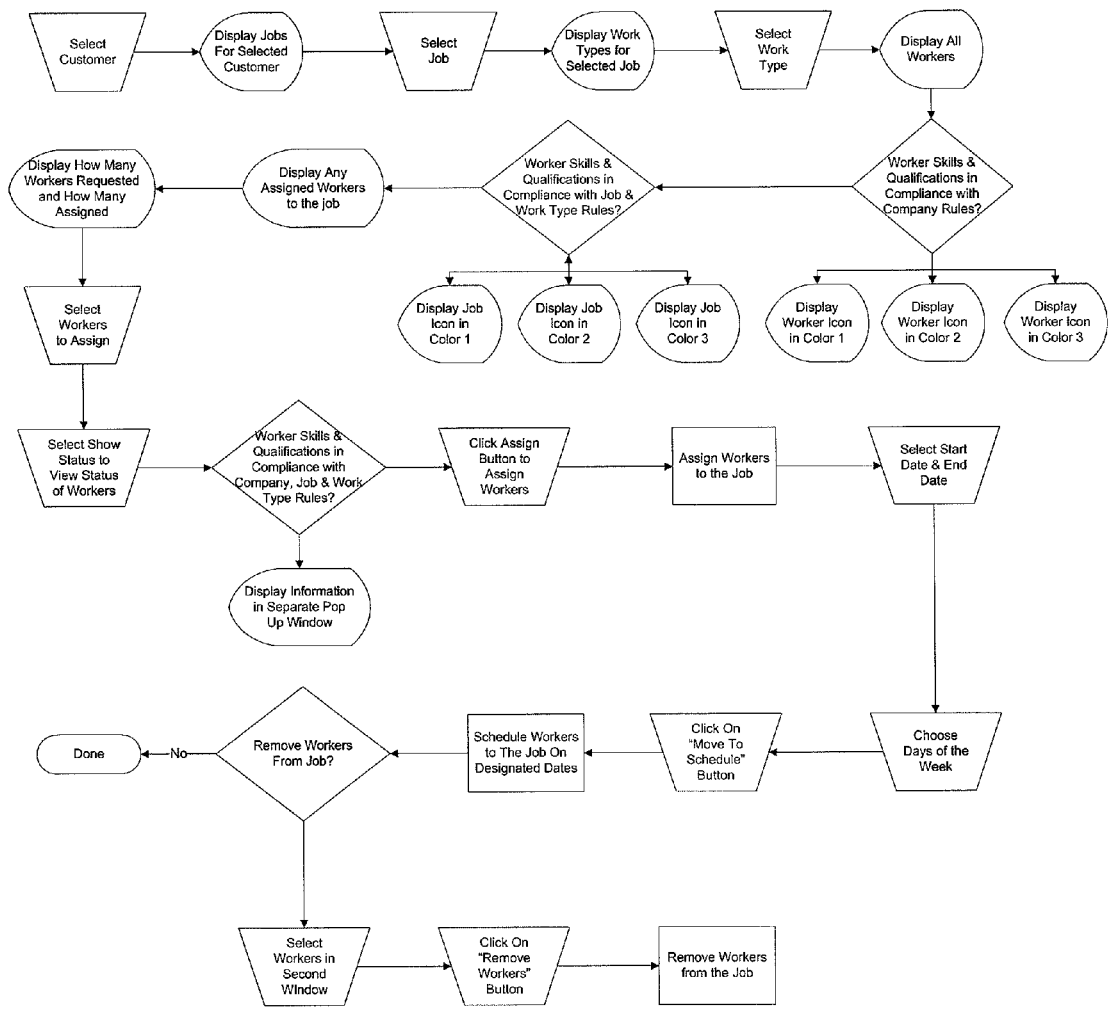
FIG. 29B is a flow chart for the job assignment in accordance with this embodiment of the present invention.

FIG. 29B illustrates the process of scheduling workers for a job. First the user selects customer and is provided with a list of job for that customer. Next the user selects a job and is provided with work type or types required for the selected job. The user then selects work type and a list of workers that may be color coded based on whether they meet the requirements for the job.

In particular, as illustrated in FIG. 29B, the system first checks if they comply with company requirements, then if they comply with job and work type rules. Based on these criteria, the workers are color coded. The system then displays the list of the assigned workers to the selected job and the number of workers required. The user then is provided with option to assign additional workers and to view the status of each worker they intent to assign. As illustrated in FIG. 29B, the user views workers to assign color coded based on whether they satisfy the skills and qualifications required for the company, job, and work type. The user than may assign the worker to a job. Once the worker is assigned to the job, the user may then select the start and end date for the worker to perform the job as illustrated in FIG. 29B. In particular, the worker may be scheduled at a particular days during the week, or for x amount of days every other week and so on. Also, the worker may be removed from the job by simply selecting the corresponding option.

The Schedule by Job gives actual and scheduled cost information by day. Each day an assignment is made the system accurately calculates the cost of the schedule and displays it within the job windows for review by the user. This function further enables the user to know the cost of the labor associated with the project. Specifically, the scheduling can be performed as follows. The user can view and manipulate a customer name, job name, status, workers requested to date, balance to fill today, workers scheduled by day of the week, labor cost scheduled, total man days scheduled to date.

iii) Schedule By Worker

The Schedule by Worker logical part is a dynamic tool, which enables the user to save hundreds of hours a year that would otherwise be spent figuring out who can work where. The Schedule by Worker allows the user to see their entire staff for the week, for example, in one snap shot, see FIG. 30A. The Schedule by Worker allows the user to review the worker's work week (in this particular example), identify through a color coded system the worker's schedule, showing overtime in one color, over booked on a single day by one color, and under booked by another color. The system totals the hours to show the total hours scheduled for the week. One of ordinary skill in the art understands that other variations are possible.

Each worker name has a cell underneath each day of the week. The cell has a total count of hours from the assigned jobs. The user can click on the calendar that is in each cell and run a search against the jobs in the system on which the worker is qualified to work. A list is then displayed with the number of workers requested for different jobs by work type; the user can then easily assign the worker to any job they want and close the window. Upon closing, the screen is refreshed, posting the worker to that job and showing the worker's day as filled. Within the pop up window, the user can assign that worker to a range of dates and specific jobs.

The user can also select the number in the cell and the jobs that the worker is scheduled to will pop up with an appropriate job information and schedule. The top of the page has a calendar that allows the user to move between weeks with ease. The Top of the page also has bars that allow the calendar to move left to right to see the week from Wed to Wed, while recalculating the hours of the time frame shown. Within the weekly form, the user can also request to see the jobs, which overrides the matching to determine where the worker could be scheduled as an exception to the standard job skills and qualifications. If the worker is placed on that job, a smart alert will be sent. This illustrative, non-limiting embodiment enables the user to easily view their staff, know who is working, assign workers easily to jobs on which they are qualified to work, and as an end result, the jobs are filled with qualified workers.

This solves the current day burden of figuring out who has been fully scheduled, who is qualified to work on certain projects and what projects need to be filled. This logical part allows scheduling in relation to the workers' availability, qualifications and skills, and the requirements associated with a job. The capabilities of these many management tools ensure the jobs have the best workers assigned to them and enable the end user to save hundreds of hours that may otherwise be wasted on scheduling and problems with overtime and under scheduling of workers. The color coding within the worker weekly schedule easily identifies the workers that are scheduled over a predefined daily hours and workers under the limit. This gives the user a quick reference to what the current workers' schedule is.

Smart scheduling allows the user to click on a worker who needs to be allocated to a job. The system automatically reviews the active jobs and reviews what jobs need workers according to the number requested. WMS returns a report to the user that shows the jobs in need of workers and for which the worker in question is qualified. If the user wants to see more jobs, the user can change the filter to see the active jobs the worker is qualified for or the active jobs. At that time the user can select a job and assign the worker to the job and perhaps, reassign another worker to a different job. Once complete, the user returns to the schedule form.

This logical part could be very useful to the Temporary Staffing Industry. A resource manager at a Temp Agency could easily utilize this tool to view their entire staff and easily check on pending jobs that need to be filled. Using WMS, the manager could constantly monitor their workers, job openings, and job qualifications to ensure that everyone who needs to be working is working and every open job is filled.

Moreover, a list of scheduled workers can be filtered by which job(s) has(have) been selected. Alternatively, the jobs can be viewed at one time, with the workers scheduled to those jobs appearing under each job with the number of hours they are scheduled for. Workers can be scheduled by viewing the entire workforce and clicking on each cell to schedule a worker to a job on that date. The user can also choose a group of workers, select jobs they are qualified for and schedule them to a date range on that job.

This exemplary Schedule by Workers logical part includes the following filters: calendar for selecting dates, worker status (check box), assignment status (radio button), customer drop down filter (select customers), job drop down filter (select jobs), work type drop down filter (select type(s) of work). Moreover, buttons for reassigning, rescheduling and removing a worker from the schedule may be provided. In addition, the screen for this logical part can list workers by job and work type and show time scheduled every day of the week, month or year.

In addition, column with a Flag Box for selecting employee, column with an employee number, last name, first name, days in the week and total may be provided. Cells for each day of the week containing number of hours scheduled and calendar pop ups may be provided. By clicking on hours will show the user where a worker is scheduled. Additional buttons such as a refresh button, week button, month button, job duration/annual button may be provided.

Figure 30B:
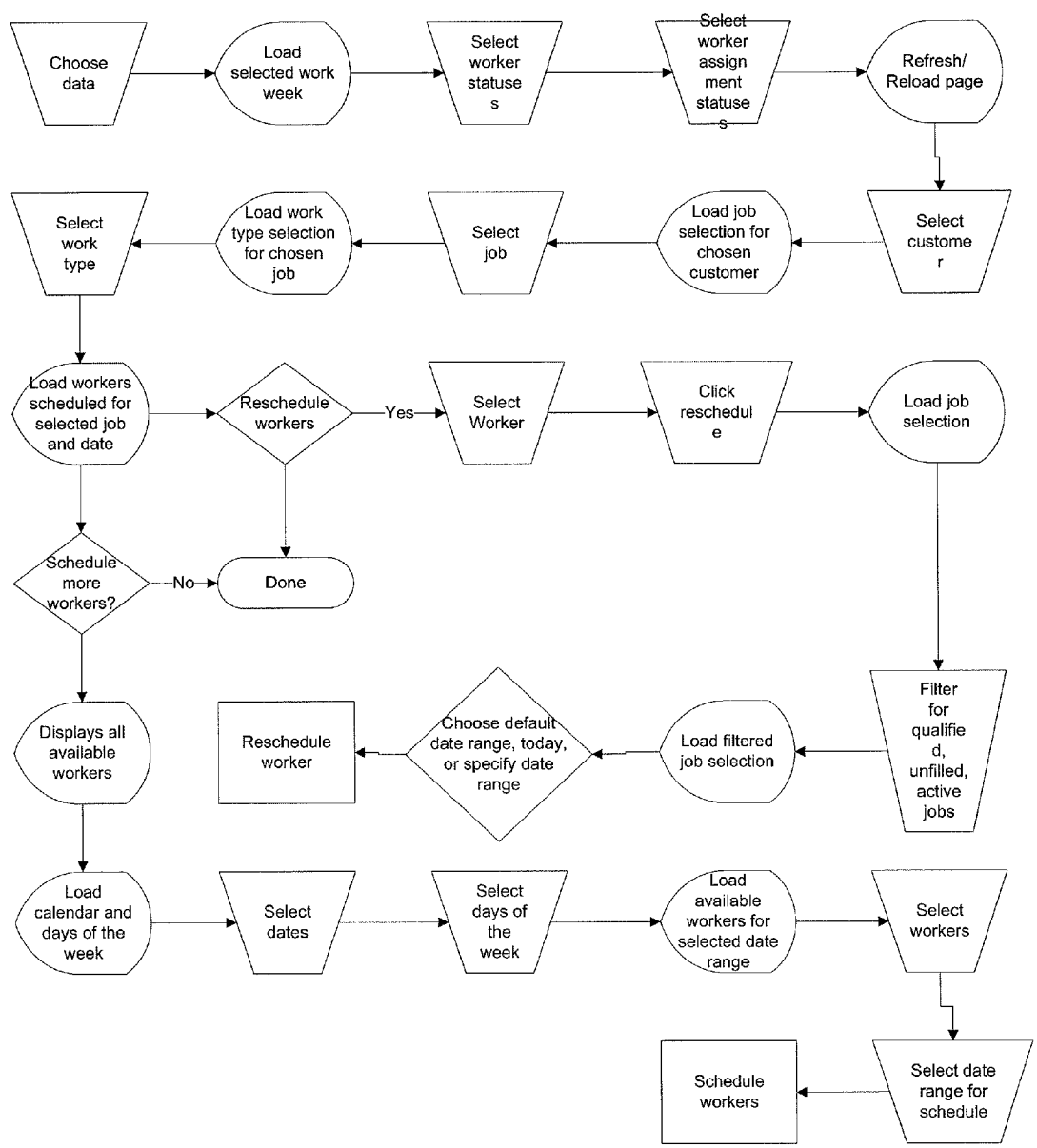
FIG. 30B is a flow chart for the scheduling by worker in accordance with this embodiment of the present invention.

In sum, the system provides the user with filters for selecting a customer, a job and a work type, as illustrated in FIG. 30A, thereafter with easy screen for viewing scheduling assignment, modifying them or scheduling a new worker, e.g., FIG. 30B. As illustrated in FIG. 30B, when the user initially loads the schedule by worker screen, all workers eligible for scheduling are loaded with their schedules for the current week. The screen offers the user many options for scheduling and viewing the schedules of their workforce. The user may filter the screen by selecting a specific date range he or she wishes to analyze. The user can also filter by worker status and assignment status, such as over or under assigned, which will look for workers with over or under 40 hours a week. The user can filter for a specific work type on a specific job with a specific customer. The user can reschedule workers by selecting the workers from the filtered schedule and clicking on the reschedule button. This will provide the user with a screen where the user can choose another job to which that worker should be scheduled for a specific date or date range. To add more workers to a job, the user would simply filter for the specific job in question and click on the show available workers button for a specific date range. They could then select workers from the returned list and select the date range for which they wish to schedule those workers and assign them.

D. Customer Management

Figure 31:
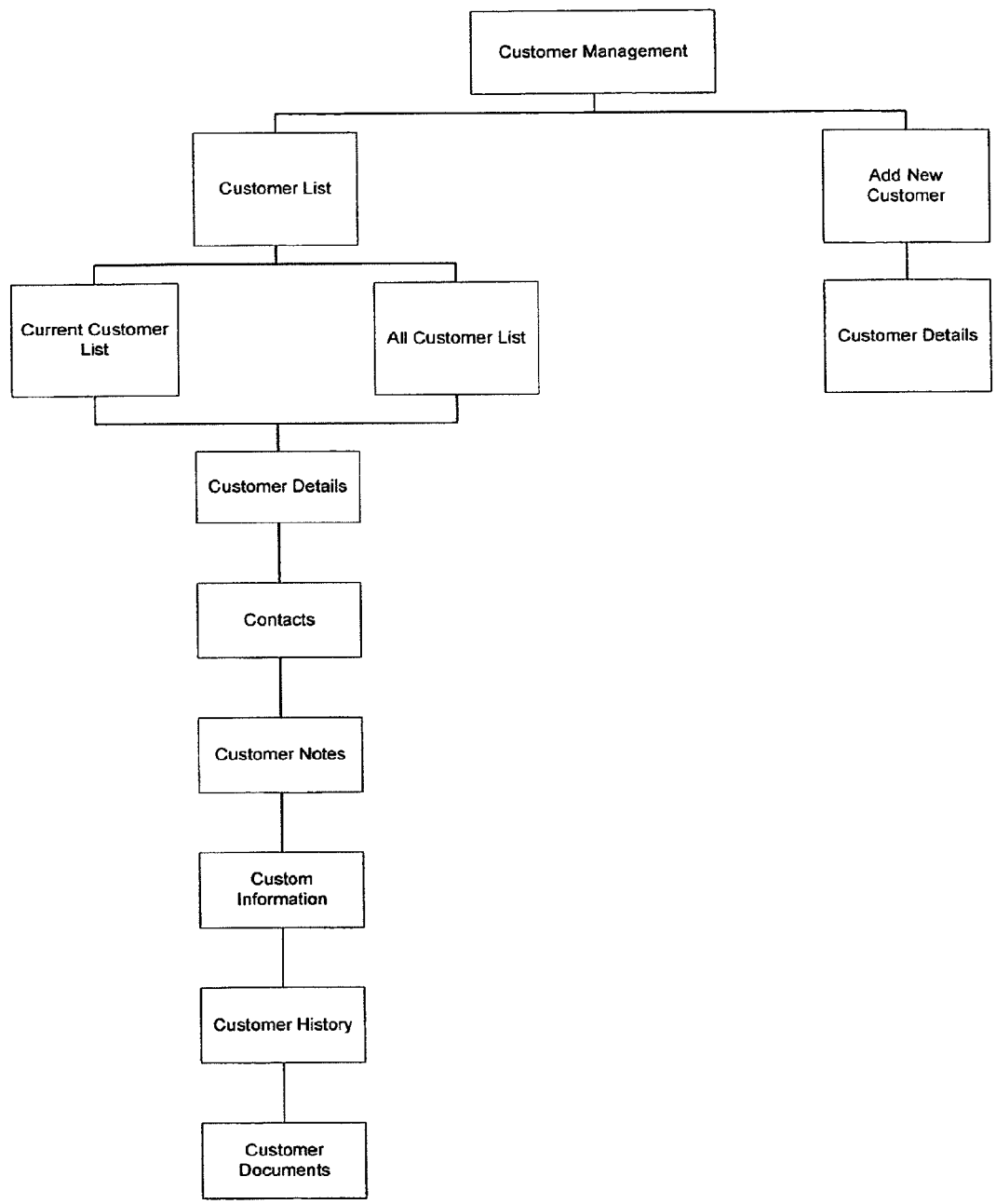
FIG. 31 is a block diagram of the sub-modules for a customer management module in accordance with this embodiment of the present invention.

The Customer Management module enables the user to capture the important information about a customer contact without having to use a secondary contact application. Customer Management module captures documents and key dates, sends email alerts and has date pop-ups when the user logs in. This gives the user the unique ability to manage the documents inside one system. It also allows the user to access the information from any web browser. The customer management provides a smooth easy to use method for managing new and existing customers, contacts and the relevant information. Customer management module may be split up into two sub-modules, see FIG. 31: 1) add new customer and 2) customer list. These exemplary sub-modules are described in further detail herein below.

1) Add a New Customer

The Add a New Customer sub-module captures customer data in one, easy to use form that includes details, documents and customized fields. For example, FIG. 32 illustrates an exemplary user interface for adding a new customer. In FIG. 32, the user may input customer group, name, address information, account number, status of the client and notes. The form allows the user to easily enter fields without the need to suffer from time delays of reloading screens. The user may capture documents for each customer according to the dynamically generating fields that allow the user to name documents, enter date references, enter numerical information from documents and enter text notes from documents. This information can then be used for tracking, searching and mathematical calculations. The user can also capture key contacts of customers, providing an easy way for the user to find important client contacts in one location.

WMS also allows the user to capture accounting information to set up easy synchronization between accounting packages such as Quick Books, Mas90 and Great Plains. This interface allows the user to have a single point of data entry. It permits the user to download the files into existing accounting systems for record keeping, billing, account reference numbers, payroll and others which will be linked as needed.

Additionally, the user can define and populate custom fields. These fields are dynamically generated for the user to be able to track information about their client and be reminded through pop-ups and email alerts. They are dynamically generated so any industry user can apply them to their specific needs.

Figure 33:
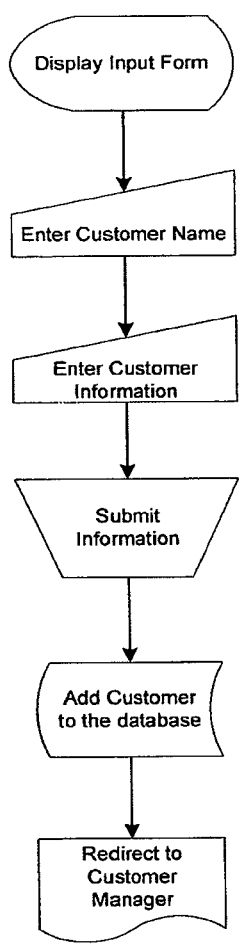
FIG. 33 is a flow chart diagram for adding a new customer into the worker management system in accordance with this embodiment of the present invention.

To add a new customer, the user may name or select customer group (general contractors, communications and so on), accounting reference name and number, name of customer, their address, phone, fax, status (a list of possible statuses may be defined by a system administrator), customer notes (dynamically created, the date and user is saved with each note) and so on. Once a customer is saved, the user can enter further detail on the customer in the edit current customer screen. FIG. 33 illustrates an exemplary process of adding a new customer to the system. In particular, the user enters client name, client information and submits the information to the system. The system automatically adds the client to the system's database.

2) Customer List

Figure 34:
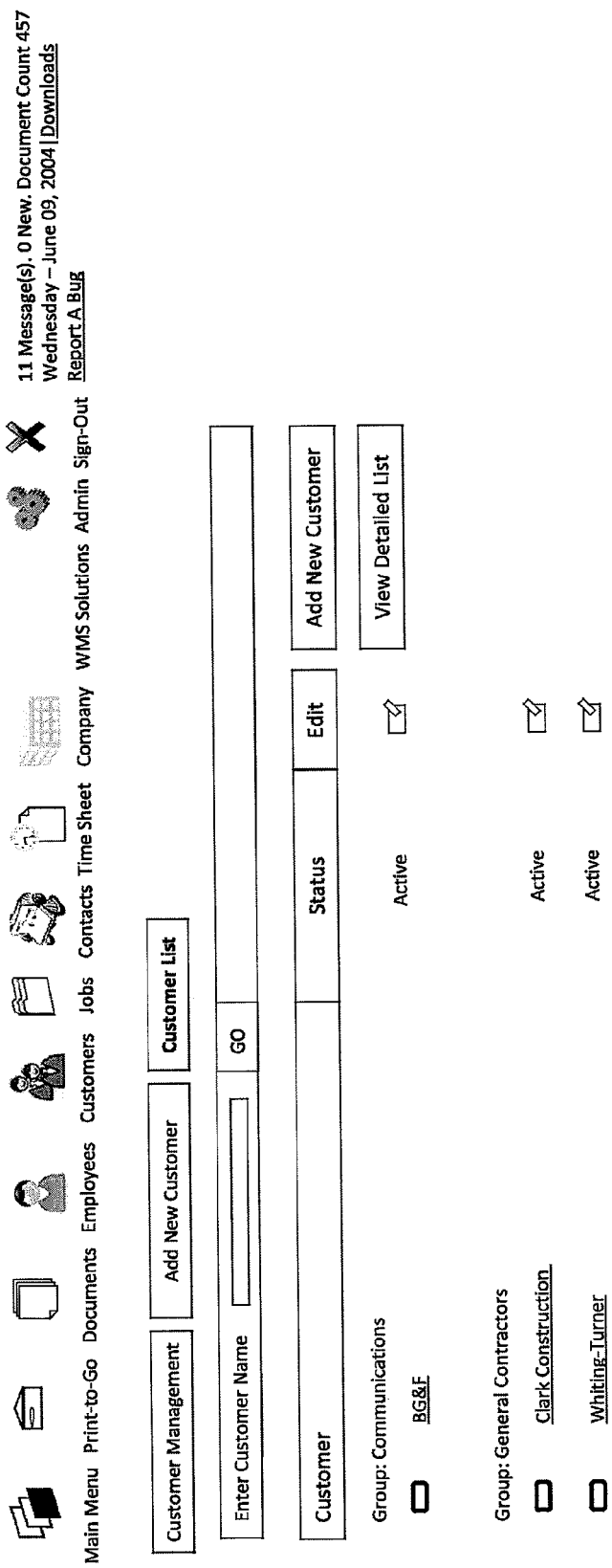
FIG. 34 is a GUI of the screen for viewing current customers in the worker management system in accordance with this embodiment of the present invention.

The customer list sub-module groups customers according to All Customers and a default customer status such as Current Customers. If a user clicks on All Customers, they will see a list of All Customers they have ever worked with as illustrated in FIG. 34. In addition, FIG. 34 illustrates the display of customer status for each customer and a simple icon for editing the customer. The customer list is categorized by customer groups as illustrated in FIG. 34. If the user selects Current Customers, a list of the Current Customers will appear. Once the user enters either selection, they can drill down into each customer by clicking on the customer name to view, edit or add to the fields included when the customer was originally added. For simplicity and ease of use, customer data may be grouped into the following logical parts, see FIG. 31: i) customer details, ii) customer contacts, iii) customer notes, iv) custom fields (customer information), v) customer history, and vi) customer documents. Each of these logical parts may be placed on individual tabs for easy maneuvering, see FIGS. 35A-F. For these logical parts, changes made to a customer can be saved by simply clicking a save button for example, similarly customer information can be reset or a certain edit can be canceled.

In particular, the following items may be listed for each customer: name, contact, phone and detailed information and so on. Moreover, the user can choose fields to display on this list based on individual user preferences. FIG. 34 includes a button titled "View Detailed List" which provides the user with additional filters by which the user may search and sort their Customers and includes preferences for viewing additional information on the list. The user can choose to display the following fields from the customer file on the list: accounting reference, contact name, phone numbers, addresses, fax, notes and so on. To drill down into the details of an individual customer, the user may simply click on the desired customer, as it is displayed under All Customers or Current Customers. In this illustrative, non-limiting embodiment, the details of an individual customer are provided in a screen with a number of tabs, each tab corresponding to the logical part listed above.

i) Customer Details

Figure 35A:
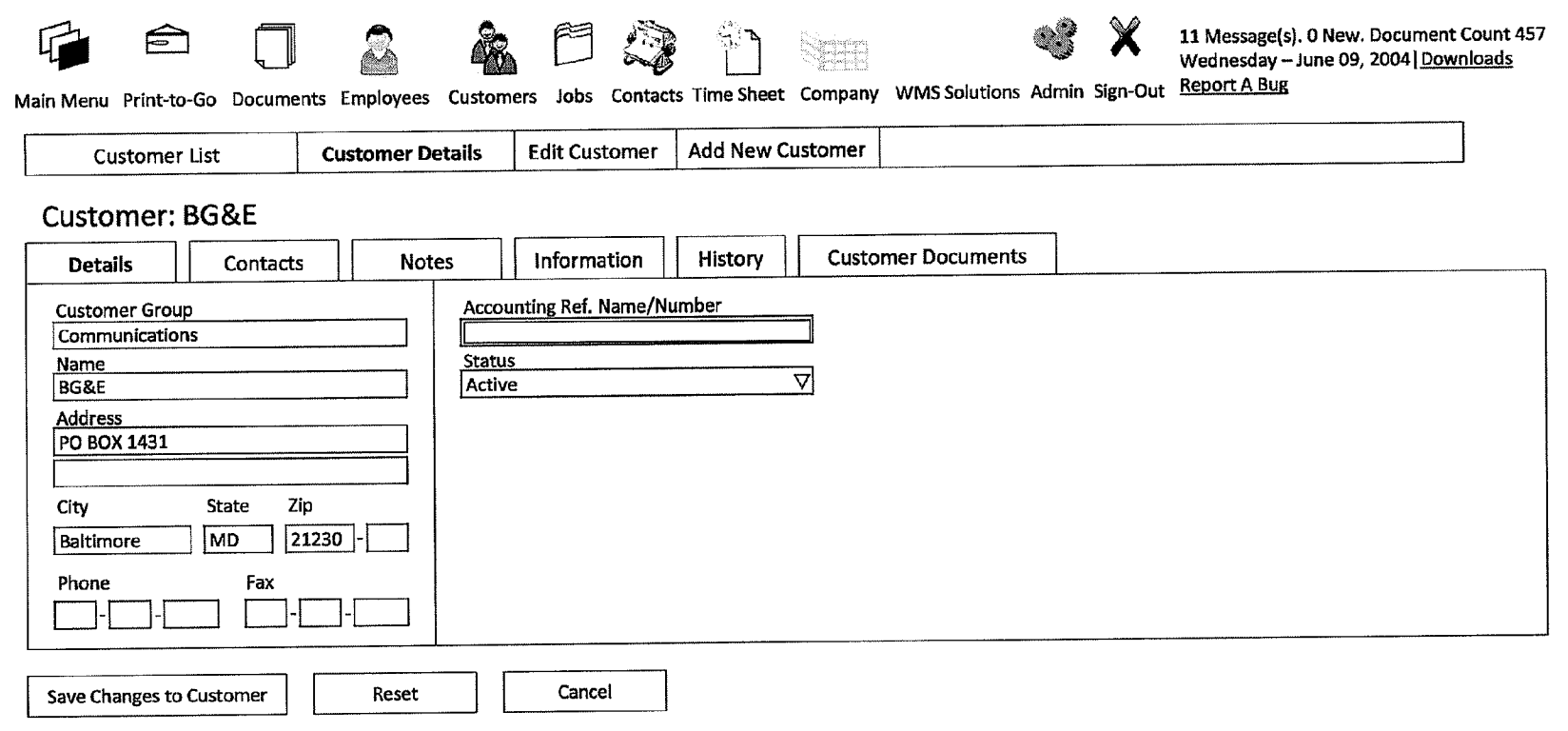

The customer details logical part displays general information about the customer such as name, address, phones, faxes, email address, accounting reference name and number, status, standard industry work reference field for tracking a customer and so on as illustrated in the exemplary user interface in FIG. 35A. This information may be edited on the fly by simply clicking an edit button, for example.

ii) Customer Contacts

The customer contacts logical part displays information about the people to contact for that customer. In particular, information such as contact's name, job title, company, address, phone number, email, status of the contact (whether the contact is primary or secondary contact) and so on can be provided, as illustrated in the exemplary user interface in FIG. 35B. Similar to the logical part above, this information may be edited on the fly by simply clicking an edit button, for example.

iii) Customer Notes

This logical part displays the notes or memos about the customer. For example, information such as whether the customer likes a particular manager or has requested that particular equipment be used in performing his jobs can be entered in the notes field, see FIG. 35C. In addition, the user can add new notes by simply clicking on the edit button, for example.

iv) Custom Fields or Customer Information

Figure 35B:
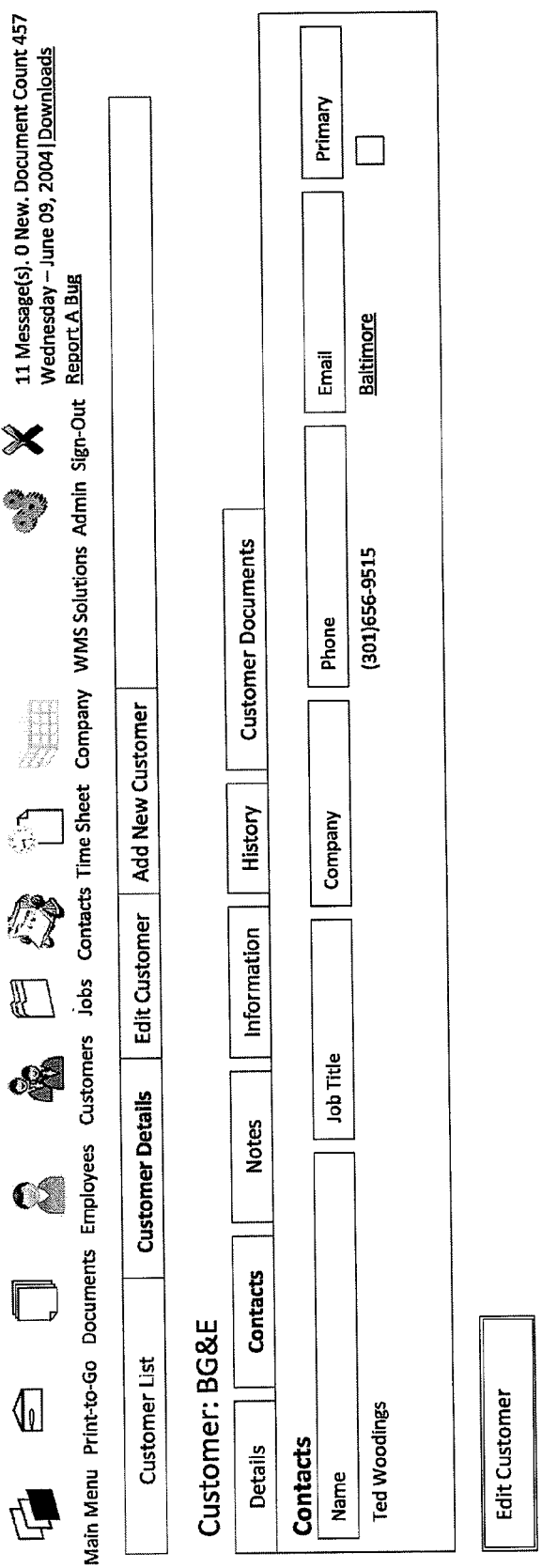
FIGS. 35 A-F are GUIs for viewing and editing information about a customer in accordance with this embodiment of the present invention.
Figure 35C:
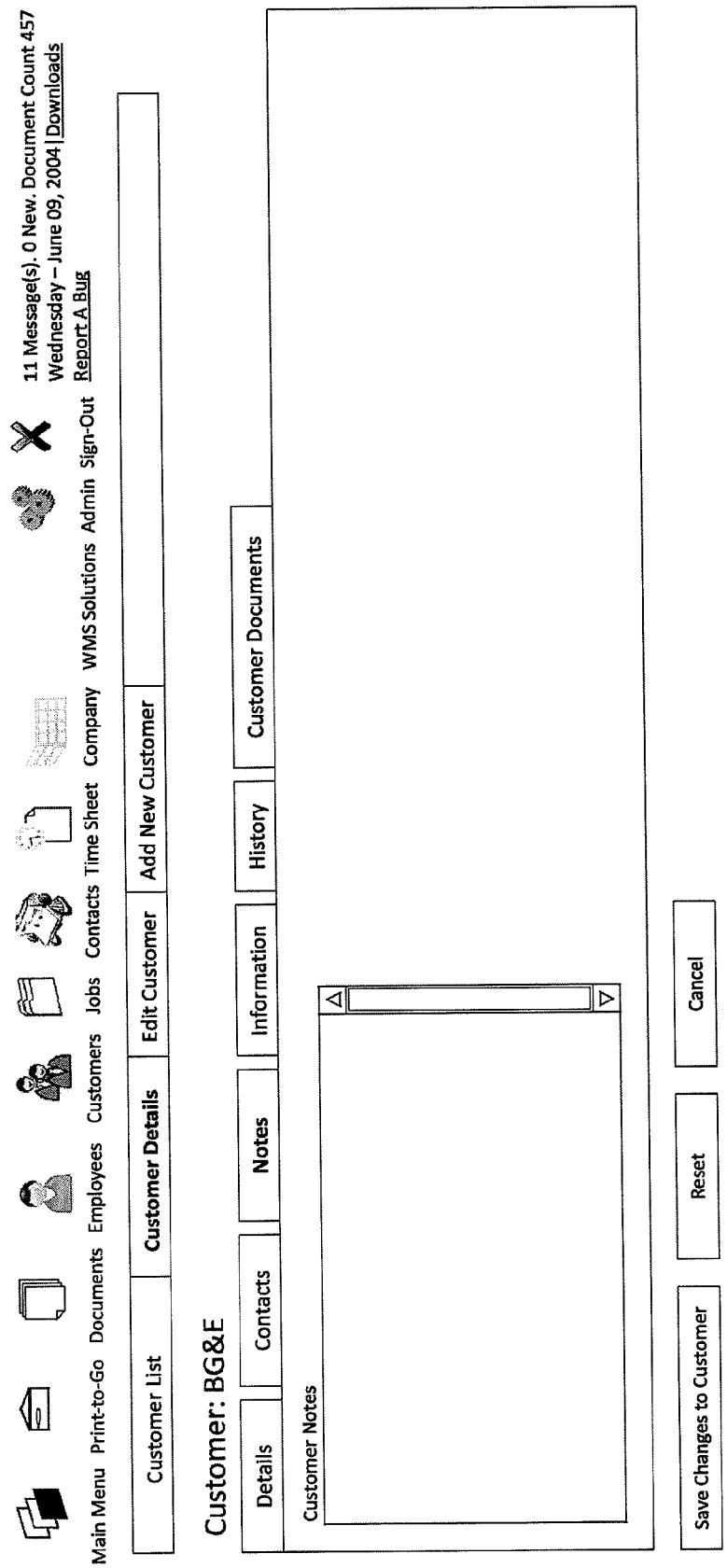
Figure 35D:
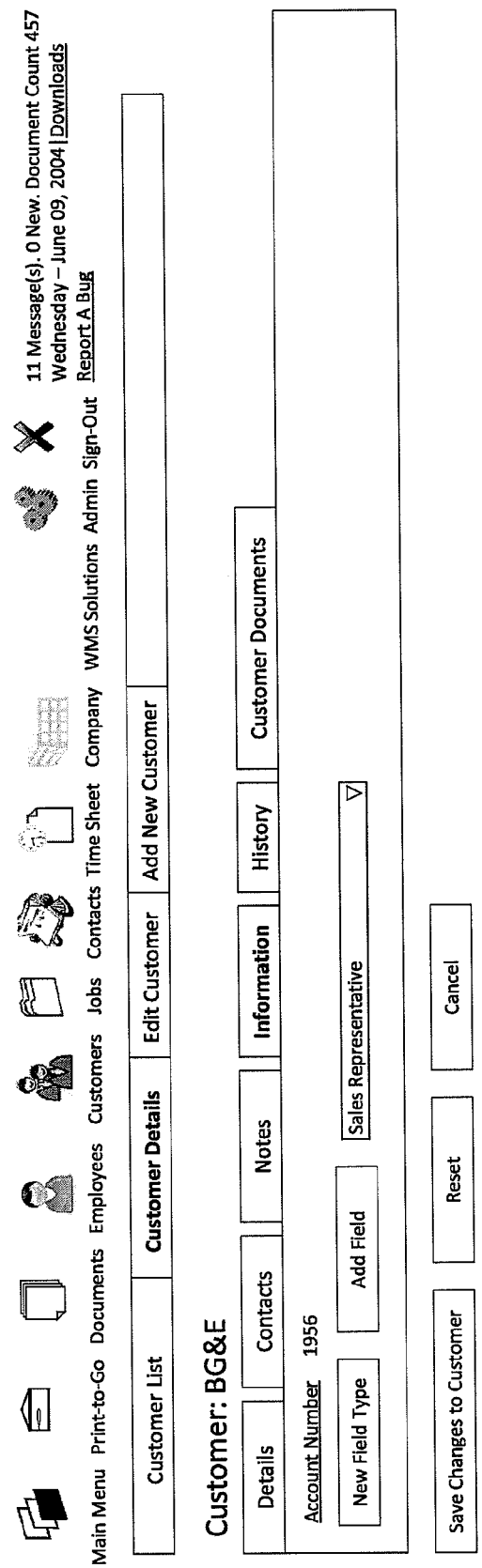

Custom fields or customer information is a completely customizable logical part. In particular, it allows the user to store custom field names and custom field values. For example, FIG. 35D illustrates adding the custom field "Sales Representative" as well as an already existing custom field "account number". In addition to adding new fields, the user is able to create new field types as illustrated in FIG. 35D.

v) Customer History

This logical part may provide cost information for the customer. For example, instead reviewing and/or billing the customer by jobs, a customer may be billed in one bill for the jobs performed for this customer. In addition, the user can review the information about the customer such as total hours of work provided, wage, travel/fringe, total labor costs, margin and so on. As illustrated in FIG. 35E, the Customer History logical part provides the user with the ability to evaluate the profitability of the customer. For example, if two customers requests workers for certain jobs and the company cannot meet the demand of both customers, then the company can quickly review customer information and provide workers for a regular customer as opposed to the one that only provides occasional work.

vi) Customer Documents

Figure 35F:
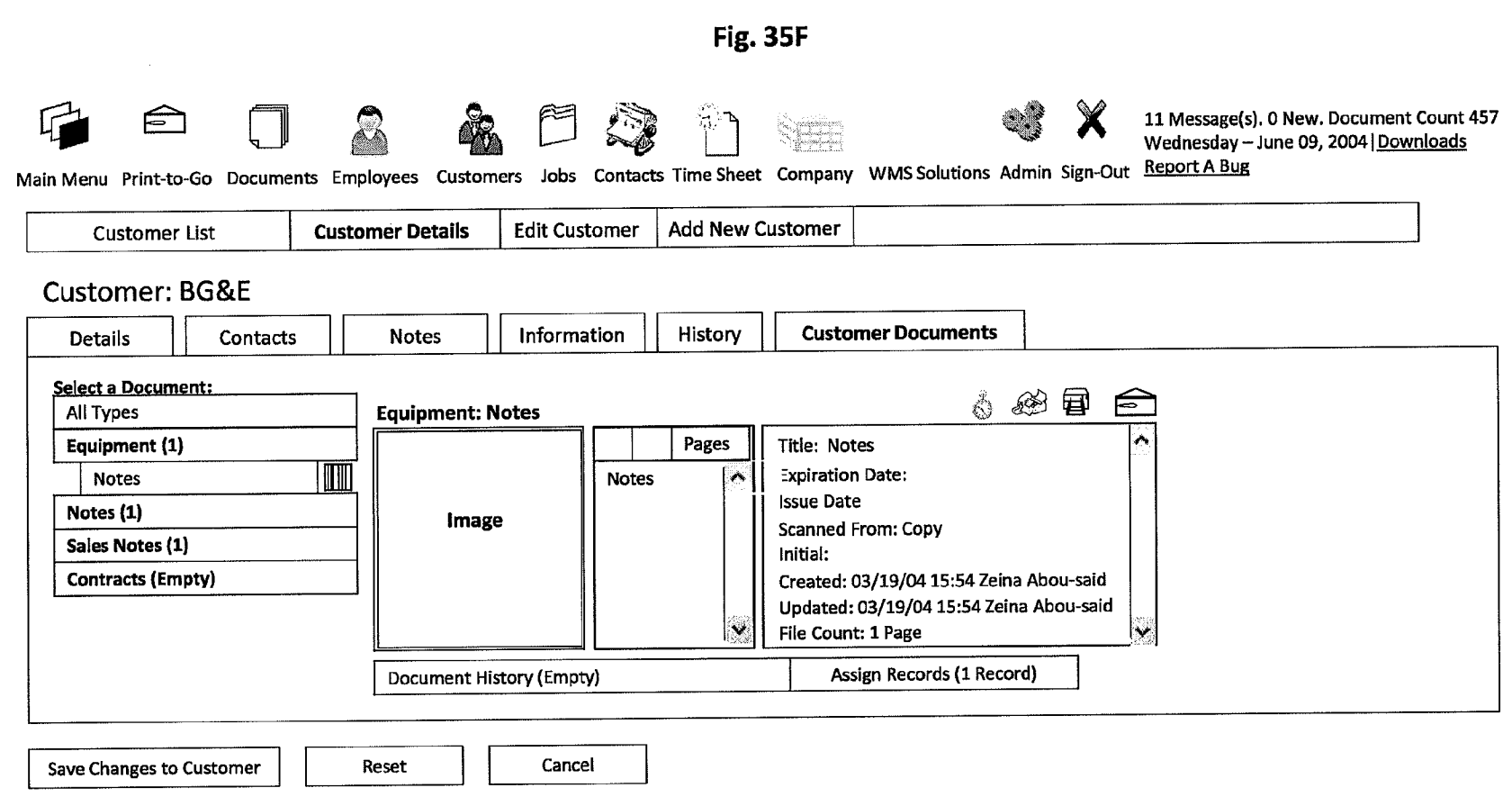

In this logical part, the documents can be grouped by group documents name for customers. A screen illustrated in FIG. 35F shows name of document, date of upload, download, keywords, notes and so on can be provided for documents related to a customer. The functionality of this logical part is somewhat similar to job documents and miscellaneous worker documents described above, except that this logical part applies to customers.

The following document types may be particularly relevant to the customer: equipment requirement, sales notes, contact documents and so on. The customer document logical part allows the user to add any type or format of document and assign it to any selected customer. This dynamic method of creating fields on the fly enables the user to capture as much information as required and store it electronically. This logical part also allows users to retrieve or review the information from any web browser. WMS system may also provide a 24/7 monitoring and daily backups to ensure that the documents are secured and restorable. Customer documents logical part enables the user to have their documents for a client, a job, or any purpose located in a single place. Documents can be uploaded through a simple intuitive web based wizard (upload system) or by forwarding documents to WMS's 24 hours Document Center. By digitizing documents the user is able to have any documents available for each customer at anytime.

The customer document logical part allows the user to list the customers in a drop down tree that will then show a list of the customer's documents on file. The list shows the name of the documents individually and by groups of documents, the date entered, a key word field, and status of document, giving the user a quick reference and rapid access to the document they are seeking. With this sub-module, the user will save time looking for contracts, work orders, etc.

All documents can be attached to invoices/reports to meet customer contractual requirements. Forms can be loaded with digital signatures for disbursement with invoices or other correspondence. The documents can be grouped and dispatched via printing, email or fax. Users can also create customized "Document Groups" by simply checking the flag boxes next to the documents they wish to include. This would enable the end user to create customized groups of documents for distribution or review. The save key allows groups to be created on the fly. The group can then be used to print, fax or email groups of documents with one request.

The customer documents logical part allows the end user to group documents to be disbursed. This is similar to grouping a work type, in that it allows the user to predefine groups of documents, and allows the user to easily dispatch documents without having to set up numerous print runs. The group documents function allows the user to click on the flag box of documents, creating a filter. Once filtered, a document relationship is created and those documents are saved as a group. The user will be prompted to name and save the group and a new custom document report will be created. When that report is referenced, the documents in the group will be listed showing what documents are in the group.

Figure 36:
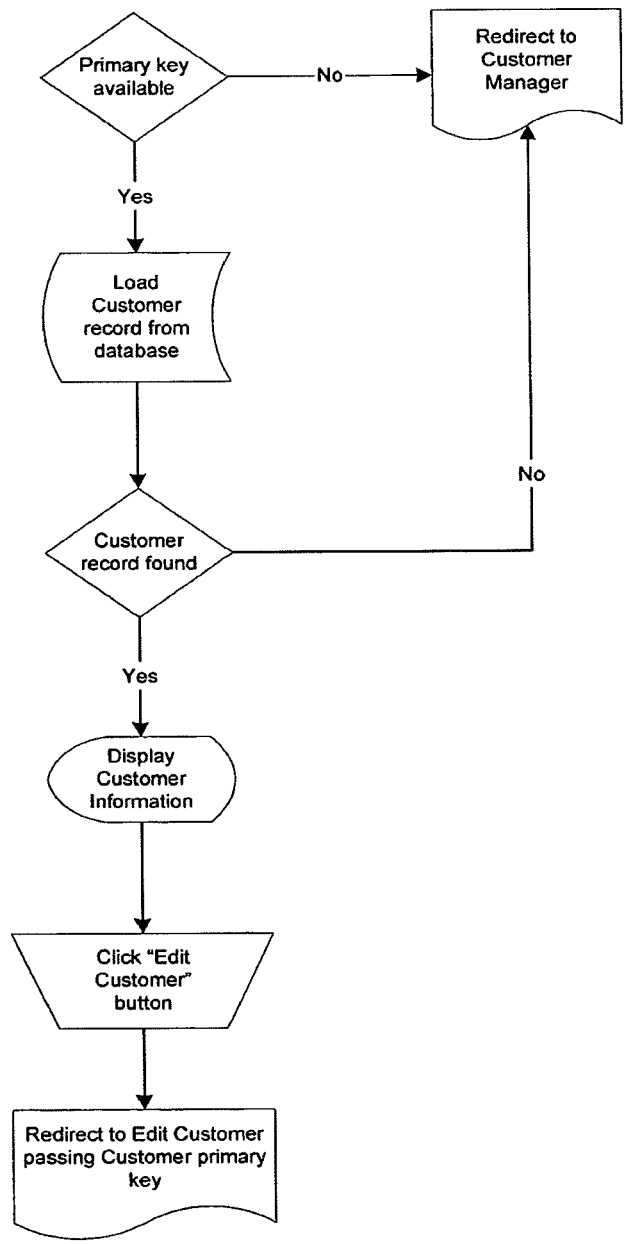
FIG. 36 is a flow chart diagram for viewing customer information for a customer selected from a list of customers in accordance with this embodiment of the present invention.
Figure 37:
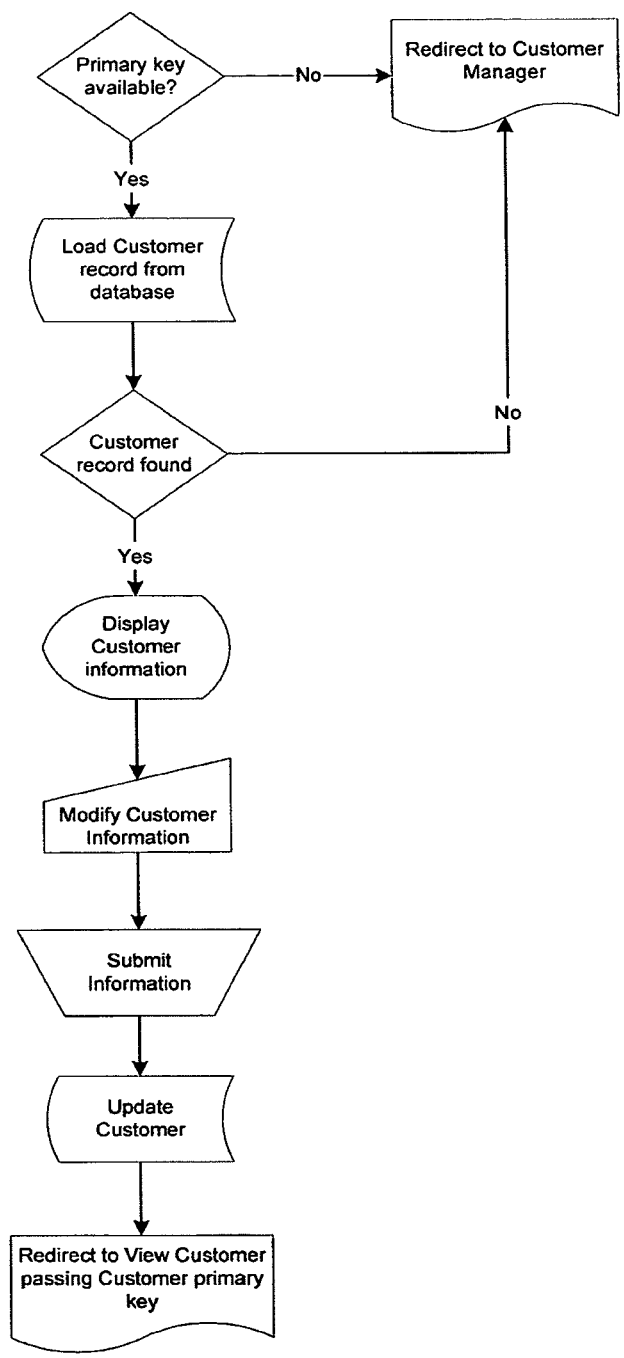
FIG. 37 is a flow chart diagram for editing customer information for a customer selected from a list of customers in accordance with this embodiment of the present invention.

In sum, the customer information can be viewed by simply clicking on the desired customer. The client information is loaded from the database and is displayed for the user as illustrated in FIG. 36. When the user wishes to edit this information, the user simply clicks on an edit button, and is redirected to an edit screen as illustrated in FIG. 36. FIG. 37 illustrates the process for modifying information. The user modifies the information, clicks submit and the changes are uploaded into the database. The screen is refreshed reflecting changes made by the user as illustrated FIG. 37.

E. System Administrator

The System Administrator piece of WMS allows the user to customize the software for their needs. The user begins by completing a Master Form or entering the Administrative Setup function and completing each requirement separately. They can then use the Work Type Setup to create dynamic fields for Types of Work to be used throughout the system. From the Administrative Setup menu the user can also adjust the cost details, tweaking features such as Payroll Tax, Accounts, Miscellaneous Burdens and Worker's Compensation. In this illustrative, non-limiting embodiment, the system administrator module is split up into the following sub-modules, see FIG. 38: 1) user accounts management, 2) document/skills setup, 3) administrative setup, 4) accounting setup, 5) security grid, and 6) work type list management. Each of these exemplary sub-modules are described in further detail herein below.

1) User Accounts Management

Account Setup is a simple to use function that enables the user to manage users and security for WMS. The WMS security is robust and utilizes different technology for securing the software. The Account Setup screen gives the user a simple interface to setup up the user and administrative data for their account access. In particular, this exemplary, non-limiting sub-module is split into three logical parts, FIG. 38: i) user accounts, ii) user account types, and iii) verification levels. In the user accounts logical part, as illustrated in FIG. 39A, the administrator or user simply sets up account name, user name, email address, and a password. In the user account types logical part, see FIG. 39B, the type of user account can be set up. For example, as illustrated in FIG. 39B, the user may set the account type to "admin," "general," or "owner". In particular, the user account types logical part may provide a screen with a list of names for the account types (human resources, management, CEO, etc). When the user clicks on a name of an account type a small window may pop up and the user can edit the following information for this account type: name, description, default verification level and so on. The account type will provide a default verification level for the accounts of that account type. In addition, the user may add a new account type as illustrated in FIG. 39B. Also, the exemplary screen in FIG. 39B provides the user with a count of the number of accounts for each type of account.

Figure 39B:
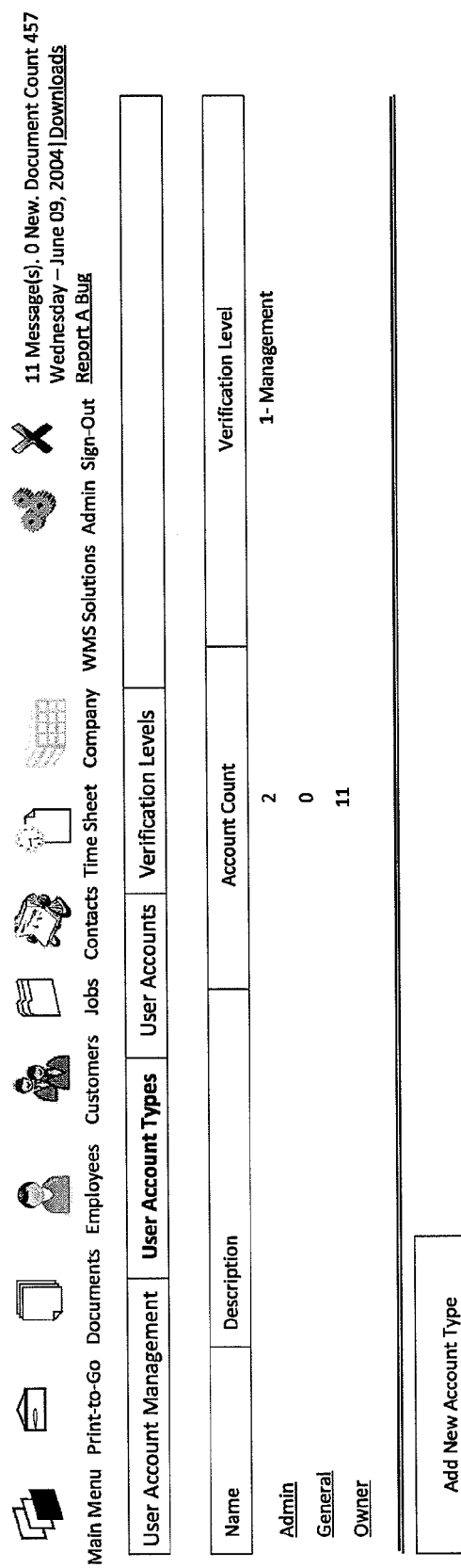
Figure 39C:
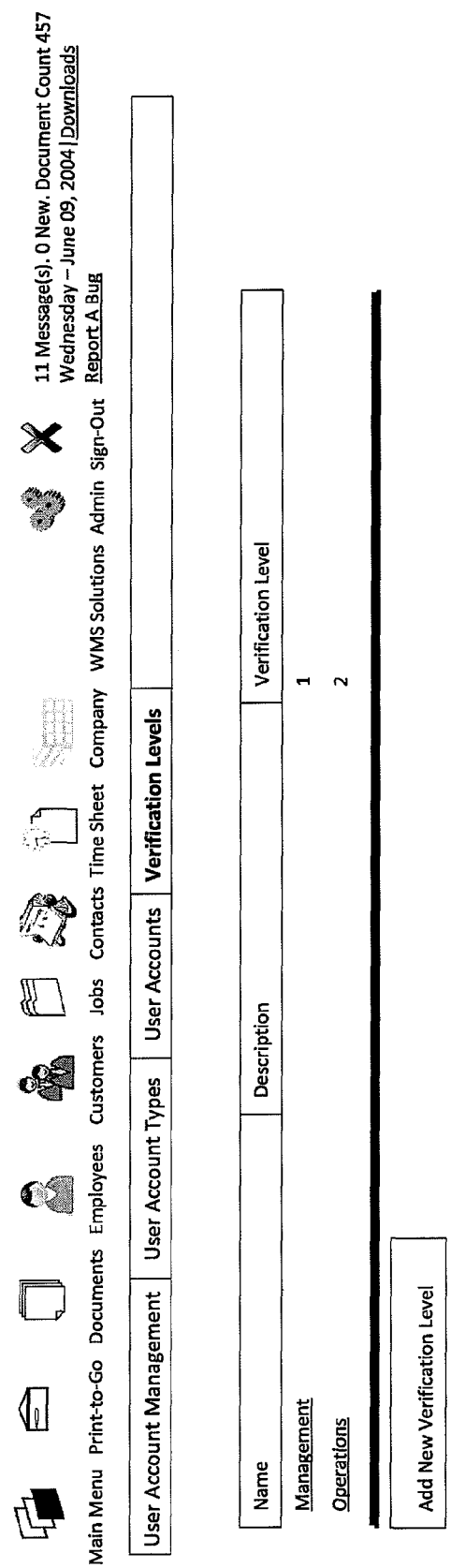

In the third logical part, verification levels are set up as illustrated in FIG. 39C. This allows certain users to verify certain documents. To setup verification levels, a screen with the list of names for various verification levels may be provided. By clicking on the name of a particular verification level, a small window may pop up providing the following information for this particular verification level: name, description, level, check image rights (e.g., a check box), check expiration rights (e.g., a check box), verify document rights (a check box), access rights (e.g., a drop down menu to set my level only, top-down or all), delete manual notes rights (e.g., a check box), add attachments rights (e.g., a check box), select notes for dispatch rights, and so on. The greater the numeric value of the verification level, the greater the user's rights will be in the system. In addition, the user or administrator can add new verification levels.

2) Document/Skills Setup

The WMS has incorporated the ability to list skills in the worker file, the job file and for a work type. This sub-module allows the user to dynamically generate skills to create a limitless list of skills and then relate these skills with the work type, job and worker. Thereby, the user can match a job directly to a qualified worker. This gives the user an invaluable resource for matching the job's required skills to a worker. In addition, by attaching skills to workers, the user is able to monitor what skills each worker has and what skills they need to learn. This can help the user with training programs, increases in wages and numerous other monitoring capabilities. In particular, this sub-module allows for setting up the following items, see FIG. 38: i) document/skill groups, ii) skill types, iii) document types, iv) custom document types, v) custom type groups, and vi) custom document binders.

Figure 40A:
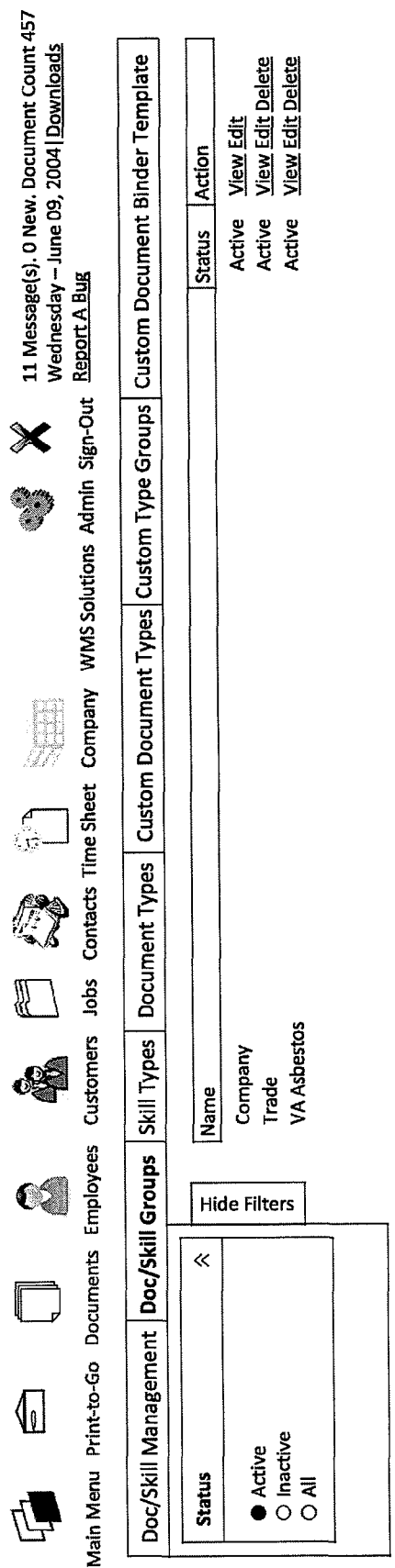

For example, for document/skill groups, a dynamic list created by the user is illustrated in FIG. 40A. The screen with this dynamic list includes the following information: a retractable filter to view Active, Inactive or All Doc/Skill groups, name of the group and so on. When the administrator or the user decides to add, view or edit a particular group, the following information may be provided for this particular group, in a form of a screen: name, description, active/inactive (e.g., checkbox), list of document types in the group followed by a required checkbox, list of skill types in the group followed by a required checkbox. The user may sort and order the document types by simply dragging document types to their respective position within a pop up of the group list. The user or administrator may also add new groups.

Figure 41:
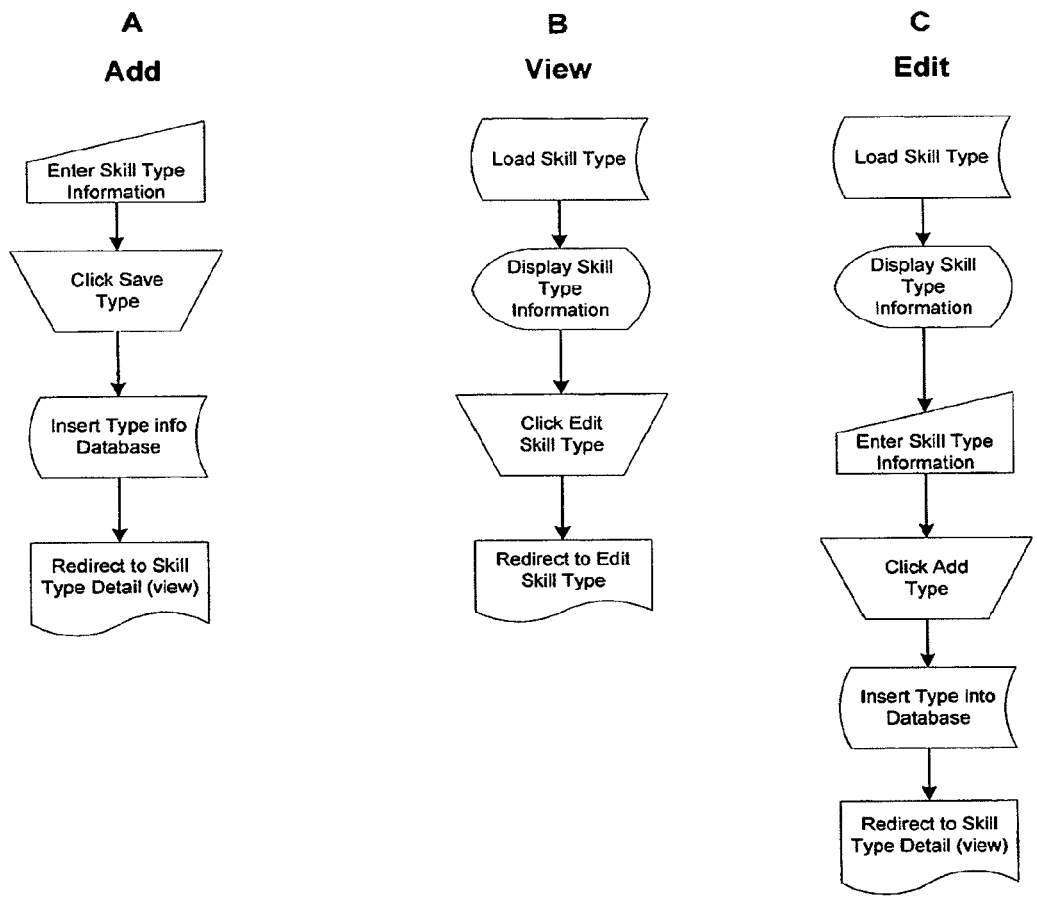
FIGS. 41A-C are flow chart diagrams for adding, viewing and editing skill types in accordance with this embodiment of the present invention.

Next, to set up skill types, the user is provided with information related to skill types as illustrated in FIG. 40B. The user may view and/or edit this information or add a new skill type as illustrated in FIGS. 41A-C and as explained in further detail below. In addition, the user may group skills by user defined categories as well as assign a level to the skill. For example, the following information can be added, edited or viewed for a particular skill type: name of the skill type, skill description, skill level, status and so on.

Furthermore, the administrator or the user can setup document types as illustrated in FIG. 40C. The user can view, edit or add document types by simply viewing a list with the document types, their names and statuses. Moreover, the user can group document types into predefined categories by simply dragging and dropping document types into a document group. Within these groups, documents can be reordered and sorted by a simple drag and drop technique.

Figure 42:
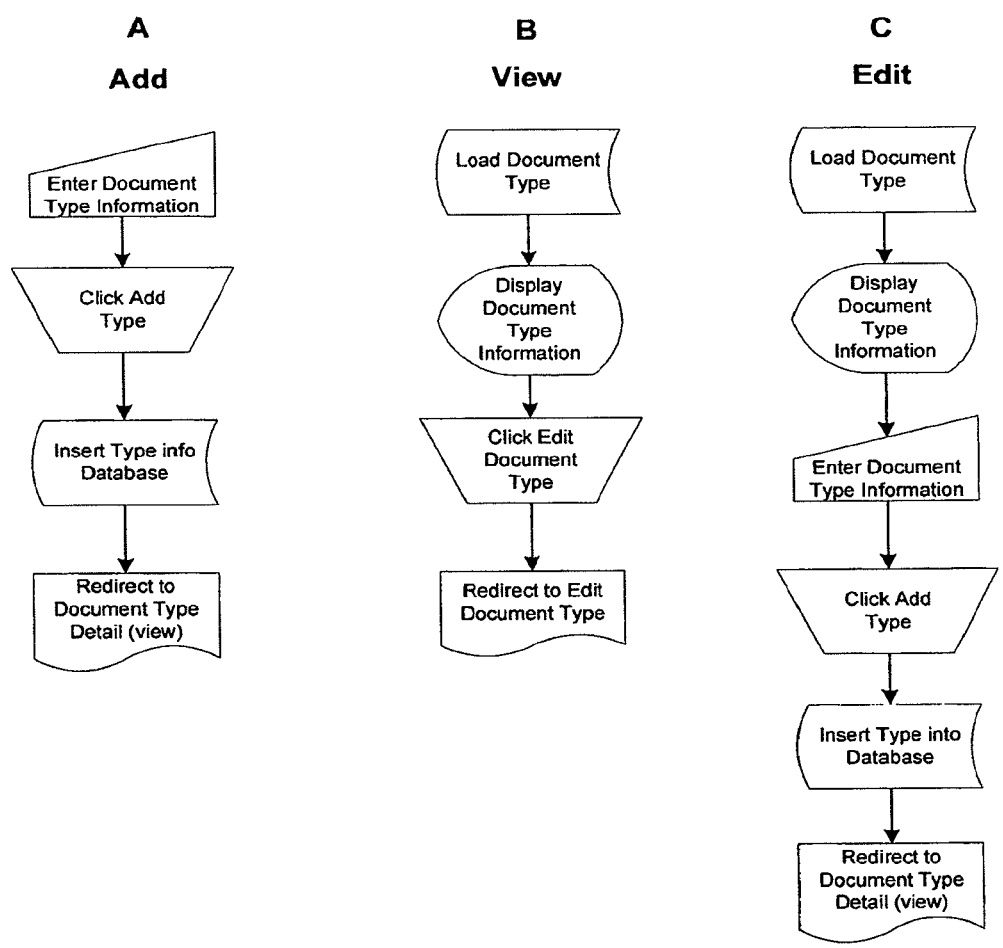
FIGS. 42A-C are flow chart diagrams for adding, viewing and editing document types in accordance with this embodiment of the present invention.

To add a new document type, the user simply clicks on the corresponding button and a pop up screen is provided allowing the user to enter the information for the new document type. Once the desired information is entered, the user simply clicks "add" and the document type is inserted into the database. The user is then shown the document types including the added document type, see FIG. 42A. In order to view a document type, the system loads the document type and displays it to the user. When the user clicks edit button, they are redirected to an edit screen, see FIG. 42B. To edit the document type, the document type information is modified and the button "Save" is selected. The document type is modified in the database and the user is redirected to the display of the document types, which includes the previously edited document type, see FIG. 42C. The skill types may be added, viewed or edited by the process described above for adding, viewing and editing document types as illustrated in FIGS. 41A-C.

Similarly, the user can create custom document types that can be associated to any entity within the system including Workers, Jobs, Customers, Contacts, Vendors, Types of Work, Company documents and so on. For example, FIG. 40D illustrates an exemplary user interface for adding custom document types for various entities such as customer, job, employee, contact, company, and so on.

As illustrated in FIG. 40D, the user first selects the drop down to "Create New Custom Doc Type." The user names the document type, and as the option provides a description of the type as well. The user can then select whether management of that document type requires using and monitoring an expiration and/or issue date. The user can set the term of the document, such as 1 year or 6 months, which will allow the system to automatically calculate the expiration date based on the issue date or vice versa. The user can then add a new custom field to the document type or assign a preexisting custom field. If the document type is no longer in use it can be marked as inactive, prohibiting it from being displayed throughout the system. The user can select to which modules the document type can be associated.

Also, the user can create custom type groups as illustrated in FIG. 40E or custom document binder templates as illustrated in FIG. 40F, to which the document types can be associated and which will allow the user to quickly and easily dispatch and/or print from the modules within the WMS. FIG. 40F illustrates the administrative set up of the custom document binder templates. First, the user must name the document type and has the option to give a description. The binder template will be used in the reporting tabs such as the tool box of the job or worker module. If a binder is active it will appear throughout the application as a method to group documents for convenient dispatch. If it is inactive it will not be displayed for use, the user would need to reactivate the binder from the system administration module. As FIG. 40F illustrates, the user may associate certain document types to the binder template by simply flagging the checkboxes preceding said document types. If the user wished to include any custom fields the document types may have, the user simply checks the flag box following the document types. The user can then determine in which modules the binder will be displayed by selecting from the right hand table including various items managed by the system. To utilize the binder template, the user would go to the reporting or tool box tab within a job record for example and select the template to use. That template would save all pre-selected document types into a "binder" which can then be emailed, faxed, printed and so on.

3) Administrative Setup

This sub-module enables the user to have one simple place to manage the worker management system application. Conventional software systems typically require the user to maneuver throughout the software setting up numerous pieces of information in various places before the system is ready for proper use. This sub-module is a one stop place for the user to set up the initial application as well as to make future management changes without having to figure out the complexity of the software.

The Administrative setup screen allows the user to customize the dynamic functions in the system. Each item will be accompanied by an icon that will act as a help feature to assist the user during setup. The screens within this sub-module are easy to read and enable the user to set smart alerts and adjust the color coding in the system for each item it is associated with. The Administrative Setup may be driven by prompts that can be turned on or off at the beginning of the setup process, the prompts walk the user through each field for setup.

In addition, upon leaving this sub-module, the WMS displays a list of fields that are yet to be setup, suggestions for the set up and suggestions for fields that could be set up differently. If the user wishes to avoid the hassles of the administration, the user can simply click "enter default settings for my industry," and the WMS system enters the defaults for the industry. Thus, the user can be set up and running within minutes. Any of the fields can be adjusted later during runtime. In addition, the user can default to the industry settings any time they want, not just during the initial setup.

The system utilizes the common expression of Administrative Setup to give the user one location to manage specific tables and forms that can be managed by editing, deleting, or adding functions. Administrative Setup is a one stop place for administrating the WMS information. The WMS enables the user to take control over their work force and projects. The setup screens make the process of implementing WMS easy and reliable. Cost detail can be setup for fine points such as Payroll Tax, Accounts, Miscellaneous Burdens and Workman's Compensation. In particular, this sub-module is organized in the following logical parts, see FIG. 38: i) job status, ii) type of work (job task), iii) employee status, iv) employee title, v) employee languages, vi) information fields, vii) contact groups, viii) form management, ix) vendor types, and x) tool list. Each of these logical parts may be accessed by selecting the part from the main menu screen of the administrative setup or by clicking on a corresponding tab on top of the screen, for example. Each of these logical parts is described in greater detail below.

i) Job Status

Users today have numerous methods of tracking the status of a Job. Conventional accounting systems have numerous names and functions that are limited to the different type of predefined Job Status options. This exemplary logical part provides the user with an easy way to manage their job statuses. Job status is a dynamic field thereby the user can manage the job status as they see fit. The Job Status logical part recognizes each type of the job status and utilizes the dynamically generated fields to manage each job as the user needs.

Figure 43:
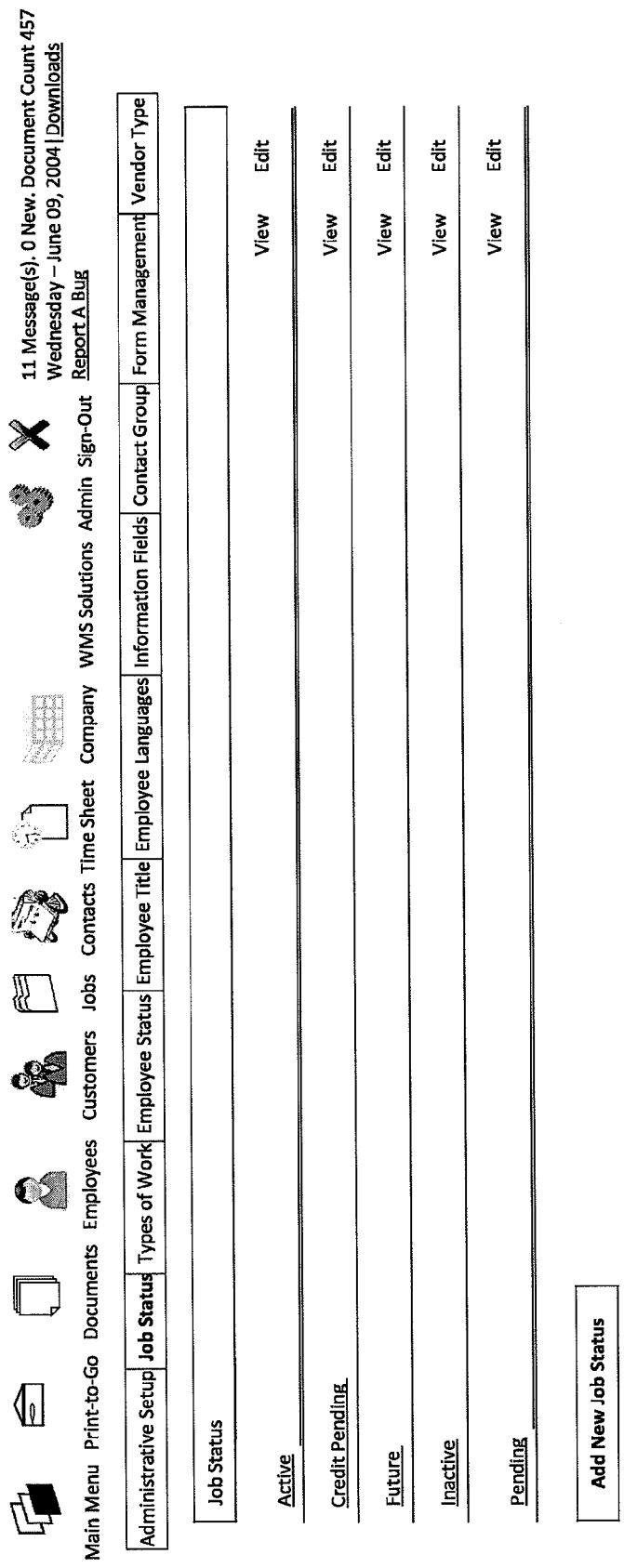
FIG. 43 is GUI for setting up job statuses in accordance with this embodiment of the present invention.

In particular, this logical part allows the user to add job statuses as the user sees fit, for example as illustrated in FIG. 43 by simply clicking on the "add new job status" button. In addition, description for the job status can be provided. Detailed information for each created job status can be viewed by simply clicking on the job status or the provided link, for example FIG. 43 illustrates the link "view", which provides to user with a link to the detailed information for the job status. A pop up screen with the job status name and description will be displayed. The user can also edit the job status, for example as illustrated in FIG. 43 by simply clicking on the corresponding button. Each job status can also be labeled as representing an active job, being displayed by default on all lists or being the selected job status for new job creation. Once these statuses are created and activated by the user, they will be dynamically propagated to all screens in the WMS that display job statuses.

ii) Type of Work (Tasks on a Job Site)

In this exemplary logical part, the user can view/edit and create specific actions being performed on job sites including the status of this type of action or work. As illustrated in FIG. 44, the type of work or job tasks can be filtered to view "active" types of work, "inactive" types of work or "all" existing types of work. FIG. 44 illustrates exemplary "active"

types of work along with their status. In FIG. 44, the illustrated job tasks or types of work are "Asbestos Removal," "Bricklaying," "General Demolition," and "Lead Removal." These types facilitate later searches by a user for jobs where this particular action (job task) was performed. For example, the user may wish to see all jobs where "Floor Tile Removal" occurred and then view which workers were scheduled to this job if the need arises for similar work to be performed again.

iii) Employee Status

Figure 45:
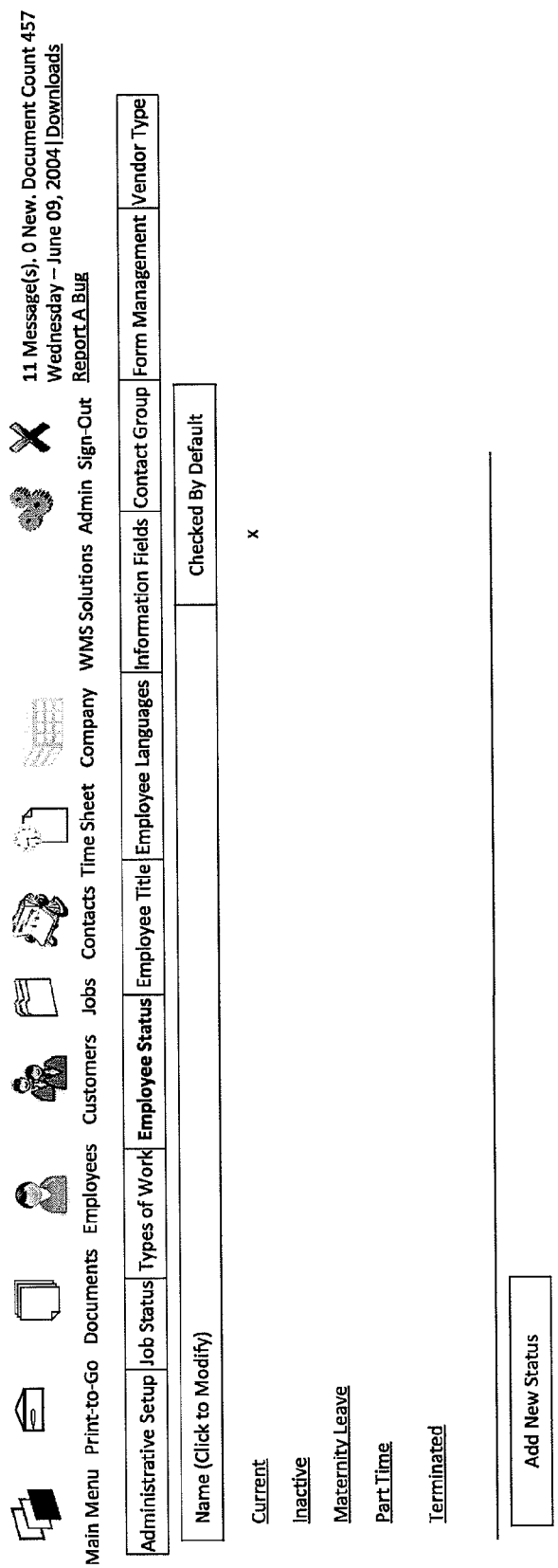
FIG. 45 is a GUI for setting up worker statuses in accordance with this embodiment of the present invention.

Similar to the logical parts above, employee status may be set up, as illustrated in FIG. 45. In particular, the user can create new job statuses by simply clicking a corresponding button. In addition, the user can edit a job status by simply clicking on that job status and edit the information in the pop up screen. Finally, a default can be set, where when employee status is not specified, the default case will apply. This default status is illustrated with an "x" in FIG. 45. The dynamic statuses created in the system administrator will be treated as other fields throughout the application, appearing as choices anywhere a user may search or filter by employee status. Other variations are possible and are within the scope of the invention.

iv) Employee Title

Figure 46:
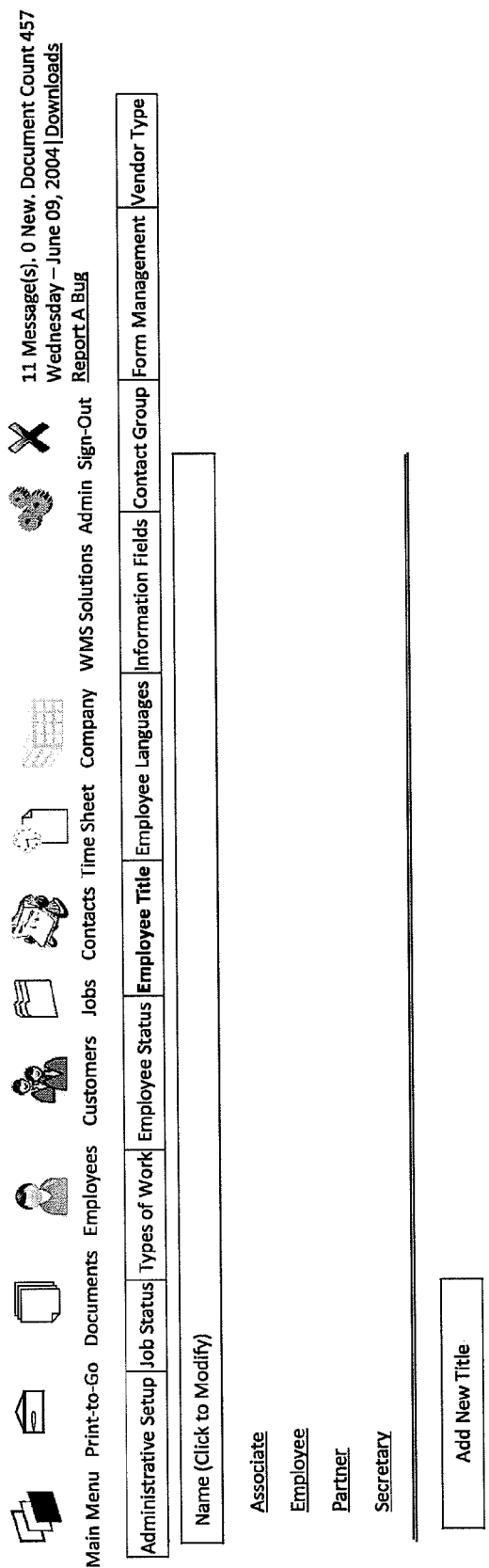
FIG. 46 is a GUI for setting up worker titles in accordance with this embodiment of the present invention.

This logical part allows the user to manage employee titles. For example, a title such as human resources, manager, supervisor, administrator and so on can be added by simply clicking a corresponding button, see FIG. 46. In addition, the employee title can be edited by a pop up screen, which allows the user to rename the employee title and provide a description for the title. This logical part keeps track of the dates of creation and modifications of the employee title. Thereby, when employee title is modified, the system will automatically change the employee title where it appears within the system. Other variations are also possible and are within the scope of the invention.

v) Employee Languages

This logical part allows the user to add new languages. In addition, the user can edit, delete or simply view the languages in the system. Default language may also be set. The specifics of adding, viewing and editing are described above.

vi) Information Fields

This logical part allows the user to add, edit and view field types. In particular, each field type has a data type, to whom they pertain and the status of the field and whether it is a required field or not as illustrated in FIG. 47. The field types may pertain to a document data, a job, a customer, a company, a vendor and so on. For example, for a driver's license, the data type is plain text, it will pertain to a worker and the status may be active and it may be a required document or not, depending on the user preference. For example, if the user manages a truck driving company, then a driver's license may be a required document. Other variations are possible and are within the scope of the invention.

vii) Contact Groups

Figure 48:
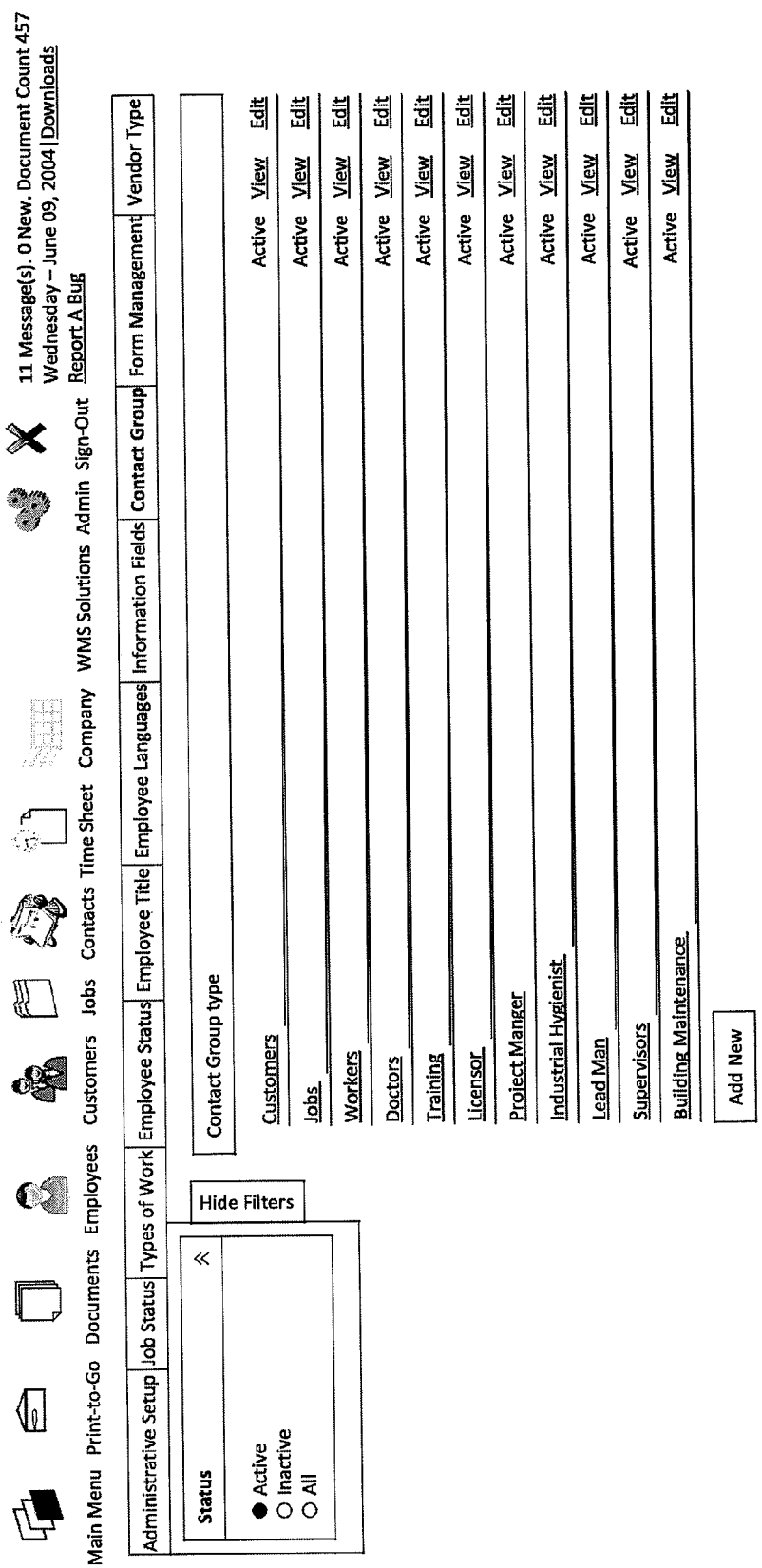
FIG. 48 is a GUI for setting up contact types in accordance with this embodiment of the present invention.

This logical part allows the user to set up contact groups types. For example, FIG. 48 illustrates contact group types: customers, jobs, workers, doctors, training, licensor, project manager, Industrial Hygienist, Lead Man, Supervisors, Building Maintenance and so on. Each group may be active or inaction as illustrated in FIG. 48. In addition each group type may be edited and new groups may be added. Other variations are within the scope of the invention.

viii) Form Management

This logical part provides the user with an ability to set forms and form fields. For example, the user accesses the set forms screen by simply clicking on the forms option in the form management logical part. A list of forms is displayed, including their description and status. FIG. 49A illustrates some exemplary forms, their description, statuses and actions. The user may simply select a form to view the detailed information for the form and the form information will be displayed to the user via a pop up screen as illustrated in FIG. 49A. In addition, the form information may be edited by clicking the corresponding button. Once the form information is modified, the pop up box is closed and the list of forms screen is refreshed. The user can also add new forms as illustrated in FIG. 49A by selecting a corresponding button. For example, the user may wish to add a W4 form, which needs to be filled out for each worker, annually. As illustrated in FIG. 49B, the user may modify or add form field information. FIG. 49B illustrates exemplary form field information such as name, description, reference ID, source, source field name and position, input field size and type and dates of creation and modification.

The user may also manage form fields as illustrated in FIG. 49B. A filter for the display of form fields is provided, thereby allowing the user to select what form field information to view. The form field may be displayed with a description, a source, a reference number and the forms to which this field applies. Using form fields, the user can designate the fields required for the W4 form. Forms can be generated as needed from the Form-to-Go screen within Print-to-Go. Then, once the W4 form needs to be filled out, the user will simply select the W4 form and the current workers or the workers within the previous year and click generate and the W4 will fill up automatically with the required fields for each worker.

ix) Vendor Types

This logical part allows the user to set up vendor types. For example, the user may want to designate a vendor type for equipment delivery, office supplies and so on. Thereby, when the user will be adding vendors to the system, a type can be designated for each one so that once the user needs a product or service, the system will automatically select only the appropriate vendors that provide the needed product or service.

x) Tool List

This logical part allows the user to set up the information related to tools required for various job types such as a hammer, a drill and so on. Once entering this logical part, the user views a list of tools that can be filtered by active, inactive or all tools as illustrated in FIG. 50A. FIG. 50A illustrates that for each tool, the name of the tool, the level of use, the tool cost, the estimated life span and the hourly reimbursement. When the user clicks on a tool, details for this tool are displayed in a pop up screen as illustrated FIG. 50B. Details may include, tool's name, life span and cost, hourly reimbursement, level of use (e.g. heavy or light use). The user may create new levels or edit any of the information provided in the pop up box. Once the user clicks submit, the modifications are automatically uploaded into the system and the list of tools is refreshed reflecting the changes made by the user.

In sum, this sub-module provides the user with an ability to set a number of types of fields needed. This sub-module is a one stop place for the user to set up the initial application as well as to make future management changes without having to figure out the complexity of the software.

4) Accounting Setup

Accounting setup allows the user to set up the financial information. This sub-module is organized into the following logical parts i) payroll taxes, ii) worker's compensation, iii) miscellaneous burdens, iv) worker's PEO, and v) wage management. Each of these logical parts are explained in further detail below.

i) Payroll Taxes

The WMS solution allows the user to determine the true cost of their workers. Payroll Tax Burden can include a variety of different taxes depending on the job location. The payroll tax burden is dynamically generated, allowing the user to define as many types per state as needed. Each payroll tax is multiplied against the workers wage and added to overhead for the worker, this allows the user to have an accurate cost relationship between the job and worker cost. The payroll tax gives the user the ability to assign tax by each individual state that allows them to associate the tax for the state with the work type. This easy to use function allows the user to have a better knowledge of the overhead cost for the worker.

Figure 51:
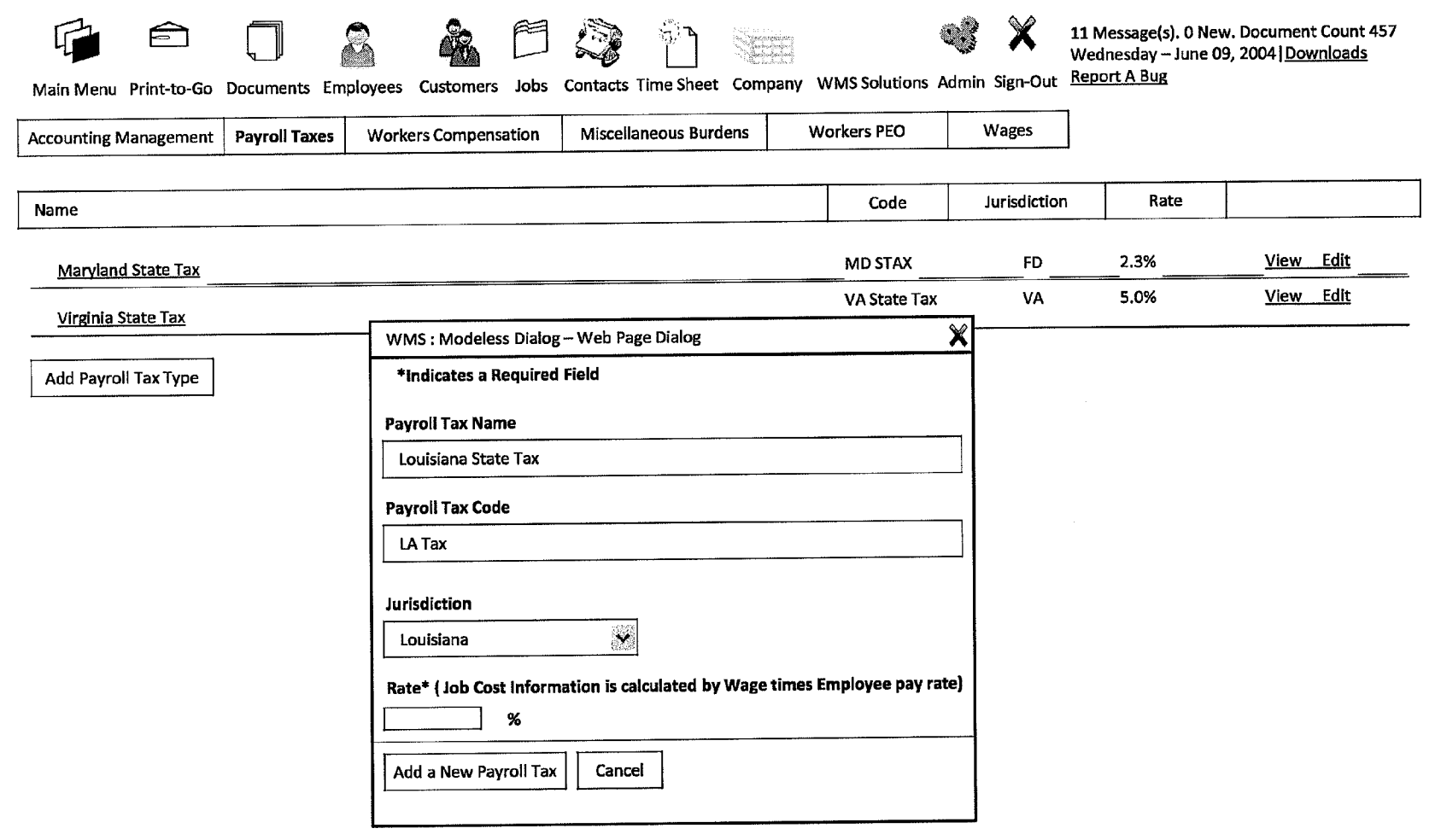
Figure 52:
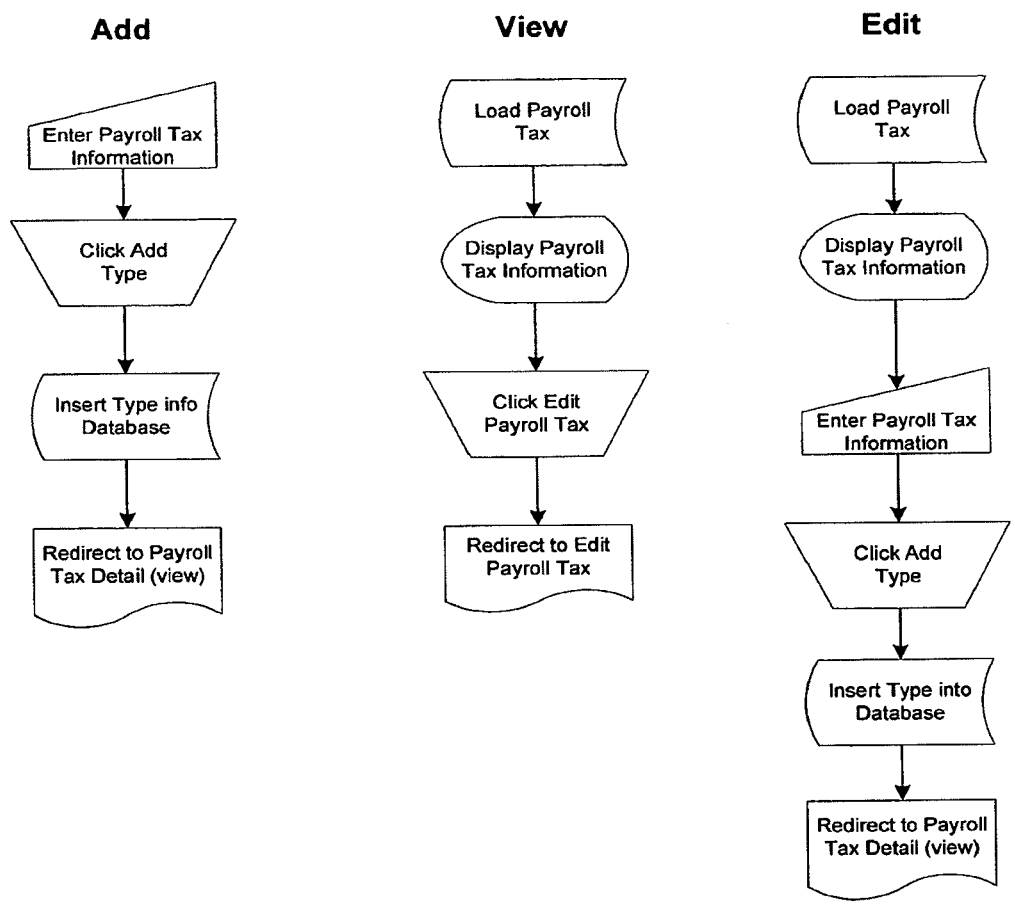
FIG. 52 is a flow chart diagram for adding, viewing and editing work payroll taxes types in accordance with this embodiment of the present invention.

The user has the ability to add, edit and deactivate the tax burdens and payroll tax burden types in the master set up screen. Upon entering the payroll tax, the user is presented with a list of payroll taxes as illustrated in FIG. 51. FIG. 51 illustrates an exemplary screen for viewing payroll tax types. As illustrated in FIG. 51, the system displays the name, code, jurisdiction and rate for each tax type. The user may add new payroll taxes or select an already existing payroll tax to view and/or edit the detailed information for the payroll tax as illustrated in FIG. 51. In addition, detailed information for a selected tax type may be displayed, edited or added as illustrated in FIG. 51. The process of adding, viewing and editing payroll tax type are illustrated in FIG. 52 and is similar to adding, viewing and editing described above.

ii) Workers Compensation

This logical part tracks workers compensation expenses and detailed work history by allowing the user the ability to manage workers compensation cost by work type. This allows individual breakdown of cost by each work type performed, such as an asbestos pipe and a boiler compared to a demolition type in the state of Maryland compared to Delaware. Conventional accounting practices typically incorporate the workers compensation code with the payroll entry or within the job, by assigning the worker to a work type. The WMS system controls the details of the work activity and the cost of insurance associated with that particular activity. This breakdown gives the user a detailed report that can be supplied to the workers' compensation audit for precise work audits. The ability to provide precise workers' compensation audits with precise job information enables the user to greatly reduce the likelihood of insurance companies overcharging for the premium. Furthermore, it gives the user the ability to assemble documents for audits that typically take days to assemble. This allows businesses to gain control of their workers compensation cost.

Figure 53:
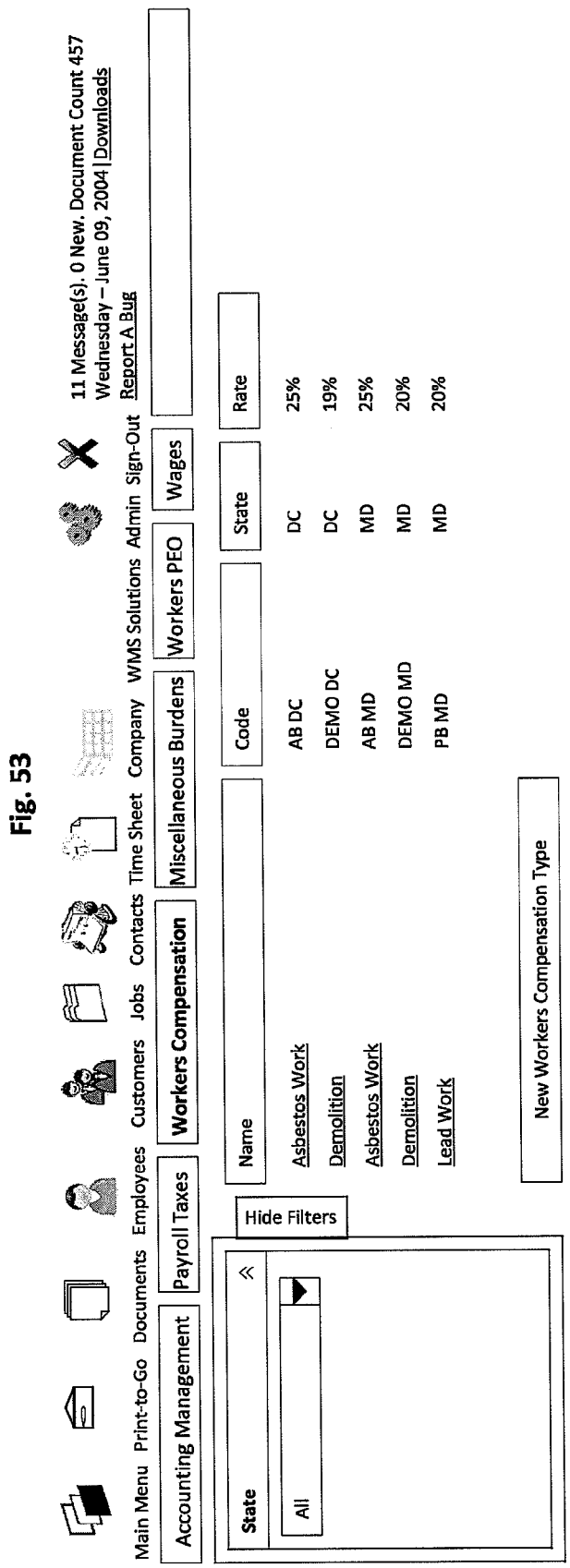
FIG. 53 is a GUI for setting up worker compensation types in accordance with this embodiment of the present invention.
Figure 54:
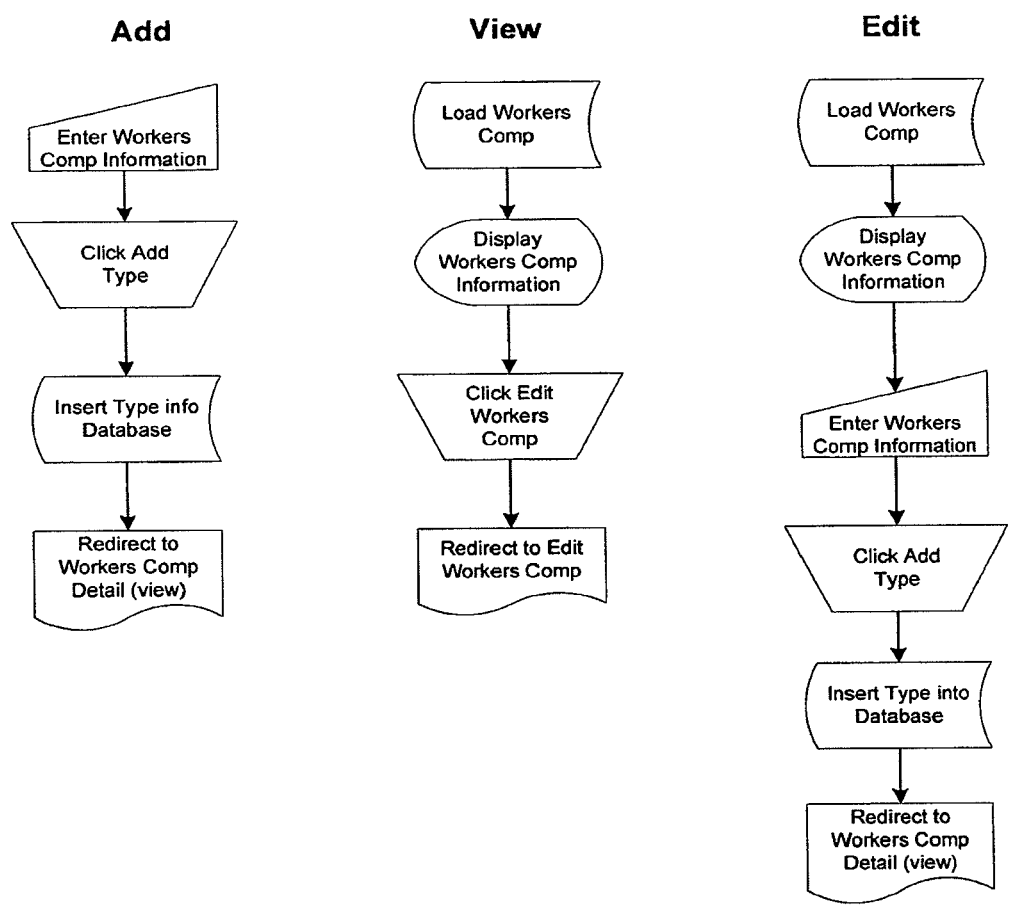
FIG. 54 is a flow chart diagram for adding, viewing and editing work worker compensation types in accordance with this embodiment of the present invention.

Once the user accesses this logical part, the user can view the worker compensation codes, rates and state as illustrated in FIG. 53. A filter can be set to view worker compensation rates for a particular state as illustrated in FIG. 53. The user can drill into the detailed information of the worker's compensation rate by simply clicking on the name of the worker compensation rate. The details can also be edited. New worker compensation rates may be added as illustrated in FIG. 53 and view or edit details for the worker compensation type as illustrated in FIG. 54 and described in the previous logical part.

iii) Miscellaneous Burdens

This logical part enables the user to set up miscellaneous burden types that give the user the ability to manage the job and task cost directly related to the time associated with the worker assigned. Miscellaneous burdens calculate the workers wage in association with the work type. This gives the user the ability to capture worker cost associated with a job. The information is captured by a percentage and multiplied by the worker wage to determine the cost. This cost is then added to the overhead of the worker. The user is able to attach these burdens to work types. This provides the user with additional control when managing costs.

Figure 55:
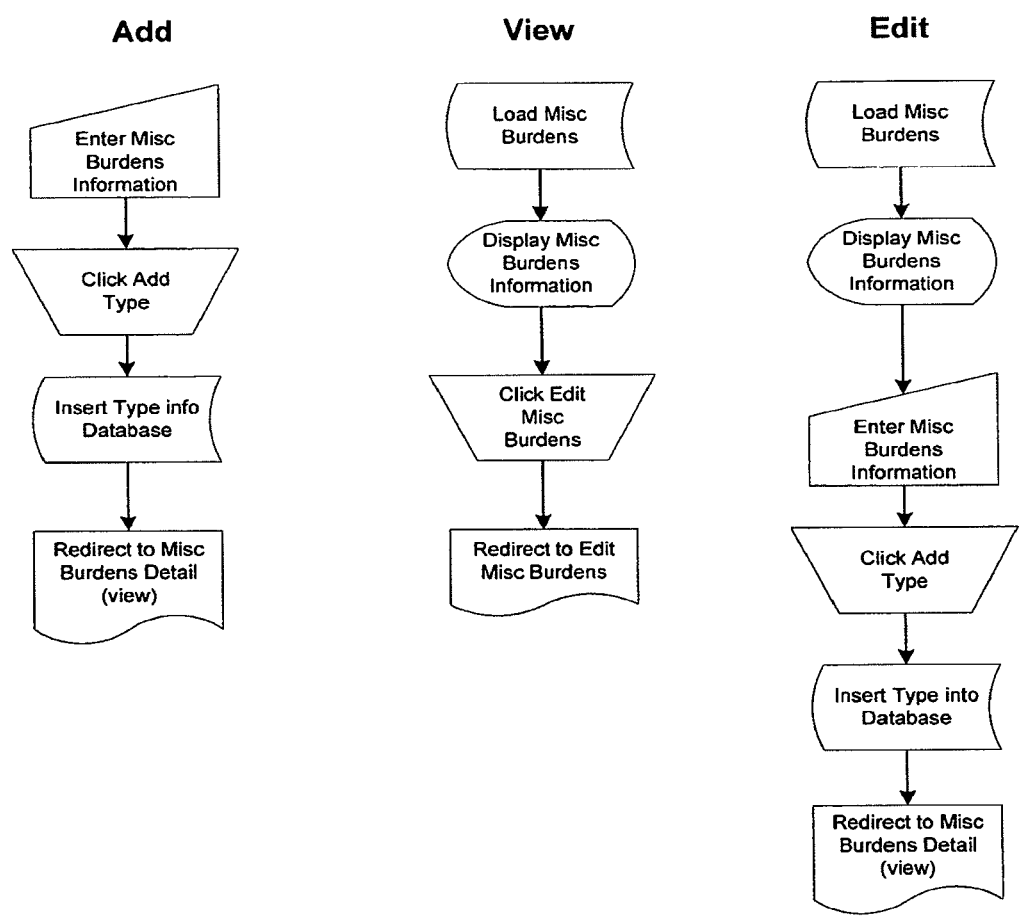
FIG. 55 is a flow chart diagram for adding, viewing and editing work miscellaneous burdens types in accordance with this embodiment of the present invention.

Conventional accounting methods attach burden to an earnings code or to an overall job. While this information is helpful to the user, the ability to associate a burden cost directly with a worker and the work type to which they are assigned is much more accurate. The user has the ability to attach or not attach the burden giving them total control. Each miscellaneous burden is dynamically generated providing a number of abilities to the user to define what ever type of burden they want. Similar to the previous parts, the miscellaneous burden types may be added, edited or simply viewed as illustrated in FIG. 55.

For example, if history shows a worker will need a new respirator every 300 hours, the user can calculate 300 hours into a standard work year of 2080 hours. The cost of supplying the respirator can be divided into a percentage cost by the hour. The user can set up a miscellaneous respirator cost. Therefore, every time a worker is scheduled to a work type that requires a respirator, the true burden rate of this work is being contributed to the overhead. This information would be compared to the billing rate giving the user the ability to manage the cost relationship with the applicable information, by relationally linking the work type and the worker.

Another example would be if a user has deliveries to make that are an unusually long way from the office, they could set a work type that captures an additional wear and tear vehicle cost associated with the work type. When the worker is assigned to the job the additional cost would be built into the over head of the worker making the delivery. The job allows any work type to be assigned, but by setting up a work type called drivers for 50 to 75 miles, the user has the ability to associate a worker directly to the work type and through the use of miscellaneous burdens associate the cost with that work type. This enables the user to attach cost in a direct method to a task for their staff, thus knowing the real cost associated with performing the task. The miscellaneous burdens are presented to the user just like the previously described logical parts, allowing the user to add new burdens, view and edit details for a selected burden, see FIG. 55.

iv) Workers PEO

The exemplary Workers PEO (Professional Employer Organization) logical part allows the user to choose a different company database in a designated third party accounting application to which to sync payroll. For example, if an accountant is using WMS to perform the payroll function for workers belonging to multiple clients, for example, Company A and Company B, the accountant can choose which company each worker belongs to using this function. The choice is linked directly to the accounting application used by these companies. For example, if they use Quickbooks, when the accountant is syncing the payroll information from WMS to Quickbooks, the paychecks for workers belonging to Company A would be pulled from Company A accounts in Company A's database while workers from Company B would be paid from Company B's accounts and those records would be synced with Company B's Quickbooks' database.

v) Wage Management

This logical part provides the user with control over pricings and wages. In particular, the user can set up company pricings for various states and various work types. This exemplary logical part allows a company to establish default prices to assign to workforce services provided to customers. An exemplary user interface, which displays various work types for various states, is illustrated in FIG. 56A.

The first column illustrated in FIG. 56A displays the state in which the wage is used. The second column illustrated in FIG. 56A lists the work types available for that state. The third column illustrated in FIG. 56A lists the total wages used for each work type. The forth column illustrated in FIG. 56A includes the Wage Over time rate, and the fifth column includes the total fringe which may include such items as travel expenses. Moreover, the sixth column illustrated in FIG. 56A includes the overtime rate on the fringe expense and the seventh column includes a total of all regular expenses associated with wages. The eighth column illustrated in FIG. 56A includes all overtime expenses associated with the wages and the ninth column may include the total of both overtime and regular wage expenses. The tenth column illustrated in FIG. 56A includes the percentage markup being added to bill a customer for this particular type of labor and the eleventh column includes the dollar value mark up used to bill a customer for this type of labor, or work type. The twelfth column illustrated in FIG. 56A displays the gross margin percentage earned on this work type, and the thirteenth column provides the gross profit dollar amount earned on this work type. Finally, the fourteenth column as illustrated in FIG. 56A includes the rate at which the regular labor of this work type is billed to a customer, and the final column includes the rate at which overtime labor hours of this work type are billed to a customer.

Figure 56B:
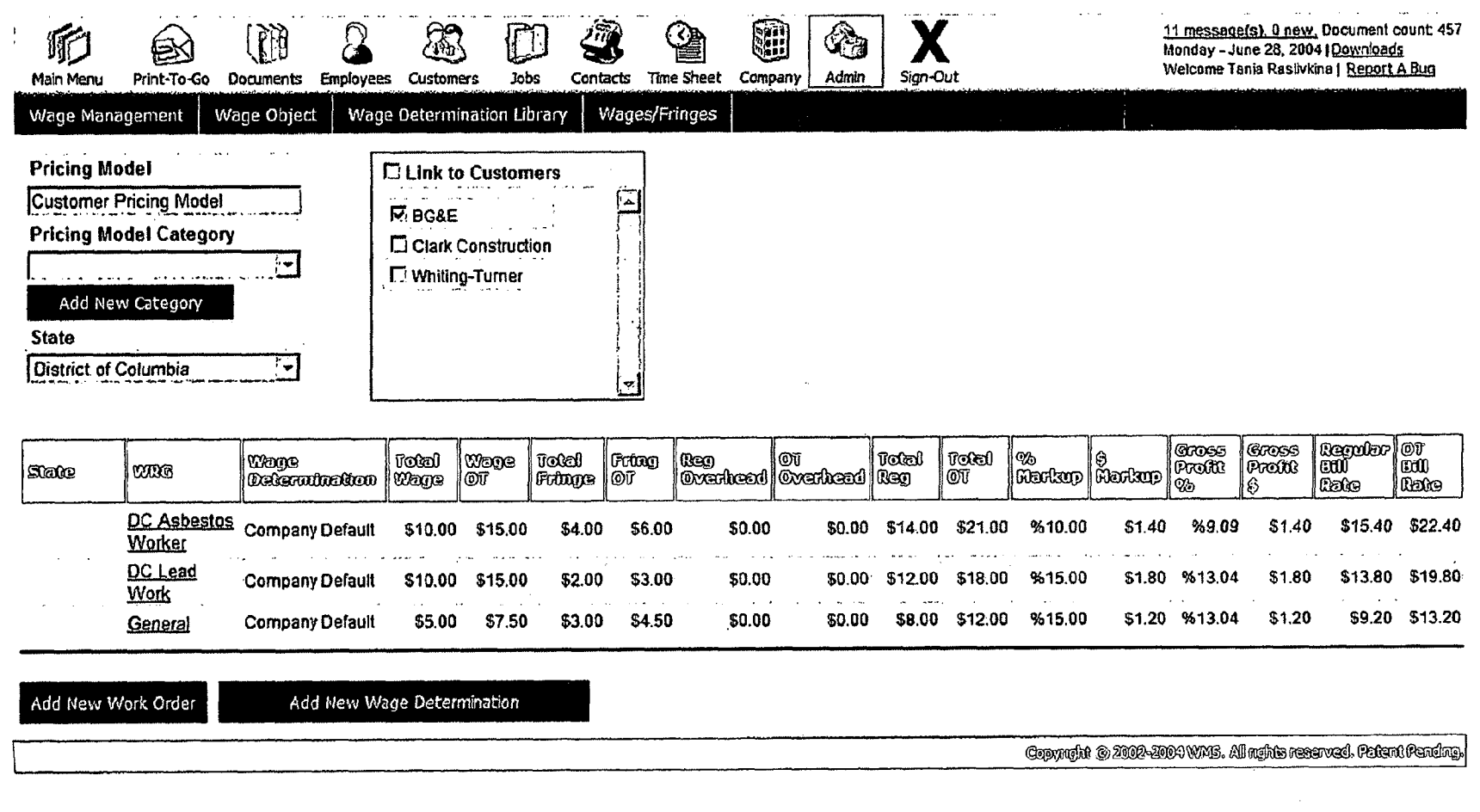

This information provides the user with the ability to evaluate pricing of a certain work type in a certain state. The user can add new company pricings, view and edit details for a particular data entry, just like in the logical parts described above. Next, the user can view and set up customer prices as illustrated in FIG. 56B. Unlike company pricing, customer pricing would be specific for one or more selected customers. For example, the user may set up a specific wage with a type of wage (regular, certified, union. etc), pay group details and memos. In addition, the user can add or select document types to be associated with this wage. Moreover, the user can add new wage information or edit existing wage information by filling out the necessary fields, illustrated in FIG. 56C. This logical part allows the user to determine the pricing of particular work type services and associate the pricing to the work type. Next, similar to customer pricing, vendor pricing may be set up; this logical part allows the user to create billing rates to bill customers for services that a vendor may provide the user that they then provide to their clients In addition, wage determination library is provided to facilitate the setup of wages as illustrated in FIG. 56D. The user may set up wages and fringe rates for pay groups that can later be associated to work types during the wage determination process as illustrated in FIG. 56E. For example, for an asbestos work type, the user may set up a wage of $20.00. This logical provides the user with an ability to manage the costs associated with a job. In addition, to facilitate setting up wages, a determination library is provided with average wages in different states for certain work types.

5) Security Grid

Figure 38:
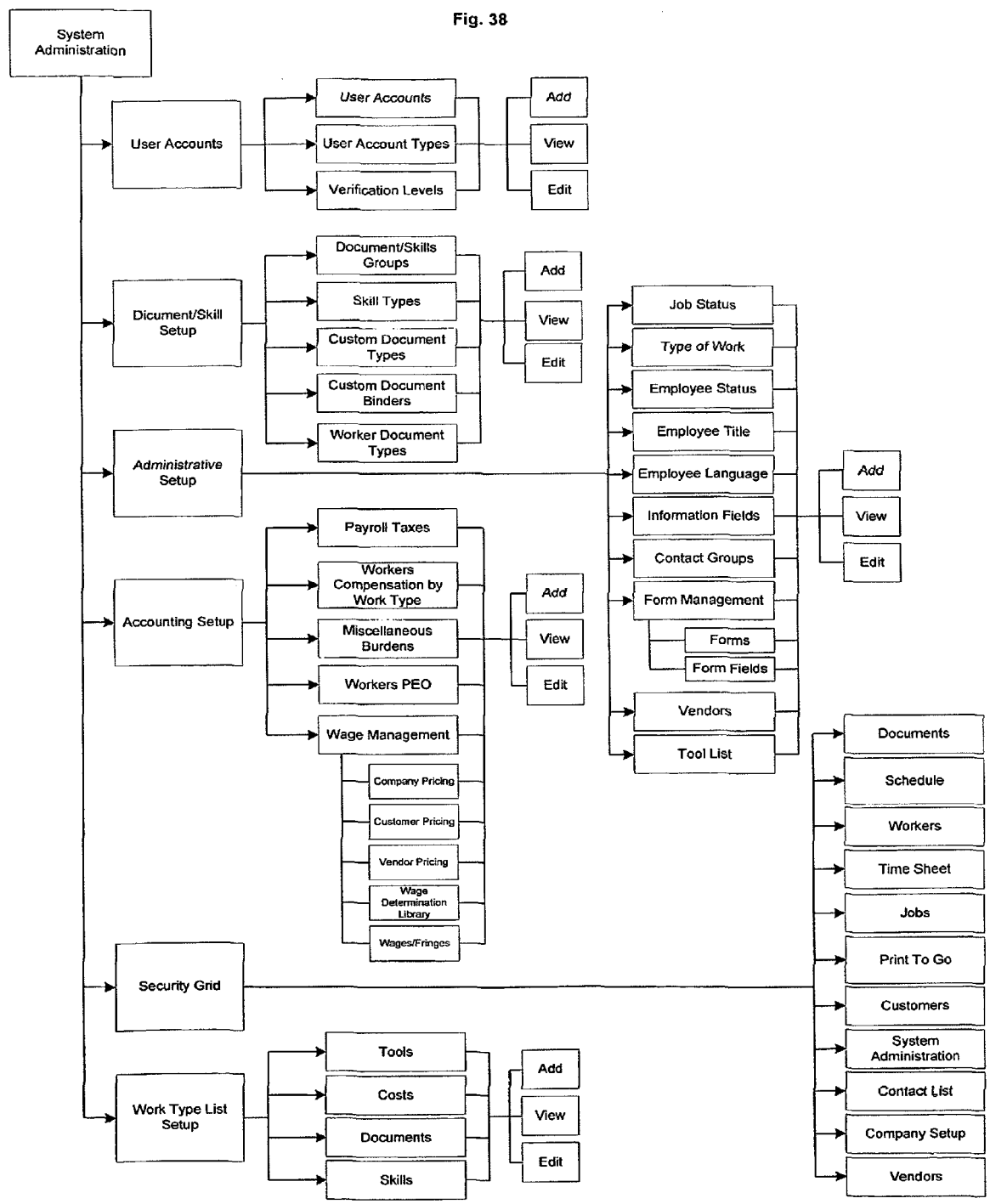
FIG. 38 is a block diagram of the system administration management module in accordance with this embodiment of the present invention.
Figure 57A:
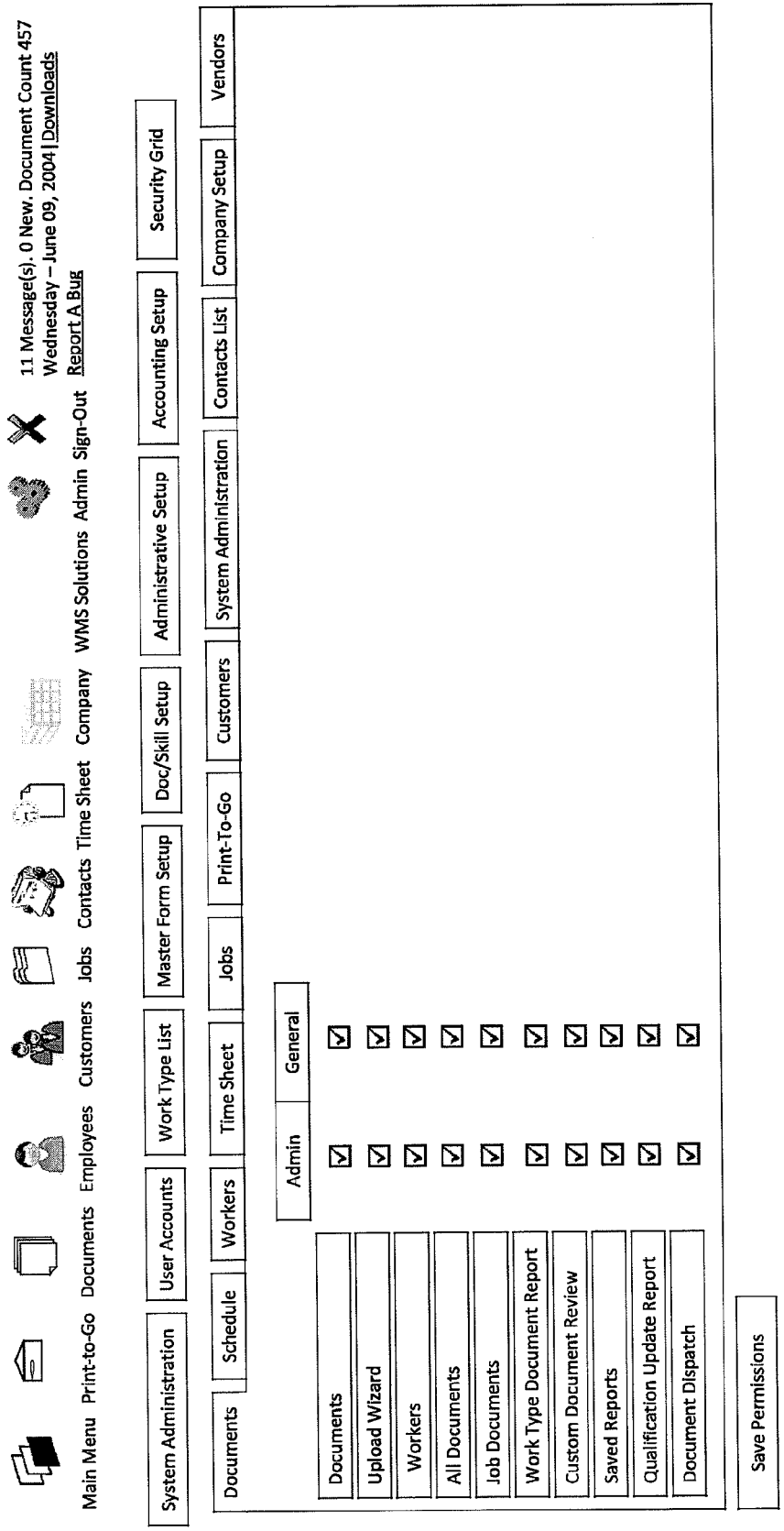
FIGS. 57A-K are GUIs for the security grid sub-module in accordance with this embodiment of the present invention.
Figure 57B:
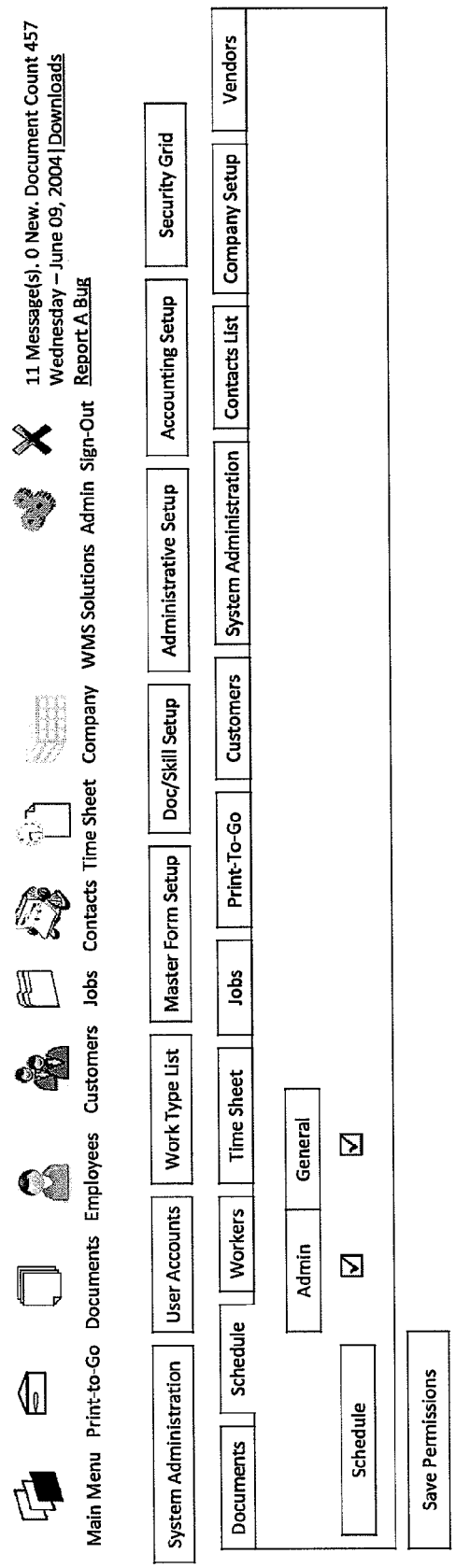
Figure 57C:
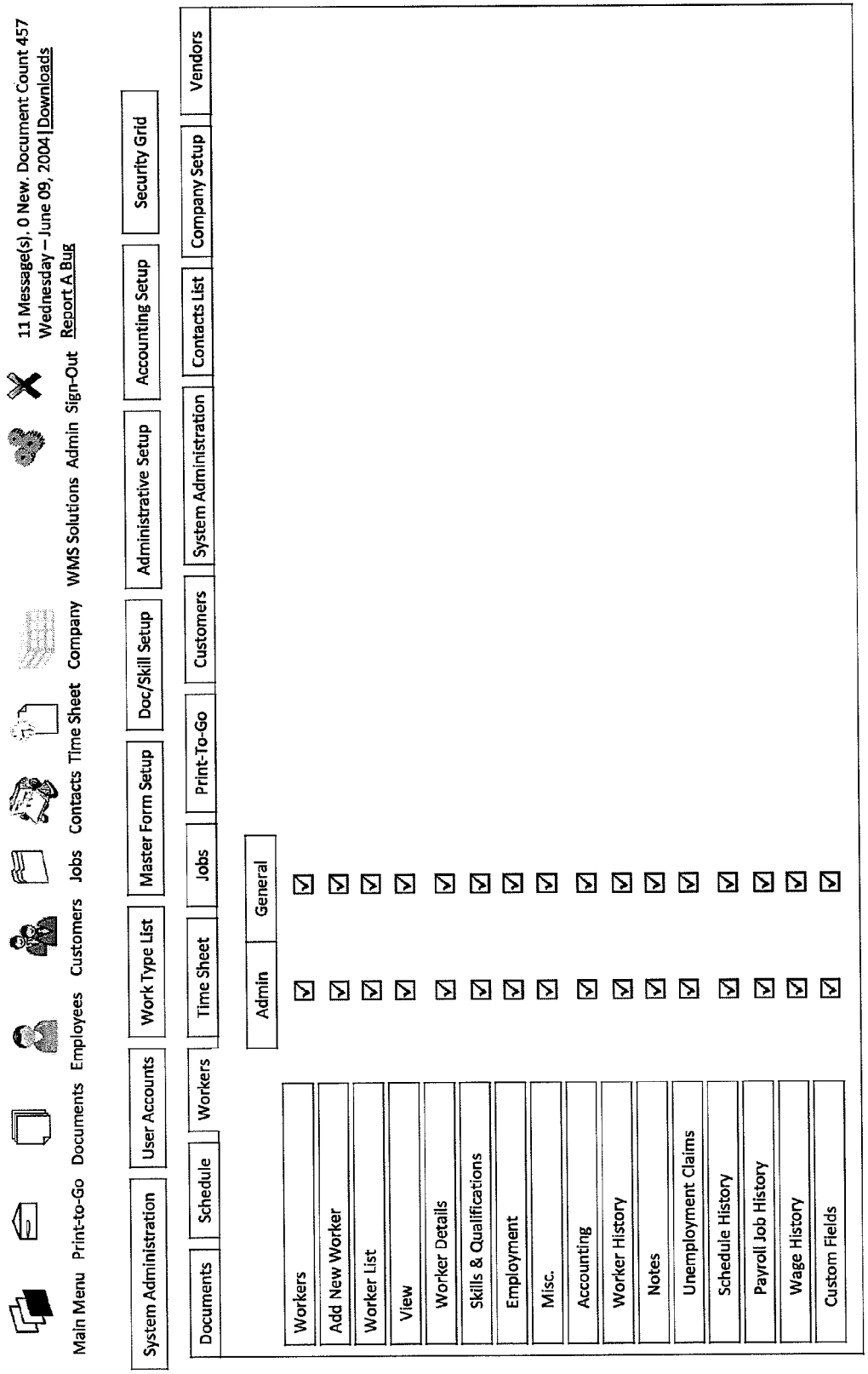
Figure 57D:
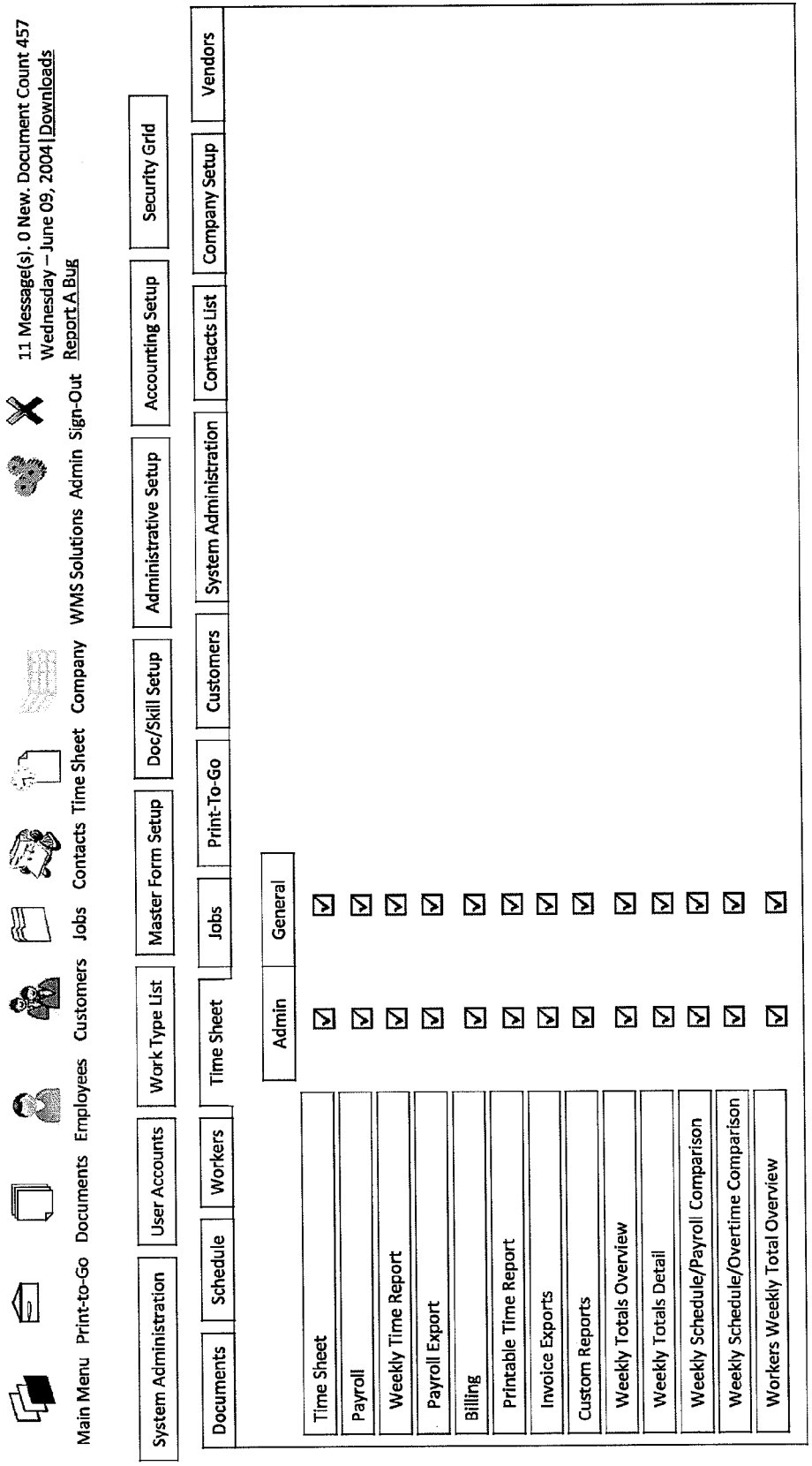
Figure 57E:
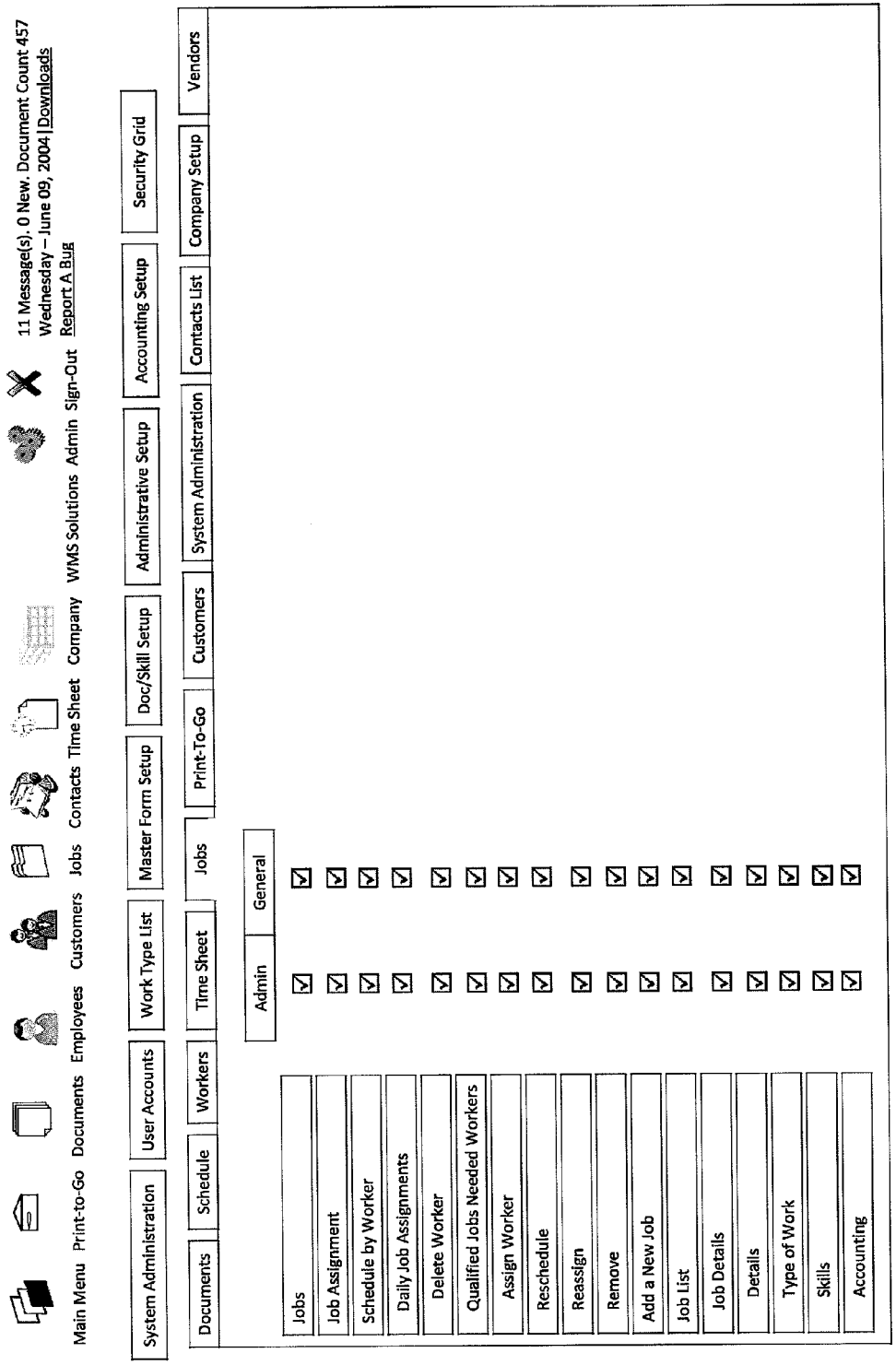
Figure 57F:
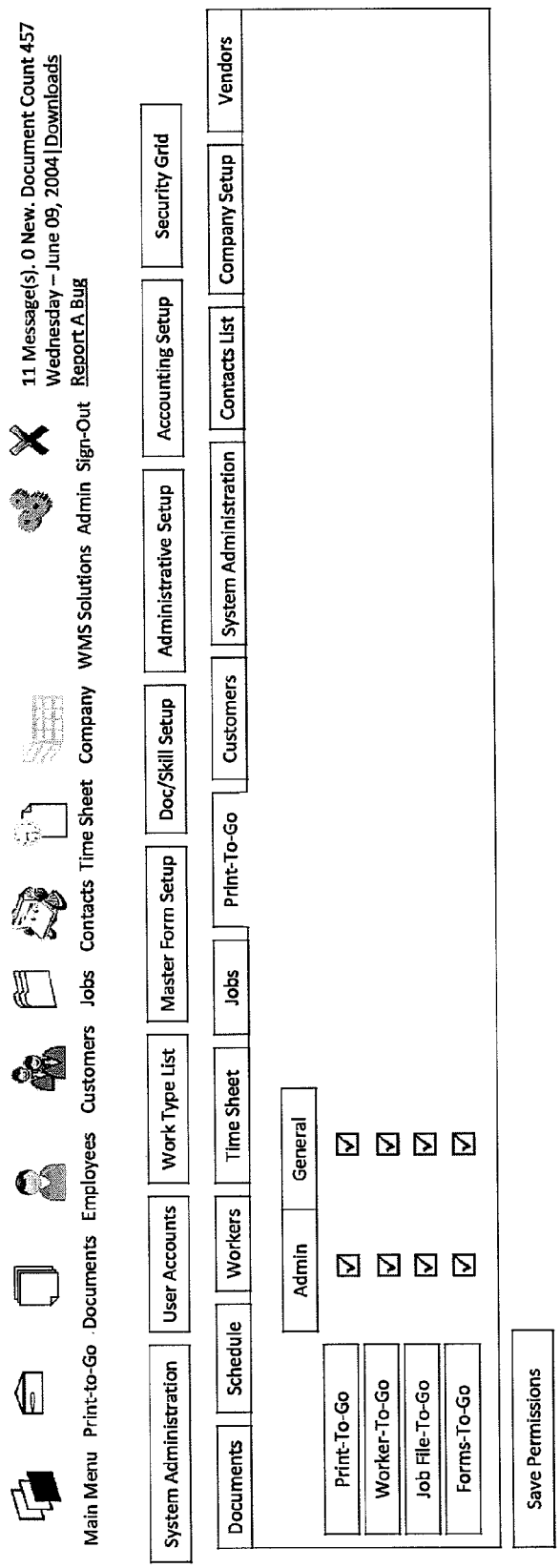
Figure 57G:
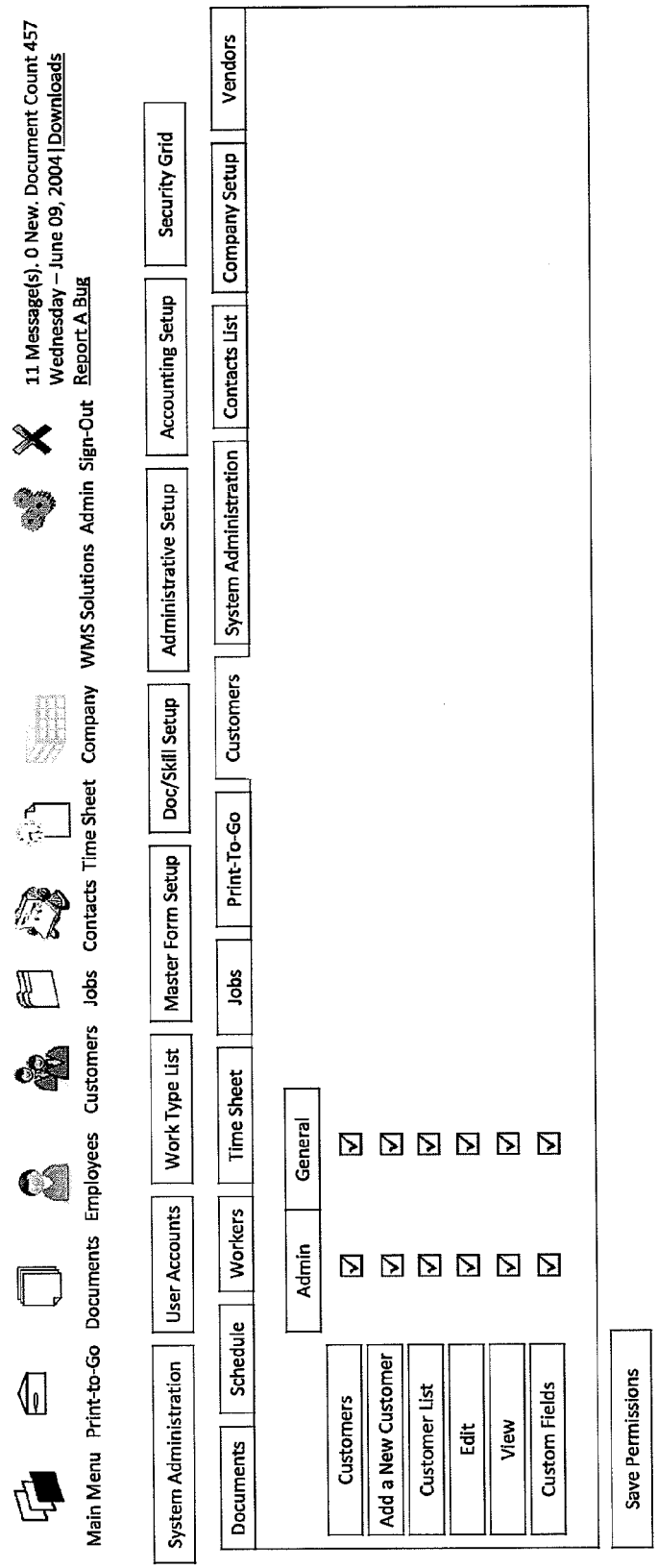
Figure 57H:
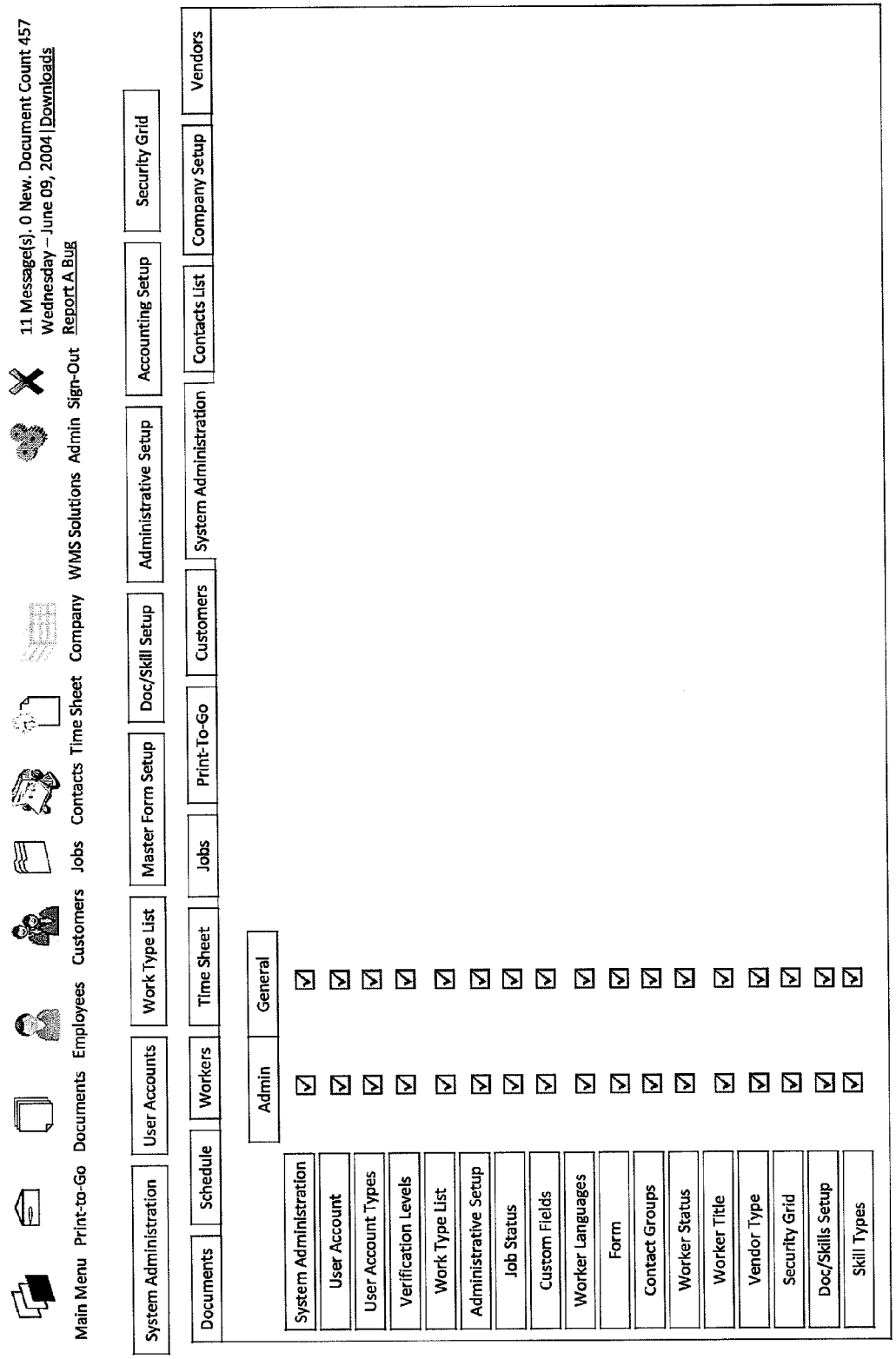
Figure 57I:
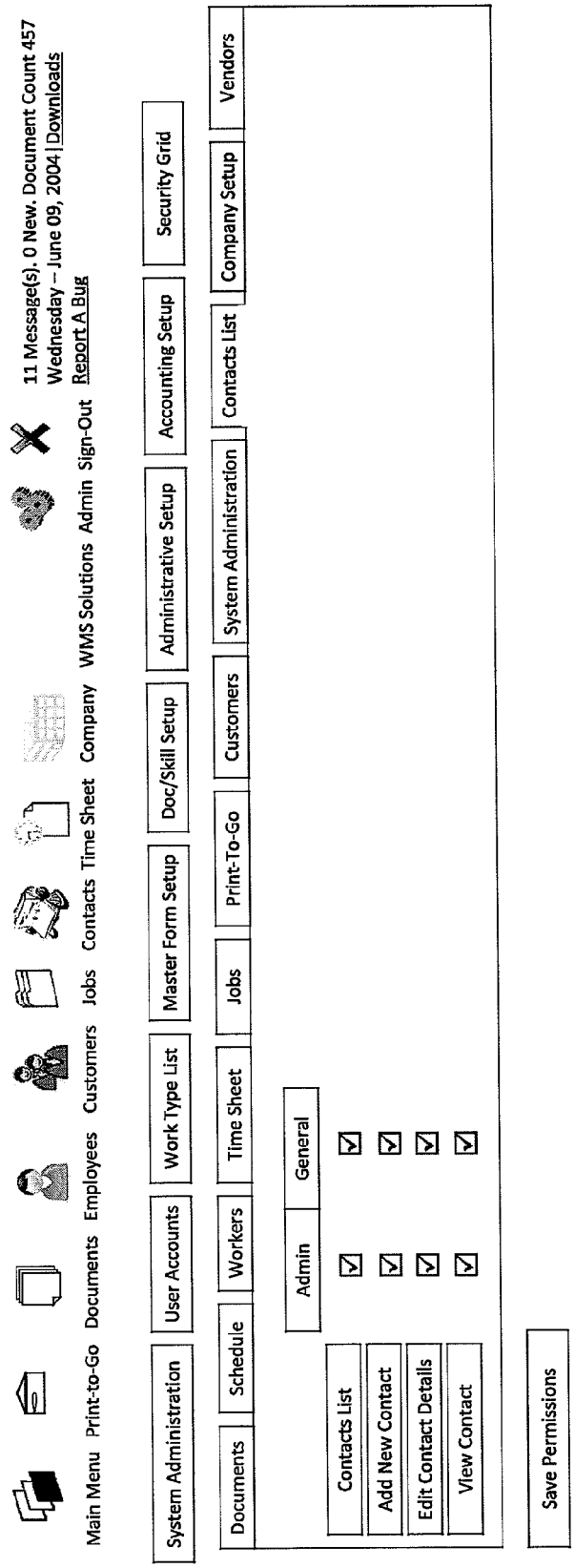
Figure 57J:
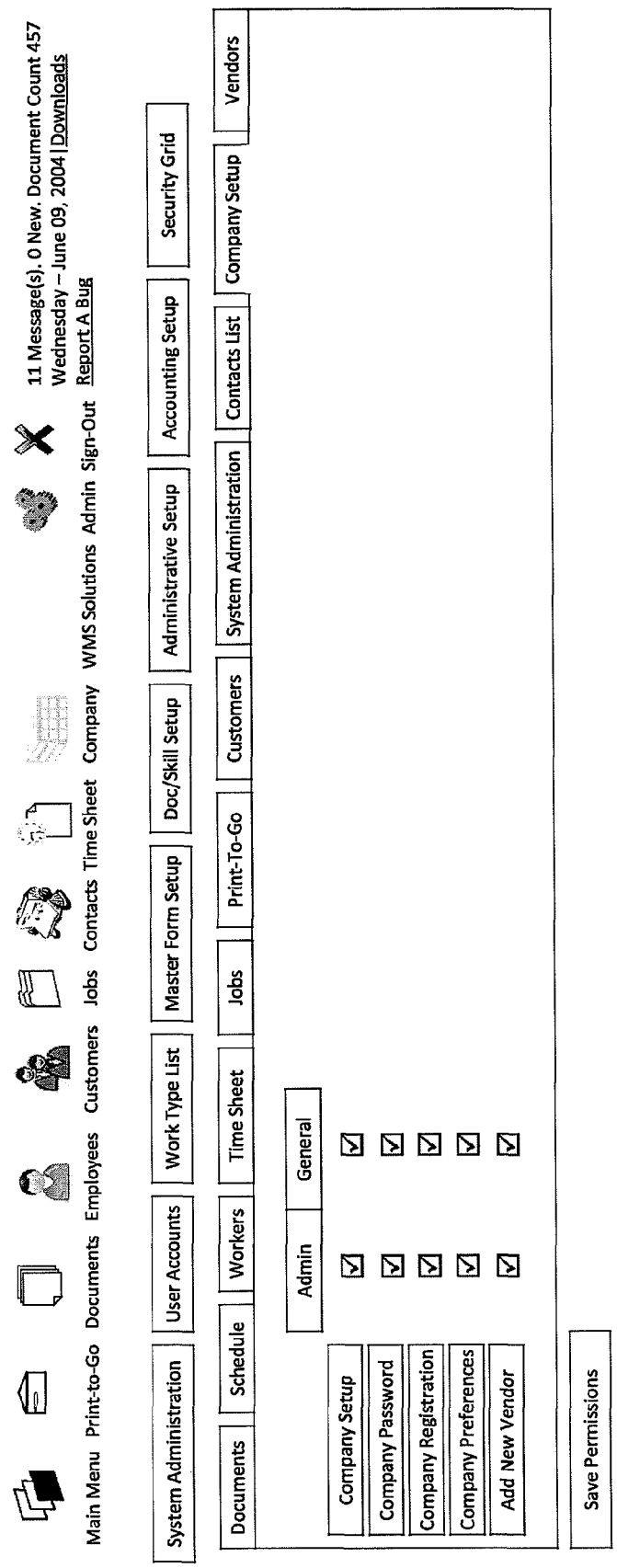
Figure 57K:
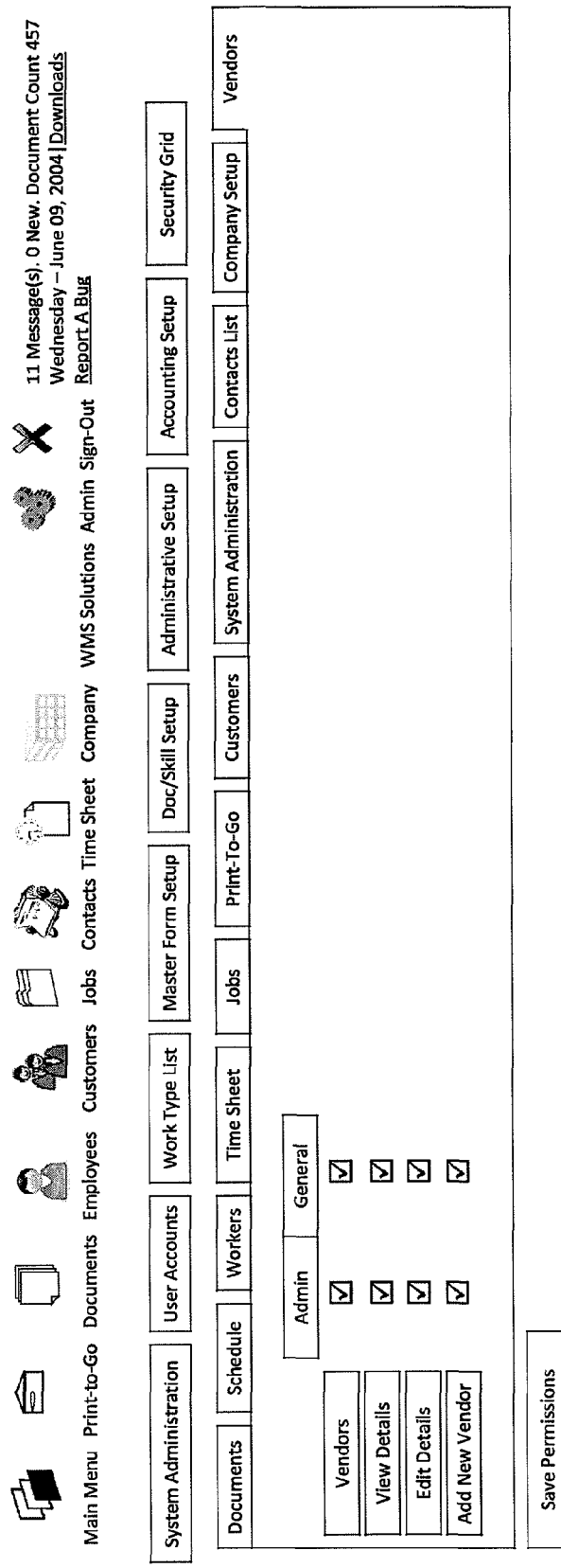

This sub-module allows the user to set permission for various employees within the company, FIG. 38. In particular, certain people can be allowed to view, modify and add information in various parts within the system. The permissions are set for the following pieces: documents as illustrated in FIG. 57A, schedule as illustrated in FIG. 57B, workers as illustrated in FIG. 57C, time sheet as illustrated in FIG. 57D, jobs as illustrated in FIG. 57E, print-to-go as illustrated in FIG. 57F, customers as illustrated in FIG. 57G, system administration as illustrated in FIG. 57H, contacts list as illustrated in FIG. 57I, company setup as illustrated in FIG. 57J and vendors as illustrated in FIG. 57K. Permissions can be set for various user types. Other variations are possible and are within the scope of this invention.

6) Work Type List Setup

Figure 59:
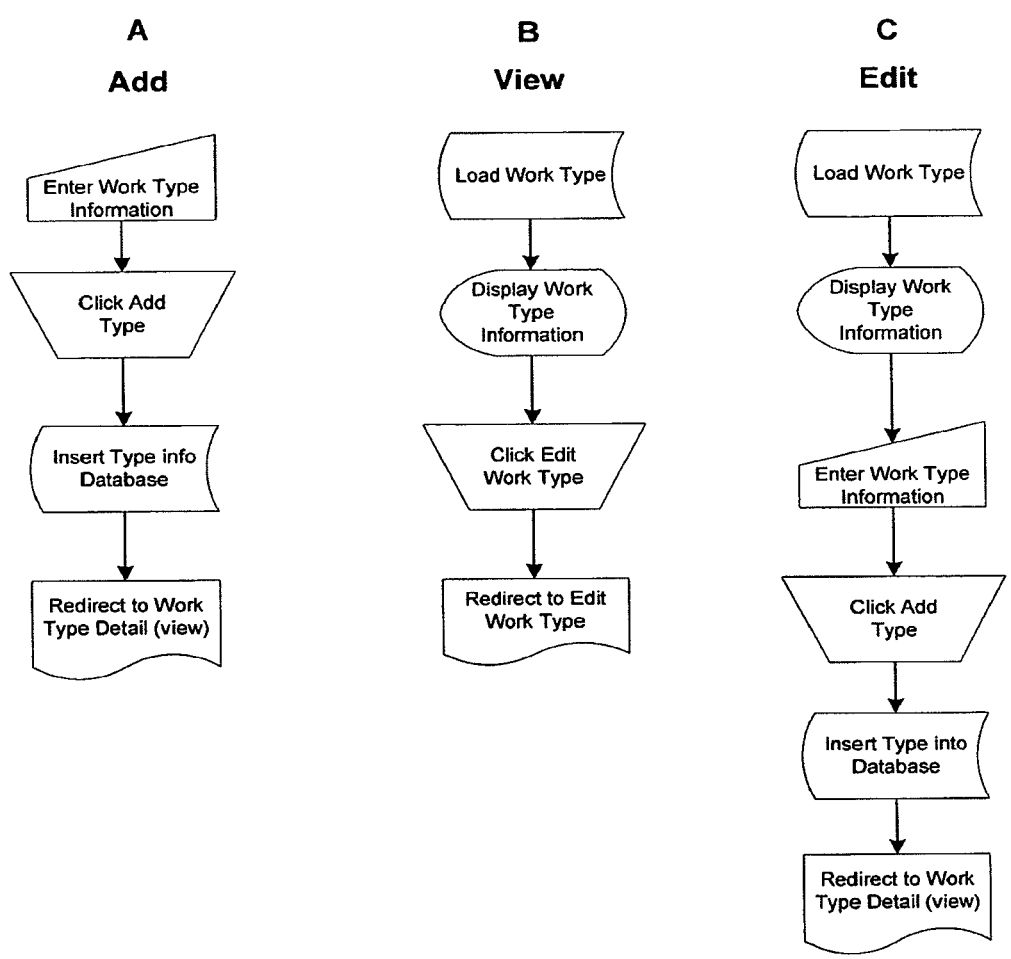
FIG. 59A-C is a flow chart diagram for adding, viewing and editing work types in accordance with this embodiment of the present invention.

This exemplary sub-module provides the user with an ability to add, view or edit work types, FIG. 58. In addition, in setting up a work type, the user relationally links other important information to the work type. For example, the user may specify type of tools required for that work type. Also, job cost (including payroll tax, worker compensation and miscellaneous burdens) may be specified. Similarly, the user specifies documents required for that work type, including documents required by the industry, company, trade, etc. The user can also set type of skills required for this work type. The skills are organized by groups such as industry required skills, company required skills and so on. FIG. 59 illustrates exemplary display of information for work type. This sub-module allows the user to set up the information that is required for the work type. Thereby, if a worker is set to a particular work type, the system will analyze the worker's record and alert the user to the missing or expired worker documents or other deficiencies for this work type. The system can easily and automatically evaluate which worker may perform the work of a particular work type.

The User may add, view or edit information for the work type as illustrated in FIGS. 59 A-C, respectively. The user may view the detailed information for the work type as illustrated in FIG. 596. The user clicks on the desired work type and it is loaded and work type information is then displayed as illustrated in FIG. 59B. In addition, the work type can be modified by simply clicking on the work type to be edited and submitting changes such as work type information in a pop up screen as illustrated in FIG. 59C. The user then clicks submit "add type" and the changes are then saved to the system's database as illustrated in FIG. 59C. The view screen is then displayed with the edited work type.

FIG. 59A illustrates the process for adding a new work type. As illustrated in FIG. 59A, the worker information is entered by the user and the user submits (clicks add type) the entered information and the work type with its information is inserted into the system and the screen is reloaded. Other variations are possible and are within the scope of the invention.

This exemplary feature provides the user with an ability of bringing together the key aspects of different work types by associating job requirements and worker skills needed to perform the job. The user can create a limitless list of requirements and skills that meet their industry needs. By combining these skills in a "Work Type" they create a profile of the worker needed to perform those tasks.

In addition to managing which workers are qualified to work under a particular work type, the user has the ability to track actual cost by predefining the cost associated to the Work Type. The user can attach Workers Compensation, Payroll Taxes, and Miscellaneous Burdens as they apply to each work type and each state. This gives the user the ultimate ability of knowing the real cost associated with any job.

When a worker is assigned to a "Work Type", the system checks the workers qualifications and skills on file and compares to the qualification and skills required for this work type, then the system visually display, through color-coding, if the worker meets the skills and qualifications of that Work Type. In addition to the color-coding, a symbol is displayed showing the worker valid or invalid. Also, the color coding displays if any of the qualifications for the job or the company are going to expire within 30 days.

During set up, the user defines different types of works needed to perform their job. The billing rate and budgeted worker wage information is collected. This information is reviewed each time a worker is assigned to the Work Type and displays a real cost to the user. The user has the ability to immediately analyze the relationship of the worker and the schedule with costs prior to the event occurring. This gives the user control over their labor cost and early warning signs of any cost overrun.

By using the association of "Work Type" to a Job Requirement, the user knows the workers who have the ability to complete a certain job and the user has the tools to track and monitor the cost of that job. The criteria that defines Work Type is not predefined. Work type is a dynamically generated field. This allows the user to create new "Work Types" and dynamically generate the necessary requirements associated with them. This provides the user limitless possibilities for tracking job requirements and skills related to their work force.

This feature also allows the user to use skills and qualifications as requirements to pre-define any type of "Work type" they want to create to manage their business. The user may simply apply skill or qualification requirements or combinations of skills and qualifications to a "Work type". Once that work type is assigned to the worker, the system monitors and tracks the worker throughout the system for their validation and status of that specific work type description. This is done through color-coding and symbols. Thus monitoring the work force is easy and intuitive.

For example, a company policy may require a copy of the worker's driver's license to be kept on file. The exemplary WMS does not specifically list a driver's license, but the user can "add a new work type" and set out the new criteria for the driver's license. In short, the work type logical part is very flexible providing the system with the ability to adjust to the needs of a particular industry or field quickly and easily.

To sum up, with this exemplary Administrative module, the user has an ability to set up almost any field and field type, the user views as important in managing the business. In addition, this system provides the user with flexibility to name fields with words, the user is most likely to remember. The user can set up default fields and add additional fields or field types for any type of data, at any time and not just during the initial setup. Finally, the user can also rename all dynamic fields within the system and all main modules. For example, the user may wish to name "workers" "employees" or "students" and in so doing all fields including that terms will be renamed such as "worker status" to "employee status" or "student status." The job or customer fields may be renamed project and client fields for example and so on.

F. Accounting Management—Time Sheet

Figure 60:
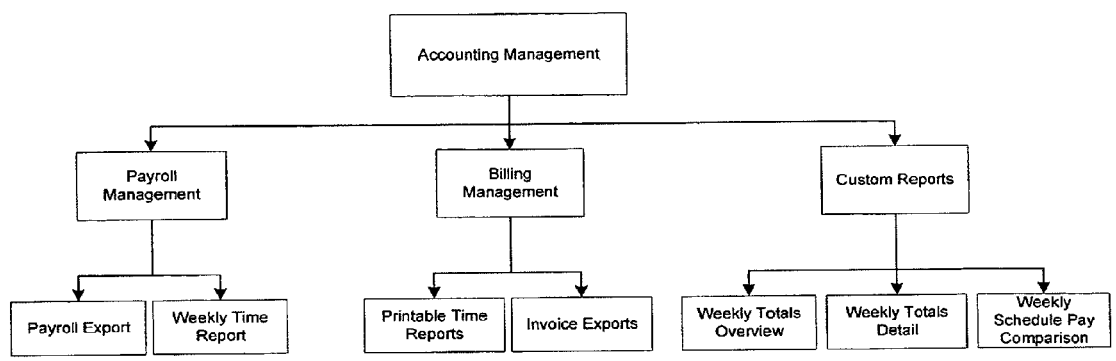
FIG. 60 is a block diagram of the accounting management module in accordance with this embodiment of the present invention.

The WMS provides not only exception front office management capabilities but it also provides a wide range of back office capabilities such as Billing and Payroll Management. This module is broken into the following sub-modules, see FIG. 60: 1) Payroll Management, 2) Billing Management and 3) Custom Reports.

1) Payroll Management

This sub-module facilitates the payroll entry process by utilizing methods and procedures that save the user hundreds of key strokes during time entry. For example, Paychex, a conventional payroll system, requires the user to make about 227 key strokes to enter payroll data, to enter the same data with the WMS solution the key strokes needed are as little as about five. Conventional accounting systems require the user to enter data from data entry sheets that accept the information one worker at a time. Other conventional systems create spread sheets to allow the user to enter data. These conventional systems fail to utilize the dynamic features and methods that are provided in this sub-module. This sub-module can be used as an overlay to any accounting system directly or be used to capture information and download it to any accounting system or payroll service through a custom link.

Therefore, the user only has to enter data one time. By utilizing this sub-module, the user can refine their payroll entry system to only a few key strokes. If the user chooses to use the payroll sub-module only, a custom link is created to embed the payroll sub-module within the accounting system thus enabling the information to be drawn in the same format that it is drawn from this worker management system. The methods and procedures of this module enable the simple and rapid entry of time sheets. Many users struggle with time sheet entry. The conventional processes of entering time sheet information are slow and tedious and the conventional methods practiced lead to data entry mistakes that could be avoided.

This sub-module provides one main screen for payroll entry with several key pop up menus. The time sheet is automatically populated with key data the system already knows. The user goes directly to a single screen, selects a customer, and then selects a job. This sub-module then draws the default information from the information already contained within the other modules of the system. This enables the user to key specific time directly to the workers on the job. The user has the ability to easily select and use scheduled data or default setting, which can be set to the user preference. For example, the default setting could be set to 8 hours and the standard work days would default to eight hours. The recommended practices is to set the default to zero, this ensures no hours are predefined. If the user selects populate fields from a schedule, the system populates the date from the schedule information. The user is then able to edit the fields for each worker as necessary. The information that is presented is only default information that can easily be edited or deleted.

Another example of this is the worker pay rate. The worker pay rate is drawn from the worker file. If the job is a Davis Bacon job/Certified Wage project, the system automatically has that information based on the job criteria originally entered, and defaults to the worker's wage or Davis Bacon wage, whichever is higher. The user could then type over the wage and put in any wage they wanted. This wage would be used for this time sheet only. The ability to default to information that has already been entered into the system and overwrite the known information without writing back to the job file or worker file is an efficient method of managing payroll. It enables rapid time entry and easy and quick adjustments.

The user also has the ability to correct or update the job and the worker file by simply clicking on a button and a window for the job or the worker pops up. The edit is made and the user is able to keep working without ever leaving their place in the application. The user has the ability to hit a refresh button on the time sheet entry screen which would go out and get the most recent data. If the user does not hit the refresh screen, the edit they made to the file would not be activated until the next use of the time sheet. In the conventional systems, users are forced to keep running list of items to update data entry for the next payroll or they enter them and it over writes the information for this week. An example of this would be a worker receiving a pay increase. The accountant may be notified of a wage rate raise but the user is still working on the last week's payroll. Rather than wait to make the update, they could make the update straight from the time sheet, as the event arose and it would not affect the past or current pay period time entry. This is true for the payroll and job fields that populate the time sheet.

The ability to have the necessary information populate as a default and then to be able to adjust, move, and correct that information allows the user to easily navigate the time entry. Since the information is automatically entered by default, the user does not have to remember numerous codes and payroll information. Furthermore, the user can easily view a worker or a job at anytime without losing their place by simply clicking on the job number or worker name, a new window appears, the view or edit is done and the window is closed returning the user to their original place.

This sub-module also enables the user to add workers to the time sheets and create new time sheets for jobs on the fly. This is done through a dynamic pop up windows that give the user the ultimate flexibility to add a worker to the time sheet, and if necessary, add a job time sheet to the customer for that job. Most accounting systems available today require the user to leave the system to setup a new job or create a new payroll time sheet. The WMS methods and procedures allow the user to do this in easy steps without leaving the current place of work. This sub-module does the work through business logic. This enables the user to rapidly add unexpected jobs that need time data entry.

For example, when a contractor worked on a job for 2 hours on a Friday afternoon because they finished another job early and the office was unaware of it until the time sheet came in, the user would typically have to set the job and time sheet information up in another place in the system. Therefore, when the user was entering time and this time sheet appeared, they would have to stop where they were in the time sheet entry, leave the screen, enter the job to the customer, assign the worker to the job and then enter the time, assuming the job cost and pay rate cost was in the system, this process takes time and numerous key strokes.

This sub-module is consistent with solving this problem by allowing the user to simply click one button called add a worker/job. A pop up window is presented that has the workers for the company available and the current job, and the customer are displayed. From this one screen, the user could select a new customer and the jobs for the customer would be displayed, the user would select the job and the workers that were on the job and the new time sheet would be created. If the user selected, for example, a radio button that said "use current workers selected", the system would know from the current work sheet what workers were selected and would populate the workers for that time sheet. Thereby the information in the system is entered only and then is relationally linked to other modules. This enables the user to go right back to entering time. The WMS solution not only saves time by only entering information once but also by not requiring the user to move between screens and various modules within the system, thereby loosing their current place of work.

This sub-module may save the user many hours a year in payroll entry. In addition, with default values that can be over written and the payroll entry mistakes should drop. This sub-module is split up into the following logical parts i) weekly time reports and ii) payroll exports, see FIG. 60.

i) Weekly Time Reports

The Weekly Time Report logical part is a functional screen allowing the user to enter weekly time for the workers assigned to a selected job for the selected week. By default the previous week is selected, but the user can select any week from the displayed calendar as illustrated in FIG. 61. In addition, the week comes up in the form the customer uses, be it from Monday to Monday or Wednesday to Wednesday. The user selects a customer, which refreshes the screen with a list of the jobs that had workers assigned that week. The user then selects a job, which refreshes the screen with a single spreadsheet containing a list of workers assigned to the job. The spreadsheet is then ready for time entry. For each worker on the job the following information is easily entered by tabbing or using the arrow keys to move through each field: total hours worked on this job for each day. In addition, for each worker on the job the following information is calculated automatically as time is entered: the first forty hours will appear in the regular hours column, any hours over forty will appear in the overtime (OT) hours column as illustrated in FIG. 61. This logical part will easily calculate if overtime was worked on two separate jobs.

For each worker on the job the following information is pulled from one of two places either the job detail information or the individual worker's detail information, whether the job is non-certified, regular travel/fringe rate and so on. Of course, the user could override the previously entered information. Overtime Travel/Fringe Rate is calculated automatically at time and a half of the Regular Travel/Fringe Rate. Regular Wage Rate is pulled from the worker's individual detail file, but can also be overridden as time is being entered. Overtime Wage Rate is calculated automatically at time and a half of the Regular Wage Rate. Regular Billing Rate is pulled from the job detail file or, if the worker has a greater billing rate than the job, it will be pulled from the worker's individual detail file. The Regular Billing Rate can also be overridden as time is being entered. Overtime Billing Rate is pulled from the job detail file or, if the worker has a greater billing rate than the job, it will be pulled from the worker's individual detail file.

For each worker on the job the following information is calculated automatically: as time is entered total wage is calculated based on the number of regular hours times the regular wage rate plus the number of overtime hours times the overtime wage rate. Total travel/fringe is calculated based on the number of regular hours times the regular travel/fringe rate plus the number of overtime hours times the overtime travel/fringe rate. Total Bill is calculated based on the number of regular hours times the regular billing rate plus the number of overtime hours times the overtime bill rate. These amounts are recalculated automatically as any number in the worker row is changed. Clicking Save Changes updates the weekly time report row records in the database. For each worker row, the job number is displayed. For each worker row, a checkbox is displayed allowing one or more workers to be selected for functions such as: reassigning selected workers, assigning worker to an additional job, deleting selected workers and adding a worker or a job to the time report.

For example, when reassigning selected workers is selected, a list of the jobs will appear. The user simply selects a job and presses the reassign button. The screen will refresh and the workers that were reassigned will no longer appear on the current job. When assign to additional job is selected, a list of jobs will appear. The user simply selects a job and presses assign. This allows workers to be assigned to more than one job as their schedule permits. If a crew works on one job starting Monday, and was moved to another job late in the week, but was not assigned to the new job in the WMS, the current client would appear. The worker will still be assigned to the original job as well. When deleting selected workers is selected, the screen will refresh and the workers that were deleted will no longer appear on the current job. When adding a worker/job to the time report is selected, a list of workers in the system's database will appear. The user can then access and manipulate various worker and job data. It is possible to assign only one worker or multiple workers to the current job. For each worker, if a worker's documents are Expired or Incomplete, the name is shown in bold red, for example. If a document is pending, the name is shown in bold blue. If the worker is assigned to more than one job that week (and thus at risk for uncalculated overtime on one or more jobs), a red exclamation point is displayed after the worker's name. This is provided by way of an example only and other variations are within the scope of the invention.

In order to increase the speed of entry the totals row at the bottom of the Weekly Time Report is left blank until an Update Button is selected, for example. Otherwise, the worksheet would be continuously updated which takes time especially on a large job. After the Update Button is selected, the user will be able to view the totals for each column in the worksheet. These numbers can be used for reconciliation and verification purposes.

The Weekly Time Report also allows every worker's individual data file to be accessed by clicking on the worker's name. This can be used for updating worker information on the fly. Other features that may be included are automatically opening the worker in a separate window. The user then will also be able to assign workers to a job through the weekly time report to a job if the client has no other jobs with workers assigned.

Payroll Exports Service Provider

This logical part allows the user to export their timesheet information to a predefined link, which would typically be assigned to an outside software package or service provider such as Payroll, ADP, Paycheck, Timberline, Great Plains or Quick Books. The specifics for the export function, such as which outside software or vendor and which fields to link are predetermined during the setup.

Workers On Site/Secure Site

As security becomes a greater concern at places of business, airports and government facilities worldwide, a need for more accurate verification of identity and tracking of an individuals' whereabouts has become necessary. WMS has created a secure site system tied directly to the job management, compliance and time sheet capabilities of the application. Secure site utilizes WAP capabilities, magnetic stripe technology and biometric fingerprint scanning.

The user may begin by simply linking a worker profile to a swipe card containing a magnetic stripe or to a fingerprint. This is done via a magnetic stripe reader or a fingerprint scanning device and an easy to use screen listing the workers in the designated database. WMS can then track these workers as they enter and exit job sites. The application is loaded at a job site either on a WAP enabled mobile device or any computer. If the application is loaded on a device connected to the internet or on a WAP enabled device, when the workers swipe their cards, scan their fingerprints or are logged in via the WAP enabled device, their time of arrival is automatically logged into the time sheets. The logout process works the same way. In addition, upon swiping their ID card or scanning their fingerprints, the worker's profile is displayed, allowing the supervisor to see whether or not the worker is in compliance for that job. If a required document or certification has expired or is missing, the supervisor can have the worker re-swipe their card or rescan their fingerprint to show that the worker attempted to come to work but was not qualified for the job in question. The system may also block the worker from logging into the system if a required industry representation is missing or expired. Alternatively, the system may send an alert to the site supervisor informing them that an unqualified worker is working on the site. On of ordinary skill in the art will recognize that other variations are within the scope of the invention.

2) Billing Management

The billing management capabilities include the ability to manage invoices through the invoice expert and print time reports of this exemplary embodiment. This sub-module includes the following logical parts, see FIG. 60: i) printable time reports and ii) invoice export. The Printable Time Report logical part is a report displaying the time report row data for the selected job for the week selected. FIG. 62 illustrates that upon selecting a customer and a job for the customer, an exemplary printable time report is displayed. In FIG. 62, workers assigned to the job are shown along with number of hours they worked and the totals for the job are provided. In addition, FIG. 62 illustrates a calendar for selecting the week for the report. This report can be printed for a variety of purposes such as record keeping and client invoicing. Certain columns/data can be hidden depending on the reporting needed.

By default the previous week is selected, but the user can select any week from the displayed calendar illustrated in FIG. 62. The user selects a client, which refreshes the screen with a list of the jobs that had time entered that week. The user then selects a job, which refreshes the screen with a single spreadsheet containing a list of the workers who had time entered to that job. The user can then click on the designated links (e.g., prey, next links) to quickly jump from job to job for the selected client or can change the report view by clicking on the Time View, Bill View or Sign View.

The time view logical part provides the user with a screen that breaks down the hours by day and total for the time period of each worker assigned to a specific job. It breaks down the hours by regular, overtime and total hours. It includes travel or fringe rates and any overtime paid on those items as well as the billing rates for all mentioned items. The bill view can be used to support invoices mailed to clients. It breaks down the hours by worker by day worked on a project for a client and includes only billing information without any cost information. The sign view logical part can be used when a worker picks up a check or confirms the hours or amount paid to them by the employer. It may provide such information as hours and all wage rates as well as a space for the worker to provide their signature.

The user can also download a file (e.g., a PDF file) containing the liability releases for the workers on a particular job. The user will also be able to print any document from this page. The user can also download a PDF to Acrobat that contains the three views and releases in a single file for easy printing. The user will be able to define which document he or she wishes to add to the PDF file. The invoice export logical part works similarly to the payroll export. The invoice information is simply exported to an outside software package or service provider.

3) Custom Reports

The custom reports sub-module allows the user to dynamically generate reports. By utilizing the report writer the user can identify fields within the database and build custom reports to meet their needs. The report wizard walks the user through the process step by step insuring the integrity of the data and its relationships for distribution. In the event the user is unable to build a report, the user has the ability to call the WMS document center for support or contract the system's partners to develop any type of report information they need. This sub-module may include the following exemplary reports: i) weekly total overview, ii) weekly total details, iii) weekly schedule/payroll compensation, iv) weekly payroll/ overtime compensation, v) employees weekly totals overview, and vi) workers compensation reports.

G. Print-To-Go

Figure 63:
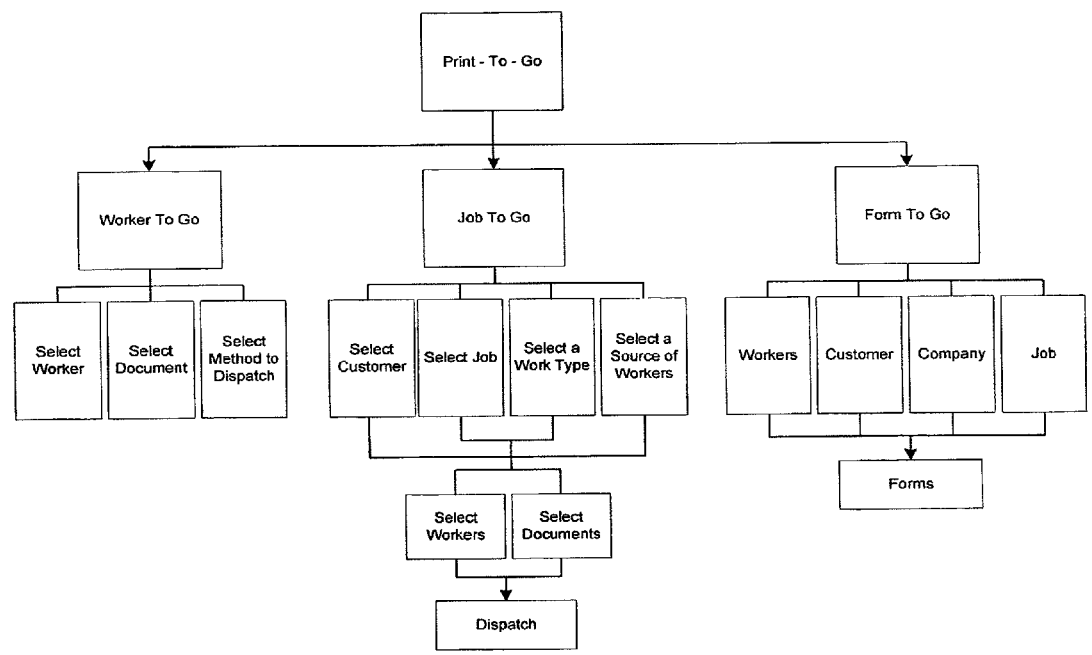
FIG. 63 is a block diagram of the print to go module in accordance with this embodiment of the present invention.

Print-to-Go module provides documents on demand for users who need documents rapidly and frequently. Today many people still pull documents from file cabinets and run them through copiers each time a copy is needed. This module eliminates the need to ever copy a document more than one time. The Print-To-Go module allows the user to manage and distribute documents by printing, emailing, faxing or saving them to a disk. This module enables the user to print directly from employee files, worker file-to-go or from a predefined job, job file-to-go or generates selected forms for selected workers, form-to-go. The three sub-modules are 1) worker-file-to-go, 2) job-to-go, and 3) form-to-go, see FIG. 63.

1) Worker File-To-Go

Figure 64:
FIG. 64 is a GUI for creating a worker file to go in accordance with this embodiment of the present invention.

Worker File-To-Go enables the user to click on one or more workers, select desired documents for the workers and select a method to dispatch the documents as illustrated in FIG. 64. For example, if fax-to-go is selected, the user is queued to enter the fax number. If email is selected, the user is queued for email address. Then the documents are dispatched. Once dispatched the user has the ability to make another selection or leave the screen. Alternatively, the user can save the document as a PDF onto a CD/DVD, a floppy or some other type of memory. If a document was checked and there was no document on file for the worker, a page will print with the workers name, the name of the document and a message that the document is not on file.

In addition, preceding each worker name is a color coded icon or some other symbol, alerting the user if the worker is out of compliance with company requirements. To view what problems may be present in the worker's file the user may use some sort of navigation method, such as clicking their mouse on the icon or rolling over the icon, at which point a pop up will detail the documents, skills or other fields needing attention. To view or print the problems that may exist with one or more worker files the user may flag the check box preceding the worker icon and click on the show status button, at which point a large pop up window will appear detailing all the problems that may be related to those workers.

2) Job File-To-Go

Figure 65:
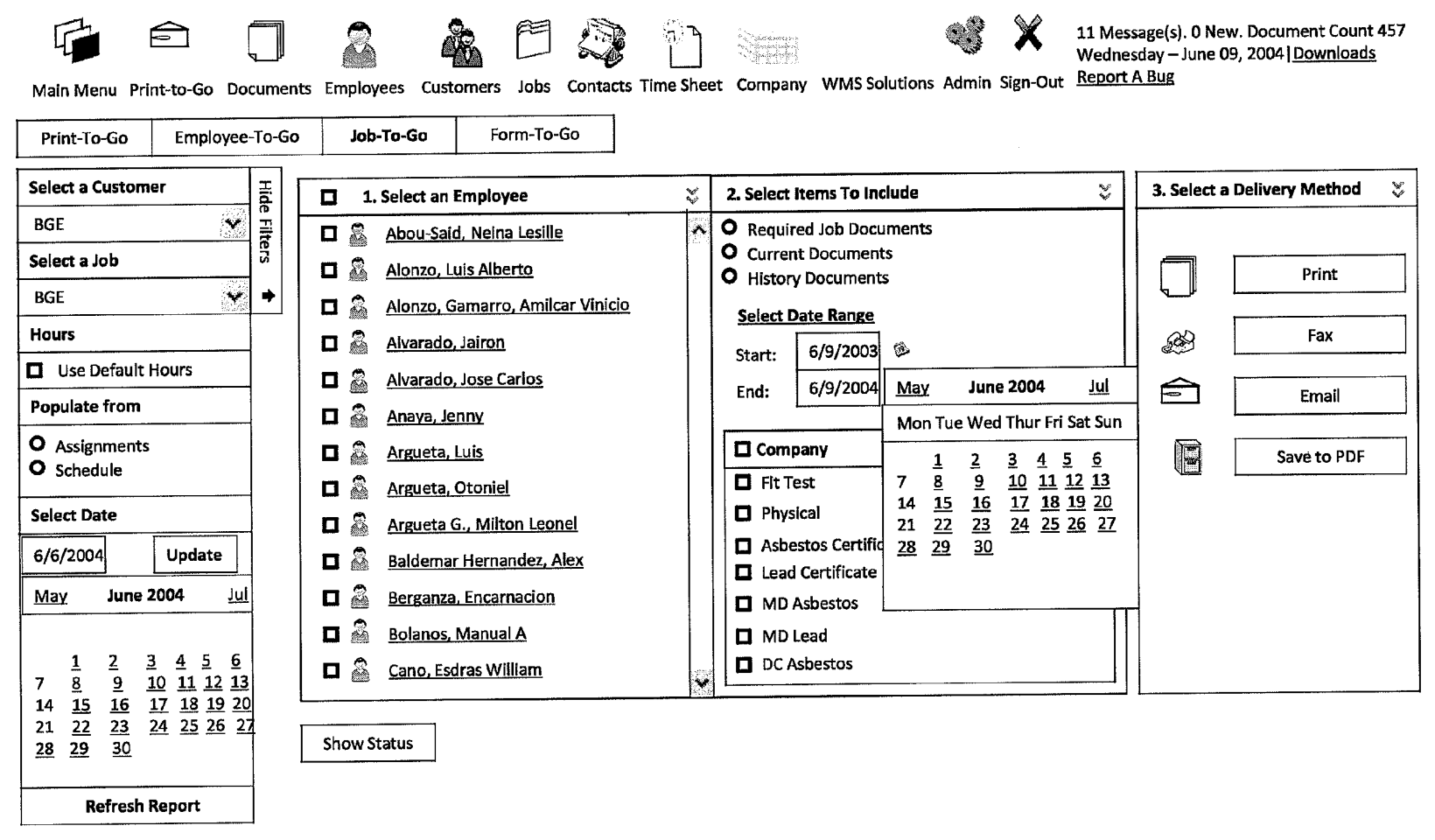

Job File-To-Go sub-module dispatches documents in the same way as Worker File-to-Go sub-module. The difference is when Job File-To-Go is selected, a number of filters are provided. The user may select a customer and then jobs for the selected customer. In addition, the user can select a work type and the source of workers (e.g., from the assigned workers, scheduled workers or payroll). Upon such selection, the workers for that selection are displayed as illustrated in FIG. 65. The user can then select send all the documents, only documents that have not yet been distributed, current documents, required documents for the job and so on, e.g., as illustrated in FIG. 65. The documents are automatically pre-selected. The user can edit the workers and the documents to disburse with easy to use check boxes. Upon final review, the entire job file is ready for dispatch. Once dispatched the user has the ability to select another customer and job or leave the screen.

In addition, the Job-To-Go screen, similar to the Worker-To-Go screen also provides color coded icons or other symbols representing the company, job and work type requirements with respect to each worker's compliance. To view the problems with a worker, the user may use some sort of navigation technique such as rolling their mouse over the icon or clicking on it to view a pop up of the problems with that worker. To view and print one or more workers at a time, the user may flag the check boxes preceding the icons next to the workers for which they need more information and click on the show status button. A pop up will appear informing the user of all problems with the workers in question.

Print-To-Go offers the user a wide range of preference regarding how the selected information will be delivered. For example the user can choose to include a cover page between each worker file displaying a picture of the worker and a list of documents that were printed with the data entry information listed. For example, the workers physical would list, physical and date of expiration. The user can also choose to print the word "expired" on any document that has expired. If the document had been verified by the user, the name of the user, the date verified and the name information of the verifying party would be printed on the document at the bottom of the page. The functions to print expiration, verification, cover page, and picture on the cover page are the functions that the user can turn on or off in the print to go preferences or administrative section. This gives the user flexibility over the type of information to dispatch.

3) Forms-To-Go

Forms-To-Go sub-module generates forms and populates them with data from the system. The user may select a customer, a company or a job, and then the forms to generate as illustrated in FIG. 66. For example, the user selects the workers and the forms to fill and then to download PDF and the forms are automatically populated with data and are displayed for user review in a PDF format. In addition, the populated forms can be saved back to the record for which they were completed to be used at a later date.

H. Information Exchange

Information Exchange (hereinafter "IE") has empowered the community to eliminate the need for duplicate entry. Community is one or many users that share a common relationship. For example, a contractor and a sub contractor. Once information has been captured electronically by one single user, other members of the user's community will not need to re-key that data. IE allows for the dispatch of data related to elements in the originating database to elements in the recipient database. The dynamic nature of the WMS calls for the customizable routing of incoming data and the possibility of creating custom fields to accept that data on the fly. IE makes the process of transferring data between an industry community more efficient and accurate. Data is easily distributed and validated without sacrificing data security or integrity. IE, just like the previous logical parts, eliminates duplicate entry and at the same time validates Information and Supporting Documentation (hereinafter "ISD"), and manages ISD with Smart Management tools such as smart alerts and color coding within a community of users. ISD are images, data files, documents, industry representations, forms or any type of information.

Figure 67:
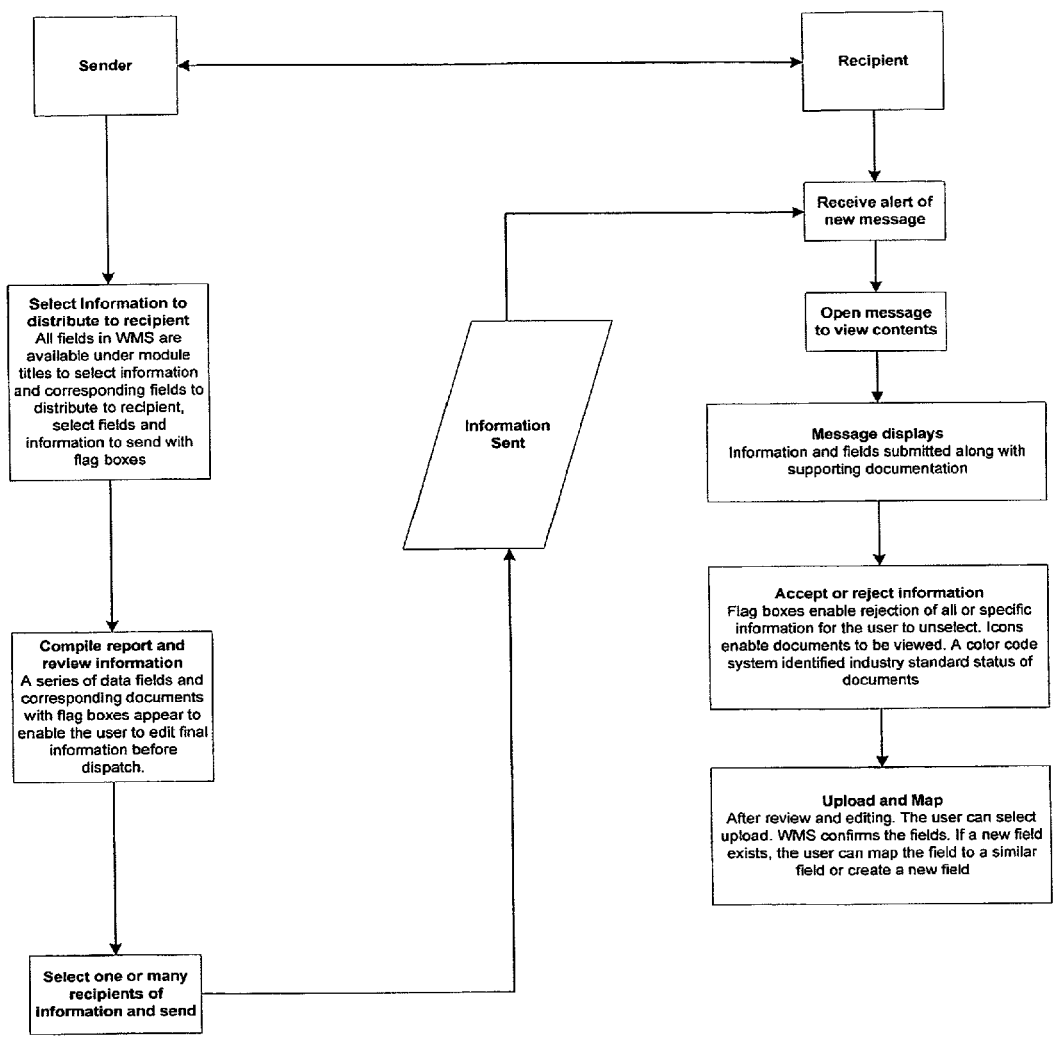
FIG. 67 is a flow chart diagram of information exchange module in accordance with this embodiment of the present invention.

IE is a work flow process that enables a user and a community of users in a one to one or one to many relationship to exchange information with each other seamlessly while enabling each user the ability to choose the information they want to distribute, just as if they were submitting the information by paper, email attachments, web page portal or any other means, as illustrated in FIG. 67. In addition, IE is consistent with eliminating the need for the recipient to manually extract data from these sources in order to enter the data into the recipient's database, IE does it automatically. The user can dispatch ISO to one or more users electronically, enabling the recipients to receive the information, view the information, accept all or part of the information and save the ISD into their database directly. Each user has control over their individual database. When information is received they can choose to accept or reject the data and can even create new fields to accept new types of information. The user has control over what information is sent to other users from a source database and what information is accepted into the recipient's database.

FIG. 67 illustrates a sender selecting information to distribute to one or more recipients. In particular, the sender may select any number of fields and documents to transmit to the recipient. Each selected field or document is provided with a flag box so that the sender may deselect the field or document and so that the recipient may easily map by fields or any number of fields. As illustrated in FIG. 67, once the sender selects information and documents that are to be dispatched, a summary report is compiled for the user to review. The summary report has the total number of documents and the total number of fields being dispatched. In addition, the summary report may provide the total number of workers for whom the information is dispatched, or the total number of jobs, and so on. In addition, the sender may edit the information for dispatch using flag boxes. As illustrated in FIG. 67, when the sender reviews the information, the sender then specifies one or more recipients. Of course, the recipient or recipients may be specified before the selection of information or before the review. The information is then dispatched to the designated recipient or recipients as shown in FIG. 67. The information may be sent using the Simple Object Access Protocol (SOAP).

SOAP allows a program in one kind of operating system to communicate with a program in the same or another kind of operating system using the World Wide Web's Hypertext Transfer Protocol (HTTP) and its extensible markup language (XML) as a mechanism to exchange information. One of ordinary skill in that art is well aware of the SOAP and further description of the actual transmission process between the sender and the recipient is omitted.

As illustrated in FIG. 67, once the dispatched information reaches the recipient, the recipient receives an alert informing him that new information has arrived. Next, as FIG. 67 illustrates, the recipient opens the message so as to review the information received. Next, as illustrated in FIG. 67, the recipient manipulates the flag boxes to determine which information to store in the recipient's database (which information to accept) and which information to reject. Also, a color coded schema may identify the status of the dispatched documents to the recipient. In addition, the recipient may be provided with icons or some other user interface representation to allow the recipient to view the received document. As illustrated in FIG. 67, once the recipient selects which fields and documents to accept, the accepted information is uploaded to the recipient's database. In particular, the system may ask for confirmation of the mapping, also if new fields are being uploaded (fields that were not previously mapped), the system may request the recipient to map this new received fields with an already existing field in the recipient's database or to add a new field for this received field. The information and the supporting documentation is thus uploaded into the recipient's database.

This IE process can be applied to internal and external business practices for a wide range of businesses including event planners, consumers, health care, contractors, banks, non-profits, manufacturers, unions, governments, and anyone who needs to exchange and manage information between each other.

The IE seamless integrations of ISD are performed by mapping data fields using a common library of industry data fields. The dynamic field generation empowers the user to easily develop the necessary ISD fields that their community may need to manage. Each user in each industry dynamically creates document types and custom fields that manage information inside those document types as well as information fields that hold independent data. A unique GUID for each field or document type is created. When the user cannot find a term to their liking, they can simply create a new term to manage the ISD. This new term is added to the library of industry data fields and a GUID is attached to it. During the information exchange process, IE reconciles the list of incoming fields with the existing list of fields and presents the recipient with several options. IE first looks for existing equivalent fields using GUIDS. If the ISD has not been mapped between the users then the GUIDS will not be identical. The WMS will then display mappings by field names. If an exact match does not exist or the user wants to view other data field names, the WMS displays similar field names to which the incoming data field can be mapped. If the user is not satisfied with the terms on the existing list or if the incoming data field to be mapped is a new type of data, the users simply adds a new field to their database.

For example, this may be accomplished by a simple wizard that displays the information delivered by the user in an easy to read format with the mapping that has been suggested from the library of industry data fields. The user reviews the mapping, makes adjustments, accepts or rejects part or all of the information and then IE seamlessly uploads the ISD into the recipient's database for management. Once the fields between two users have been mapped, IE maintains the mapping to empower seamless, effortless exchange while allowing the user to make changes and redirect ISD to new data fields as needed or desired.

IE enables the user to review information before accepting it. The information is displayed in full before being loaded into the recipient's database. The user has the opportunity to confirm the mapping of information and to accept or reject specific fields or supporting documentation. IE's screens are easy to read with check boxes next to each information field along with icons to view documents. The user can quickly and easily accept or reject the information. This process helps to inform users of what information has been accepted by the recipient and what has not. The information is managed through color codes and smart alert rules that have been established by each user to manage common information between users in the industry.

The following is an example of the IE process. Typically the user who first handles the data will perform the data entry, or use OCR technology and confirm the information. Once confirmed, the user can easily distribute the information as needed to the community of recipients. The user uses the templates they designed to manage information that is common in the industry. Each user dynamically sets up their own document types and information fields. The users can name the fields anything they wish and the mapping process will enable them to link information, just as language allows people to communicate in everyday conversation.

The terms used in the community of users are typically the same, thus the mapping process is easy to use. Once mapped, the relationship is set and there is no need to map on each occurrence. If one party in the relationship has changed terminology the report will easily identify this as a new field and the user can map it. The reverse is true, if the recipient has changed terminology they can re-map information to ensure it is put in the right fields. In addition, if the user is not sure they can view the data or document to double check. The users in the community understand the language and use it to set up their own databases for their own internal management of information. The information is then transferred into fields with similar titles that enable the system to reconcile information and supporting documents.

As users evolve with IE, they will define their own community where they share a common relationship of information and eliminate duplicate entry. Information is broken down into common templates with fields that are common in the industry. WMS manages these terms in the WMS library and currently utilizes web services to manage the library, enabling a seamless integration between users. When the information is distributed, it is done so with electronic transfer that creates a report for the user to view and evaluate what if any of the information they want to accept. This is done through easy to use screens with flag boxes to determine what they want to accept.

The information that has been accepted is then distributed into the user's database. When fields appear that do not have clear mapping from the WMS library, a wizard appears offering the user the ability to map the fields. If there are no similar fields, the user can simply allow WMS to add new fields. These fields will be mapped and added to the database. This is done through technology available today and will embrace new technology to improve the efficiency as it becomes available.

The initial process starts as the user develops templates for information and the supportive documentation for the common information shared among users in the relationship. These fields map and manage the information. When a unique field is created, the user has an option to only display the field for that relationship or add it as a default to the document type template. When information is received the user can easily create new dynamic fields to manage the incoming information as well as how the supporting documentation is managed. In addition, the user has the ability to change or assign new smart management business rules around the information and supportive documentation.

For instances, if a contractor submits a new type of insurance document, that is new to the recipient and new dynamic fields have been generated, the user has options to map the information or dynamically create a new document template and fields to mange the new information. For example, mold insurance, the document type is created to capture mold insurance as a document type, key fields are created to handle the specific fields of the document such as the expiration date, the limits of the insurance, the signature of the insurance certificate, the insurance company's name, address and phone number, along with the brokers name, address and phone number. In this example, both users have been empowered to have clear seamless insurance submittals. This eliminates duplicate entry, and benefits both users. The sender knows the user has their information on file and the recipient knows they have it on file and it is current. Therefore, one of the many benefits to the community of users is payments to the user can be smoother because both sides of the relationship know what has been sent, without wondering if it is in the mail, on someone's deck or some other place. It will be in the electronic file, ready for review and access. These fields are dynamically created in the recipient's database to manage the incoming electronic information.

Moreover, IE empowers the user to set smart alerts such as sending an email to the sender when the document is going to expire in 30 days, and a reminder if a new document has not been submitted 7 days before the expiration. The number of days to monitor and the individuals who will be sent an email are set up by the user. Business rules can be set to enable the user to have company default setting every time a document with an expiration date is developed or they can be set during the initial setup. In addition, the user is empowered to set as many smart alerts as they like. For example, another email can be sent to the Project Manager informing them that a document is about to expire. Other variations are possible and are within the scope of the invention.

In this embodiment, the information is received from the user database and is mapped to the destination database. The community is empowered by the elimination of duplicate entry. The information can be sent in either directions and be reconciled at the receiving end(s). Therefore, it is easy for the users to distribute information back and forth without concern of it being lost, overwritten, or deleted.

Auto update can be set up on any level of information. A complete file, such as an employee, or as specific as an employee's drug test result. Auto update identifies any information that has been changed between users and creates a seamless update. Both parties can have auto update turned on. When new information is added the information will automatically update the designated recipient's files. A log will store the transaction to show when the event occurred. The recipient receives the information in their IE mail box, if the event has been auto enabled, the file will automatically load into the destination database updating the data and bypassing the review process. The user will be notified when the new information has arrived and has been loaded. The user can view the information to ensure they agree with the loaded data. If there is anything they are not satisfied with they can simply reverse the uploading. The power of the auto upload is the ability for company defaults to manage the information. This management with the smart alerts empowers the user to stay informed up to the minute.

The user can access this logical part by simply clicking an IE tab. A screen with a number of messages is displayed. For each message, a number of workers, documents, jobs and etc. may be shown. Similar to the other logical parts, a number of filters can be set. For example, a filter by message status (read, unread and dispatched messages), by company (originating company name), number of messages to display per page (how many messages to see on each page of the inbox) and so on may be set. The user may delete certain messages, compose new messages or read the received messages.

Compose a New Message

Figure 68A:
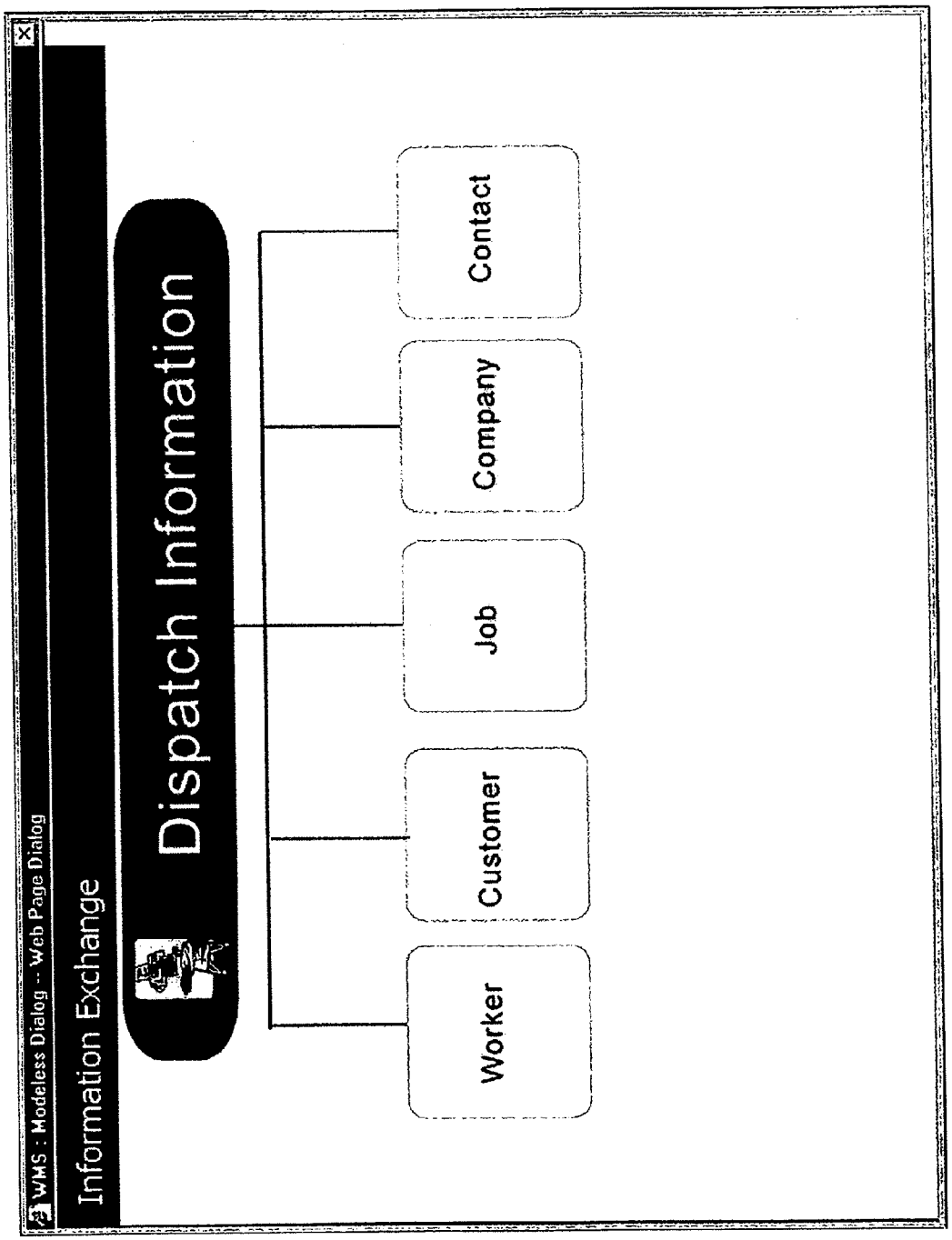
Figure 68B:
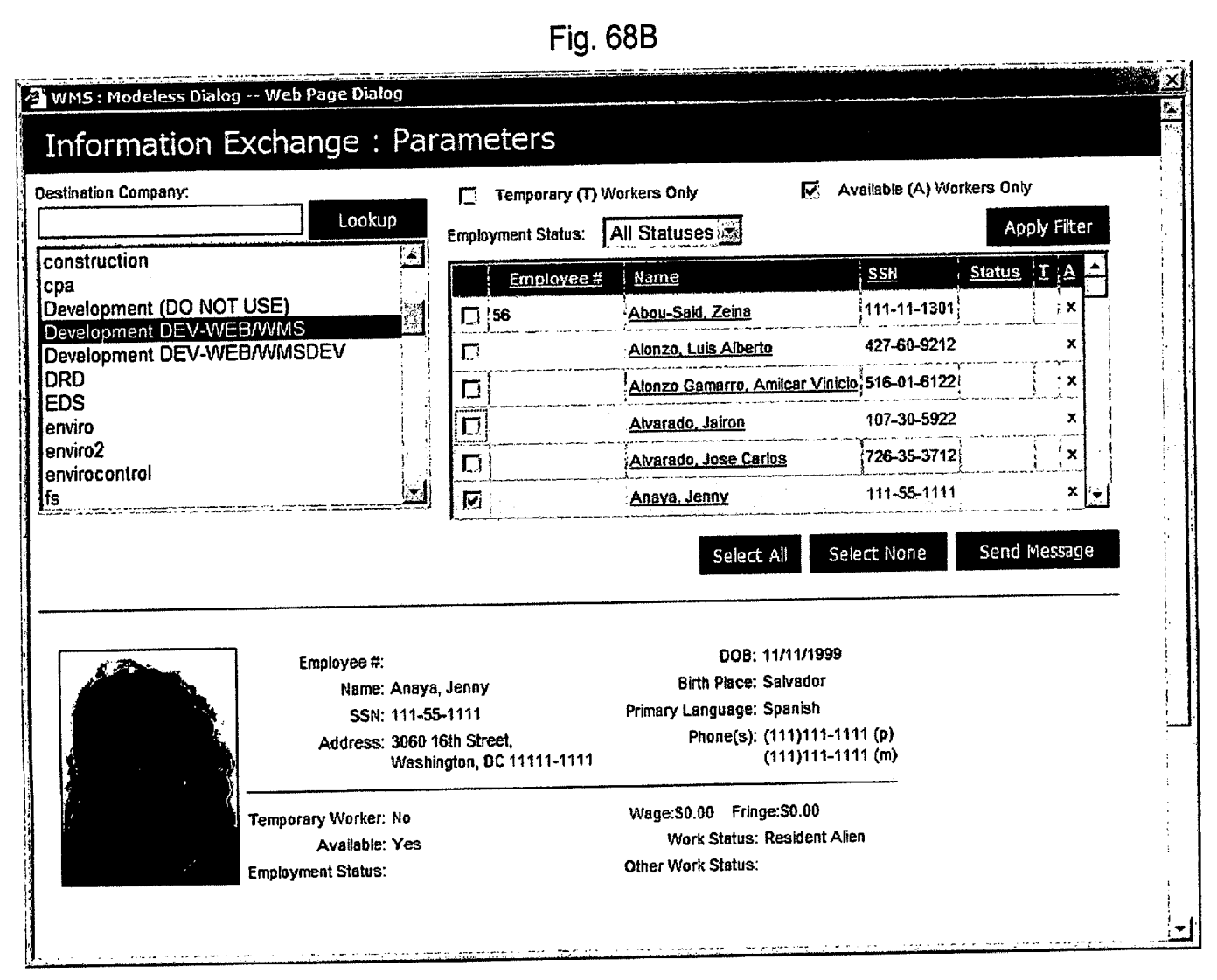
Figure 68C:
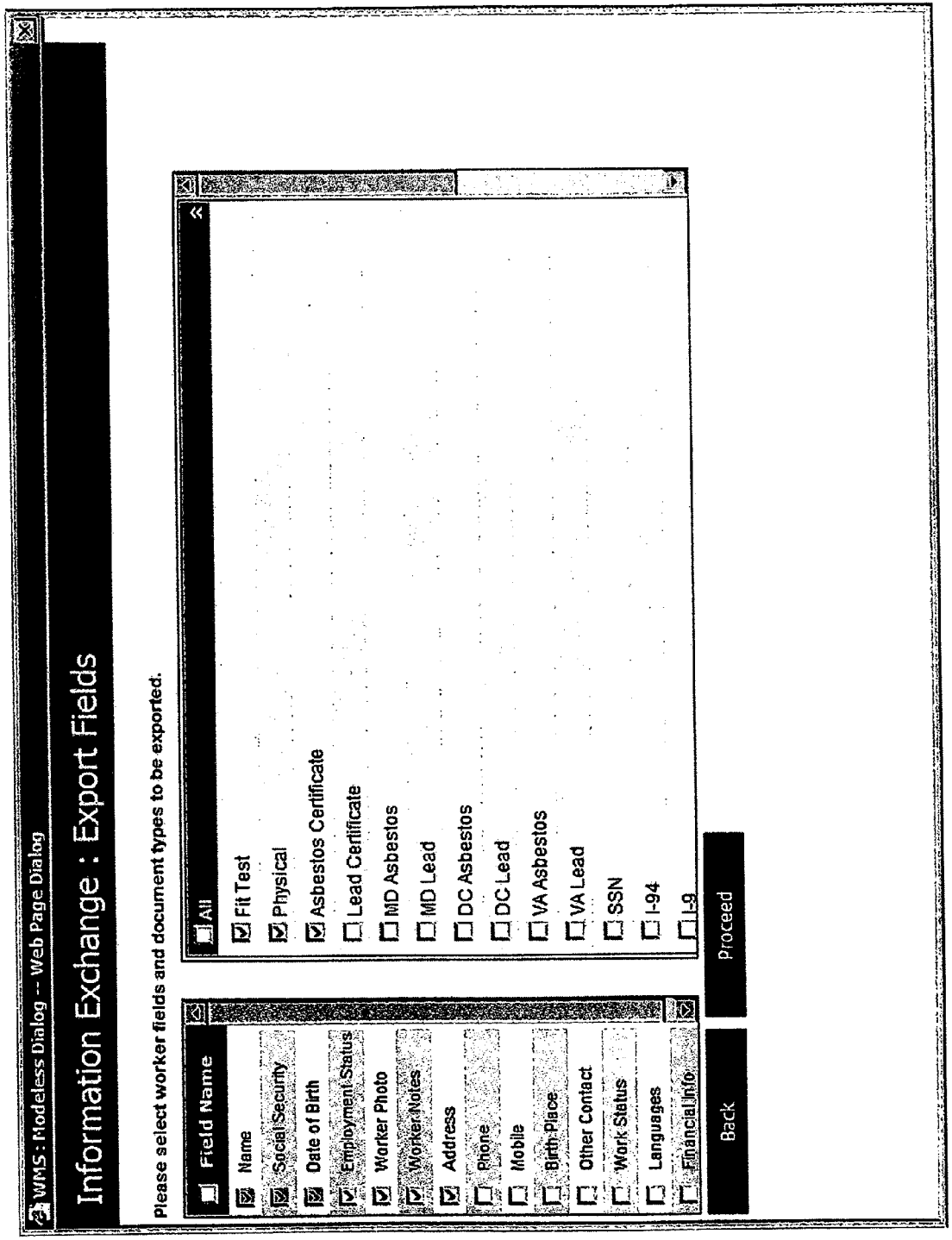

A new message may be composed as follows. A user may simply click on a new message data and select from information for dispatch (worker, document, customer, job, company or contact) as illustrated in FIG. 68A. The user is then provided with a screen to edit details of the new message as illustrated in FIG. 68B. In addition, the user is provided with a list of recipients, allowing the user to select the recipient as illustrated in FIG. 68B. Filters exist allowing the user to easily flag the values by which to filter and to find the desired information. In the case of the worker information in the environmental contracting industry, those filters may be for temporary or available workers. The flag box filters are activated using the button "Apply Filter", for example. A drop down filter may exist to further sort the information in the originating database. In the case of the environmental contracting industry, a workforce database may allow the user to filter by employment status. A table appears below the above mentioned filters holding data from the originating database. In the case of a worker database in the environmental contracting industry, the table includes columns for flag boxes to select the workers, employee number, worker name, social security number, status, and other items such as documents. FIG. 68C illustrates selection of fields for the worker and document types to be dispatched with the worker information.

Figure 68D:
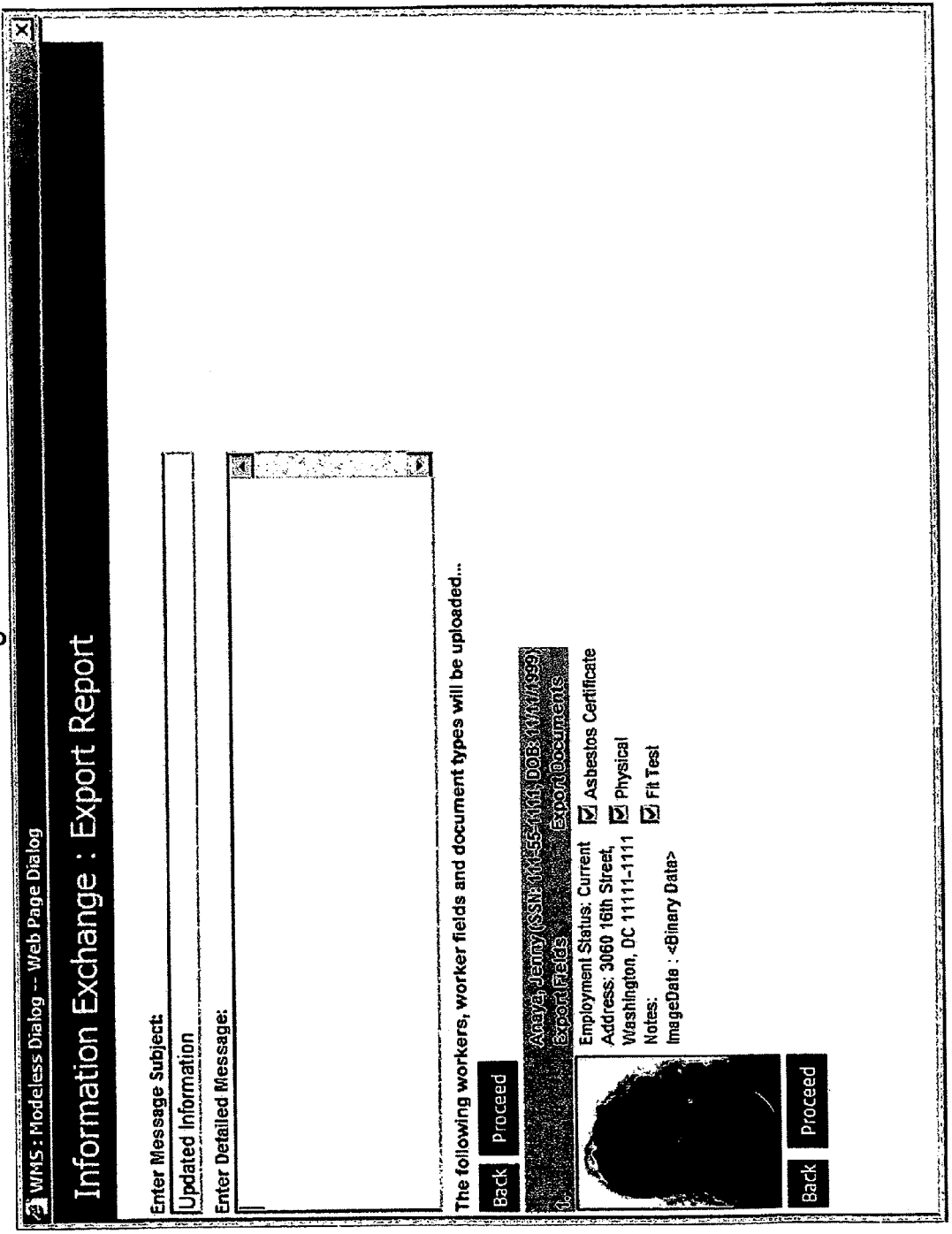

Next, the user can use this table to further select information. For example, the user can select to dispatch the information in the table by simply clicking "select all." Alternatively, the user can simply put checks next to the items to be dispatched (i.e. check marks next to the workers whose information is to be dispatched). If an item in the table is selected, the information is displayed below the table as illustrated in FIG. 68D. As a result, the user can quickly and easily review the information which is to be dispatched. The user can also include a text message as illustrated in FIG. 68D to be dispatched along with the data from the originating database (e.g., "This is all the workers we place to use for X job. Please review their documents"). Next, the user simply clicks to send a message and a window pops up relating the status of the dispatch. When the dispatch is complete the user has the option to close the window or return to the information exchange main screen.

Dispatching data into a system will add or modify data in the recipient's database. Data can be dispatched with options: "New Data Only" or a "Full Update". Dispatching New Data Only will insert data in the fields for which the recipient database does not already have values. Dispatching data with the "Full Update" option will overwrite existing data in the recipient database with values from the originating database.

But even when the "Full Update" some of the information is not necessarily transmitted. In order to increase the speed of the information exchange, before sending an image, a document, an industry representation or an ISD, transparently to the user, a unique hashing number is transmitted to the destination database. The hashing number is unique to that particular ISD and is usually consists of twenty bytes. Upon receiving the hashing number, the destination database searches for this hashing number within its system database files. If the hashing number is located, this means that this ISD is also present in the destination database. Therefore, the ISD is not transmitted from the source database but is simply loaded from the destination database. On the other hand, if the unique hashing number is not located in the destination database, then the ISD is transmitted from the source database. This process is transparent to the user. The user will receive a message with all of the ISDs, irregardless of whether they are retrieved from the destination database or dispatched from the source database.

As a result, any number of information can be dispatched quickly and easily by simply setting filters and selecting information from a table. Moreover, information to be dispatched is displayed on the screen for quick review. In addition, it can be specified how the data dispatched is to modify the recipient's database.

Reading Received Messages

Figure 68E:
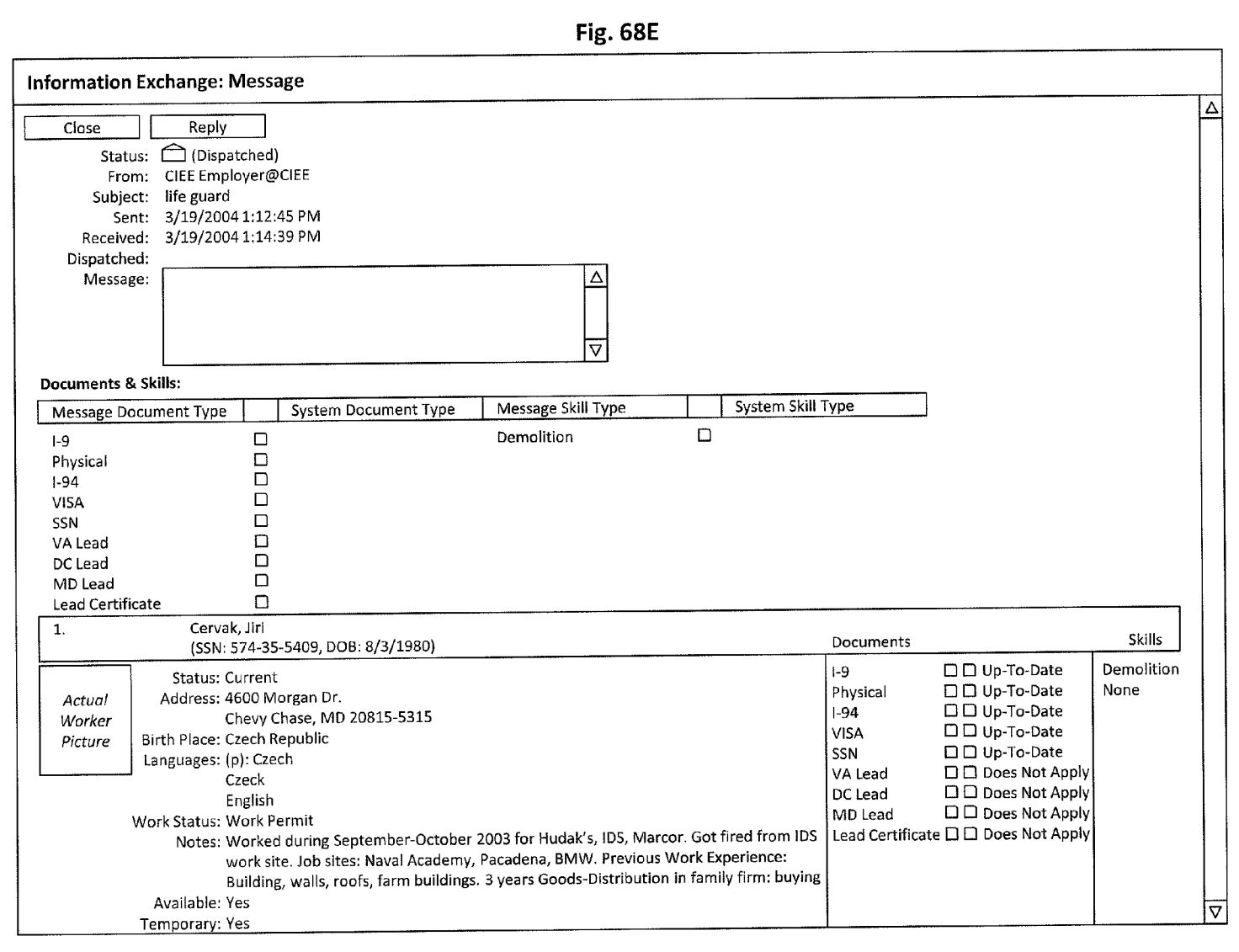

IE messages are directed to the user's information exchange inbox. In order to complete the information exchange process, a user must open the messages and accept the dispatch of the delivered information into their database. In this illustrative, non-limiting embodiment, the message is read as follows. User opens a message and a screen with details of the message pops up as illustrated in FIG. 68E. The pop up illustrated in FIG. 68E includes message text, the documents and other data types being dispatched and a list of the exact workers, jobs, customers or other files being delivered. User may request to see details of a document type or other data item by clicking on a view icon and the details of the data type may be shown in another pop up window.

The system will automatically map the data type to the data type of the recipient's database. For example, an updated physical is received for a worker X. The system will automatically map this document to a document type corresponding to a physical and a worker X in the recipient's database. If, however, the data type is mapped incorrectly or the system cannot find a corresponding matching data type, the user can manually select a corresponding data type. For example, for those data types that cannot find corresponding locations, a message will appear reading "New Type." The user can click on "New Type" to map the data or create a new data type to which it will be mapped. A new pop up is opened listing the data types currently in the recipient's database. The user can map the incoming fields to the corresponding fields in the recipient database. If a particular field does not exist in the recipient's database, the user guided by prompts to the administrative screen where the field can be created, thereby, the new field can be created on the fly without leaving the current screen.

Selective Encrypting Sensitive Fields

In transmitting information further security can be provided by selectively encrypting designated data fields. Encrypting data as it passes from server to client or client to server ensures the security of sensitive content. Encryption, however, also increases the size and complexity of the information being transmitted. In this exemplary, non-limiting embodiment, the size of data being transmitted is minimized while the security of the data being transmitted is maintained. For example, only the sensitive information is encrypted while unimportant data is left as is. By not encrypting the information that is unnecessary to secure, the system limits the size and complexity of the transmitted data, allowing information to be transmitted faster while maintaining the utmost security.

For example, when loading a web page, a large portion of the data being transmitted is not necessary to encrypt. Code specific items not including user data can make up anywhere from about 40% to 80% of the HTML code on a page. This data is unnecessary to encrypt such as tags, page titles and names of the fields are usually not the sensitive information.

For the sensitive information, however, the system may utilize both Symmetric and Asymmetric Ciphers to encrypt these sensitive fields. Symmetric Ciphers are easier to implement, require less resources and are faster as the code behind them is smaller. Symmetric Ciphers, however, are easier to break since the key that is being used for encryption is also being used for decryption. The same key is known by both parties, the encrypting and the decrypting one. Therefore, a key exchange must happen between them before they can share encrypted information. It is easy to intercept the key during the key exchange process and then decrypt the traffic.

Asymmetric ciphers, on the other hand, are virtually impossible to break as they have two keys, or in other words, a key pair. Asymmetric ciphers have a public key and a private key. The public key encrypts data that only a private key can decrypt, and the private key encrypts data that only the public key can decrypt. Asymmetric ciphers also allow for verification. The asymmetric ciphers, however, are harder to implement, require more resources and run more slowly as the code behind them is much larger.

Figure 69:
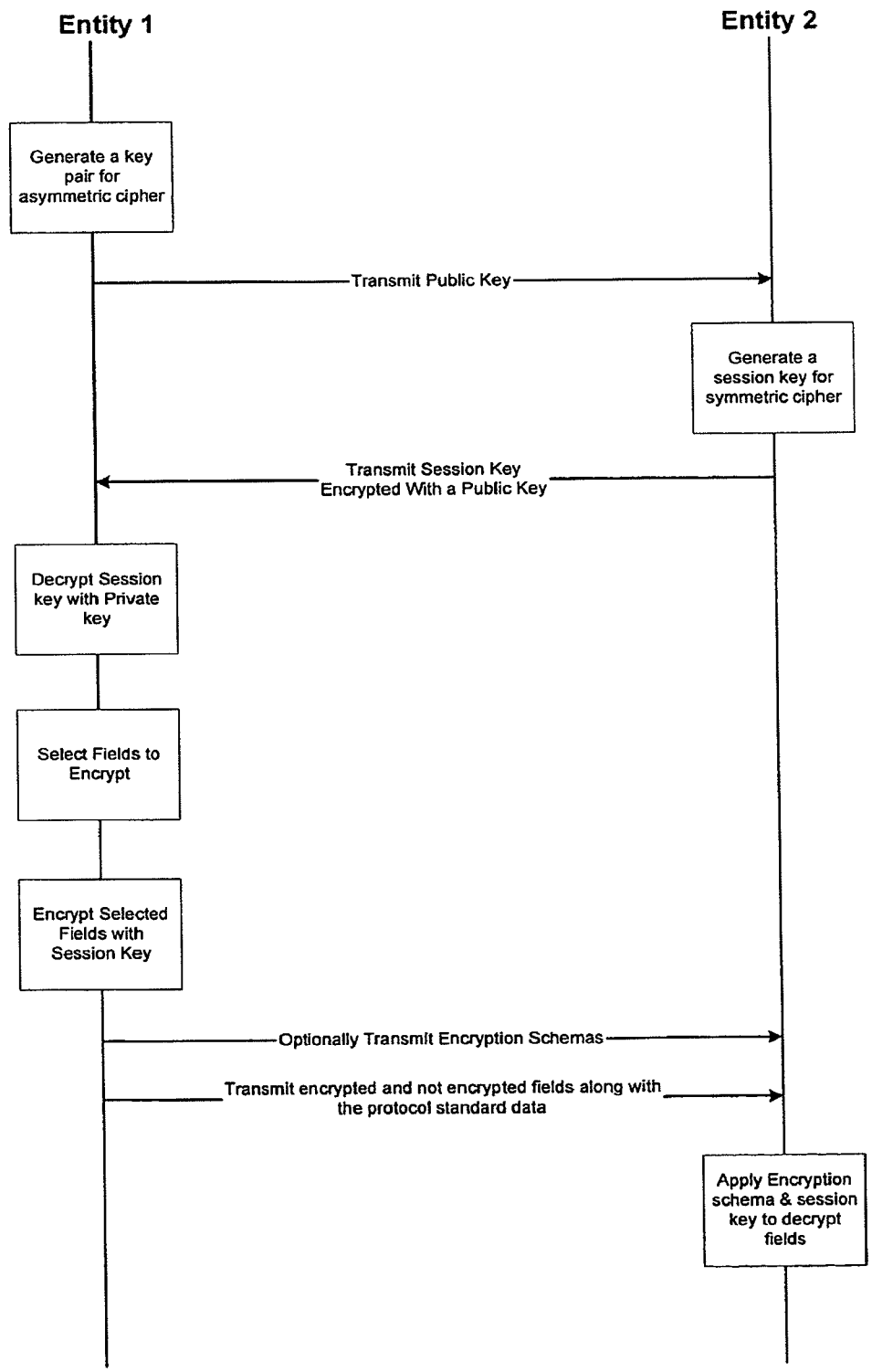
FIG. 69 is a flow chart diagram of creating a session key for selectively encrypting data, encrypting selected fields, transmitting encrypted and unencrypted data, and decrypting fields in accordance with this embodiment of the present invention.

In this exemplary, non-limiting embodiment, the system creates a session key. In the beginning of a communication, two entities exchange session keys. One entity generates a key pair for asymmetric ciphers and sends a public key to the other entity. The other entity generates a session key for symmetric ciphers. It encrypts the session key with the public key from the other entity and sends it back. The other entity takes the encrypted session key, applies its private key and decrypts it to get to the original session key as illustrated in FIG. 69. The other approach is to store the public key of transfer initiating entity in the database. This approach allows for verification of initiating entity's identity.

The system in this exemplary embodiment identifies the information that needs to be encrypted. For example, using SOAP, the system encrypts only the elements in the XML document between the tags. Thus, only the sensitive fields are being encrypted. A programmer, an administrator or a user can decide which sensitive fields should be encrypted. Selected elements between the tags are encrypted and replaced with the encrypted value as are the attributes of the element. The recipient must be aware of the items being encrypted via either implicit methods, whereby the sender assumes that the receiving side knows what is being encrypted and no schema is ever exchanged, or by explicit methods, whereby, every transmission of information should be prefixed with the encryption schema. The schema exchange precedes encrypted transmissions.

Alternatively, a mixed method may be provided, whereby the schema exchange is done independently. After receiving a new encryption schema, the receiving side simply assumes that the rest of the transmissions will be encrypted according to this schema until a new encryption schema exchange occurs. An example of an explicit schema would be in the case of synchronizing our application with a third party accounting package such as Quickbooks. The synchronization module transfers an explicit schema defining which fields will be encrypted, before transmitting the said fields. The explicit schema defines exactly which fields will be encrypted, such as worker social security number, wage rates and so on. When the receiving end obtains the schema it is clear exactly which fields need to be decrypted.

When encrypting data on a web page, the implicit method is generally used. The HTML code is generated by the server and receives data back from the server so there is no need to explicitly exchange the encryption schema. This is slightly more difficult as there is no explicit control of how to store session keys on a web browser. One method for handling session keys on the client's web browser is through the use of an Active X control. One of ordinary skill in the art would know that one could also use a .Net control to handle this function. For Netscape and non Microsoft approach applets and other client side code execution techniques can be used.

For example, the system uses an invisible Active X control that exchanges the session key with the server and stores it in a security repository which exists on a computer that uses MS Windows. A new session key exchange can be forced from the server or the client. The new session key replaces the old session key in the repository. There are at least three ways information can be passed between the client and the server. Text or other items can be pushed from the server to be displayed on the client's web browser, data can be input on the client and submitted to the server, or a combination of the two actions can exist. When the text needs to be displayed on the client, and when no feedback is expected, WMS creates another Active X, this time a Visible Active X, whose sole purpose is to display the text to the user. An object with Class ID of the provided Active X control is created. The Class ID is always the same for the Active X control being used. The encrypted information is passed as a parameter. When the information reaches the client, the Active X control begins execution. The Visible Active X takes the encrypted text from the server, obtains the session key from the invisible Active X, decrypts the text and displays it to the user. This happens during the page uploading process.

In the case where data is submitted to the server from the client, a visible Active X present on the user side captures the information the user submits. Then, the visible Active X obtains the session key from the invisible Active X to encrypt the data and submits it along with other information to the server. The server then decrypts the data during the process of receiving posted data from the web page, and processes submitted information. A combination of both of the above described cases can occur, where text is displayed from the server to the client and information is then submitted by the client to the server.

Data for encryption can be pre-selected by the system, or a user interface can be used where the user select the items to encrypt such as social security number or document images. Selective Encryption allows for much needed security without significantly increasing the transmission size. This method is more efficient than the traditional SSL, where everything is encrypted and the transmission size increases by up to about four point five times. The other downside of the SSL is that GZip HTTP encoding cannot be effectively applied to the encrypted data. Compression rate for the SSL encrypted data is less than about five percent. In this exemplary embodiment, the compression rate is better.

In this logical part, the users of IE have the ability to interact with one or more parties and exchange information electronically which empowers them to work more efficiently, reducing cost and becoming more timely with decisions and actions within the relationship. With methods that prevent duplicate entry, IE verification, IE smart management and IE Auto Update, the information is managed quickly and easily. IE is a document management solution that helps eliminating paper work, and to enable document validation to ensure compliance with government requirements, and to manage critical records securely.

Moreover, in the illustrative, non-limiting embodiment, the IE grants various permissions to different users. The rights to accept or dispatch data using information exchange are derived from the account types assigned to users. Account types and their corresponding permissions are dynamically created by the system administrator during the initial setup of the system and throughout operation of the WMS. In addition, by comparing the unique hashing numbers of the documents before transmitting the documents, as described above, duplicative transmission of data is prevented transparently to the user. This exemplary IE can be applicable to a number of industries, examples of which are provided below.

Health Care Industry

Figure 70A:
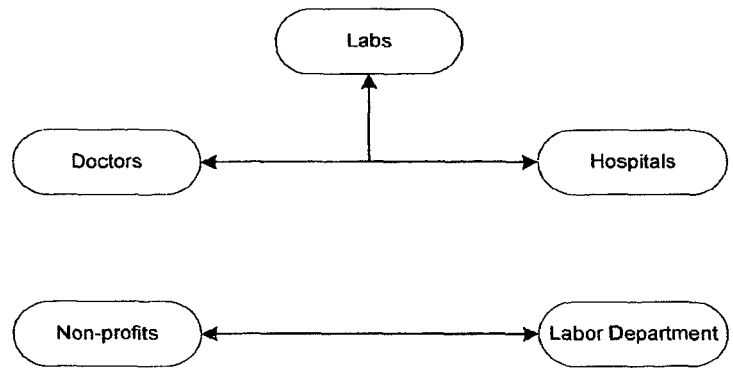
FIGS. 70A-G are block diagrams of information exchange for various industries in accordance with this embodiment of the present invention.

The health care community could benefit greatly with IE. For example, doctors, labs and hospitals could each have their own independent database managing patient information with the benefits of the WMS, see FIG. 70A. The information stream that is exchanged between each users could be done quickly, seamlessly and without paper enabling each user the ability to maintain long term storage for access when needed. For example, the lab result could be distributed automatically enabling faster decisions. Doctors could have secure access to critical decision making information that is up to the minute. This would empower doctors to make better decisions when they are away from the office. It would enable their staff to spend less time on the phone hunting down the information. IE would create a GUID for each patient enabling seamless transfer of data while enabling each user to only transfer what they want. Notifications could be sent to users when critical data was available or when specific conditions occurred. Pharmacies could be automatically notified of prescriptions written, giving them greater lead time and accuracy. A common file could be shared to ensure proper subscriptions to patient by having a shared log of each patients file, when appropriate.

When appropriate, patients could have their own sites to manage their information. Patients with long term care issues could benefit greatly from this process. As laws permit the ability for each user to have a patient file would be enormous, eliminating millions of dollars a year in document searches for finding and sending patient files as needed. Enabling the community to transfer files without a concern of sending confidential information because Smart Management tools will keep them compliant and not allow the transfer of documents considered confidential. The entire process within this small community would be very efficient. When the parties are included, the cost saving to the community and the increased health care efficiencies are immeasurable.

Non-Profit Organizations

Non-profit organizations and the Labor Board Department have endless regulations that require information and supporting documentation to monitor and manage the non-profit organization that have countless hours and millions of dollars wasted every day with duplicate entry by both of these parties. Non-profits have tough compliance reports that require submitting large amounts of information to the Labor Department for review.

In the conventional systems, some of this information is submitted electronically, some by paper and some by entering it into web page format to the Labor Department. The hours wasted are a tremendous burden on both users and others, with wasted resources spent entering duplicate information to be managed, rather than community services for which billions are donated annually. The WMS empowers the relationships to stop the current methods and embrace a solution that enables easy transfer of ISD, to be reviewed and uploaded in a simple process. Empowering both parties to spend their time and resources on more important details for the community. To empower non-profits to have an affordable solution to better manage their work practices and give them a paperless solutions that will reduce the paper work and make them compliant with many new laws and regulations.

When non-profits submit information through the WMS, the Labor Department and any other organization will benefit tremendously by having the ability to review data and have it update their databases with auto data entry. The IRS has saved enormous amounts of money using on line applications. The money saved by non-profits should be easily comparable to this solution. (Note: one difference regarding the online entry is the need for the user to key the information into a form the IRS can read. This process requires the user to submit the form in a format the IRS can translate, hence duplicate entry of information is managed by the user.) Non-profits range in funding, from little to plentiful funds. The WMS empowers non-profits with affordable solutions that not only enable the transfer of IE, saving money for the user, but also to handle their everyday business. The solution enables non profits to reduce cost and spend more time on their causes. The labor department could require auto updates, as allowed by confidentially regulations, to receive updates from non-profits to keep a closer eye on their compliance. This could be accomplished through, IE and smart alerts notifications.

Unions

Figure 70B:
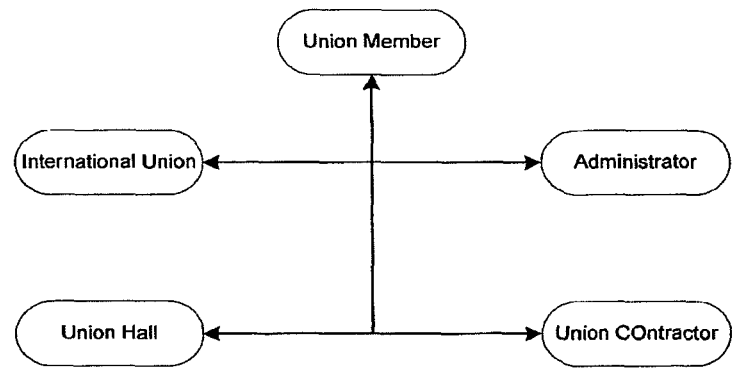

In the conventional systems, unions are engulfed in duplicate entry that amounts to 100's of millions of dollars on an annual basis as a result of administrative expenses, paper, forms and storage. Each party maintains their own records and exchange common information on a daily basis between one or many of the community members to maintain union member files and be compliant with each other and the Federal and State governments. The information that is exchanged within this community has identical terms; making it effortless to utilize IE. IE can reduce the paper work, manage information and empower each user independently to save money, and to focus on the work at hand improving the quality of their work performance, see FIG. 70B.

Some of the benefits are: transfer of dates to administrators and Union Hall each week for wages; training updates for union members and staffs of organizations; compliance with ARIS, for work hours to become a journeyman; compliance of union members for dues, training and working hours; union contractors ability to purchase licenses, maintain them and distribute to Union Hall when the work was completed to enable the union worker to find other work, while insuring they do not get reassigned under the license purchased by the contractor; easy audits for the Labor Board and other Government audits; empower the Unions to become paperless; secure confidential information for each user of the community; enable Union members to view their files on line. By empowering the Union to use IE, other users also benefit. The information shared may become flawless, timely and paperless, empowering the community to develop better relationships within the group, as well as with the existing and new customers.

Banks

Figure 70C:
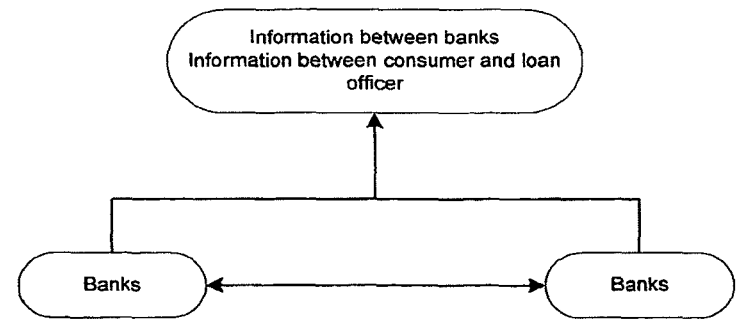

Banks will receive numerous benefits by utilizing IE. By enabling the IE, banks adopt a paperless solution making them more easily compliant with various regulations such as the Sarbanes-Oxley act. The banks can capitalize on IE in numerous ways. For example, transferring files between banks that are not sharing a common platform; transferring data between newly acquired banks; eliminating costly computers to manage client based software; enabling loan officers to transfer files without a concern of sending confidential information because Smart Management tools will keep them compliant and not allow the transfer of documents considered confidential. In addition, client folders can easily be reviewed for compliance, by using easy to read, user friendly screens that illustrate compliance, see FIG. 70C. In addition, smart alerts can be set to ensure that the client files are compliant, producing a daily report to inform loan officers of any pending issues. This empowers the loans offices to get the task done, and also empowers the bank officers to ensure compliance with governmental regulations. In addition, the WMS allows the users to secure the information by utilizing document validation to ensure authentic social security cards, driver's licenses and other documents that are required to process loans.

Facility Management

Figure 70D:
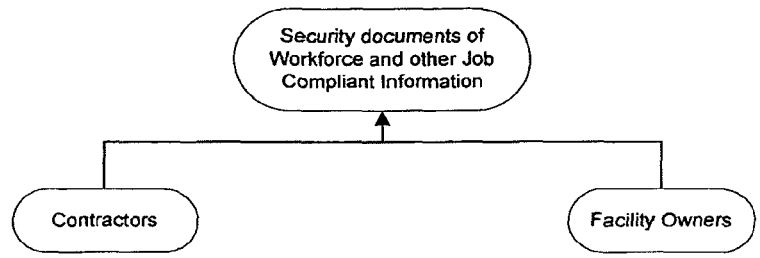

Facility Management can benefit with IE and the WMS by requiring contractors within their industry to utilize the system. Facility managers receive endless amounts of IDS from contractors, realtors, chemical companies, various vendors and customers, e.g., see FIG. 70D. This requires a tremendous amount of information and paperwork management. IE allows the facility management to exchange data with contractors easy and seamlessly, thereby reducing the paperwork.

Lawyers and the Court Systems

Figure 70E:
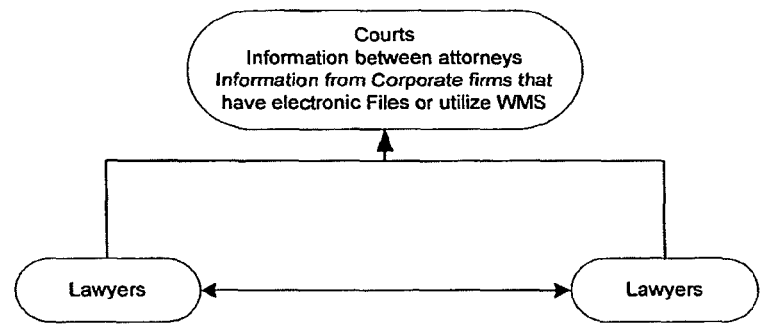

The court systems and attorneys are engulfed in paper work. The amount of effort extended to manage information in the legal system costs millions of dollars annually. By utilizing IE methods and procedures the court system could drastically reduce the paperwork. By utilizing WMS, the legal system could eliminate unlimited number of tasks that cost tax payers millions of dollars a year. For example, the WMS provides an inexpensive solution that handles technology and long term storage requirements, requiring the user to only have a web connection. When cases are reassigned, the system may automatically update attorneys, clients, and court staff via email, voice broadcast and so on, e.g., FIG. 70E.

Submittals of files could be done via IE to empower the community of necessary readers to read and access the information, while maintaining the originals in an agreed upon format for review at anytime. This would reduce the cost of paper files. It would empower users to have access to information quickly as it is developed. Police reports could be easily assigned to a file, eliminating costly data entry and copier fees. Users can attach specific notes to each document and information file, enabling them to easily track issues for court documents. The files could be managed indefinitely, enabling secure electronic file transfer to attorneys when they need an update on a client that has been in the system for a while. Rather than making costly duplicate files, the user can simply exchange the data electronically in a secure environment. They can then check to make sure it went through properly via an audit trial. This would reduce copier expenses exponentially within the legal community.

The IE provides the users with the ability to track community information regarding a document, while enabling each specific user to add new fields to track information they require about a document and keep it to themselves, while easily managing it for their cases. As a result, the courts, lawyers, and prison can easily manage a single file for an individual. It would eliminate the need to have duplicate entry, as any new user can simply purchase a WMS license and have access to the file, enabling them to view and manage any information permitted by the source they request it from.

Real Estate

Figure 70F:
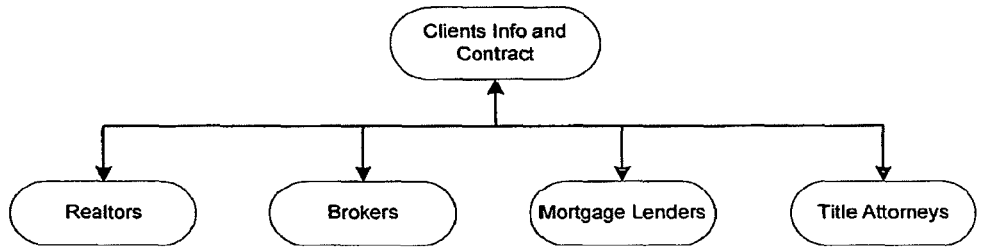

For example, a Realtor can create a contract between a buyer and seller, see FIG. 70F. They can manually or electronically complete the contract. Upon completion, the user enters key fields and scans the signed document through easy to use WMS bar code scanning or faxing. The document is forwarded to the system for upload. The user then simply selects the Broker, Title Attorney and Mortgage lender with one simple click, distributing a copy of the contract and the key information about the contract, along with the client information on both sides of the transaction. The information is then received and the recipient can confirm the information and accept or reject it. The recipient can easily view the contract to confirm the data entry prior to or after accepting it. This eliminates the need for the title attorney and mortgage lender to enter the contact names and contract terms manually.

Through easy custom links the information can be dispatched to their propriety applications for processing loans and title work. If the Title Attorney has specific information about the contract that they need to manage, which had not been previously keyed by the realtor, the attorney can easily add another field, click on the icon, load the information and manage it. In addition, the title Attorney could easily associate their WMS smart alerts to that information as the information now resides in their own database.

If the realtor resubmits the contract and the amount of the contract has changed, the recipient can select archive existing contract information, or allow the information to be overwritten. The user can easily manage changes by versioning the information and supporting documentation. This ensures an audit trail and the ability to see what happened to the data and track changes as they occur. The user can set up the audit trail to versions or only as requested. The WMS features empower the user and community of users to manage the information as if they were doing it the old fashioned way with folders and paper, except that it is being done electronically with only one actual paper file of the document residing with the realtor or the initial user.

Similar to the relationship illustrated in FIG. 70F, this exemplary IE may be applicable to an employee staffing firms. For example, with foreign workers, a sponsoring agency will need to keep a number of documents related to the visa and work permits for the foreign worker. Similarly, a potential employer may request access to a number of work and visa related information and supporting documents. In the conventional techniques, the sponsoring agency simply maintains a paper copy of all the information and supporting documentation. They retain passport copies, photos of the student, visa application forms, resumes, specialized training certifications and more. The sponsoring agency then assists the visa applicant with finding temporary, usually summer employment in the US. The sponsor must then send all the information they have on that applicant to the potential employer.

With IE, all the necessary information and supporting documentation may be stored in the database, and visa expiration dates and similar dates may be tracked. Moreover, the user may select the information and supporting documentation needed by a potential employer and dispatch the information to one or more potential employers using this IE. Similarly, the IE may be used in the context of a staffing agency providing workers to businesses in need of workers. An applicant retains their resume and other professional certifications on file with a staffing agency. The staffing agency has relationships with employers. When an employer is seeking an employee and the staff agency finds a match, they can use IE to dispatch the necessary information and supporting documentation to the employer or a number of interested employers.

General Contractor

Figure 70G:
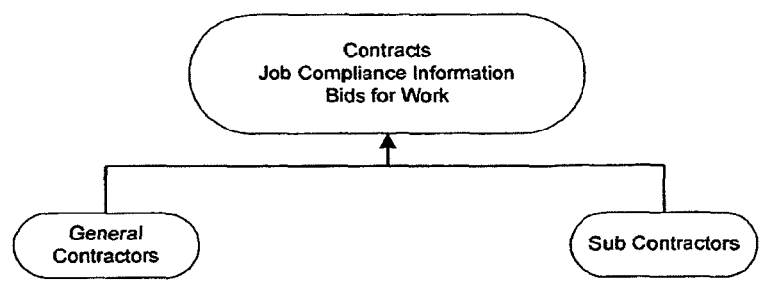

General Contractor (GC) and Subcontractor (SC) engage in business together, see FIG. 70G. They share a common relationship on one or many projects. Within this relationship, they need to exchange information and supporting documentation. The sub-contractor has to submit history, references and areas they would like to bid. The GC has to manage that information for this subcontractor and many others. In the conventional systems, the GC receives the information and hand keys the information, scans documents or attaches electronic files to a database. With IE, the contractor could easily receive, review and upload the data they wanted to manage, with supporting documentation. The GC and SC would engage in a contract that will specify common information. This information can change overtime as new contract issues arise. Therefore, the users can dynamically create fields to manage the new required information.

The relationship requires the users to typically engage in a contract. When they do so, there is information that both parties manage, for example, contract amount, contract number, terms, conditions, supporting documentation required. When the GC submits the contract, they submit the document as well as the fields for compliance if necessary. The SC receives a message stating a new message has arrived, they review the message and determine what they want to receive; upon acceptance they manage the information within their own database. The WMS empowers the SC to accept only the information and documentation they want to receive from the GC.

In this example, the SC wants to select the contract, the amount of the contract, the contract number, the specific conditions of the contract, bond amount, workforce trade requirements, data of completion, key contacts, products required to use and materials required to use. The SC navigates the list with a series of check boxes. This is the first time the SC has worked with the GC so when the information is accepted, the term contract number is different. The SC spelled out number and the GC used the # sign when creating the document type fields. So the SC simply maps the fields together. Going forward this information will be exchanged seamlessly; no further mapping will be required.

In addition, the contract has a field that was managing data called, liquidated damage amount. The SC, in this case does not have this field. So the uses simple check box navigation to say "yes, create new field". Upon acceptance the new field will be added to the fields that are managed for contracts. Going forward the fields will be mapped between users and any new contracts with this user or other users will be available to capture the information. If this is a unique field to this relationship only, the user can simply select the document type in the GC file and set a simple check box to say view only in this custom file, do not display in template.

If another field comes in during the mapping process, the WMS will ask the user if they want to activate this field for this new event only, or activate permanently, or create another new field. This flexibility allows the user to handle the information easily and seamlessly. In the IE, once the relationship is linked between two or more users, the mapping is applicable to subsequent information exchanges.

In short, IE offers easy to manage viewing screens to monitor the information in color code and view the status of the ISDs. IE enables two or more parties to work in a seamless environment reducing hundreds of wasted hours managing and re-keying information. Users utilize the IE to easily forward small or large files to the recipient. With a few simple mouse clicks the information is submitted to the recipient. With a few simple mouse clicks the user verifies the information and then accepts or rejects the information and populates their database enabling the WMS to manage the information with smart alerts. The IE may eliminate the need to re-key data once it has already been entered into a database; it may also eliminate the need to rescan information once it has been loaded in electronic form, and it may eliminate the need for recipients to fax, FedEx, UPS or distribute documents by other costly means.

The user can set new fields to be specific to a certain relationship or add them to the global template. If the user has set the field to be for a specific relationship, the WMS asks if they want to activate the field for that information of another specific relationship and or to add the filed to the template. The WMS empowers users to act quickly with accurate and validated IDS. The system set in place monitors compliance using smart alerts set by the user.

The WMS is an open dynamic platform that allows two or more users to create document types and common information types that develop a platform to exchange and manage information quickly and easily. IE gives the user complete control over what they share while enabling the user to easily view information and manage the information before populating it in their database.

By empowering users to utilize IE, the user has the ability to remove duplicate entry while validating information that has been submitted. This process gives users the ability to easily work together while saving hours otherwise spent on duplicate entry and as a result, missing the opportunity to evaluate the information because of time restraints. With IE, once one of the users has captured the information, the entire community may utilizes that entry as if it were their own. This saves the community from everyone entering the same information over and over and making data entry errors.

WMS empowers the user to manage information through color coding, email alerts, voice broadcast and pop-ups, based on user defined business rules. The user is able to better manage their activities and the entire community of users is empowered to be more efficient and produce more results, with precise information, more reliable and faster without the need to wait for analysis as a result of re-keying data.

The ability to exchange information and supporting documentation and remove duplicate entry frees business managers to use their time more wisely and efficiently, focusing on work at hand as opposed to being slaves to data entry. The need to manage, sort, analyze and track data is imperative for anyone to make decisions within a relationship, whether it is a home owner viewing their calendar for their children's play group times, or a banker sharing loan documents between branches across a state. The user has control over the information they distribute and receive. The IE enables the community of users the ability to utilize dynamic entry of fields to manage new terms in the community.

Parties benefit from IE; the process is easy, fast, seamless and affordable compared to what it costs to re-key data for users large and small. The process which enables 24/7 access, storage and access as a web-based application is priced similar to cell phone packages. The IE auto update can be set up on any level of information to ensure information is managed as quickly as the information is available.

I. WMS Solutions

The WMS Solution module is easy to use. Many conventional software applications require the user to navigate through numerous screens within modules to enter information. Typically, there is an association between one module and another. During data entry, many times an event occurs that has not been set up in the predefined menu, causing the user to have to leave the existing screen and navigate to the setup screen, adjust the information and finally navigate back. The WMS uses pop-up screens to enable the user to reach out and adjust the information on the fly without leaving the base screen they are working on. The use of tab-based menus on a number of screens enables the user to go to any screen within the WMS without losing data or confusion. This saves the user substantial time without unnecessary keystrokes and navigation.

Another feature of the systems is the "auto updating screen"—as the user edits or inputs information, the data and calculations refresh with the adjusted accurate data. An example of this would be if an accountant was entering payroll information and the worker was given a raise, as explained above. With the WMS payroll system the user could enter the new wage directly over the old and it would apply for that pay period only, or the user could click on the worker icon and pull up there file in one click, then select the worker edit button, then enter the new wage rate, then click exits the screen and the user would be right back in the payroll data enter screen with the new wage displayed. In the conventional payroll applications this would require the user to leave the screen, go the worker file, set the new wage and then return to the payroll date screen. The WMS solution is fast, easy and always delivers up to date information to the user. This module has the following sub-modules 1) call broadcast, 2) smart alerts and pop-ups notifications and 3) Custom Document Report Writer.

1) Call Broadcast

This sub-module utilizes broadcast calling to inform workers of changes in work schedule, new potential work or company information, and remind the worker of scheduled qualification updates. Through the use of predefined sorts, flagging and scheduling, this sub-module calls a specific group of workers to broadcast a message the user creates. The message is left in voice by the user and is set to be broadcast at a specific time set by the user.

This sub-module has a relational link between broadcast calling and the need to respond or directly communicate to a specified group of people for a specific reason by using a database to define or flag that group. Broadcast calling has been designed to specifically generate prerecorded messages to a group of people. This sub-module has refined this capability to be used within software to identify specific groups of people to contact such as a predefined workforce, a workforce based on certain criteria, a group of predefined customers or vendors.

In addition, the WMS allows for the use of broadcast calling to respond to calls with the use of personalized messages. This empowers business owners, salesman, brokers, coaches and others giving them the ability to respond to the tremendous flow of incoming calls with one simple broadcast call addressing a similar issue. The WMS Broadcast Call Feature has been designed to be a stand-alone feature that can be embedded in any software application that creates a call list or stand on its own and have a call list loaded to it from any software application.

This sub-module is a solution for sending information and reminders to the workforce through a selection of a specific group of workers and the technology of broadcast calling. In the conventional systems, administrators are required to make numerous phone calls to remind workers of upcoming qualification updates and work schedules, recruit workers for new staffing demands, inform workers of new policies and changes in worker schedules, as well as many other issues that require the same or similar information to inform the worker.

In many instances the user is required to take a long list of phone numbers home to make calls in the evening and early morning in an attempt to reach the worker. With the use of WMS broadcast calling the user can set a specific time, a specific group of workers, selection of numbers to call, home, cell phone, other number and record a specific message in their own voice to be dispatched directly to the worker. With a click of a button the user can go home without their list of workers, and know that the automated system will call and give the worker the information they need.

The worker can respond to the message by use of the telephone keypad. By following the instructions on the message the worker can dial in a response sending it directly back to the user. The user will receive a detailed report instantly upon dispatch informing them of each worker's response or what resulted from the call. If a fax machine was reached, the worker hung up on the call, or a voice mail was reached and a message left, the report gives detailed information allowing the user to make more informed decisions. The user can easily record a second message and send a second call to the same group or a selection of the original group called quickly and easily with the selection of a few options.

An example of this would be the need for a company to hire 20 additional workers to perform demolition work for a recently awarded project. In the conventional systems, most administrators are required to dig through old worker files, retrieve their numbers, and then start dialing to see if the workers are available to return to work. This could be done during the day but typically the worker would be out performing their new job and would not be home until after their day's activities. Therefore, calling in the evening and early morning is the best time to reach the worker. Upon receiving the call, the worker is informed of the project and easily dials 1 to respond that they are ready to work and will be happy to start on Monday. This information is dispatched directly back to the user. The user is then able to quickly see the responses. In this case, the end user may have selected 20 of the best workers he used on the last project. Ten may have dialed (1), saying they will be in on Monday, three dialed (2) saying thank you but they have a job but please keep them on the call list, two dialed (3) saying no thank you, one dialed (4) saying please take me off your call list. The report showed 16 responses, 1 voice mail reached, 1 fax machine and 2 numbers that were disconnected. The user checks their records and sees that several of the workers with disconnected numbers have friends that currently work with the company. This sub-module enables the user to track groups of workers enabling the user to expand their reach when trying to find workers. The administrator creates a new message and sets a new broadcast call to the friends asking them to let the worker know they have work available. Again, the WMS would submit information back to the user regarding the call. In this case one of the friends dialed (1) informing the user that they knew where the worker was and would inform them of the message.

Another example of this sub-modules ability, worker broadcast is the ability to call a specific group of workers that meet a certain job criteria. This could be single best method for finding worker to respond to emergency work. With the use of WMS worker broadcast call, the user can call as few as 1 or as many as thousands of workers in a single instance. With the use of WMS Job Management or the WMS search engine, the user can easily identify a group of workers with specific skills and qualifications and broadcast a call with a simple click of the button to qualified workers to respond to the need. This would enable the user to contact numerous workers in seconds as opposed to hours to be able to make immediate decisions. In the past, telephone trees would be established while one worker would call ten and another ten. With the WMS, the worker cannot only broadcast call 1000 workers be called but their responses could be identified immediately. During a crises, such a large chemical spill or even worse a bio-terrorist attack, the system can quickly identify who is qualified to work at that location based on State and Federal training regulations and within seconds make unlimited phone calls dispatching the message allowing each worker to reply with a response informing the end user of their ability to respond. This is an invaluable resource for the ability to receive workers who typically carry cell phones and have no other way of being reached.

Another example of the Worker broadcast call is the ability to send a reminder to the worker regarding a schedule qualification update. Each qualification stored in the worker file has the ability to be scheduled for an update. When the update is scheduled the user has the option to notify the worker of the update. The notification can be set at a needed time or several times and so on.

For example, a worker may be required to get a new physical, and the user can set a reminder call to be sent the evening before to the worker reminding them of the doctor's appointment the next day. The worker also has the ability to respond as to there intentions. In addition, another reminder is sent 1 hour before the scheduled appointment. Finally a message is sent 2 hours after the appointment to verify the worker attended the appointment. The response to each of these calls informs the user of the status of the qualification update and enables the user to make decisions about the workers availability.

If the worker, dialed (2), for example, which responded they did not make the doctors appointment, the user would know at that instant that the worker would be unable to work the following Monday and the opposite of that would be knowing the worker completed their physical and was ready to go. The use of reminder messages is a way for the users to ensure their work force keeps up with updates and remains qualified to work.

For example, every time a worker's driver's license is going to expire, a voice call will be dispatched to the worker reminding them to get a new driver's license, the worker responds to the message, and the user know that the issue is being addressed.

WMS Job Reassignment Broadcast

The WMS broadcast call enables the user to dial to anyone within the database. Typically the user would like to call each customer, vendor, worker or staff personally, however, due to heavy time demands or unusually circumstances the user may not have the ability to do so, or the user may have a need to set up a call in advance. Through the use of the WMS broadcast call, the user can select from any database in the WMS system and create a message to be dispatched to those specified numbers. This allows the user to inform individuals of information and quickly receive a response to make better business decisions.

For example, if a job has been rescheduled for two weeks. Rather than the user having to call the associated parties, the WMS makes it easy for the user to identify which customers, vendors, staff and workers should be called. The personalized message is made regarding a number of details and the message is simply sent. The recipient responds and within minutes the user knows who they have to find and inform, while knowing that a number of entities have already responded and that they can make it for the rescheduled new date.

WMS Customer Broadcast

Today, many people do not have instant email access, however, most business professionals have cell phones. The WMS provides the user with the ability to utilize the customer database to track which customers wish to receive broadcast calling and which customers do not want to receive broadcast calling. With the use of the customer broadcast, the user can easily identify which customers the user wants to call, create a personalized message, and set the responses to inform the user whether or not they will need to call the customer regarding the sale.

This enables both the user and the customer to control their time more efficiently. In order to get away from offensive voice mails today, the user would simply discuss the use of the message broadcast and note the customer broadcast file requested or denied. By making this selection, the WMS knows when to accept or reject a request to broadcast call to a customer. An example of sending a broadcast call to the customer would be the availability to utilize a new piece of equipment. The user can create a specific message asking their customers if they would be interested in hearing more about this equipment. Since the relationship has already been determined the user is comfortable to dispatch the call directly to the customers' cell phone. The user can respond dial (1), please send me more information, dial (2) to respond not interested or dial (3) do not use this form of communication in the future. The WMS customer broadcast would be set up to monitor activity and to inform the user of each response allowing them to make better business decisions in the future.

WMS Response Broadcast Call

Due to the tremendously busy schedules and difficultly in responding to numerous phone calls within a day, the WMS provides a Response Broadcast call. This method of utilizing the broadcast abilities enables the user to easily select an individual or group of individuals to call and send a response to. By reviewing the WMS task list, or any list, WMS response broadcast call, is a stand-alone feature that can be modified to any contact database, task database, or any type of software that can identify a list. The user can send a personalized response explaining why they could not respond and when they would be able to respond.

For example, when the user is tied up in a meeting all day, and they returned to their office at the end of the day with 20 phone calls to make in 15 minutes before they had to leave to their son's soccer game. Rather than not responding to the calls, or missing the soccer game, the user sets up two calls, one that is very personalized to 12 of the callers who are close customers, explaining the circumstances of the meeting and the need to get to the soccer game, and if it is critical please call on their cell phone, otherwise they will call in the morning. The other 8 callers would receive a call saying they will be called back in the morning. Using the WMS response call, individuals can take control of the immense responsibility of returning phone calls, while maintaining a balance to the numerous calls necessary in today's busy world.

For example, the soccer coach may receive 10 phone calls from Moms wanting to know if the soccer game is still on for tomorrow with all the rain. With a simple click in a software database such as ACT, the user can identify whom to call, set up a personal message and off it goes. In the morning, the coach can wake up and make a new message to send out to the players to inform them of the final decision. This broadcast calling is an efficient solution to respond to too many calls. Two messages can be recorded for 20 different calls. Sales updates can be personalized.

2) Smart Alerts and Pop-Ups Notifications

The WMS has a combination of email alerts and pop ups that can be turned on and off by the user for monitoring and notification of specific job management and document management. A number of alerts were described above. By utilizing emails and pop up alerts within job management and document management the user has the ability to prevent cost overruns, breach of company policy, insure necessary updates of requirements and skills and to notify management of thresholds that have been reached. Each alert and pop up offers the ability for the user to be reminded and notified upon specified criteria that will enable the user to better manage and execute their business plan. Traditional pop ups and emails have been sent has reminders, WMS has captured the relationship of document management and job critical information that enables the user to define threshold notification levels to better manage their business.

The system also provides scheduled alerts to notify the administrator when a worker needs an update or has completed an update. The schedule alert gives the user the ability to attach, not only a pop up and email reminder of a worker document that is going to expire, but also allows the user to manage the alert. The user can request a smart alert to notify an administrator 30 days from expiration of each document for a worker. If the update has not occurred the smart alert can send a new alert to the administrator and the manager. A third alert can be sent when the document is not updated 2 days prior to expiration to the administrator, manager and owner. The user controls who receives the email alerts, the number of days, and the frequency. The smart alert, which consists of emails or pop ups or both are controlled per occurrence. In addition, the alerts can be sent to the worker, via email or WMS out call. Additionally, smart alerts for Job Cost, Schedule, Payroll, Documents, Documents Distribution, Task Reminders and other Custom Alerts are embedded throughout the WMS system.

3) Custom Document Report Writer

WMS custom reports allows the user to dynamically generate reports from anywhere within the WMS system. By utilizing the report writer the user can identify fields within the database and build custom reports to meet their needs. The report wizard walks the user through the process step by step insuring the integrity of the data and its relationships for distribution. In the event the user is unable to build a report, the end user has the ability to call the WMS document center for support or contract our system partners to develop any type of report information they need.

An example of a custom document report could be a quick document status report that generates a report informing the user of the workers that are currently working, what job they are working on, their pay rates, the average pay-rate for the job, and reconciles the number of men on site compared to the number requested.

J. Vendor Management

Figure 71:
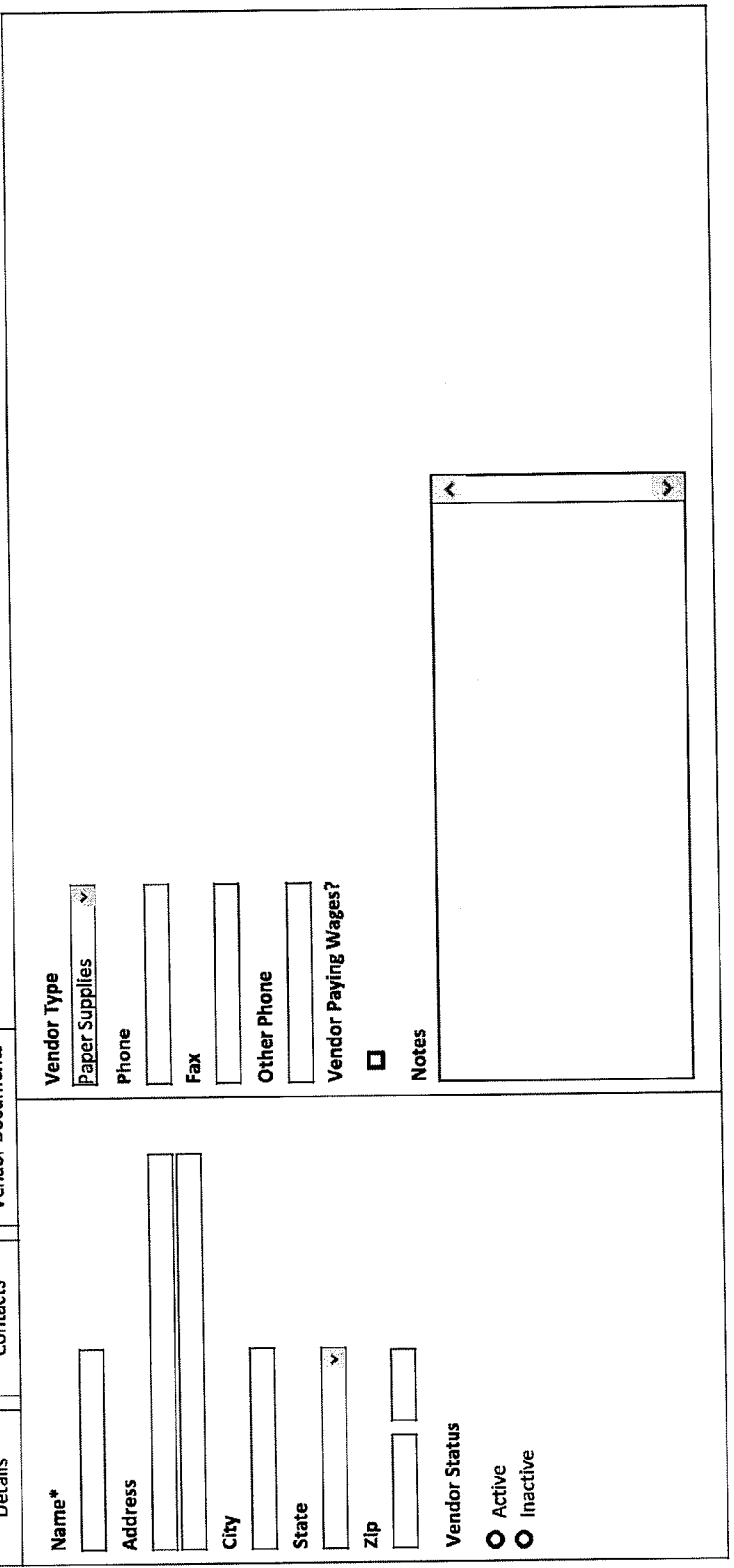
FIG. 71 is a GUI for adding a new vendor in accordance with this embodiment of the present invention.

The vendor management module of this exemplary, non-limiting embodiment of the WMS system allows the user to effectively manage aspects of uploading and tracking information related to vendors. In this exemplary embodiment, the vendor management module is split into 1) adding new vendor and 2) vendor list. To add a new vendor, the user may simply click on a corresponding button illustrated in FIG. 71. The vendor information may be split into vendor details, contacts and vendor documents, which may be accessed by clicking on the corresponding tabs. Thereby, the user may enter details for the vendor, the vendor's contact information and upload documents for the vendor (e.g., coupons). Similarly, the user may edit vendor information and documents by manipulating the corresponding tabs.

In addition, the user may view a list of vendors by clicking on a corresponding tab. The user can set preferences, select fields which are to be displayed on the vendor list. For example, the user may select to be view vendor name and phone only or address and email information and so on.

K. Company Management

Figure 72:
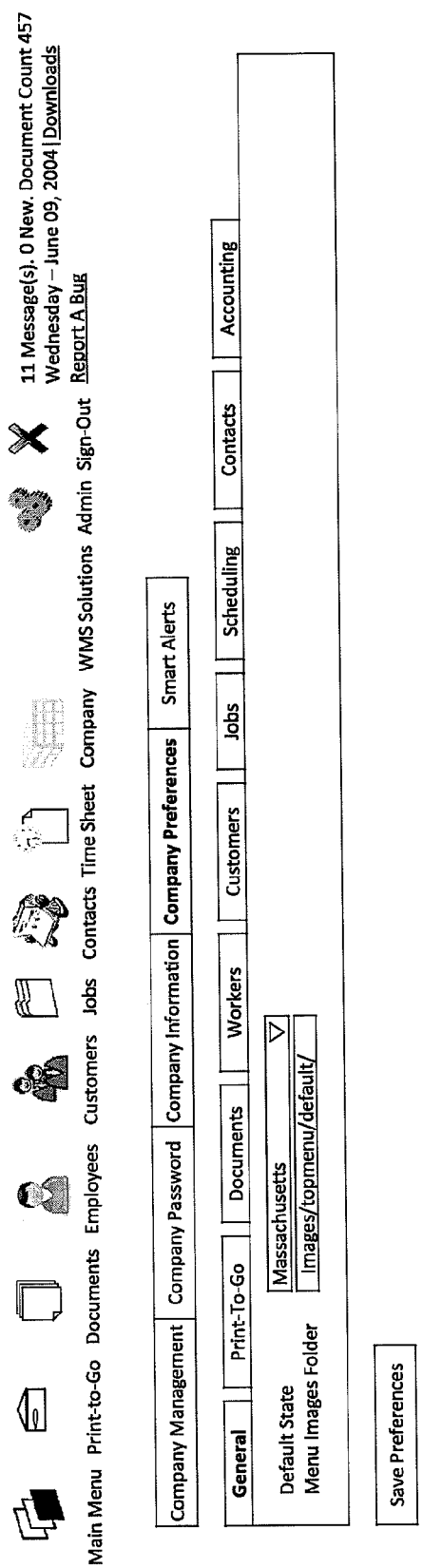
FIG. 72 is a GUI for setting preferences for the company in accordance with this embodiment of the present invention.

The company management module of this exemplary, non-limiting embodiment allows the user to effectively manage aspects of information related to the company. For example, the user may set or change the password for the company. In addition, the user may add, edit and view company information and company related documents. This module provides the user with the ability to set defaults and preferences as illustrated in FIG. 72. For example, the user can set account preferences, document preferences and so on. Finally, in this module, the user can create and set smart alerts for the company.

IV. Summary of the Exemplary Architectural Design of the Worker Management System The exemplary, non-limiting embodiment of the present invention has numerous advantages, providing the users with ways to streamline and simplify complex work and staffing requirements. With the WMS described herein, the user can manage the complete project, including workers, documents, scheduling, budgeting and payroll functions from a single user interface and using a single depository of data that is accessed in real-time. Real-time input and output attributes are integrated throughout the WMS. Real-time information is loaded into the system as workers enter and leave the system, using traditional print, computerized input or bar code input.

By using WMS, the user is able to view that day's activities quickly and rapidly, and using real-time date capture by use of a Nextel phone, time card scan, PDA or any web device, the user has control of the job site. The user also has real-time visibility into scheduled costs, actual site costs, schedule progress, and can thereby readily determine actual versus scheduled costs. For example, if the owner has scheduled 10 people, as the 11th person tries to sign in the supervisor is sent a message denying the workers ability to sign in without an override.

Also, any inventory or materials associated with a project can be tracked in accordance with the site requirements or number of personnel employed. Finally, payroll is automatically calculated based on the workers assigned to a particular job.

The system can be hosted in a central location and configured for web-based delivery to respective customers for the system, or hosted through a dedicated computer network, either inter-company or intra-company. In other words, multiple independent customers may access the WMS software through an Internet connection to a single host facility. Also, a customer may choose a stand-alone version of the software to be configured on a dedicated internal computer network. Whether web-based or dedicated, the customer may also grant other entities access to the customer's data via a series of permissions and secure logins. Other variations are possible and are within the scope of the invention.

The WMS manages the relationship between workers' skills, qualifications, job requirements, schedule requirements and task requirements, thereby providing a simple solution to job management. The ability to control and manage these issues with flexibility and reliability, while having critical cost information continually updated in real-time, enables the users to make better decisions. The WMS system has the following broad capabilities: Resource Management—allows scheduling of workers by day and/or week; Resource Search—allows searching of workers to find available workers with certain specified qualifications; Print/fax/email—allows documentation (by customer/job/worker) to be batch printed/faxed/emailed through single selection; Worker Document Management—stores/retrieves/manages worker regulated documents; Customer Contact Management—manages the client/customer history, pay rates, contact information; Customer Job Management—manages the type of job, location, notes, history, regulated industry requirements; Payroll Management—allows worker time to be entered and generates paychecks based on worker pay rates and hours input; Invoice Management—generates custom invoices based on worker time entered against customer and job; Custom payroll/accounting import/export functions with widely used conventional payroll/accounting systems, for example, Paychex, ADP and Quickbooks and other available systems; and so on.

The above-identified invention may be embodied in a computer program product, as will now be explained. On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers.

For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium. For the sake of simplicity, therefore, the term "program product" is thus used to refer to a computer useable medium, as defined above, which bears in any form of software to enable a computer system to operate according to the above-identified invention. Thus, the invention is also embodied in a program product bearing software which enables a computer to perform worker and document management system according to the invention.

The invention is also embodied in a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like. As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of this invention that an actual user ever interacts with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

The WMS may be several separate programs, only one program, a module of a program, or even a particular task of a module. An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

The above and other features of the invention including various novel method steps and a system of the various modules have been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention as defined by the appended claims.

What is claimed is:

1. A computer assisted method of managing documents comprising:
storing a plurality of electronic documents, data related to said plurality of documents based on compliance status of the plurality of electronic documents, and a list of entities with data related to the entities, relationally linking the electronic documents to at least one entity from the list of entities;
determining, by a computer, whether the entity meets a requirement by analyzing the documents linked to said entity, said data related to said plurality of documents, existence of said plurality of documents, and information related to said entity,
wherein the determining comprises:
dynamically selecting, by a user, types of the documents and types of said data related to said documents; and
dynamically setting, by the user, filters for information to be displayed based on said selection of the type of the documents;
displaying said at least one entity from the list of entities with at least one corresponding industry document from said documents based on said set filter; and
selecting an entity from said list of entities based on said determination from the displayed at least one entity, and
wherein the entity meets the requirement when the entity has documents required to meet compliance regulation, the documents are linked to the entity and the documents are valid.

2. The computer assisted method according to claim 1, further comprising grouping at least one document from the plurality of documents to form an entity type, and wherein said analysis comprises analyzing whether an entity from the list of entities has documents necessary to meet the entity type.

3. The computer assisted method according to claim 1, further comprising storing detailed information for each of the entities on the list, and linking an entity to a subject based on whether the entity is categorized under the entity type, wherein the entity type further comprises at least some of the information from the detailed information.

4. The computer assisted method according to claim 1, further comprising color coding said documents based on the current statuses of said documents.

5. The computer assisted method according to claim 1, wherein said data related to said documents comprises information about statuses of said documents and color coding said documents based on said statuses, and wherein a first document of a first status is displayed in a color different from a second document in a second status.

6. The computer assisted method according to claim 1, further comprising dynamically building a user interface that displays information for each of said at least one entity on the list by having a user selecting type of information to view and order for the view for each of said at least one entity on the list.

7. The computer assisted method according to claim 1, further comprising user selecting an entity from said list of entities and displaying attributes of the selected entity based on the existence of necessary documents and based on a status of the necessary documents for said selected entity.

8. The computer assisted method according to claim 1, further comprising grouping documents for the selected at least entity into groups.

9. The computer assisted method according to claim 1, further comprising adding an entity to said list of entities and adding data related to the entity, wherein a user navigates through data to be added based on tabs organized by types of data, and wherein the tabs are dynamically defined by the user such that the user dynamically creates user interfaces for each of said tabs.

10. The computer assisted method according to claim 1, further comprising dynamically building a user interface that displays information for each of said at least one entity on the list by having a user selecting type of information to view and order for the view for each of said at least one entity on the list.

11. The computer assisted method according to claim 1, further comprising user selecting an entity from said list of entities and displaying entity characteristics based on the existence of necessary documents and based on a status of the necessary documents for said selected entity.

12. A computer system adapted to manage documents, comprising:
  a processor, and
  a memory including software instruction adapted to enable the computer system to perform the operations of:
  storing a plurality of electronic documents, data related to said plurality of documents based on compliance status of the plurality of electronic documents, and a list of entities with data related to the entities, relationally linking the electronic documents to at least one entity from the list of entities;
  determining whether the entity meets a requirement by analyzing the documents linked to said entity, said data related to said plurality of documents, existence of said plurality of documents, and information related to said entity,
  wherein the determining comprises:
    dynamically selecting, by a user, types of the documents and types of said data related to said documents; and
    dynamically setting, by the user, filters for information to be displayed based on said selection of the type of the documents;
    displaying said at least one entity from the list of entities with at least one corresponding industry document from said documents based on said set filter; and
    selecting an entity from said list of entities based on said determination from the displayed at least one entity, and
  wherein the entity meets the requirement when the entity has documents required to meet compliance regulation, the documents are linked to the entity and the documents are valid.

13. The computer system according to claim 12, wherein the processor is configured to group at least one document from the plurality of documents to form an entity type, and wherein said analysis by the processor comprises analyzing whether an entity from the list of entities has documents necessary to meet the entity type.

14. The computer system according to claim 12, wherein the memory stores detailed information for each of the entities on the list, and links an entity to a subject based on whether the entity is categorized under the entity type, and wherein the entity type further comprises at least some of the information from the detailed information.

15. The computer system according to claim 12, wherein the processor is configured to color code said documents based on the current statuses of said documents.

16. The computer system according to claim 12, wherein said data related to said documents comprises information about statuses of said documents and color coding said documents based on said statuses, and wherein a first document of a first status is displayed in a color different from a second document in a second status.

17. The computer system according to claim 12, wherein the processor is configured to dynamically build a user interface that displays information for each of said at least one entity on the list by having a user selecting type of information to view and order for the view for each of said at least one entity on the list.

18. The computer system according to claim 12, wherein the processor is further configured to receive a user selection of an entity from said list of entities and configured to control a display to display attributes of the selected entity based on the existence of necessary documents and based on a status of the necessary documents for said selected entity.

19. The computer system according to claim 12, wherein the processor is further configured to group documents for the selected at least entity into groups.

20. The computer system according to claim 12, wherein the processor is configured to add an entity to said list of entities and to add data related to the entity, wherein data to be added is organized by tabs based on types of data, and wherein the tabs are dynamically defined by the user such that the user dynamically creates user interfaces for each of said tabs.

21. The computer system according to claim 12, wherein the processor is configured to dynamically build a user interface that displays information for each of said at least one entity on the list by having a user selecting type of information to view and order for the view for each of said at least one entity on the list.

22. The computer system according to claim 12, wherein the processor is configured to receive a user selection of an entity from said list of entities and displaying entity characteristics based on the existence of necessary documents and based on a status of the necessary documents for said selected entity.

23. A non-transitory computer readable medium storing instructions, which when executed by a computer, cause the computer to perform operations comprising:
  storing a plurality of electronic documents, data related to said plurality of documents based on compliance status of the plurality of electronic documents, and a list of entities with data related to the entities, relationally linking the electronic documents to at least one entity from the list of entities;
  determining, by a computer, whether the entity meets a requirement by analyzing the documents linked to said entity, said data related to said plurality of documents, existence of said plurality of documents, and information related to said entity,
  wherein the determining comprises:
    dynamically selecting, by a user, types of the documents and types of said data related to said documents; and
    dynamically setting, by the user, filters for information to be displayed based on said selection of the type of the documents;
    displaying said at least one entity from the list of entities with at least one corresponding industry document from said documents based on said set filter; and selecting an entity from said list of entities based on said determination from the displayed at least one entity, and wherein the entity meets the requirement when the entity has documents required to meet compliance regulation, the documents are linked to the entity and the documents are valid.

* * * * *